United States Patent [19]

Cray et al.

[11] 4,393,495
[45] Jul. 12, 1983

[54] MESSAGE TRANSLATION ARRANGEMENT FOR TELEPHONY SYSTEM WITH ROMOTE PORT GROUPS

[75] Inventors: Edgar R. Cray, Altamonte Springs; Russell R. Davis, Seminole County; Maynard K. Knapp, Altamonte Springs; Glenn L. Richards; Bernard H. Root, both of Longwood; William W. Woodruff, Winter Springs, all of Fla.

[73] Assignee: Stromberg-Carlson Corporation, Tampa, Fla.

[21] Appl. No.: 204,114

[22] Filed: Nov. 5, 1980

[51] Int. Cl.³ .......................... H04J 3/12; H04Q 3/54
[52] U.S. Cl. ................................ 370/56; 179/18 ES; 370/110.1
[58] Field of Search ............................ 370/110.1, 56; 179/18 ES

[56] References Cited

U.S. PATENT DOCUMENTS 4,133,980  1/1979  Moed .................................. 370/110
4,288,870  9/1981  McDonald et al. ................... 370/56

OTHER PUBLICATIONS

"Modular Digital Switching Network", Frank Fellinger, International Conference on Communications, (Toronto, Canada), Jun. 1978, pp. 37.3.1–37.3.6.

Primary Examiner—Thomas W. Brown
Attorney, Agent, or Firm—Cesari and McKenna

[57] ABSTRACT

A telephony network with a digital central office and one or more remotely located digital satellite units. Each digital satellite unit connects to a number of remote subscriber lines and monitors these lines to establish communications through interconnecting spans and a digital satellite interface at the digital central office. The digital satellite interface includes a programmed controller that communicates with the remote digital satellite units connected to it, with call processing equipment in the digital central office and with maintenance processing equipment in the digital central office. Supervisory information and voice data information, in digital form, pass through span equipment that interconnects port group highways in the digital central office and the interconnecting spans. The span equipment strips messages from and inserts messages into signalling time slots on the interconnecting span.

38 Claims, 114 Drawing Figures

FORMATTER 25 BLOCK DIAGRAM

PROCESSOR 27 BLOCK DIAGRAM

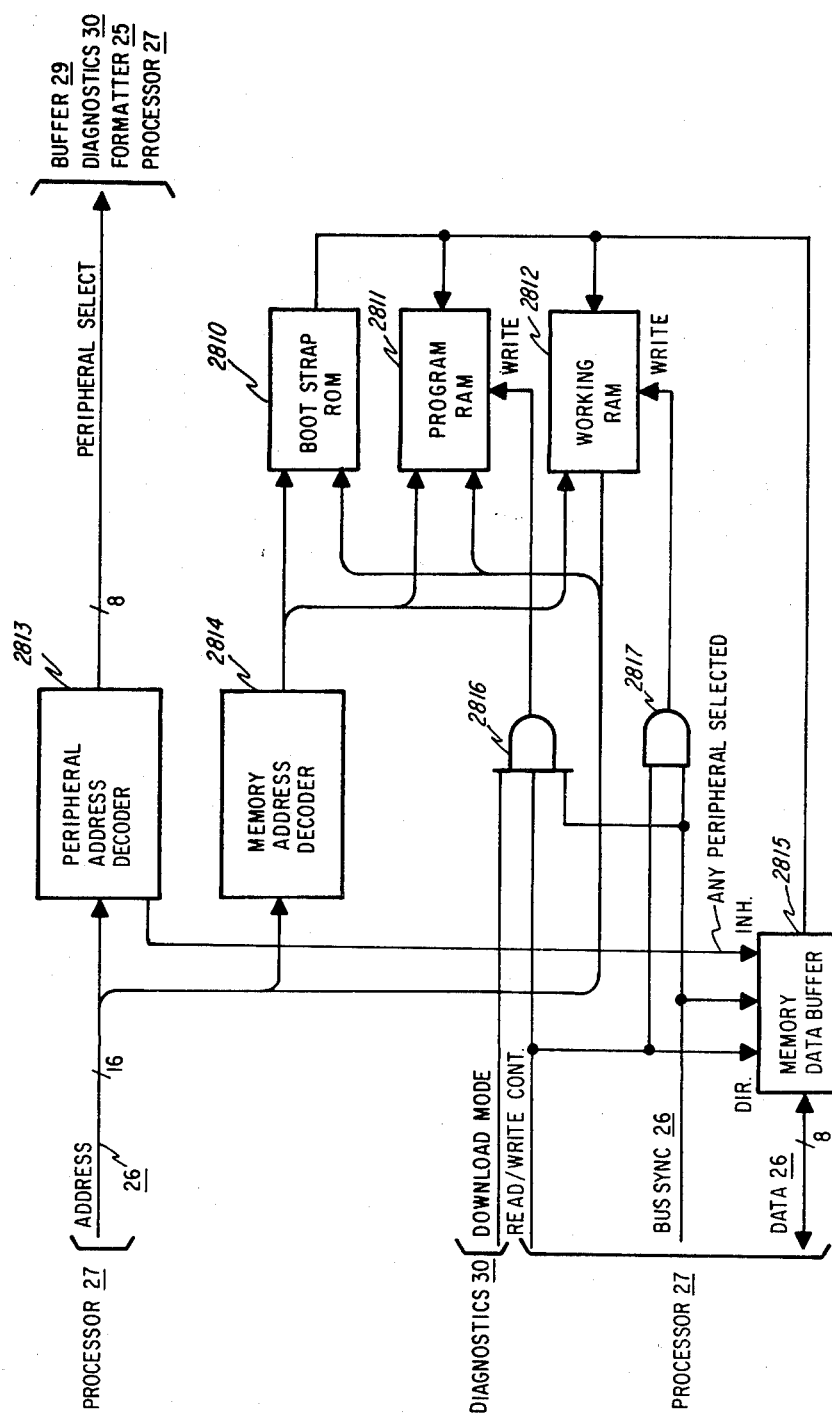

FIG. 9

MESSAGES FROM CALL PROCESSOR 408 TO DIGITAL SATELLITE INTERFACE 14

| MESSAGE | | BYTES NO. | | | | | |
|---|---|---|---|---|---|---|---|
| | | 1 | 2 | 3 | 4 | 5 | 6 |
| | | CMD | NO BYTES | | | | |
| TERMINATE | 0 | 5 | 'ED SLN | DCO'ING PORT NO. | | CPD | |
| | | | | | | └BY | |
| | | | | | | └GST | |
| DISCONNECT | 1 | 2 | SLN | | | | |
| LINE CONTROL | 2 | 3 | SLN | G/S | BR SIR | TA SIR | |
| PAY STATION | 3 | 5 | SLN | DCO'S OPERATOR PORT NO. | | COMMAND | |
| RING LINE | 4 | 4 | 'ED SLN | RINGING CONTROL | RINGING TYPE | | |
| LOOP AROUND TEST | 5 | 5 | TEST DATA | | | | |
| TEST RESPONSE | 6 | 3 | TEST SLN | G/S | TEST RESULTS | | |
| DSI CONTROL | 7 | 2 | FUNC | FUNC PTR | | | |
| CHANNEL DISCONNECT | 8 | 2 | 0 CHANNEL | SN CN | | | |

FIG. 10

MESSAGES FROM DIGITAL SATELLITE INTERFACE 14 TO CALL PROCESSOR 408

| BYTE NO. | | | | | |
|---|---|---|---|---|---|
| 1 | 2 | 3 | 4 | 5 | 6 |
| CND | NO.BYTES | | | | |

MESSAGE

| Message | Byte 1 | Byte 2 | Byte 3 | Byte 4 | Byte 5 | Byte 6 |
|---|---|---|---|---|---|---|
| ORIGNATE | 0 | 5 | 'ING SLN | ASGND. CHAN. NO. | ACB DELAY COUNT | PRY ID |
| RELEASE | 1 | 2 | SLN | | | |
| CONNECT | 2 | 6 | 'ED SLN | ASGND. CHAN. NO. | DCO'S 'ING PORT NUMBER | CPD / BY / GSC |
| CONNECT FAIL | 3 | 6 | 'ED SLN | FAILURES POINTER | DCO'S 'ING PORT NUMBER | CPD / BY / GSC |
| PAYSTATION RESPONSE | 4 | 5 | 'ING SLN | PAYSTA. RESPONSE | DCO'S OPERATOR PORT NUMBER | |
| LOOP AROUND TEST | 5 | 5 | TEST DATA | | | |
| TEST CALL CONTROL | 6 | 4 | SLN | ASGND. CHAN. NO. | TEST POINTER | |
| MESSAGE COMPLETE | 7 | 1 | | | | |
| CHANNEL DISCONNECT | 8 | 3 | SLN | ASGND. CHAN. NO. | | |
| DSI STATUS | 9 | 2 | FUNC | STATUS PTR | | |
| CHANNEL DISCONNECT FAILURE | A | 3 | SLN OR "FF" | CHAN. NO. OR "FF" | | |
| CBI LINK RESP. | B | 1 | | | | |

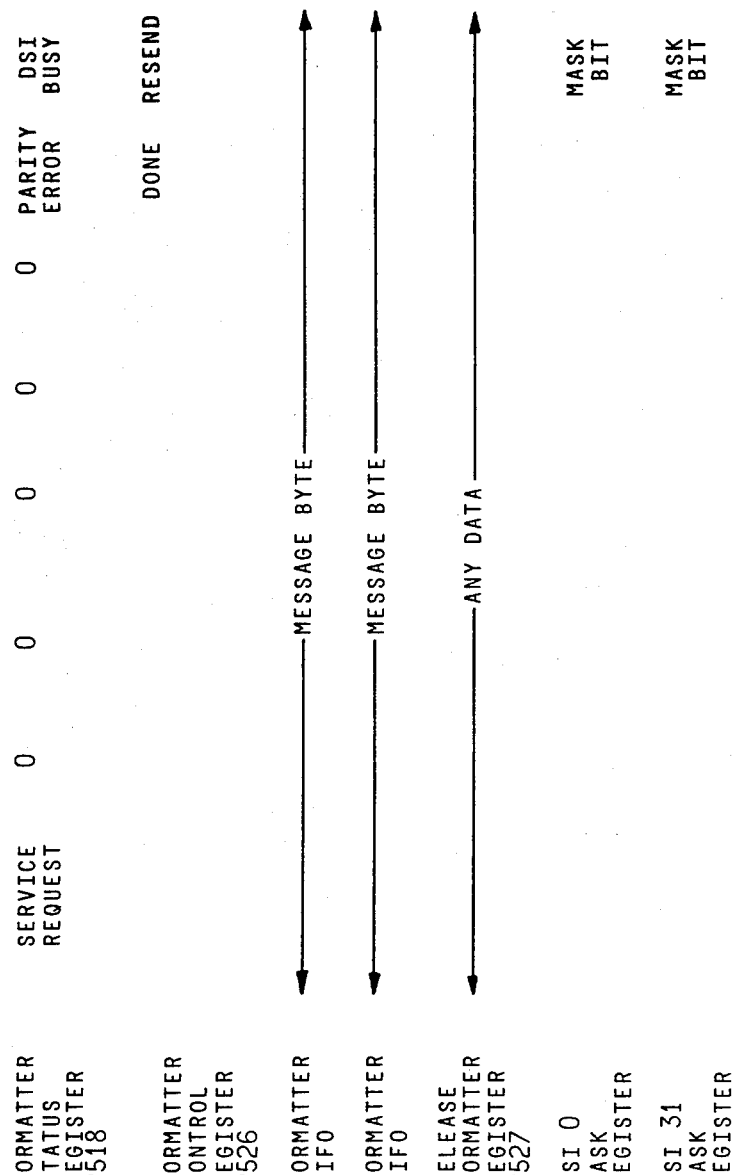

BUFFER 29 BLOCK DIAGRAM

REMOTE DIGITAL SATELLITE UNIT

FIG. 16
MESSAGE FROM DIGITAL SATELLITE INTERFACE 14 TO REMOTE DIGITAL SATELLITE UNIT 13

| MESSAGE | CODE | | | | | | | | |
|---|---|---|---|---|---|---|---|---|---|
| POLL | 1 | F | F | C | 0 | 0 | | | |
| TEST POLL | 5 | F | F | C | 0 | 0 | | | |
| POLL ASSIGN | 7 | RGN | 0 | 0 | 0 | 0 | | | |
| ORIGINATE RESPONSE | 8 | 0 | SLN | RT | SPAN NO. | CHANNEL NUMBER | | | |
| TERMINATE | 8 | RING CODE | SLN | RT | SPAN NO. | CHANNEL NUMBER | | | |
| LINE CONTROL | 9 | 0 | SLN | S DS PR PC | RB TA RD SP | | | | |
| MANUAL MAINTENANCE | B | 0 | SLN | CODE | | | | | |
| SPAN RELAY CONTROL | D | RGN | SR AS MJ MN | CA 0 0 EL | L2 L1 L0 X1 | X0 B2 B1 B0 | | | |
| OK | E | 0 0 S1 S0 | 0 | 0 | 0 | 0 | | | |
| IDLE | F | F | F | F | F | F | | | |

FIG. 17
MESSAGES FROM REMOTE DIGITAL SATELLITE UNIT 13 TO DIGITAL SATELLITE INTERFACE 14

| MESSAGE | CODE | | | | | | | | | | | | | | | |
|---|---|---|---|---|---|---|---|---|---|---|---|---|---|---|---|---|
| POLL RESPONSE | 1 | RESPONSE | | | | | | | | | | | | | | |
| TEST POLL RESPONSE | 5 | RESPONSE | | | | | | | | | | | | | | |
| ORIGINATE | 2 | 0 | SLN | | | | | | DS | SF | PU | P1 | 0 | 0 | 0 | |
| RLC MAINTENANCE | 4 | 0 | SLN | | | | | | 0 | | | | 0 | 0 | 0 | LP |
| MANUAL MAINTENANCE | B | 0 | SLN | | | | | | CODE | | | | | | | |
| SPAN RELAY CONTROL | D | RGN | SR | AR | MJ | MN | CA | O | O | EL | L1 | L2 | L0 | X1 | X0 | B2 | B1 | B0 |
| OK | B | 0 | 0 | S1 | S0 | 0 | | | 0 | | | | 0 | | | |
| IDLE | F | F | F | | | | | | F | | | | F | | | |

MAINTENANCE BUS INTERFACE BUFFER 18

DIAGNOSTICS 30 BLOCK DIAGRAM

CALL PROCESSOR
BUS INTERFACE 17

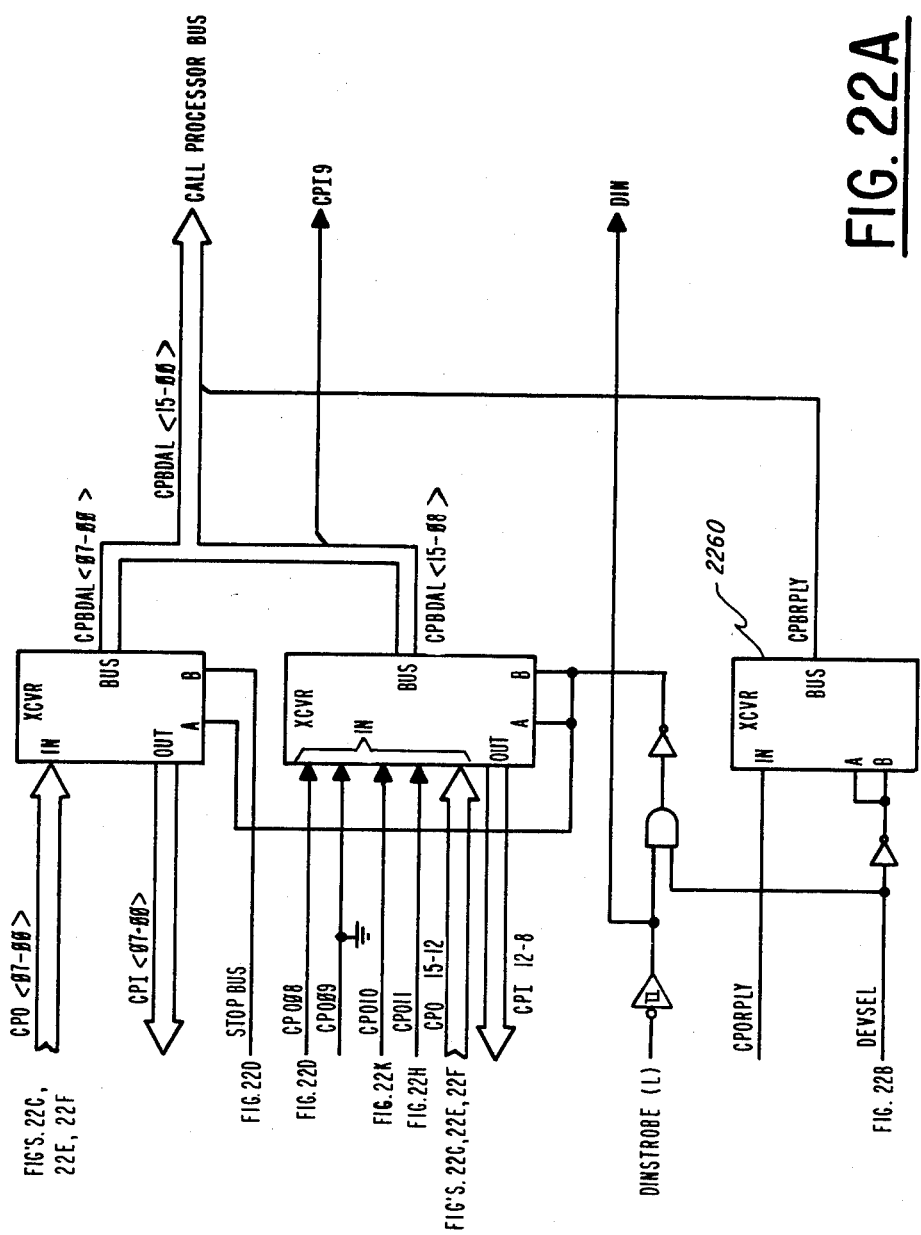

ADDRESS DECODER

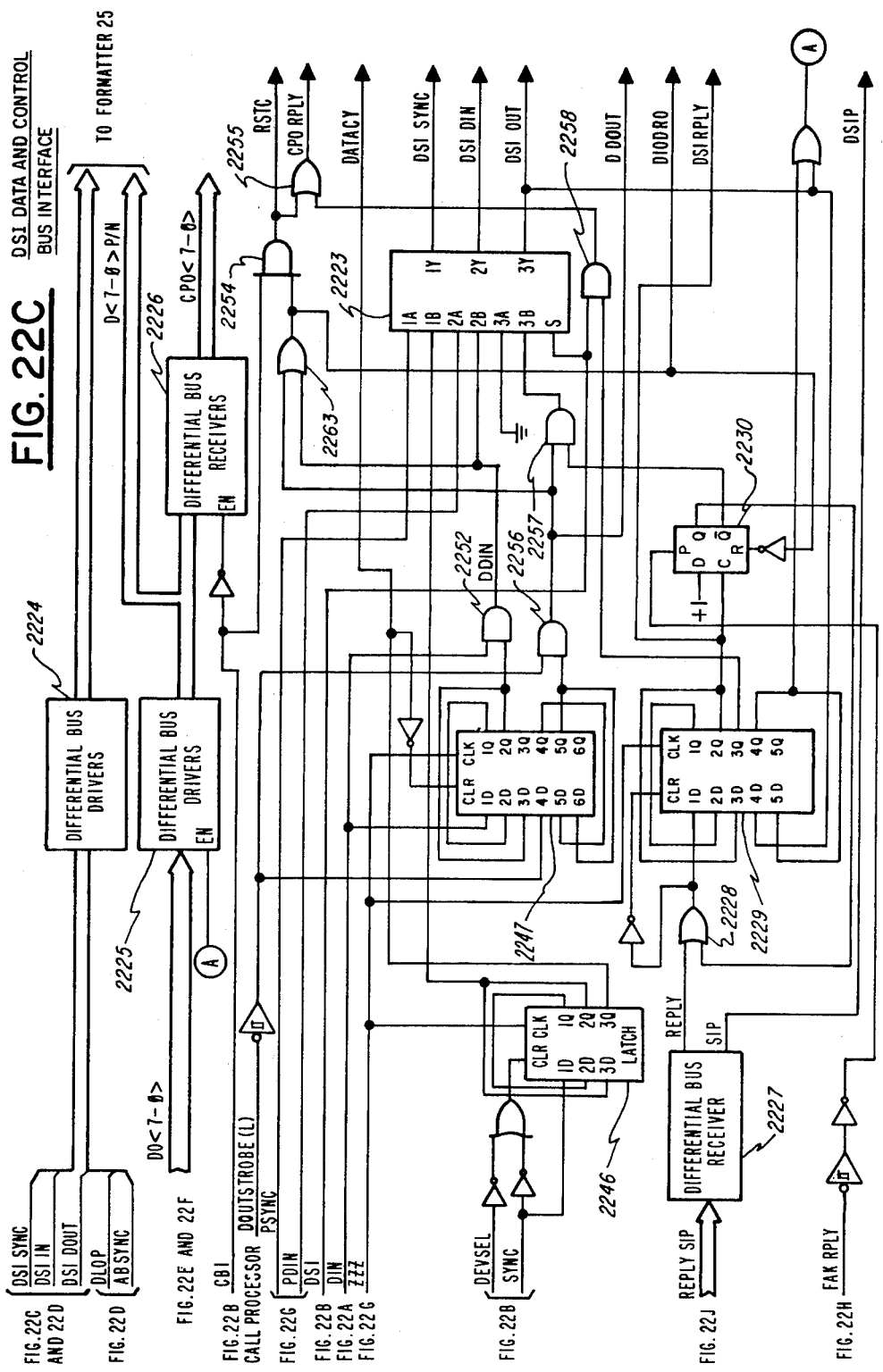
FIG. 22C  DSI DATA AND CONTROL BUS INTERFACE

ADDRESS AND STATUS LATCH

DSI COUNTER

POLL CONTROL

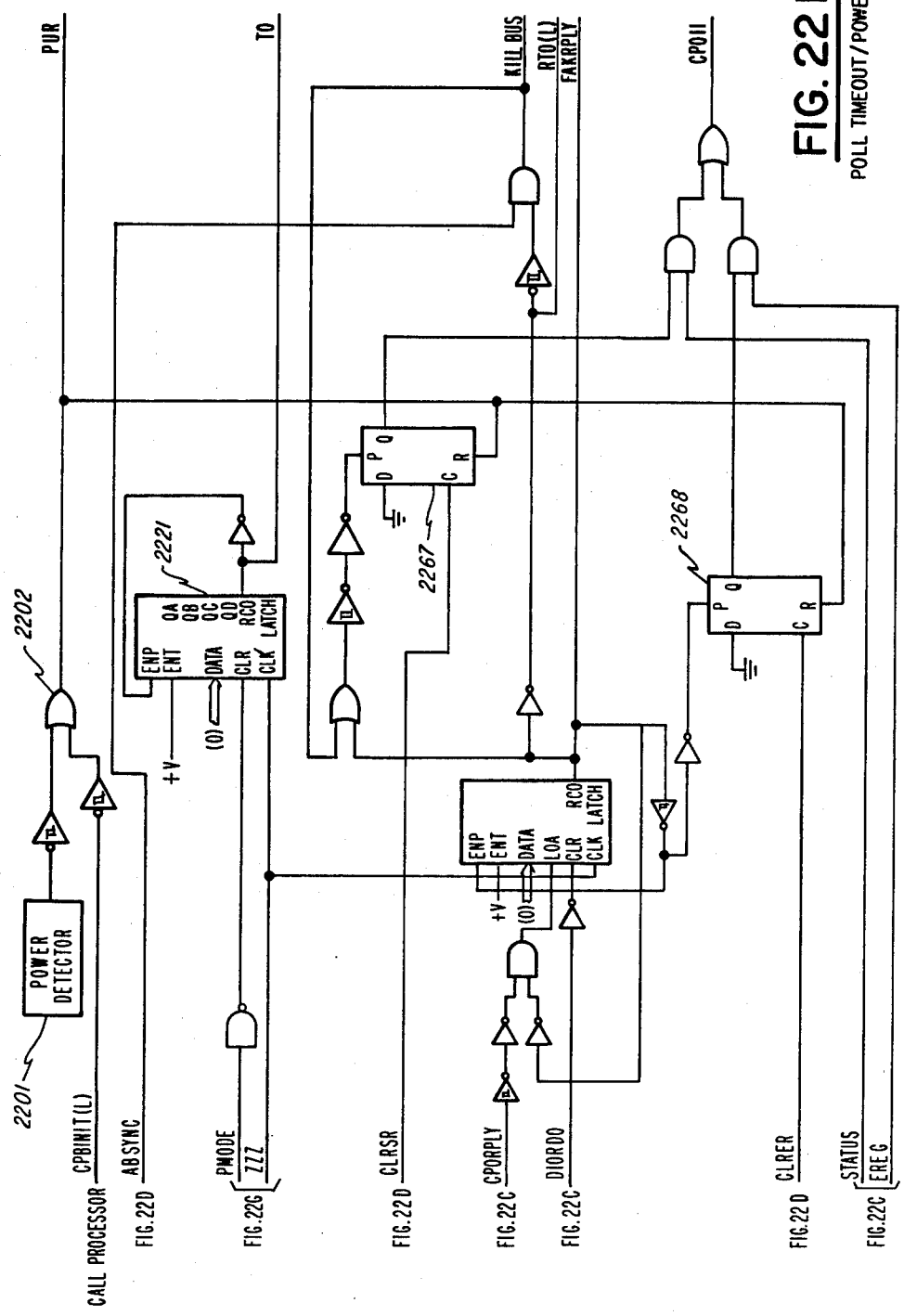

MASK RAM 1720

TEST BUS RECEIVER/DRIVER

TEST ADDRESS DECODER

COMMON CONTROL ADDRESS DECODER, LATCH 2515

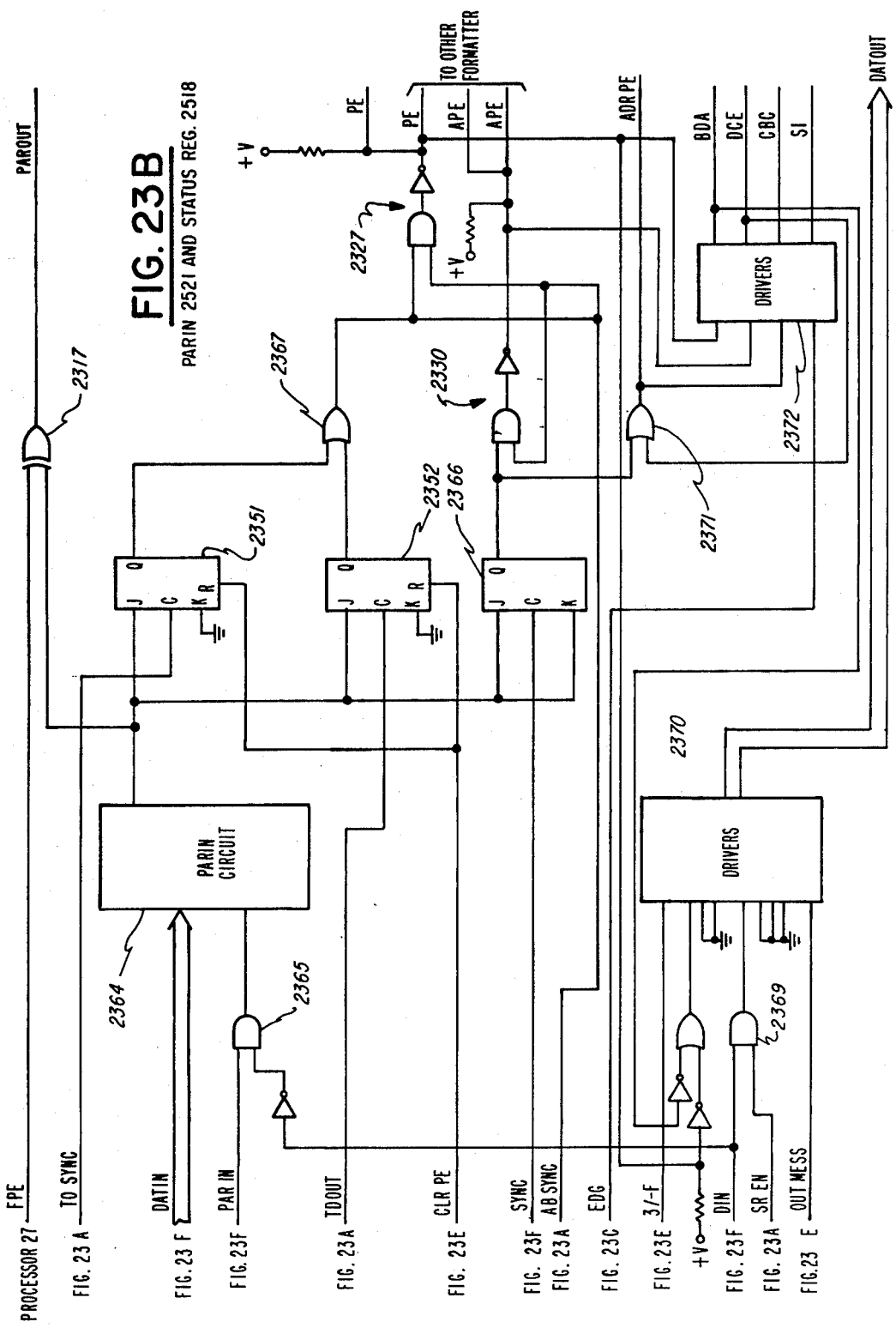

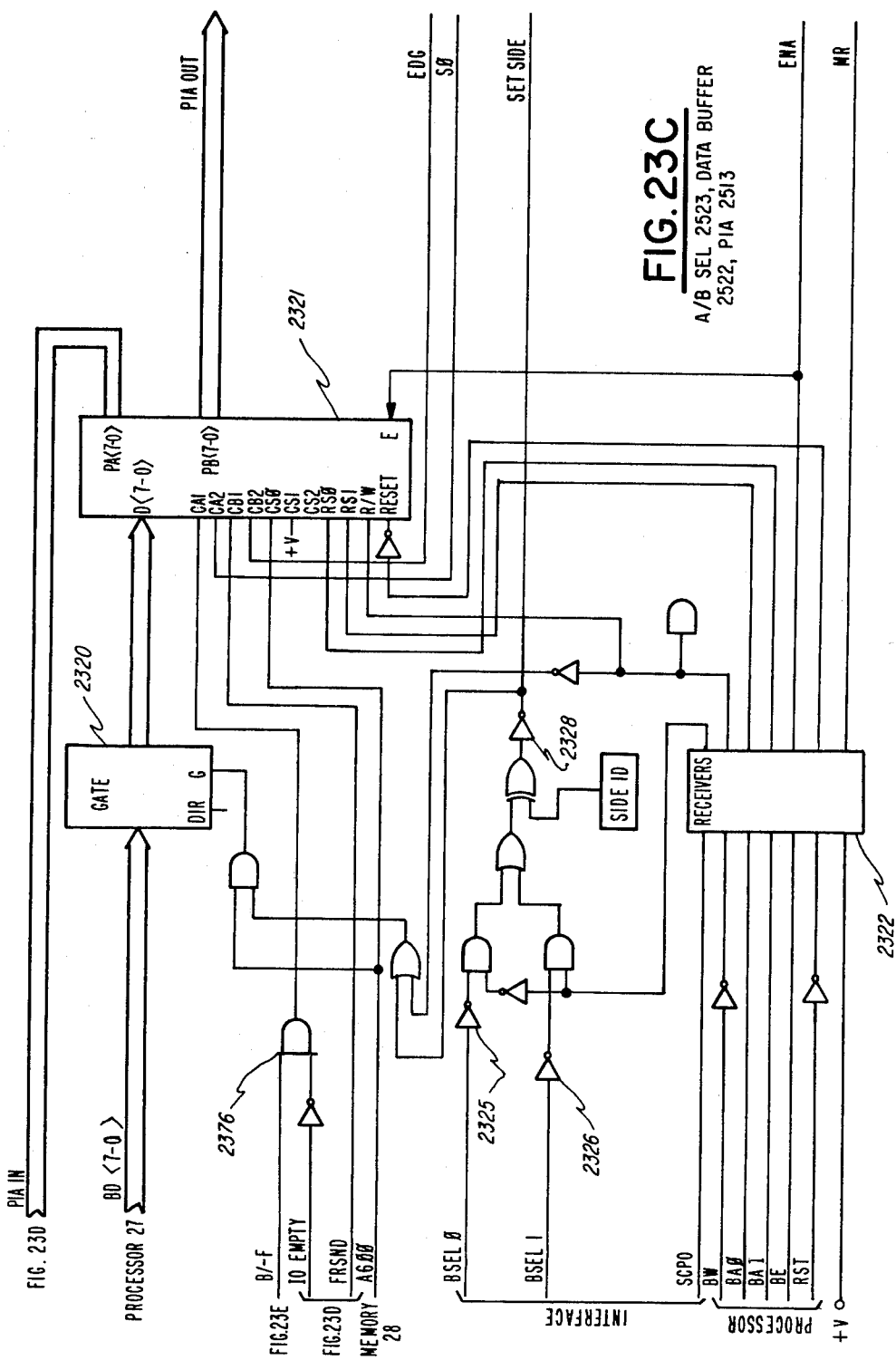

INPUT FIFO 2511, OUTPUT FIFO 2516

DRIVERS 2519, 2520
RECEIVERS 2510, 2514

CALL PROCESSOR MEMORY MAP

MISCELLANEOUS REGISTERS

LINE MEMORY BLOCK

MEMORY

FIG. 25D  MEMORY MAP-PROGRAMMABLE INTERFACE ADAPTERS

| PROGRAMMABLE INTERFACE ADAPTER | ADDRESS | FUNCTION | BIT 7 | BIT 6 | BIT 5 | BIT 4 | BIT 3 | BIT 2 | BIT 1 | BIT 0 |
|---|---|---|---|---|---|---|---|---|---|---|
| FORMATTER PIA 2513 | FPIAI | INPUT FIFO 2511 | | | | CP → DSI MESSAGE BYTE | | | | |
| | FPIAO | OUTPUT FIFO 2516 | | | | DSI → CP MESSAGE BYTE | | | | |
| | FPIAIC | INPUT PIA CONTROL | BYTE AVAILABLE | 0 | TO CA2 | READ STROBE | RESTORE E | ORA SEL | SENSE CAI | EN IRQ CAI |
| | FPIAOC | OUTPUT PIA CONTROL | RESEND | 0 | TO CB2 | WRITE ST | RESTORE E | ORB SEL | SENSE CBI | EN IRQ CBI |
| BUFFER PIA 2915 | BPIAI | INPUT SPAN DATA | TFI SPAN XFER RELAY | TF0 | DATA OK | SI/S0(L) | SR3 | SR2 SPAN RECEIVE DATA | SR1 | SR0 |
| | BPIAO | OUTPUT SPAN DATA | | OUTPUT FIFO LOADED | XMIT SPAN 1 | XMIT SPAN 0 | SX3 | SX2 SPAN TRANSMIT DATA | SX1 | SX0 |
| | BPIAIC | INPUT PIA CONTROL | SRNR | 0 | TO CA2 | READ ST | — | — | CAI | — |
| | BPIAOC | OUTPUT PIA CONTROL | STSS | 0 | — | 0 | — | — | CBI | — |
| DIAGNOSTICS PIA 3014, 3016 | DPIAC | CONTROL REG. | READ INPUT FIFO | OUTPUT FIFO EMPTY | RESET INHIBIT | RELOAD BATCH | LOOPAROUND TEST | FREEZE DSI | DOWNLOAD MODE SOFTWARE | MASK |
| | DPIAS | STATUS REG. | READ OUTPUT FIFO | CATAST ALARM | — | RELOAD SOFTWARE REQUEST | — | MAJOR ALARM | DSI BUSY | INPUT FIFO NOT EMPTY |
| | DPIACC | CR PIA CONTROL | 0 | 0 | CA2 | 0 READ | — | — | CAI | — |
| | DPIASC | SR PIA CONTROL | NEW MP MESSAGE | 0 | CB2 | 0 WRITE | — | — | CBI | — |
| | DPIAI | INPUT FIFO 3031 | | | | MP → DSI MESSAGE BYTE | | | | |
| | DPIAO | OUTPUT FIFO 3017 | | | | DSI → MP MESSAGE BYTE | | | | |
| | DPIAIC | INPUT PIA CONTROL | INPUT FIFO BYTE AVAIL | 0 | CA2 | 0 READ | — | — | CAI | — |
| | DPIAOC | OUTPUT PIA CONTROL | NEW MP MESSAGE | 0 | CA2 | 0 WRITE | — | — | CBI | — |
| PROCESSOR PIA 2714 | PPIAA | ALARM INPUTS | SCP1 | SCP0 | BERB 2 | BERB 1 | BERB 0 | CG ALM 2 | CG ALM 1 | CG ALM 0 |
| | PPIAC | ALARM/CONTROL | SCP2 | FBALM | INTD | FOFE | — | FPE(B) | FPE(A) | ALRST |
| | PPIAAC | AI PIA CONTROL | TIME | 0 | CA7 | 0 CA2 SENSE | RESET EN | — | 0 SENSE CAI | — |
| | PPIACC | AC PIA CONTROL | WDT | 0 | CB2 | CB2 S/RL | W0 | — | CBI | — |

CALL PROCESSOR MODULES

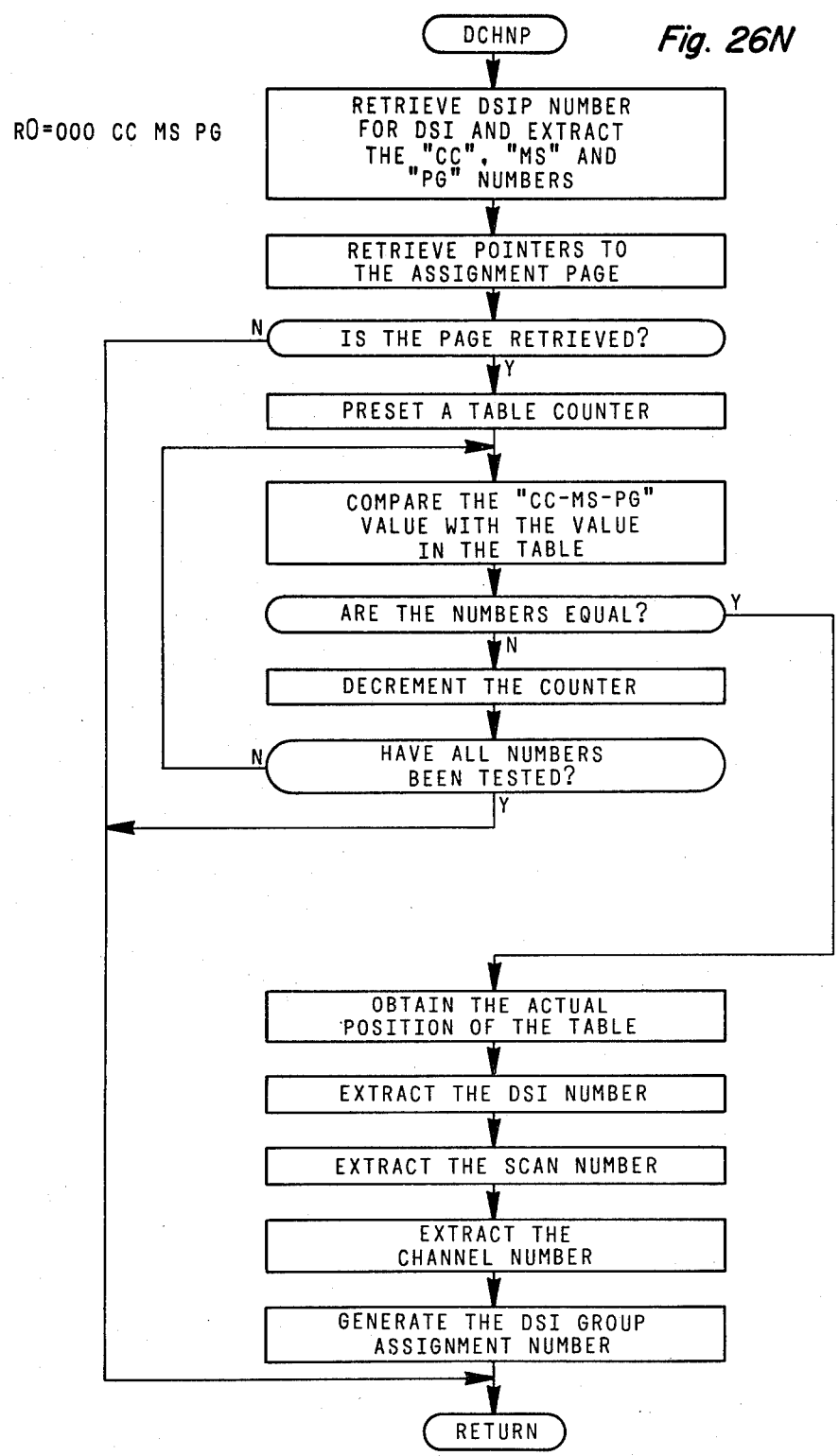

SPAN 0 TRANSMIT 2910

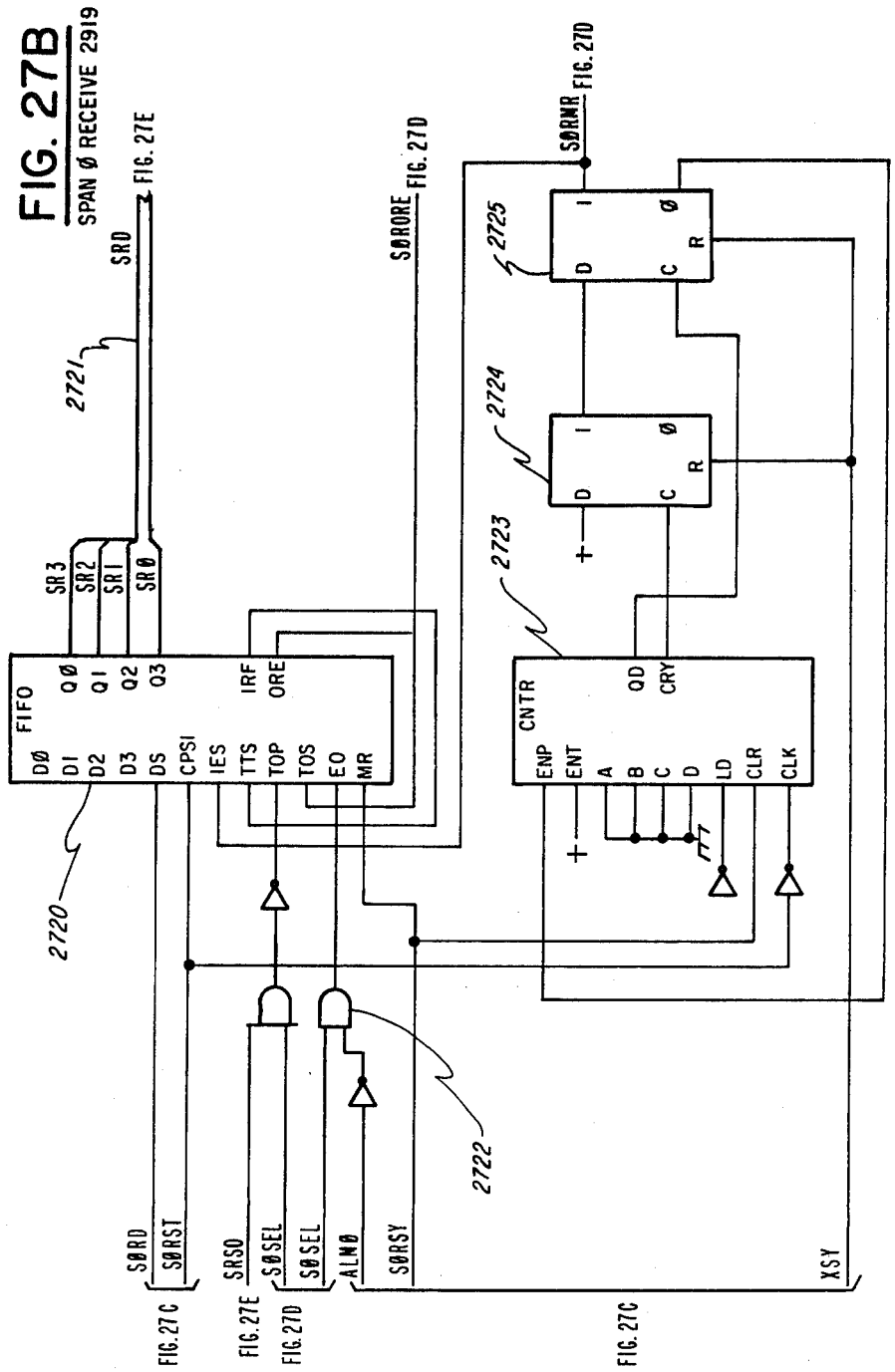

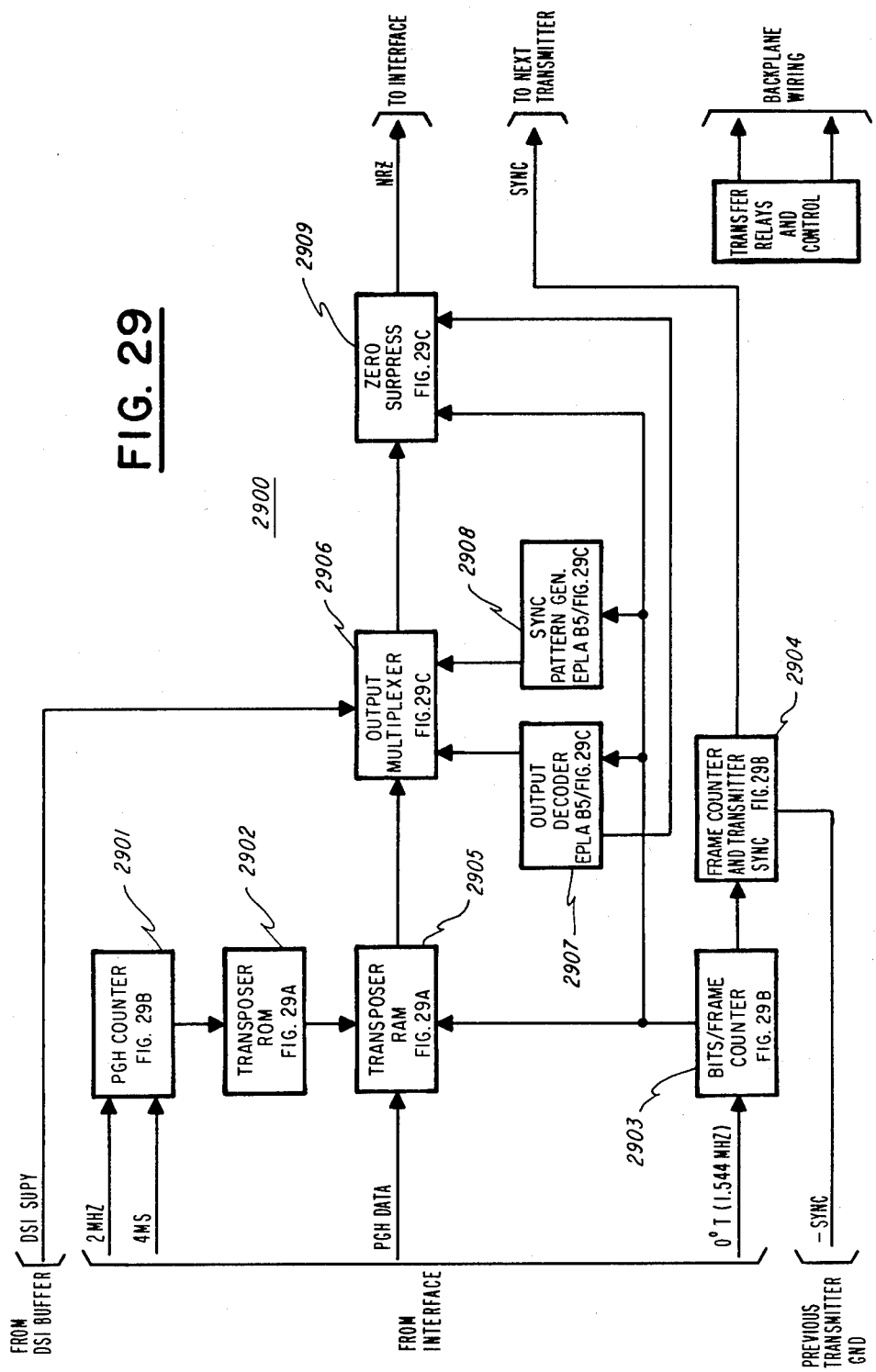

PGH TO TI TRANSPOSER

FPLA TRUTH TABLE
FPLA 2930 (FIG.29C)

NOTE: H = HIGH
L = LOW
- = DON'T CARE
A = OUTPUT WILL ASSUME STATE DEFINED BY "ACTIVE OUTPUT LEVEL".
* = OUTPUT WILL ASSUME COMPLEMENT OF STATE DEFINED BY "ACTIVE OUTPUT LEVEL" FOR THAT PARTICULAR PRODUCT TERM.

| NO. | COMMENTS | INPUT | | | | | | | | | | | | | | | | OUTPUT | | | | | | | |
|---|---|---|---|---|---|---|---|---|---|---|---|---|---|---|---|---|---|---|---|---|---|---|---|---|
| | | SPARE | SIG LB | SPARE | SPARE | T11 | T10 | T09 | T08 | T07 | T06 | T05 | T04 | T03 | T02 | T01 | T00 | DATA MUX SEL A | DATA MUX SEL B | -BT STROBE | SIG LB | -SIG LB | -BTSYNC | SYNC PATT | SPARE |
| | PIN# | 20 | 21 | 22 | 23 | 24 | 25 | 26 | 27 | 2 | 3 | 4 | 5 | 6 | 7 | 8 | 9 | 10 | 11 | 12 | 13 | 14 | 15 | 16 | 17 |
| | ACTIVE OUTPUT LEVEL → | | | | | | | | | | | | | | | | | H | H | L | L | L | L | H | H |
| 00 | FRAME SYNC | L | - | - | - | - | - | - | - | H | L | H | H | H | H | H | H | A | * | * | * | * | * | * | A |
| 01 | FRAME SYNC FRAMES 0&4=1 | L | - | - | - | L | - | L | L | - | - | - | - | - | - | - | - | * | * | * | * | * | * | A | A |
| 02 | FRAME SYNC FRAMES 5&7=1 | L | - | - | - | L | H | - | H | - | - | - | - | - | - | - | - | * | * | * | * | * | * | A | A |
| 03 | FRAME SYNC FRAMES 8&9=1 | L | - | - | - | H | L | L | - | - | - | - | - | - | - | - | - | * | * | * | * | * | * | A | A |
| 04 | FRAME 0 BSIG | L | - | - | - | L | L | L | L | - | - | - | - | - | H | H | L | * | A | * | A | * | * | * | A |
| 05 | FRAME 6 ASIG | L | - | - | - | L | H | H | L | - | - | - | - | - | H | H | L | * | A | * | A | * | * | * | A |
| 06 | NON-SIGNALING FRAME | L | H | - | - | - | - | - | - | - | - | - | - | - | H | H | L | * | * | * | * | A | * | * | A |
| 07 | BUFFER TRANSMIT SYNC | L | - | - | - | L | L | L | L | L | L | L | L | L | L | L | L | * | * | * | * | * | A | * | A |
| 08 | BUFFER TRANSMIT STROBE | L | - | - | - | L | L | L | L | - | - | - | - | - | H | H | L | * | * | A | * | * | * | * | A |

Fig. 29E

FPLA TRUTH TABLE
FPLA 2940 (FIG. 29D)

NOTE: H = HIGH
L = LOW
- = DON'T CARE
A = OUTPUT WILL ASSUME STATE DEFINED BY "ACTIVE OUTPUT LEVEL".
* = OUTPUT WILL ASSUME COMPLEMENT OF STATE DEFINED BY "ACTIVE OUTPUT LEVEL" FOR THAT PARTICULAR PRODUCT TERM.

| | | | INPUT | | | | | | | | | | | | | | | OUTPUT | | | | | | | |
|---|---|---|---|---|---|---|---|---|---|---|---|---|---|---|---|---|---|---|---|---|---|---|---|---|---|
| | | | SPARE | SPARE | PGH IN 13 | PGH IN 12 | PGH IN 11 | PGH IN 10 | PGH IN 09 | PGH IN 08 | PGH IN 07 | PGH IN 06 | PGH IN 05 | PGH IN 04 | PGH IN 03 | PGH IN 02 | PGH IN 01 | PGH IN 00 | SPARE | SPARE | TEN | SPARE | SPARE | SUPY LOOP | SPARE | SPARE |
| | | | I15 | I14 | I13 | I12 | I11 | I10 | I9 | I8 | I7 | I6 | I5 | I4 | I3 | I2 | I1 | I0 | F7 | F6 | F5 | F4 | F3 | F2 | F1 | F0 |
| NO. | COMMENTS | PIN# | 20 | 21 | 22 | 23 | 24 | 25 | 26 | 27 | 2 | 3 | 4 | 5 | 6 | 7 | 8 | 9 | 10 | 11 | 12 | 13 | 14 | 15 | 16 | 17 |
| | | | | | | | | | | | | | | ACTIVE OUTPUT LEVEL → | | | | H | H | H | H | H | H | H | H |
| 00 | LOOP TEST | | L | L | L | - | - | H | H | H | H | L | H | H | H | H | H | L | A | A | * | A | A | A | A | A |
| 01 | TEN | | L | L | H | L | L | L | L | L | L | L | L | L | L | L | L | - | A | A | A | A | A | * | A | A |
| 02 | TEN | | L | L | L | H | H | H | H | H | H | H | H | H | H | H | - | - | A | A | A | A | A | * | A | A |

Fig. 29F

RECEIVER 3000

FRAME SYNCHRONIZER
3002

FPLA TRUTH TABLE
FPLA 3025 (FIG. 30B)

NOTE: H = HIGH
L = LOW
- = DON'T CARE
A = OUTPUT WILL ASSUME STATE DEFINED BY "ACTIVE OUTPUT LEVEL".
* = OUTPUT WILL ASSUME COMPLEMENT OF STATE DEFINED BY "ACTIVE OUTPUT LEVEL" FOR THAT PARTICULAR PRODUCT TERM.

| | | | INPUT | | | | | | | | | | | | | | OUTPUT | | | | | | | |
|---|---|---|---|---|---|---|---|---|---|---|---|---|---|---|---|---|---|---|---|---|---|---|---|---|
| | | | SPARE | SPARE | SPARE | SPARE | SPARE | SPARE | SPARE | +ERROR | +LOCK | +FULL | +BIT 193 | +SRO | SYNC PAT BIT 4 | SYNC PAT BIT 3 | SYNC PAT BIT 2 | SYNC PAT BIT 1 | +SKIP | +PATTERN | +LOAD | +SIG FRAME | +ERROR | +BSIG | +FRAME 1 | +FRAME 0 |
| | | | I15 | I14 | I13 | I12 | I11 | I10 | I9 | I8 | I7 | I6 | I5 | I4 | I3 | I2 | I1 | I0 | F7 | F6 | F5 | F4 | F3 | F2 | F1 | F0 |
| NO. | COMMENTS | PIN# | 20 | 21 | 22 | 23 | 24 | 25 | 26 | 27 | 2 | 3 | 4 | 5 | 6 | 7 | 8 | 9 | 10 | 11 | 12 | 13 | 14 | 15 | 16 | 17 |
| | | ACTIVE OUTPUT LEVEL → | | | | | | | | | | | | | | | | | H | H | H | H | H | H | H | H |
| 01 | | | L | L | L | L | L | L | L | – | – | – | – | – | L | H | L | L | * | * | * | * | * | * | * | A |
| 02 | | | L | L | L | L | L | L | L | – | – | – | – | – | L | L | H | L | * | * | * | * | * | * | A | * |
| 03 | | | L | L | L | L | L | L | L | – | – | – | – | – | L | L | L | H | * | A | * | * | * | * | A | A |
| 04 | | | L | L | L | L | L | L | L | – | – | – | – | H | L | L | L | L | * | A | * | * | * | * | * | * |
| 05 | | | L | L | L | L | L | L | L | – | – | – | – | – | H | H | L | L | * | * | * | A | * | * | * | A |
| 06 | | | L | L | L | L | L | L | L | – | – | – | – | – | L | H | H | L | * | A | * | * | * | * | A | * |
| 07 | | | L | L | L | L | L | L | L | – | – | – | – | – | H | L | H | H | * | A | * | * | * | * | A | A |
| 08 | | | L | L | L | L | L | L | L | – | – | – | – | – | H | H | L | H | * | A | * | * | * | * | * | * |
| 09 | | | L | L | L | L | L | L | L | – | – | – | – | – | H | H | H | L | * | * | * | * | * | * | * | A |
| 10 | | | L | L | L | L | L | L | L | – | – | – | – | – | L | H | H | H | * | * | * | * | * | * | A | * |
| 11 | | | L | L | L | L | L | L | L | – | – | – | – | – | L | L | H | H | * | A | * | A | * | A | A | A |
| 12 | | | L | L | L | L | L | L | L | – | – | – | H | H | H | L | L | H | * | * | * | * | A | * | * | * |
| 13 | | | L | L | L | L | L | L | L | – | – | – | H | H | L | H | L | L | * | * | * | * | A | * | * | * |
| 14 | | | L | L | L | L | L | L | L | – | – | – | H | H | L | L | H | L | * | * | * | * | A | * | * | * |
| 15 | | | L | L | L | L | L | L | L | – | – | – | H | L | L | L | L | H | * | * | * | * | A | * | * | * |
| 16 | | | L | L | L | L | L | L | L | – | – | – | H | L | H | L | L | L | * | * | * | * | A | * | * | * |
| 17 | | | L | L | L | L | L | L | L | – | – | – | H | H | H | H | L | L | * | * | * | * | A | * | * | * |
| 18 | | | L | L | L | L | L | L | L | – | – | – | H | L | L | H | H | L | * | * | * | * | A | * | * | * |
| 19 | | | L | L | L | L | L | L | L | – | – | – | H | L | L | L | H | H | * | * | * | * | A | * | * | * |
| 20 | | | L | L | L | L | L | L | L | – | – | – | H | L | H | H | L | H | * | * | * | * | A | * | * | * |
| 21 | | | L | L | L | L | L | L | L | – | – | – | H | H | H | H | H | L | * | * | * | * | A | * | * | * |
| 22 | | | L | L | L | L | L | L | L | – | – | – | H | H | L | H | H | H | * | * | * | * | A | * | * | * |
| 23 | | | L | L | L | L | L | L | L | H | L | – | H | L | L | H | H | H | * | * | * | * | A | * | * | * |
| 24 | | | L | L | L | L | L | L | L | H | L | – | – | – | – | – | – | – | A | * | A | * | * | * | * | * |
| 25 | | | L | L | L | L | L | L | L | – | – | H | H | – | – | – | – | – | * | * | A | * | * | * | * | * |
| 26 | | | L | L | L | L | L | L | L | – | – | – | H | – | L | H | L | H | * | A | * | * | A | * | * | * |
| 27 | | | L | L | L | L | L | L | L | – | – | – | H | – | H | L | H | L | * | * | * | * | A | * | * | * |
| 28 | | | L | L | L | L | L | L | L | – | – | – | H | – | H | H | H | H | * | A | * | * | A | * | * | * |
| 29 | | | L | L | L | L | L | L | L | – | – | – | H | – | L | L | L | L | * | * | * | * | A | * | * | * |

Fig. 30F

FPLA TRUTH TABLE
FPLA 3041 (FIG. 30C)

NOTE: H = HIGH
L = LOW
- = DON'T CARE
A = OUTPUT WILL ASSUME STATE DEFINED BY "ACTIVE OUTPUT LEVEL".
* = OUTPUT WILL ASSUME COMPLEMENT OF STATE DEFINED BY "ACTIVE OUTPUT LEVEL" FOR THAT PARTICULAR PRODUCT TERM.

| | | | INPUT | | | | | | | | | | | | | | | OUTPUT | | | | | | | |
|---|---|---|---|---|---|---|---|---|---|---|---|---|---|---|---|---|---|---|---|---|---|---|---|---|---|
| | | | SPARE | SUPY RAM R | +LOCK | P12 | P11 | P10 | P9 | P8 | P7 | P6 | P5 | P4 | P3 | P2 | P1 | P0 | SPARE | PGH FRAME | SØ TIME | SPARE | SPARE | SPARE | PGH DAT MUX B | PGH DAT MUX A |
| | | | I15 | I14 | I13 | I12 | I11 | I10 | I9 | I8 | I7 | I6 | I5 | I4 | I3 | I2 | I1 | I0 | F7 | F6 | F5 | F4 | F3 | F2 | F1 | F0 |
| NO. | COMMENTS | PIN# | 20 | 21 | 22 | 23 | 24 | 25 | 26 | 27 | 2 | 3 | 4 | 5 | 6 | 7 | 8 | 9 | 10 | 11 | 12 | 13 | 14 | 15 | 16 | 17 |
| | | ACTIVE OUTPUT LEVEL → | | | | | | | | | | | | | | | | | H | L | L | H | H | H | H | H |
| 00 | 0-15 DATA | | L | - | - | - | - | - | - | - | - | - | - | L | - | - | - | - | A | * | * | A | A | A | A | * |
| 01 | PGH FRAME | | L | - | - | - | - | - | - | - | H | H | H | H | L | H | H | A | A | * | A | A | A | * | * |
| 02 | SUPY LOOP | | L | - | - | - | H | H | H | H | H | H | H | L | H | L | A | * | * | A | A | A | A | A |
| 03 | FO PORT 31=1 | | L | - | - | - | - | H | H | H | H | L | H | H | L | H | L | A | * | * | A | A | A | * | A |
| 04 | FO AND F1 PORT 30=1 | | L | - | - | - | - | H | H | H | H | L | - | H | L | H | L | A | * | * | A | A | A | * | A |
| 05 | A/B SIG | | L | - | - | - | - | L | - | - | - | - | - | H | H | L | H | L | A | * | * | A | A | A | * | A |
| 06 | A/B SIG | | L | - | - | - | - | H | L | - | - | - | - | H | H | L | H | L | A | * | * | A | A | A | * | A |
| 07 | 28-31 DATA | | L | - | - | - | - | - | - | - | - | - | - | H | H | H | - | - | A | * | * | A | A | A | A | * |
| 08 | 16-19 DATA | | L | - | - | - | - | - | - | - | - | - | - | H | L | L | - | - | A | * | * | A | A | A | A | * |
| 09 | SENSE SLOW 0-15 | | L | - | - | - | - | L | - | - | - | - | - | H | H | L | H | H | A | * | * | A | A | A | * | A |
| 10 | SENSE SLOW 16-23 | | L | - | - | - | - | H | L | - | - | - | - | H | H | L | H | H | A | * | * | A | A | A | * | A |
| 11 | SENSE SLOW 24-27 | | L | - | - | - | - | H | H | L | - | - | - | H | H | L | H | H | A | * | * | A | A | A | * | A |
| 12 | SENSE SLOW 28-29 | | L | - | - | - | - | H | H | H | L | - | - | H | H | L | H | H | A | * | * | A | A | A | * | A |
| 13 | SENSE SLOW 31 | | L | - | - | - | - | H | H | H | H | - | H | H | L | H | H | A | * | * | A | A | A | * | A |
| 14 | LOCK 0-15 | | L | - | H | L | L | L | - | - | - | - | L | H | H | L | H | H | A | * | A | A | A | A | * | * |
| 15 | LOCK 16-23 | | L | - | H | L | L | H | L | - | - | - | L | H | H | L | H | H | A | * | A | A | A | A | * | * |
| 16 | A/B SIG & SUPY RAM | | L | L | - | - | - | L | - | - | - | - | - | H | H | L | H | L | A | * | A | A | A | A | * | * |
| 17 | A/B SIG & SUPY RAM | | L | L | - | - | - | H | L | - | - | - | - | H | H | L | H | L | A | * | A | A | A | A | * | * |
| 18 | LOCK 30 | | L | - | H | L | L | H | H | H | H | L | L | H | H | L | H | H | A | * | * | A | A | A | * | A |

Fig. 30G

SPAN INTERFACE

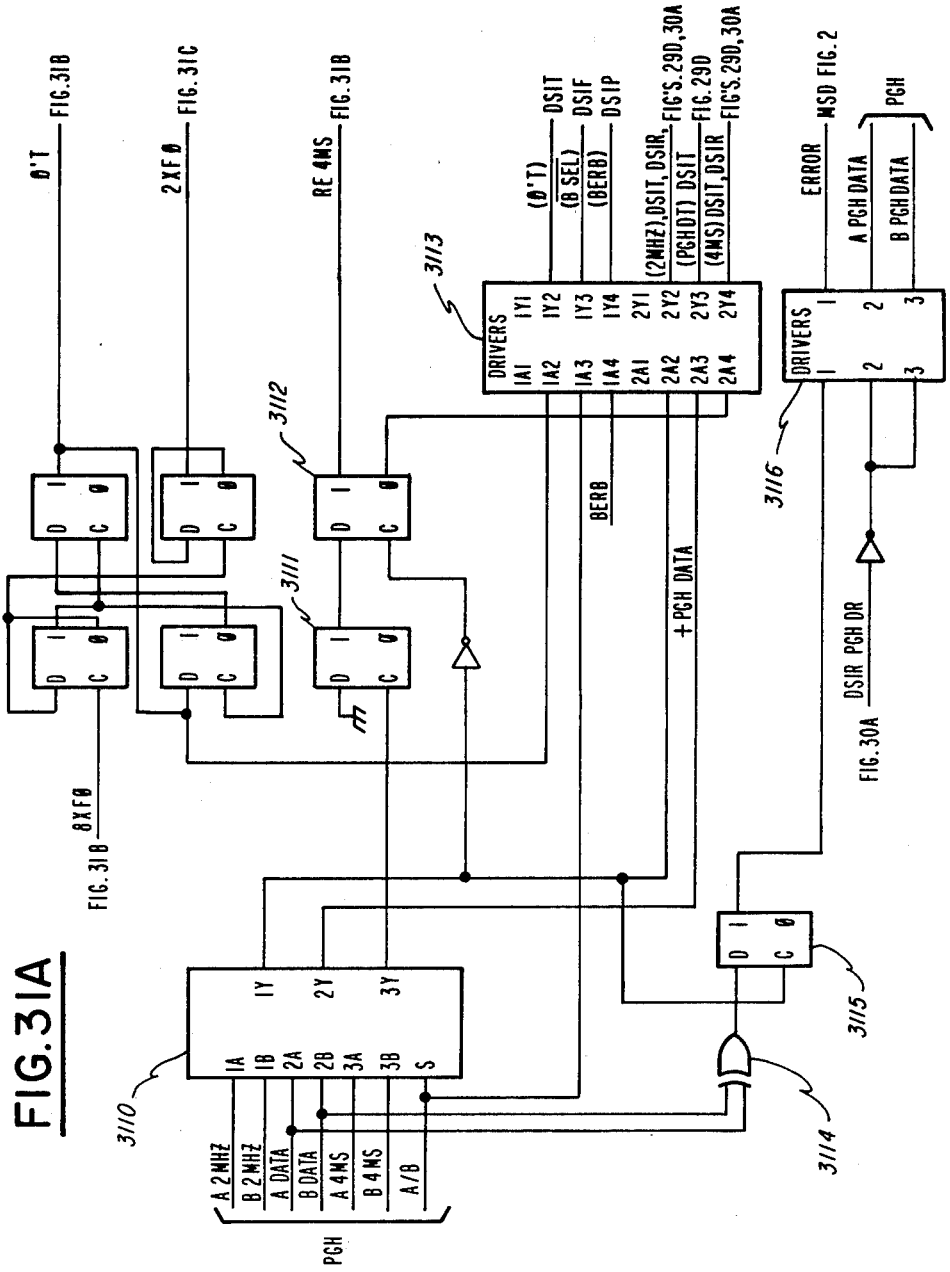

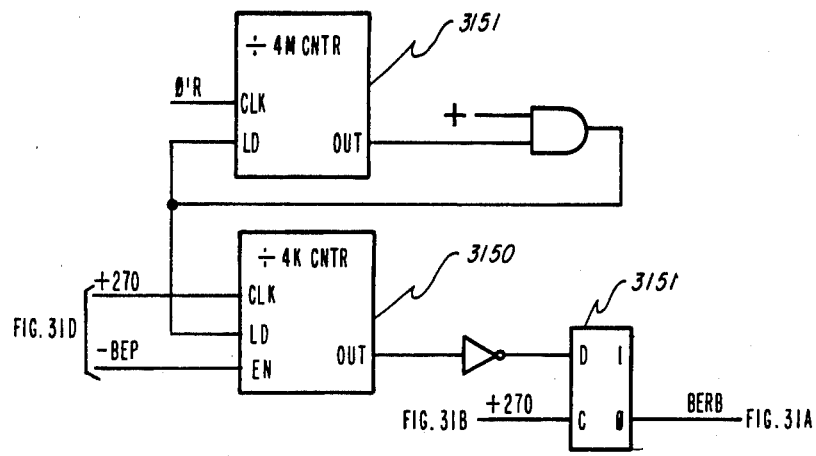
FIG. 31D
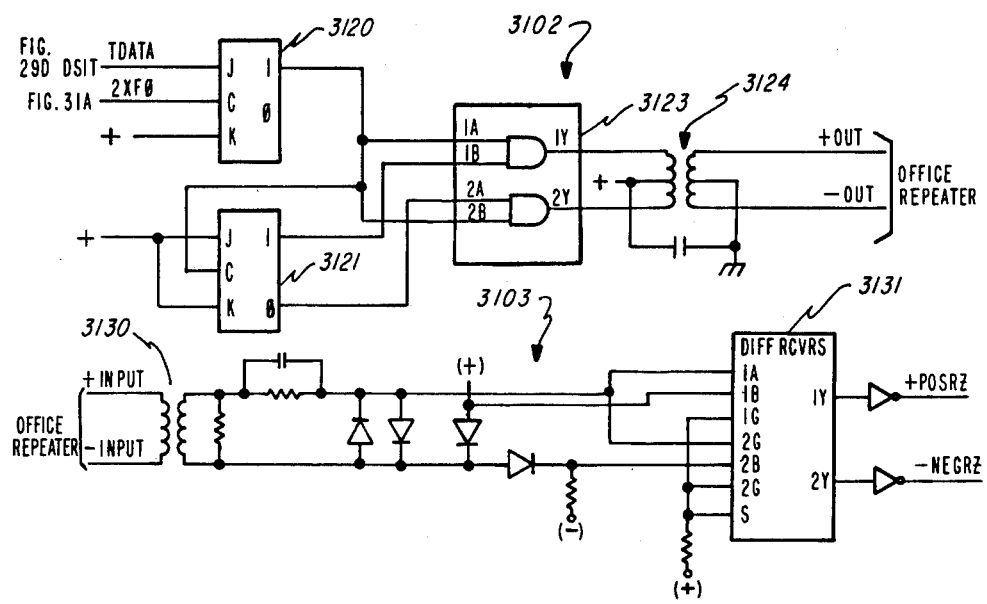
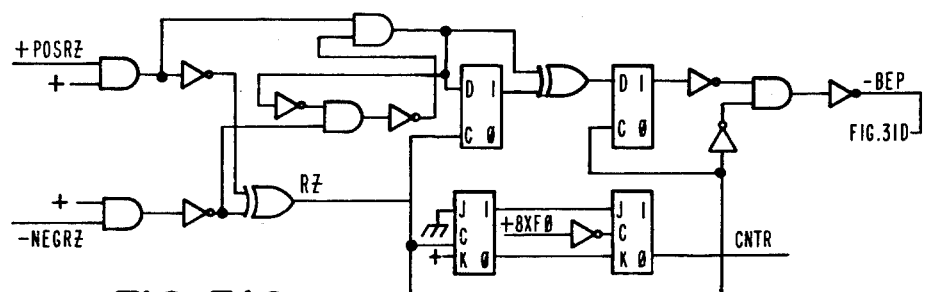
FIG. 31C

MESSAGE TRANSLATION ARRANGEMENT FOR TELEPHONY SYSTEM WITH ROMOTE PORT GROUPS

CROSS REFERENCE TO RELATED APPLICATIONS AND PATENTS

U.S. patent application Ser. No. 06/187,277, filed on Sept. 15, 1980 by Ronald J. Kandell et al for "Telephony System with Automatic Test Call Generator for Remote Port Groups" and assigned to the same assignee as this invention, abandoned;

U.S. patent application Ser. No. 06/204,686, filed on even date herewith for "Maintenance Facility for Telephony System with Remote Port Groups" and assigned to the same assignee as the present invention, which application is now abandoned in favor of continuation Ser. No. 310,990, filed Oct. 13, 1981;

U.S. patent application Ser. No. 290,531, filed on Aug. 6, 1981 by Barrie Brightman et al for an "Arrangement of Interactive Telephone Switching Processors for Control of Ports", and assigned to the same assignee as this invention; and U.S. Pat. No. 4,276,451 issued June 30, 1981 to Otto W. Beebe et al for a "Control System for Telephone Switching System", and assigned to the same assignee as the present invention.

BACKGROUND OF THE INVENTION

This invention generally relates to telephony networks and, more specifically, to a telephony switching system that is characterized by switching calls to remotely located port groups in the network.

U.S. patent application Ser. No. 924,883 discloses a telephony network that includes a digital central office for performing switching operations. In this network, telephone lines from subscribers and trunk circuits from other central offices connect directly to a digital central office through a plurality of line and trunk circuits in port group units. The connection is made through conventional tip and ring, or analagous, conductors that extend from each individual subscriber or office to the location of the digital central office. These conductors carry signals in analog form that represent voice information and supervisory information. Supervisory information received by the central office is called "sense supervisory" information and includes hook status and dial pulse information; supervisory information sent to the port group units and the conductors is called "control supervisory" information and includes ringing and other information.

Each port group unit connects to a plurality of telephone lines through individual port circuits, such as line or trunk circuits. Each port circuit converts the incoming voice signals to pulse-code-modulated signals that are multiplexed and transferred in a serial pulse train onto a port group highway. Sense supervisory information also to multiplexed into this pulse train.

A time slot interchange (TSI) matrix network receives this pulse train and strips the incoming sense supervisory information for storage in an area of a port data store that is assigned to each port circuit. A port event processor samples the information in each port data store area and modifies and uses the information in that area to send messages to a call control processor. The call control processor sends information including commands to the individual areas of the port data store for enabling the port event processor to control the corresponding telephone subscriber's line and to the TSI matrix network for establishing a switching channel through the network thereby to establish a path for the digitized voice signals over the same or another port group highway to a called telephone.

Commands to the port event processor from the call control processor enable the transmission of a dial tone, the termination of a dial tone, or the ringing of both the called and calling telephones. The port event processor generates control supervisory information in response to these commands. The control supervisory information is interspersed with the voice information in digital form for transmission to the port group unit connected to the port group highway. Then the corresponding port group unit performs various functions in response to the commands and converts the digital voice data signals into analog form for transmission through a particular port circuit to the subscriber's telephone lines and telephone.

U.S. patent application Ser. No. 924,883 discloses a single call processing system of this general construction that operates as a digital central office. U.S. patent application Ser. No. 10,910 (now U.S. Pat. No. 4,276,451) depicts a digital central office that includes two such call processing systems that operate in parallel and in conjunction with a maintenance processor. The two parallel call processing systems receive incoming signals from the subscriber and trunk lines simultaneously and operate in synchronism. However, signals from only one of the call processing systems pass through the port group units to the subscriber and trunk lines. The maintenance processor system analyzes losses of synchronization between the two call processing systems, parity errors, and other conditions. It determines which of the two parallel call processing systems actually controls the telephony network.

Digital central offices of this type require individual telephone lines from each subscriber location to the location of the digital central office. This approach works well and is economical where the subscribers either are located in a relatively small geographical area around the digital central office or are randomly, but widely, dispersed geographically. However, in many applications, telephony network subscribers tend to be located in geographically remote clusters. For example, subscribers may live in several small towns in a rural setting or may live in different apartment houses in an urban setting.

Telephony networks in such applications incorporate a great deal of redundant cabling to effect the individual connections. This cabling requires more than electrical conductors. Various gain devices may be required along these conductors; usually at least one gain device is required for each subscriber line. Thus, the cabling costs increase dramatically as the number of subscribers increases. Moreover, in many situations, the traffic volume in such networks, as a percentage of maximum traffic capacity, is very low. Thus, the actual utilization of the telephone lines can become quite expensive and inefficient.

Concentrators enable an efficient utilization of data channels in digital data networks. Basically, a digital data network includes modulator/demodulator ("modem") circuits for enabling digital information to be transferred over a normal telephone network in an analog form. When several subscribers in one area require only low-speed data transfers, each subscriber is connected to a local concentrator at a particular location by means of two low-speed modems; one at the subscriber's location; the other at the concentrator location. The concentrator location will have one such low-speed modem for each incoming telephone line. A digital processing circuit converts the digital signals between the low-speed modems of the concentrator and a time multiplexed, high-speed, serial, digital pulse train that is applied to and received from a high-speed modem that is in a high-speed path to a data processing center. Oftentimes these concentrators are very sophisticated and an apparently large concentration can occur at such a point.

However, in many applications the actual concentration is less than 40:1. Moreover, this approach is not readily adapted for application to conventional, voice telephony. The high speed data networks require specially conditioned telephone lines that are expensive to utilize, and the required modems are expensive. The modems produce or respond to carriers held to a finite frequency band and digital processing circuits are, in effect, independent switches that can become quite complex and expensive. In addition, even if readily adapted to a telephony network, the economic benefit of substituting this type of a concentrator network at a remote location in a telephony system would not be economically justified by the cabling savings that would otherwise be provided.

Another approach that is applicable to a telephony network is to place remote port units at the center of the subscriber clusters and establish a reduced number of communications links, for example one to three links, between each of those clusters and a special unit that connects in place of one or more lines to the analog portion of the digital central office. This does provide some concentration, but also requires a duplication of the analog digital conversion circuitry that already exists in the digital central office. Moreover, it is difficult with this system to provide many of the maintenance functions that are provided in the conventional digital central office, such as disclosed in U.S. application Ser. No. 10,910.

SUMMARY OF THE INVENTION

Therefore, it is an object of this invention to provide an efficient means for concentrating telephone lines from remote subscribers.

Another object of this invention is to provide remote subscriber line concentration of a type that is adapted for use with a digital central office.

Still another object of this invention is to provide a concentration of remote subscriber lines for a digital central switch that operates with a digital data processing system and in which additional tasks for the data processing system are minimized.

Yet another object of this invention is to provide remote subscriber concentration in which a number of concentrators can be connected to a single digital central office.

Yet still another object of this invention is to provide inexpensive, remote subscriber line concentration under which the digital central office maintains control of the concentrator.

In accordance with this invention, remote subscriber line concentration is achieved by connecting a number of remote subscriber lines to a remote port means. This port means connects through a communications link to an interface at the digital central switch. The interface includes encoding means for encoding signals representing control supervisory data in response to various commands that the call processing means processes. A transfer means converts the signals between the formats of the signals at the port group highway and the encoding means and the format of the signals on the communications link. Signals from the remote port means to the digital central office pass through the transfer means. Signals representing voice data pass through the port group highway while signals representing supervisory sense information pass to a message generating means that responds to those signals and transmits messages to the call processing means.

This structure provides remote subscriber line concentration that meets the stated objectives of this invention. It is adapted for use with a digital central office and operates under the control of the call processing system. However, the encoding transfer and message generating functions in the interface unit minimize the additional work that the call processing system must perform to accommodate such an interface. Finally, it transfers voice data signals between the telephone subscriber lines and the central switch by connection directly to the port group highway and thereby eliminates the need for analog/digital conversions that are required in prior systems.

This invention is pointed out with particularity in the appended claims. The above and further objects and advantages of this invention may be better understood by referring to the following detailed description taken in conjunction with accompanying drawings.

BRIEF DESCRIPTION OF THE DRAWINGS

FIG. 8 is a detailed block diagram of the data paths in a memory shown in FIG. 4;

FIG. 9 depicts various messages that can be sent from a call processor to a digital satellite interface;

FIG. 10 depicts various messages that can be sent from a digital satellite interface to a call processor;

FIG. 16 depicts various messages that can be transmitted from a digital satellite interface to a remote digital satellite unit;

FIG. 17 depicts various messages that can be transmitted from the remote digital satellite unit to the digital satellite interface;

FIGS. 23A through 23F are detailed logic diagrams of the formatter shown in FIG. 6;

FIGS. 27A through 27E are detailed logic diagrams of the buffer shown in FIG. 14;

FIGS. 32-1 through 32-5, together with FIGS. 32A, 32B, 32C-1 through 32C-3, 32D through 32G, and 32H-1 through 32H-3, are detailed flow diagrams useful in understanding the transfer of messages shown in FIGS. 16 and 17 between the digital satellite interface and a remote digital satellite unit.

DESCRIPTION OF AN ILLUSTRATIVE EMBODIMENT

A. Telephony Network

Figure 1:
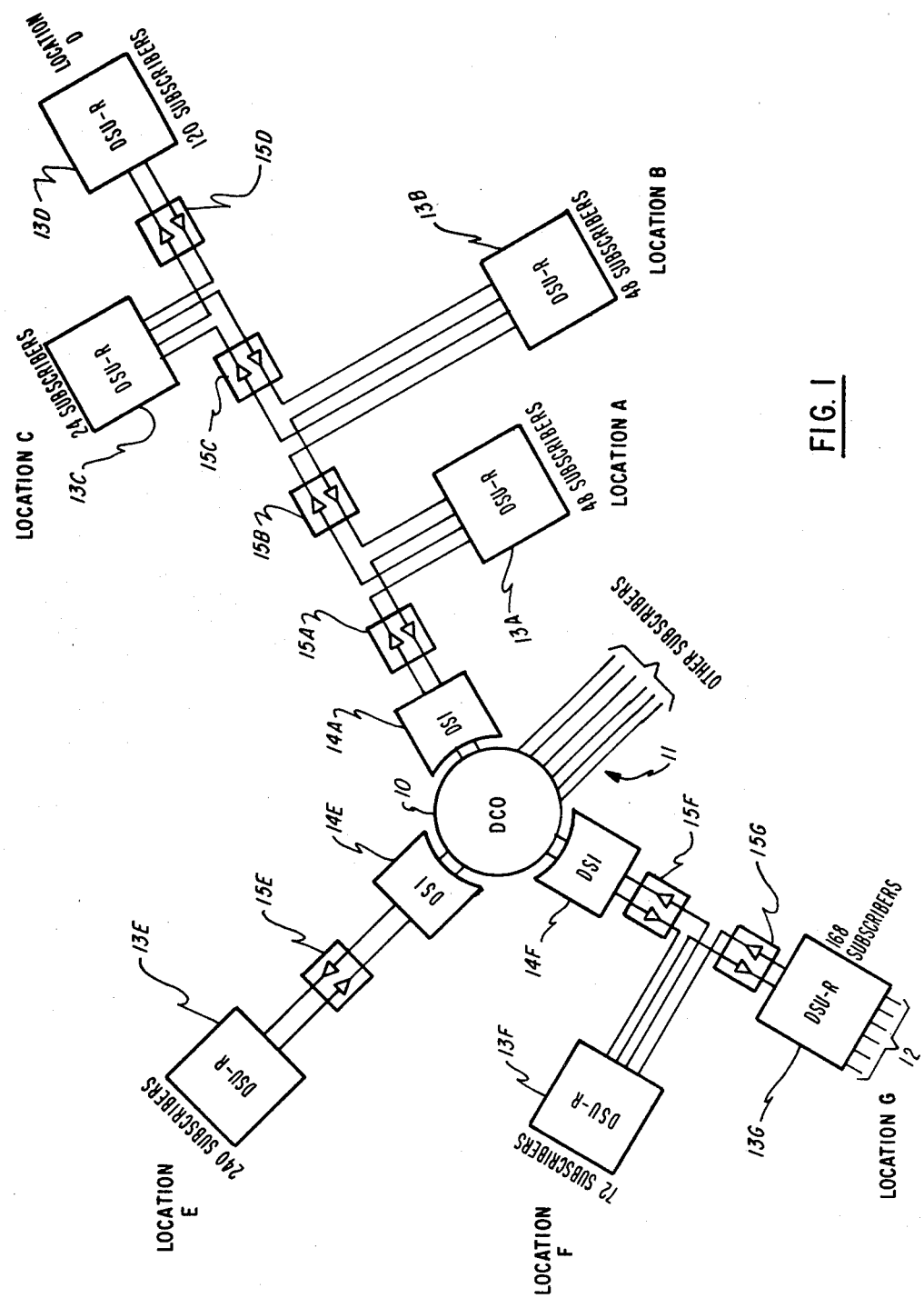
FIG. 1 is a block diagram of a telephony network constructed in accordance with this invention.

FIG. 1 depicts a telephony system that provides various levels of concentration in accordance with this invention. At the center of the telephony network shown in FIG. 1 is digital central office (DCO) 10 of the type described in U.S. patent application Ser. No. 10,910 and U.S. patent application Ser. No. 924,883. A number of local telephone lines 11 emanate from the digital central office 10 and connect to various local subscribers in accordance with the foregoing applications.

This particular network depicts an embodiment of a system in which "remote" subscribers are clustered around various geographically remote locations A through G. A number of telephone lines 12 interconnect these remote subscribers at locations A through G with remote port units that comprise remote digital satellite units (DSU-R's) 13A through 13G respectively.

Each remote digital satellite unit 13 connects to and operates in response to the digital central office 10 through a digital satellite interface 14 and a multiple path communications link 15. For example, digital satellite interface 14A connects to remote digital satellite unit 13A through a communications link 15A. The other digital satellite units 13B, 13C, and 13D are then interconnected by communications links 15B through 15D, thereby to define a daisy chain connection from the digital satellite interface unit 14A. This type of connection would be particularly appropriate where clusters of remote subscribers were dispersed along a line radiating from the digital central office location. The digital satellite interface 14E, communications link 15E, and remote digital satellite unit 13E indicate a type of connection which might be particularly useful in an apartment building in an urban environment.

In the particularly described embodiment, each remote digital satellite unit can connect to as many as 240 subscriber telephone lines such as shown at location E, and each digital satellite interface can handle traffic from up to 240 subscribers. Some typical numbers of subscribers connected to each such remote digital satellite unit 13 are shown on FIG. 1. Moreover, up to 30 digital satellite interfaces 14 can connect to a single digital central office.

From a general standpoint, it can be seen from FIG. 1 that the cabling associated with such a network can be dramatically reduced. Each of the communications links 15 may contain one, two, or three data paths. Thus, there is a potential for a cable reduction from 80:1 to 240:1. The actual concentration that can be achieved depends upon the traffic density of the various remote subscribers and the capacity of the communications link 15.

As described later, the communications links 15 in this embodiment convey pulse code modulated signals over a time division multiplexed path. Each digital satellite interface 14 interfaces to the digital central office and converts voice and supervisory information between the format of the digital central office 10 and the format of each communications link 15. The digital satellite interface 14 also reformats the supervisory and voice data signals and assigns a particular time slot, or channel on the communications link 15 to a particular remote subscriber when that telephone line is being used for a telephone conversation. The number of available channels on the communications link 15 normally is less than the number of subscriber lines.

Each remote digital satellite unit 13 provides an interface between the communications link 15 and the conventional telephone lines that emanate from that unit 13. It couples voice signals to and from the telephone, or subscriber, lines, produces sense supervisory information in response to activities by the subscirber, and responds to control supervisory information received from the communications link 15. In addition, the remote digital satellite unit 13 reformats the supervisory information and, in response to certain of the control supervisory information it receives, routes the information to the appropriate telephone line and also performs the analog/digital conversions that are necessary to receive and transmit analog voice signals over the telephone lines.

Figure 2:
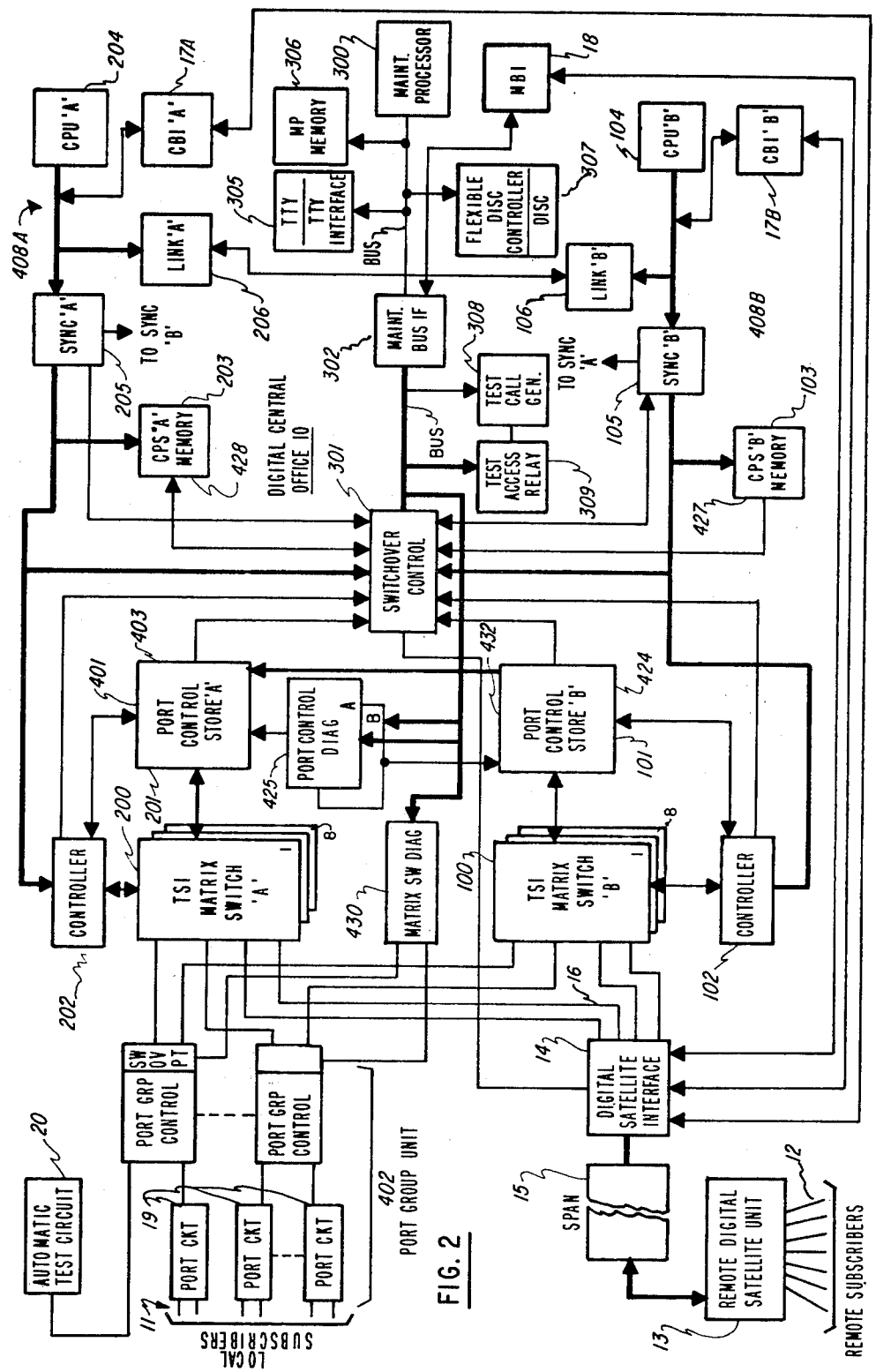
FIG. 2 is a more detailed block diagram of a digital central office in the telephony network shown in FIG. 1.

FIG. 2 depicts modifications to the telephony system disclosed in U.S. application Ser. No. 10,910 and is taken from FIG. 4 in that disclosure. In addition, FIG. 2 discloses a single digital satellite interface 14, a communications link, called a "span", 15, and a remote digital satellite unit 13 with various telephone lines 12 emanating to a cluster of remote subscribers. Elements that are common to the disclosure in the above-identified applications retain the same reference numerals. Specifically, reference numerals in the range from 100 through 399 are found in U.S. application Ser. No. 10,910, while reference numerals from 400 through 499 are found in U.S. application Ser. No. 924,833. As their functions are known, only the interconnections to specific elements are set forth. Specifically, the digital satellite interface 14 connects to this system at four points. First, there are port group highway connections 16 that interconnect the digital satellite interface with port group highways from the TSI matrix switch A 200 and the TSI matrix switch B 100. This enables the digital satellite interface 14 to transmit voice and sense supervisory information to and receive voice and control supervisory information from the port group highway signals in the format of the highway.

A second connection is to the call processing systems by means of a call processor bus interface (CBI). Specifically, a CBI "A" 17A establishes a communications path between the digital satellite interface 14 and CPU "A" 204, while CBI "B" establishes a communications path between the digital satellite interface 14 and the CPU "B" 104. Each CBI 17 can connect to a plurality of other digital satellite interfaces (i.e., up to a total of 30 in one embodiment). Each call processing bus interface 17 modifies data between a format that is compatible with the corresponding call processor 408 and the digital satellite interface 14. Each CBI 17 polls its corresponding digital satellite interfaces 14 for requests for access to its call processing unit 408. Moreover, each CBI 17 detects certain errors and can mask particular digital satellite interfaces 14 thereby to inhibit any operation through those interfaces.

A third connection between the digital satellite interface 14 and the digital central office 10 is by means of a maintenance bus interface (MBI) buffer 18 that establishes a communications path between the digital satellite interface 14 and the maintenance processor 300. The MBI buffer 18 also connects to each digital satellite interface that connects to the call processing bus interfaces 17. The MBI buffer 18 provides a conversion between formats of signals on the bus of the maintenance processor 300 and at the digital satellite interface 14. It modifies timing, expands addressing, and also performs a polling operation to determine when any of the connected digital satellite interfaces 14 wishes to communicate with the maintenance processor 300.

The fourth connection between the digital satellite interface 14 and the digital central office 10 is to the switchover control 301 that establishes which of the two call processing systems actually controls the telephone network.

These first three basic connections provide cooperative communications paths that enable the digital satellite interface 14, span 15, and remote digital satellite unit 13 to operate in response to control of the call processing systems 408A and 408B and the maintenance processor 300 shown in FIG. 2. However, this operation is accomplished with minimal changes to the physical circuits of these systems. The primary changes exist in control functions that are utilized by the call processing systems 408 and the maintenance processor 300. Thus, the existing capabilities of the call processing systems 408 shown in FIG. 2 are retained and are utilized in connection with this invention, thereby to further increase call processing efficiency and reduce costs.

As disclosed, a port group unit 402 interconnects the digital central office 10 shown in FIG. 2 to various local subscriber lines 11 through a port circuit 19. In this particular embodiment, an automatic test circuit 20, that tests the circuitry at the remote digital satellite unit 13 in cooperation with the maintenance processor 300, connects to trunk interface circuitry that connects to the port group control. This circuit is described in U.S. patent application Ser. No. 06/187,277.

B. Communications Link 15

Figure 3:
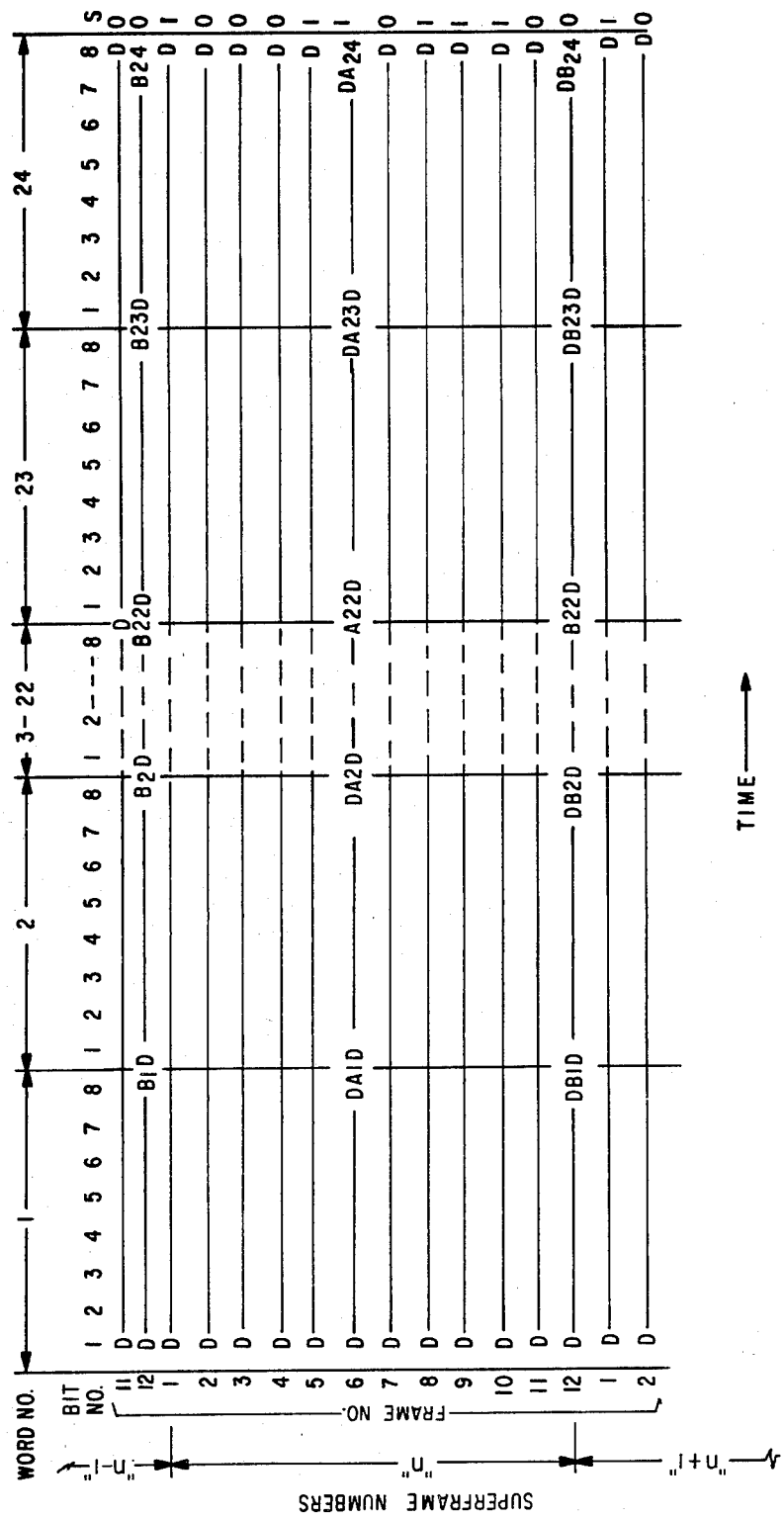
FIG. 3 is a diagram that depicts signal organization over a communications link shown in FIGS. 1 and 2.

The specific structure of various elements shown in FIG. 2 depends, in part, on the nature of the signalling across the span 15. Therefore, it will now be helpful to discuss the span 15 in more detail. A span is a known, differentially driven, electrical connection between two geographically remote points. As described later, the span 15 may include two or three independently operating span circuits or paths. Each span circuit defines a number of time domain channels. The specific organization and meaning of data signals on the channel is set forth in FIG. 3, that depicts the organization of a single "superframe" (i.e., superframe "n") that is passed over one span circuit as a serial bit stream together with portions of prior and following superframes "n−1" and "n+1". Each superframe comprises 12 successive frames (Frame numbers 1 through 12). In turn, each frame comprises 193 bits that form 24 8-bit words and one synchronizing bit. In accordance with this invention, the time interval for each "word" corresponds to a "channel"; thus, word number 1 corresponds to channel 1; and word 24, to channel 24. Moreover, as depicted at the right of FIG. 3, each frame terminates with the synchronizing bit and the pattern of synchronizing bits for a superframe is predetermined thereby to enable losses of synchronization to be readily detected. In this figure, "D" represents a signal that is interpreted as voice data.

Two of the twelve frames convey information corresponding to supervisory information and commands across the span. This is accomplished by a "bit stealing" technique that is implemented during the sixth and twelfth frame times for each superframe. During the sixth frame, the least significant bit (bit 8) in each of words 1 through 24 is encoded as an "A" signalling bit in response to sense supervisory information from the remote digital satellite unit 13 for the subscriber assigned to the corresponding channel. For example, if a subscriber goes off-hook and is assigned channel 7, off-hook information will be transmitted during the A7 bit time (i.e., the least significant bit of word number 7 in the sixth frame). Thus, during the sixth frame, sense supervisory information for 24 subscribers can be transmitted from a remote digital satellite unit 13 to the digital satellite interface 14.

The least significant bits in each of words 1 through 24 during the twelfth frame constitute "B" signalling bits. In this embodiment, the "B" signalling bits are utilized for conveying 24-bit messages between the digital satellite interface 14 and its remote digital satellite units 13.

All the information in the data words, including the least significant bits in each word during the sixth and twelfth frames, are also conveyed to the port group highways 16. Obviously, there may be errors during the sixth and twelfth frames, but the error produces no significant degradation in the quality of the voice that is ultimately heard by the subscriber.

Thus, FIG. 3 depicts a specific embodiment of a time-division multiplexed system that defines a number of channels. As described later, each of these channels is then assigned to a particular subscriber line when that subscriber line is in use. Yet this provides a reasonably rapid transmission technique for the "A" and "B" signalling bits as, in one specific embodiment in which each frame requires 125 microseconds, "A" and "B" bit signalling rates approach 2,000 bytes per second for the twenty-four channels.

Figure 4:
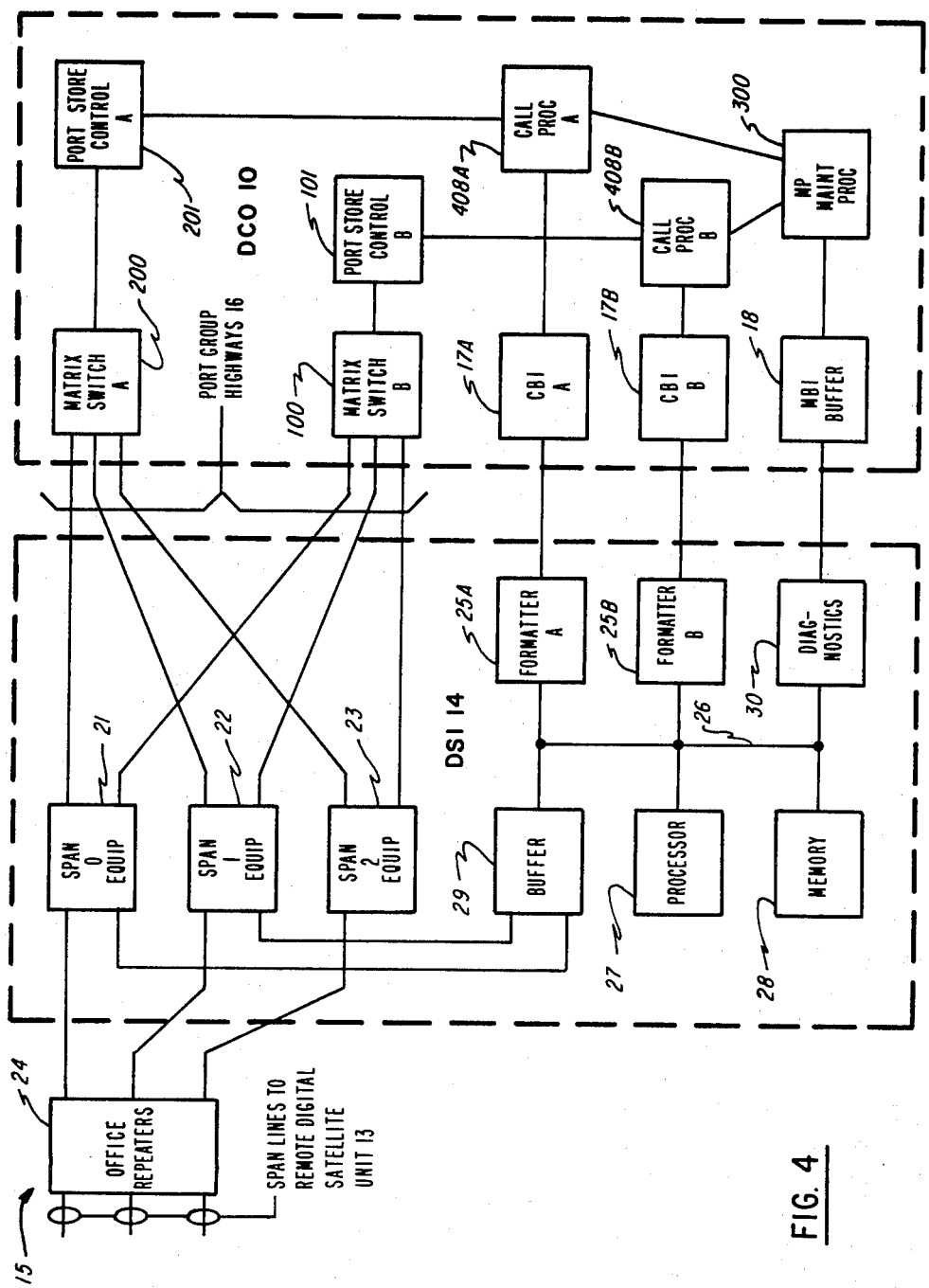
FIG. 4 is a block diagram of a typical digital satellite interface and its connection to the network that is depicted in FIGS. 1 and 2.

Circuitry along this line is denoted as span equipment. FIG. 4 depicts three separate spans 15 that are coupled to span equipment in the DSI 14. Specifically, digital satellite interface 14 contains span 0 equipment 21, span 1 equipment 22, and span 2 equipment 23. Each one of the span equipment 21 through 23 connects to both the TSI matrix switch A 200 and the TSI matrix switch B 100.

Each item of span equipment comprises three functional modules: a span transmitter, a span receiver, and a span interface. The transmitter accepts data from the port group highway connection 16 and formats that data for span compatibility, adds the synchronizing pattern shown in FIG. 3, and routes the information to the span interface for subsequent transfer over office repeaters 24 (i.e., amplifying circuits) that drive the spans 15. The span receiver synchronizes incoming data from the span interface and converts it into a rate and form that are compatible with the port group highway connection 16. The span interface also provides timing for the span equipment and proper signal levels among the digital satellite interface 14, the port group highway connection 16, and the office repeaters 24.

More specifically, a span transmitter synchronizes the equipment to the digital central office 10, formats the signals on the port group highway connection 16 into the span format, inserts the correct synchronizing bit at the end of each frame to achieve the correct synchronizing pattern for each superframe, and then routes the data to the span interface for subsequent transmission over the span 15. The span receiver synchronizes the incoming span data and formats the data for compatibility with the port group highway connection 16. It also routes voice data and supervisory data onto the port group highway connection 16. The span interface interconnects the digital satellite interface 14 to both the port group highway connection 16 and to the office repeaters 24. The circuitry may also contain bit error comparators. Thus, each span equipment provides a path between the TSI matrix switches 100 and 200 and the spans 15.

To facilitate an understanding of this invention, it will now be helpful to describe, in general terms, the construction and operation of the various circuits that establish various communications paths, namely: (1) the call processor-digital satellite interface path; (2) the digital satellite interface-remote digital satellite unit path; and (3) the maintenance processor-digital satellite interface path.

C. Call Processor-Digital Satellite Interface Path

The call processor-digital satellite interface path includes one of the call processor buffer interfaces 17A and 17B and the respective call processing systems 408A and 408B as shown in FIG. 4. Independently operable formatter circuits 25A and 25B in the digital satellite interface 14 connect to the interfaces 17A and 17B respectively and complete the paths to a busing structure 26 associated with a controlling processor 27, a memory 28 that is utilized by the processor 27, and a buffer 29. The buffer 29 is part of the communications path between the digital satellite interface 14 and corresponding remote digital satellite units 13. More specifically, the buffer 29 acts as an input/output interface between the bus 26 and the span equipments 21 through 23. A diagnostics circuit 30 also connects to the bus and is described later in connection with the maintenance processor-digital satellite interface path.

Figure 5:
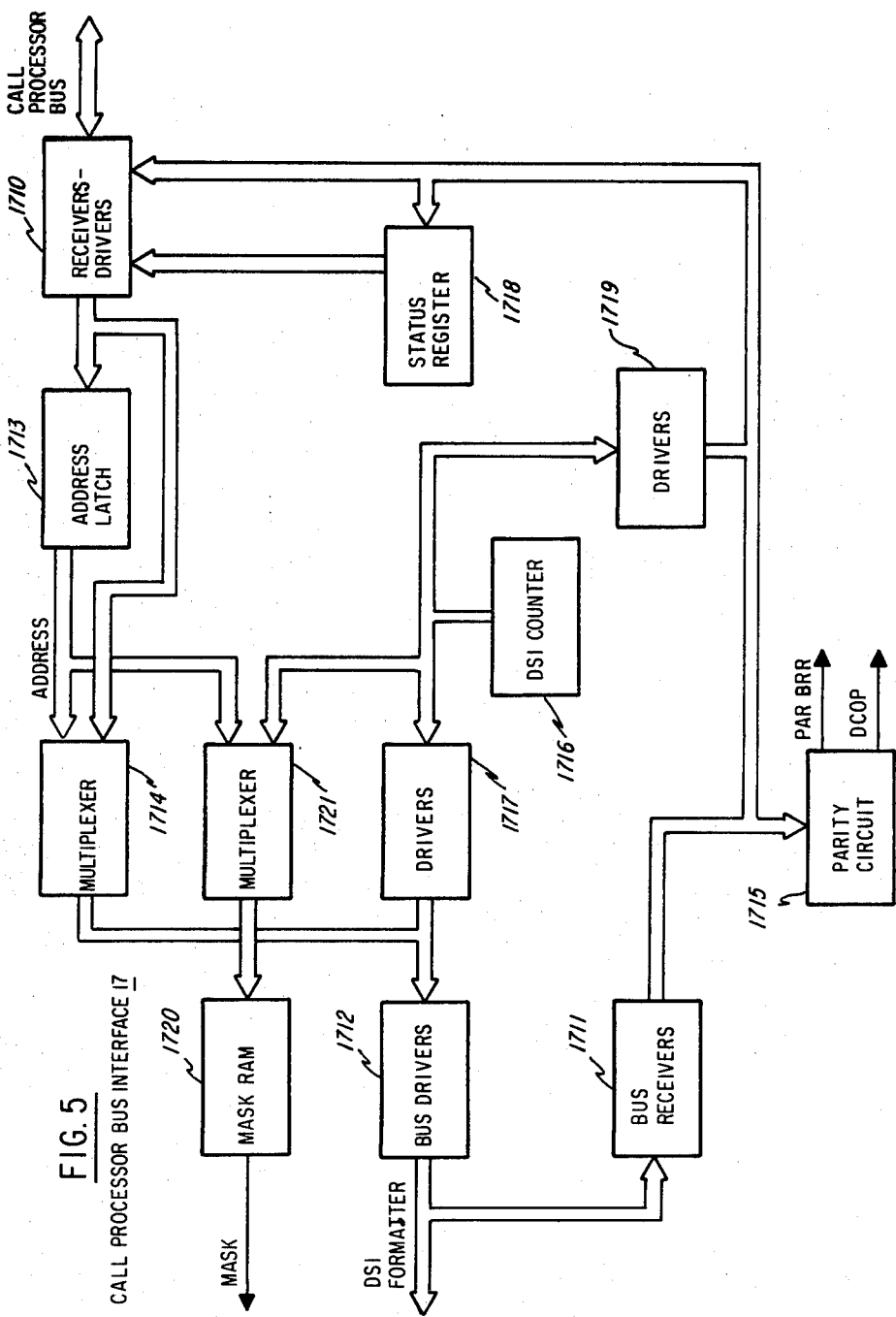
FIG. 5 is a detailed block diagram of the data paths in a call processor bus interface shown in FIG. 4.

FIG. 5 depicts one call processor bus interface (CBI) 17. It includes receivers-drivers 1710 that connect to the bus from a corresponding one of the call processors 408A and 408B and bus receivers 1711 and bus drivers 1712 that connect to a corresponding one of the formatters 25A or 25B. Each call processor bus interface 17 extends the corresponding call processor bus to the corresponding formatter. Address signals are coupled to an address latch 1713 and selectively coupled to the drivers 1712 through a multiplexer 1714 if the address corresponds to a location associated with the specific digital satellite interface 14. Moreover, data from a call processor 408 is routed from the receiver-drivers 1710 through the multiplexer 1714 to the bus drivers 1712. Other circuitry establishes various delays and controls to enable the communications. If data is to be retrieved, the data is received at the receivers 1711 and routed to the receivers-drivers 1710. A parity circuit 1715 monitors parity errors.

In addition to the foregoing, each CBI 17 contains a counter 1716 that provides polling of the various plural interfaces 14 that may connect to the CBI 17 through drivers 1717. Polling occurs when a call processor 408 is not communicating with that CBI 17. If a digital satellite interface requests service, the information is routed from receivers 1711 to a status register 1718 that is periodically interrogated by the respective call processor 408.

It also is possible to "mask out" a specific interface 14. A mask random access memory (RAM) 1720 can be loaded with an appropriate mask bit through the receiver-drivers 1710 and a multiplexer 1721. Each time the counter 1716 identifies an interface during polling, the number is sent through the multiplexer 1721 and the mask RAM 1720 generates a MASK signal if the corresponding interface has been masked out. This masking, however, does not inhibit communications between the interface 14 and each call processor 408.

Figure 6:
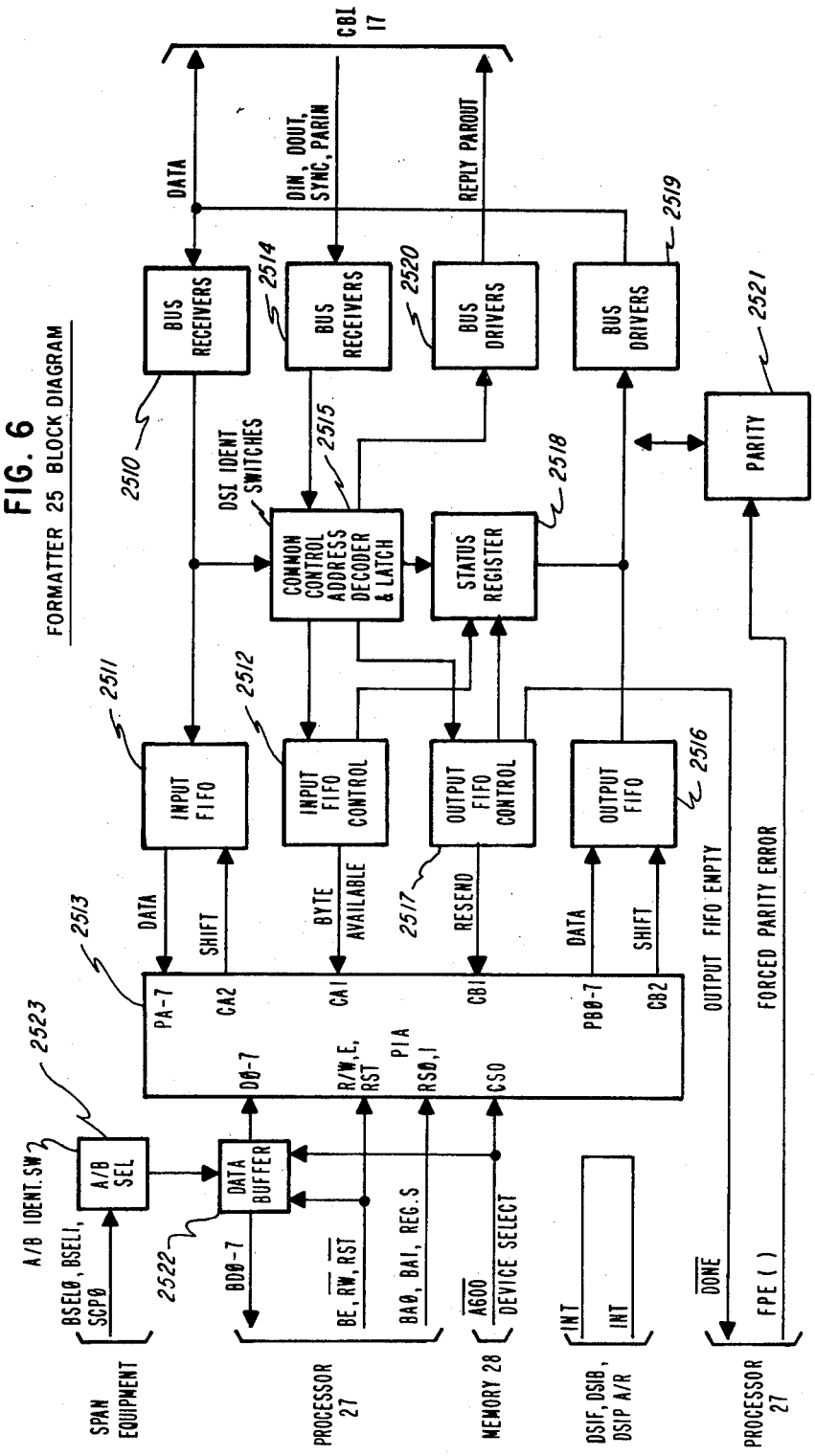
FIG. 6 is a detailed block diagram of the data paths in a formatter shown in FIG. 4.

As previously indicated, a formatter 25, as shown in FIGS. 4 and 6, receives data from a call processor and transfers it to the processor 27 in FIG. 4 and transfers data from the processor 27 to the call processor. Communications through a formatter 25 are in the form of messages. Incoming messages are received from the bus drivers 1712 in FIG. 5 by bus receivers 2510 in FIG. 6. These messages are transmitted serially by 8-bit byte and are transferred into a first-in/first-out memory (FIFO) 2511. An input FIFO control 2512 controls transfers into the input FIFO 2511 from bus receivers 2510 and out to a standard programmable interface adapter 2513. Whenever a call processor 408 sends a message to the interface 14, it addresses the corresponding input FIFO 2511 and sends the data to be loaded in the input FIFO 2511 with corresponding control signals that are received in bus receivers 2514 and coupled to common control, address decoder and latch circuitry 2515. The input FIFO control 2512 responds by shifting data into the input FIFO 2511. As is known, data being input to such a FIFO automatically shifts to the output. When a data byte is at the output of the input FIFO, the input FIFO control 2512 generates a BYTE AVAILABLE signal to an input of the programmable interface adapter 2513 and thereafter the information is shifted from the input FIFO 2511 into data inputs of the programmable input adapter 2513 by means of SHIFT signals.

When a message is to be transferred to a call processor 408, it passes through an output FIFO 2516 under the control of an output FIFO control circuit 2517. When the output FIFO 2516 is empty, an output FIFO control 2517 transmits a RESEND signal to the programmable interface adapter 2513. As a message is sent to the output FIFO 2516 over data lines, SHIFT signals are also sent. After the message is sent, the output FIFO control 2517 terminates the RESEND signal. In addition, the output FIFO control 2517 sets a SERVICE REQUEST bit in a status register 2518.

Each call processor 408 periodically addresses a status register 2518 in each formatter 25 and reads the status register through bus drivers 2519 along with control signals that are passed through bus drivers 2520. When the call processor 408 determines that the output FIFO 2516 contains a message, it addresses the output FIFO 2516 and reads successive message bytes as they are presented under the control of the output FIFO control 2517. When the message has been completed, the output FIFO control 2517 asserts the RESEND signal, thereby to enable another message to be sent.

As formatters 25 are included in each of several digital satellite interfaces that can connect to a call processor bus interface, a call processor 408 communicates with a specific formatter 25 by first identifying the digital satellite interface and then using common addresses to address the formatter. Thus, after the particular digital satellite interface has been selected, only the formatter in that interface will respond to subsequent signals even though the specific formatter address is common to all of the formatters. This condition exists until the call processor 408 transmits another message that unlatches and, thereby, "deselects" or releases the digital satellite unit.

A parity circuit 2521 checks all addresses and data to detect parity errors and set a parity error bit in the status register 2518.

A data buffer 2522 connects between the processor 27 and the programmable interface adapter 2513. It contains various connections to the processor 27 and the memory 28 that enable the programmable interface adapter 2513 to perform its control operations.

When the formatter is used in a network constructed in accordance with FIG. 2, one or the other of the call processing systems, identified as the "A" or "B" system, actually controls switching. An A/B selection circuit 2523 includes an A/B identification switch that is set in accordance with the connection of a formatter 25 to either the "A" or "B" call processor. The processor 27 will transfer data to the output FIFO's 2516 in both formatters 25A and 25B in FIG. 4. However, it will respond only to the formatter that is connected to the selected call processor 408A or 408B. Specifically, a SELECT A/B signal from the switchover control 301 in FIG. 2 and the span equipment appears as a BSEL0 signal in FIG. 6. This signal, when asserted, enables the data buffer 2523 in formatter 25A and disables the data buffer in formatter 25B so the "A" system controls call processing. When the BSEL0 signal is not asserted, the "B" system controls call processing. If span 0 span equipment 21 is removed, an SCP0 signal will be asserted and a BSEL1 signal, from span 1 equipment 23 which carries the same information, is utilized.

Figure 7:
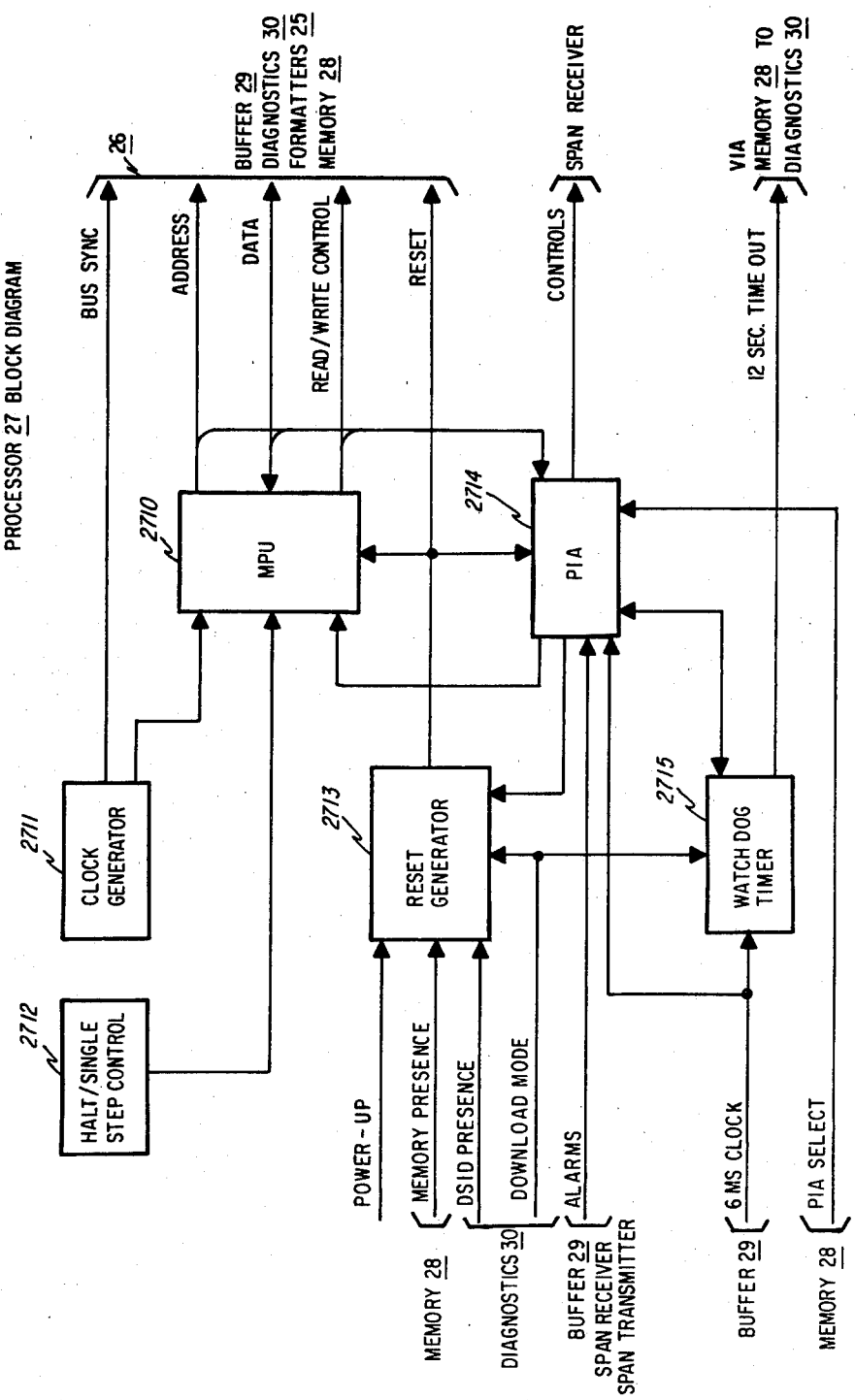
FIG. 7 is a detailed block diagram of the data paths in a processor shown in FIG. 4.

Communications between a call processor and the interface 14 shown in FIG. 4 also require interaction of the processor 27 and the memory 28. The processor 27 and memory 28 comprise a conventional, microprogrammed digital computer system. The processor 27 is shown in FIG. 7 and the memory 28 in FIG. 8. The processor 27, in this particular embodiment, is a Motorola 6800 microprogrammed digital data processing system. It includes a microprocessor unit (MPU) 2710 that connects to various other units including a clock generator 2711, a halt/single step control 2712, a reset generator 2713, a programmable interface adapter 2714, and a watchdog timer 2715.

The clock generator 2711 supplies various clocking signals required to sequence the MPU 2710 through its various processing steps. Every six milliseconds, or some other predetermined time interval, the buffer 29 generates a 6 MS CLOCK signal that interrupts the MPU 2710 through the programmable interface adapter 2714, thereby to initiate routine call processing or maintenance and administrative actions that constitute a DSI control program. One such maintenance function, or action, is examination of alarm inputs presented to the programmable interface adapter 2714 from the buffer 29, the span receiver, and the span transmitter.

The halt/single step control 2712 provides a troubleshooting aid and allows the normal cycling of the MPU 2710 to be inhibited. The watchdog timer 2715 is normally periodically reset as the MPU 2710 performs various functions. If, however, the MPU fails to execute its functions in a normal mode that would reset the watchdog timer 2715, the timer 1715 times out and interrupts the MPU 2710 to initiate a recovery sequence.

The BUS SYNC, ADDRESS, DATA, READ/WRITE CONTROL, and RESET signals are applied to the bus 26 to be conveyed to the formatters 25A and 25B, memory 28, buffer 29, and diagnostics circuit 30 in FIG. 4. In addition, DATA signals can be received from each of these elements under the control of the other signals.

The memory 28 comprises a bootstrap ROM 2810, a program RAM 2811, and a working RAM 2812. The bootstrap ROM 2810 contains a small portion of program that is automatically addressed when a POWER-UP signal is applied to the reset generator 2713 in FIG. 7. Such bootstrap programs are well known. Addresses are applied to a peripheral address decoder 2813 and a memory address decoder 2814. A memory data buffer 2815 interconnects the data paths between the processor 27 and each of the memories 2810, 2811, and 2812. The memory data buffer 2815 is inhibited, however, if the peripheral address decoder 2813 decodes a peripheral address.

During any reset operation of the call processing system, the maintenance processor 300 loads information into the program RAM 2811 and/or the working RAM 2812. Specifically, this is done when the diagnostics circuit 30 generates a DOWNLOAD signal and a WRITE signal. This will cause DATA signals, representing programs and a data base, to be loaded into both the program and working RAM's 2811 and 2812 as logical AND circuits 2816 and 2817 enable writing operations into these memories. Otherwise, only a reading operation can occur in response to ADDRESS signals from the processor 27.

The format of messages to be sent between the digital satellite interface 14 and the call processor 408 is depicted in FIGS. 9 and 10. Each message comprises at least one 8-bit byte. The first byte comprises a 4-bit group that identifies the message and a second, 4-bit group that identifies the number of bytes in the message. Thus, the ORIGINATE message in FIG. 10 contains the hexadecimal value "05", where the "0" indicates the ORIGINATE message and the "5" identifies that the message contains a total of 5 bytes. An ORIGINATE message indicates a remote subscriber has gone off-hook. The second byte in the ORIGINATE message contains the calling ('ING) satellite line number (SLN) of the remote subscriber. The third byte contains an assigned channel number, the fourth byte contains an "all channels busy" delay count, and the fifth byte contains party identification bits. The second, third, and fifth bytes, then, completely indentify the calling party and the channel number on the span equipment 15.

Figure 11:
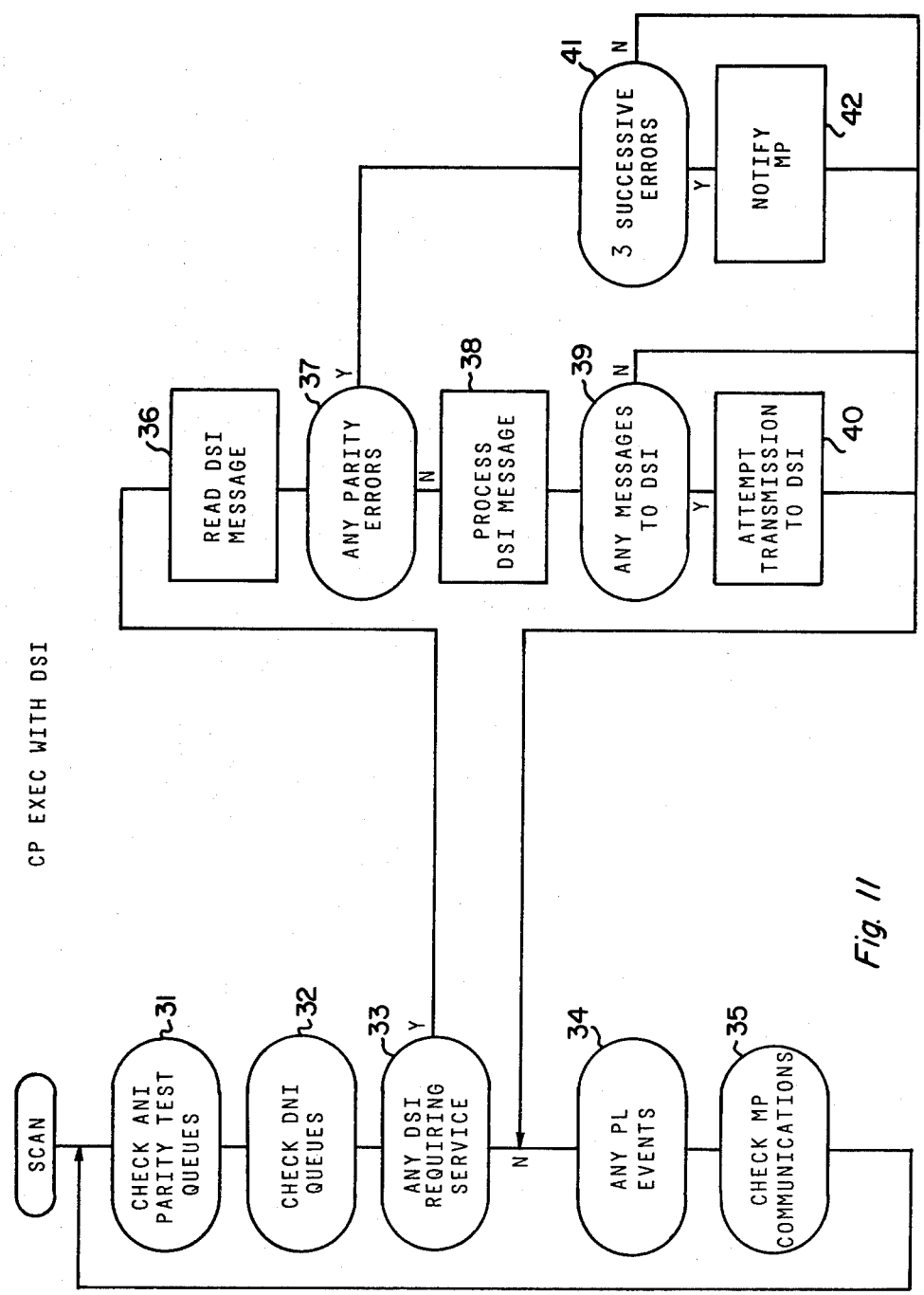
FIG. 11 is a generalized flow diagram of the control functions used by a call processor in receiving and transmitting the messages in FIGS. 9 and 10.

FIG. 11 is an overview of the call processor executive program performed by the call processing system in U.S. patent application Ser. No. 924,883, as modified by the addition of the digital satellite unit 13 and interface 14. In that original program, several sequences of tests were made. They are generally depicted without any decisions in FIG. 11 as sequence 31 in which the call processor checks ANI party test queues and sequence 32 in which the call processor checks DNI queues. Sequence 33 is new and it and other new sequences are described later. If no digital satellite interface 14 requires service, the call processor uses sequence 34 to detect PL events and sequence 35 to determine whether any maintenance processor communications are required. Operations then loop back to sequence 31.

Now referring to sequence 33, if a digital satellite interface 14 does require service, operations shift to a series of sequences during which the call processor can read the message, process the message, and then transfer a message back to the digital satellite interface 14. Sequence 36 reads the message and, in sequence 37, determines if the parity circuit 1715 in FIG. 5 detected any parity errors. If no parity errors are detected, the message is processed in sequence 38. If a return message is to be transmitted to that interface 14, sequence 39 enables its transmission in sequence 40.

If a parity error is detected in sequence 37, sequence 41 determines whether three successive errors have been detected. If a fewer number of attempts have been made, sequence 41 completes by shifting operations back to sequence 34 and, as the request for service will not have been fully serviced, sequence 33 will again divert to sequence 36. If three successive parity errors are detected, however, the call processor 408 uses sequence 42 to notify the maintenance processor 300 of the error through its respective link circuits 106 or 206.

Figure 12A:
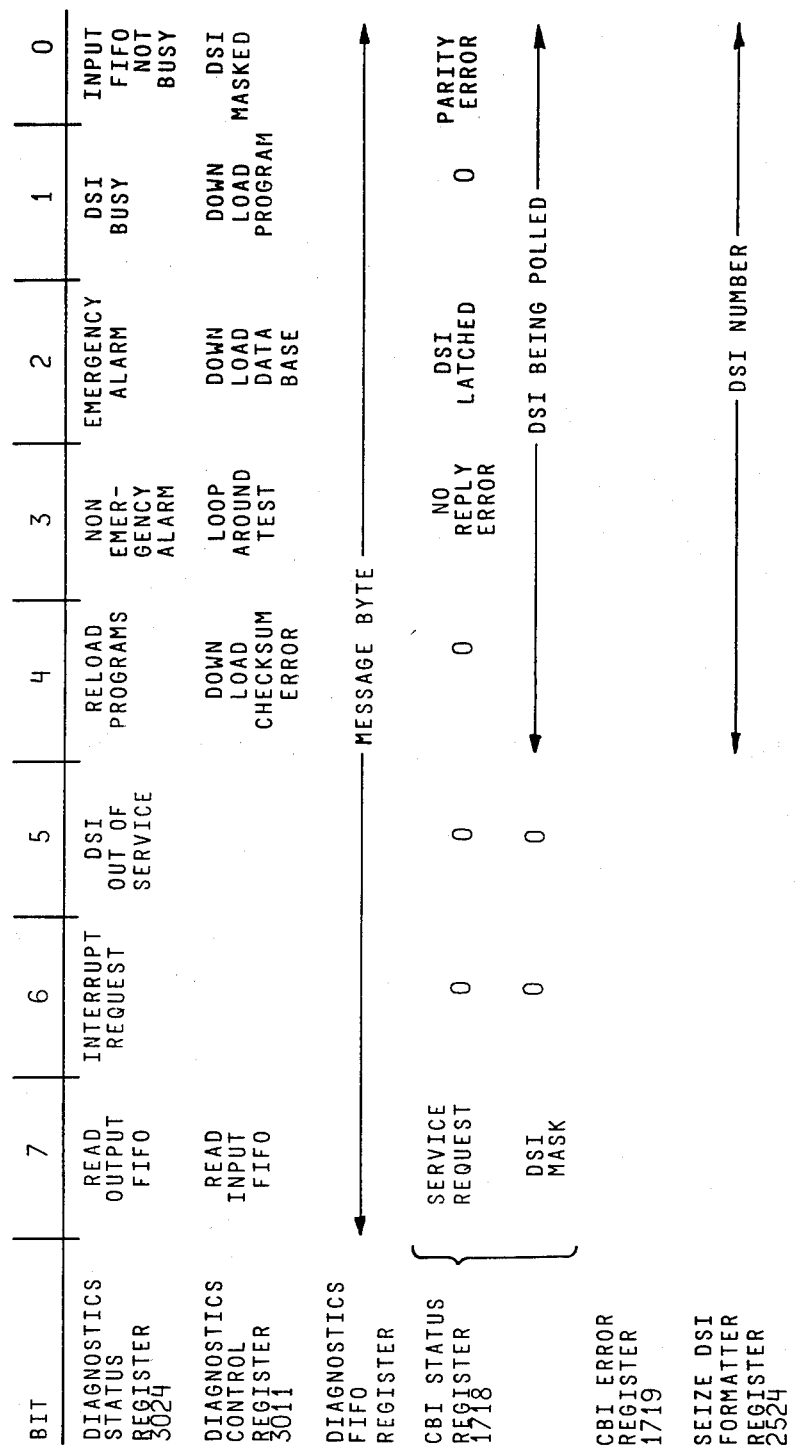
FIG. 12 together with FIGS. 12A and 12B constitute a memory map that depicts various memory locations and that is useful in understanding the flow diagram of FIG. 13.

FIG. 12 depicts various registers that can be addressed by the call processor. Certain of these registers are used during the transmission and receipt of messages between the call processor and a digital satellite interface 14, as set forth in more detail in FIG. 13. If sequence 33 in FIG. 11 indicates that one of the digital satellite interfaces 14 requires service, the call processor processes sequence 36 shown in both FIGS. 11 and 13A. Specifically, at step 43 the call processor reads the CBI status register 1718 in FIGS. 5 and 12A. The CBI status register comprises two 8-bit bytes. The most significant bit is a "SERVICE REQUEST" bit which contains a "1" (i.e., is set) if the corresponding digital satellite unit is requesting service. This polling is accomplished under the control of the DSI counter 1716 in FIG. 5 so, in step 44, the satellite number is stored in a SEIZE DSI FORMATTER register 2524, in FIG. 12A, in the common control 2515, in FIG. 6, that contains the DSI number in the five least significant bits.

Then the call processor reads a data byte by performing a reading operation from the output FIFO 2516 (step 45). When this occurs, the data byte is transferred through data drivers 2519 onto the data path through the CBI 17 to the respective call processor 408. The call processor 408 reads the first byte and immediately determines the message length. If more message bytes are to be received, step 46 branches back to step 45 to read the successive data bytes from the output FIFO 2516. When the complete message is transferred, sequence 36 in FIG. 11 has been completed and sequence 37 tests for parity errors.

Figure 13A:
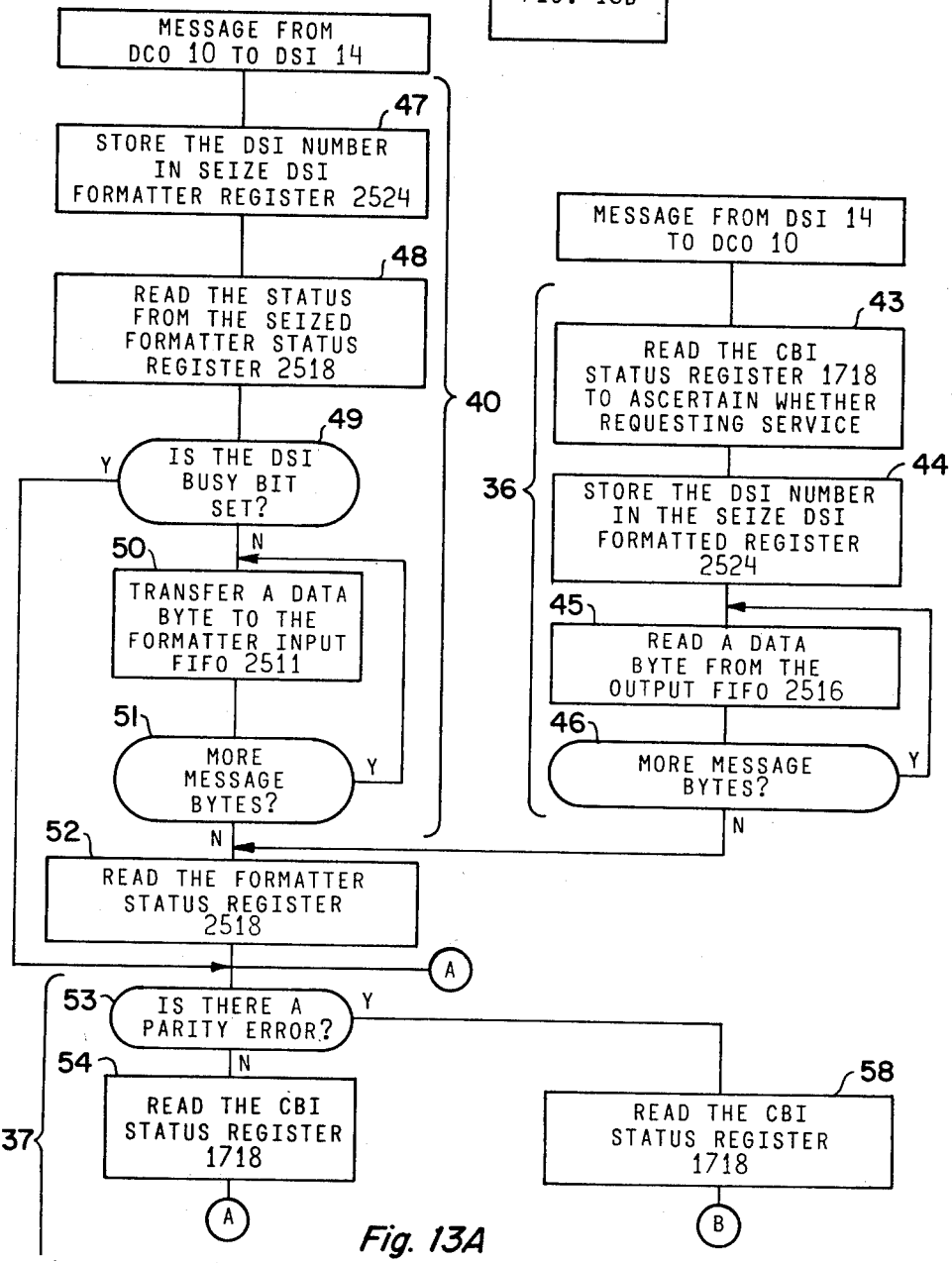
FIG. 13 together with FIGS. 13A and 13B constitute a flow diagram of the operations required to transfer messages between the call processor and the digital satellite interface shown in FIG. 4.
Figure 13B:
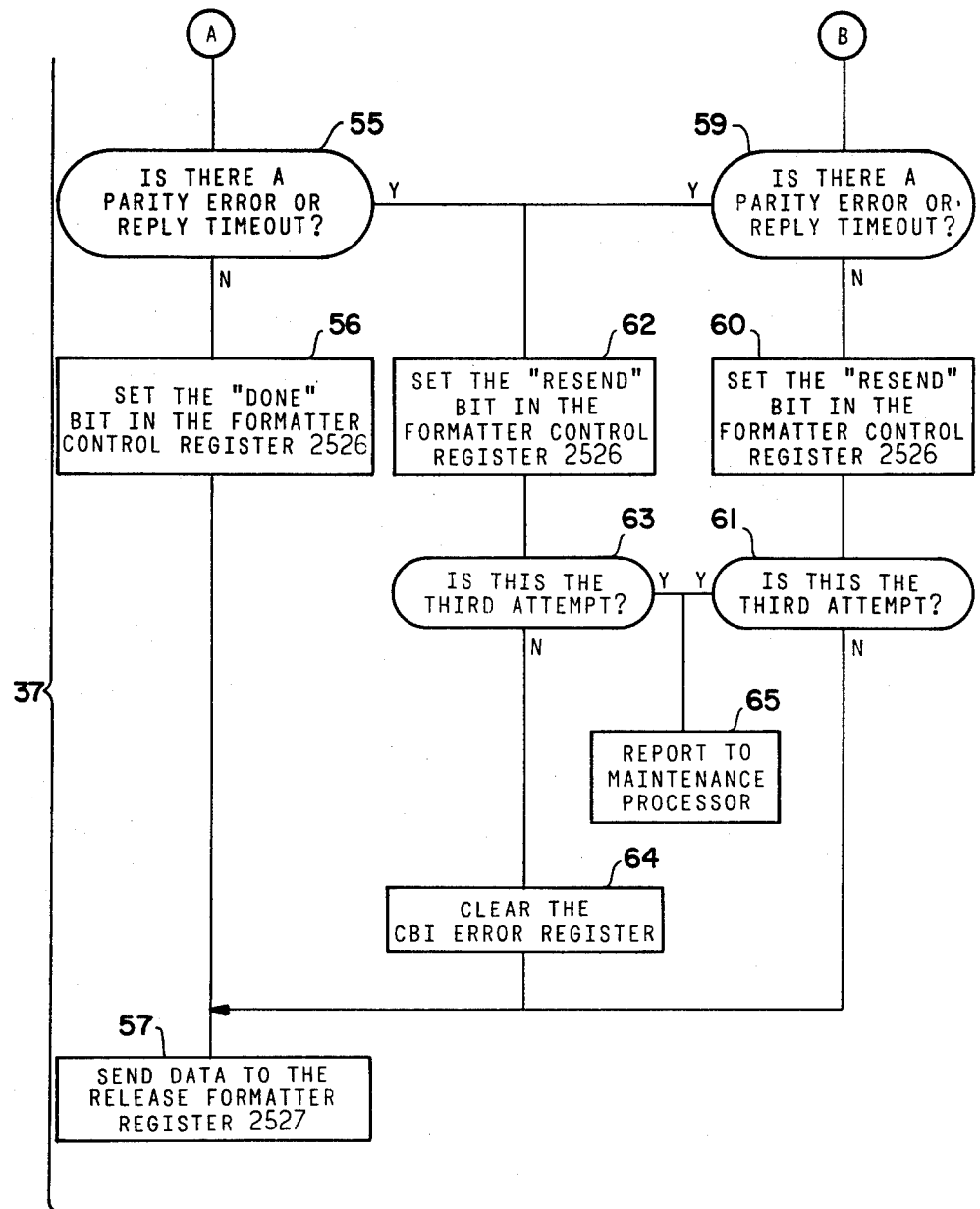

Sequence 40 in FIG. 11 is established by steps 47 through 51 in FIG. 13A. If the message is to be sent, the call processor 408 again stores the DSI number in the least significant bits of the SEIZE DSI FORMATTER register 2524 shown in FIG. 12A (step 47) and then reads the status register 2518 in the seized formatter (step 48). As shown in FIG. 12B, the least significant bit is a DSI BUSY bit. If that bit is set, no message can be sent and step 49 bypasses steps 50, 51, and 52. However, if the DSI BUSY bit is cleared, a data byte is transferred to the input FIFO 2511 in FIG. 6. Again, the first byte identifies the total number of bytes in the message, so the call processor "knows" if additional message bytes are to be sent. If they are, step 51 branches back to step 50 until all the message bytes are sent whereupon step 51 branches to step 52 so that formatter status register 2518 is read. The formatter status register 2518 is also read after a message is sent to the call processor based upon the branch of step 46.

The formatter status register 2518 contains a PARITY ERROR bit. If there is no parity error, step 53 branches to step 54 in which the call processor reads the CBI status register 1718 in FIGS. 5 and 12A to detect a parity error or a reply timeout. The CBI status register 1718 includes a PARITY ERROR bit and a DSI LATCHED bit. If neither of these bits is set, step 55 branches to step 56 whereupon the call processor sets a DONE bit in a formatter control register 2526 located in the circuit 2515 in FIG. 6 (bit 1 in FIG. 12B) and then sends data to a fictitious release formatter register 2527 in step 57. A writing operation to the release formatter register 2527 address produces the release operation.

Now assuming that there is a parity error indicated in the formatter status register 2518, step 53 branches to step 58 where the CBI status register 1718 is again read. If there is no parity error and no reply timeout signified by bits 8 or 11 in the CBI status register 1718, step 59 branches to step 60 whereupon the RESEND bit in the formatter control register 2526 in the circuit 2515 is set. If this not a third attempt, step 61 branches back to step 57. As a result, the DONE bit is not set in the formatter control register 2526. Thus, the next polling of the DSI status register 2518 will show the need for a transmission to the call processor.

If there is a parity error or reply timeout detected in either of steps 55 or 59, operations transfer to step 62 which again sets the RESEND bit in the formatter control register 2526 in circuit 2515. In step 63 a test is made to determine if this is the third attempt to read or write the register. If it is not, step 63 branches to step 64 whereupon the apropriate one of the PARITY ERROR or DSI LATCHED bits in the CBI error register 1719, which has the same form as the CBI status register 1718 in FIG. 12A, is cleared. Then step 64 transfers operations back to step 57. If three attempts are made to transmit a message to or receive a message from the digital satellite interface 14, steps 61 or 63 will branch to step 65 whereupon the error is reported to the maintenance processor 300 over the communications path between the maintenance processor and the digital satellite interface 14 as described later.

D. Digital Satellite Interface—Remote Digital Satellite Unit Path

Figure 14:
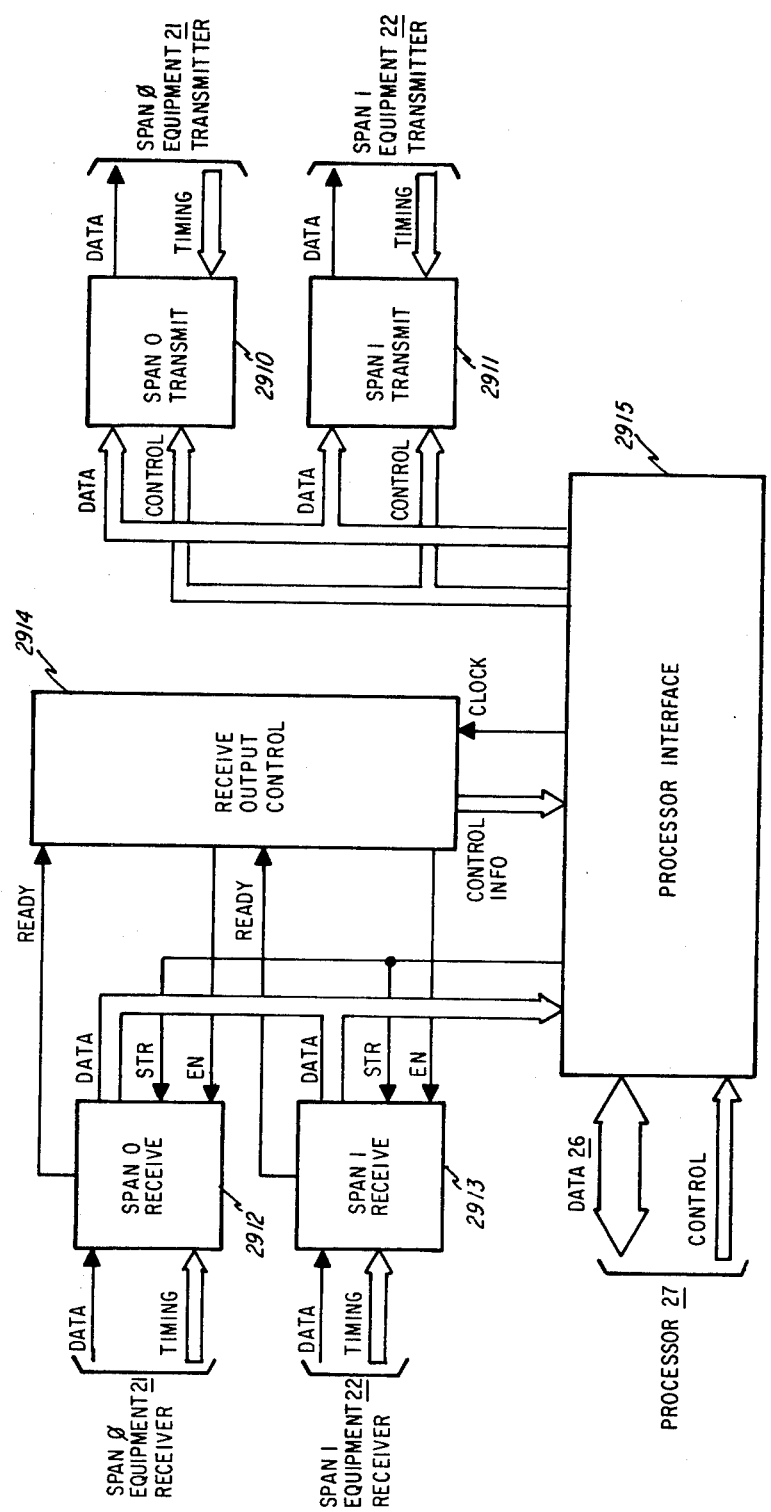
FIG. 14 is a detailed block diagram of the data paths for a buffer shown in FIG. 4.

Referring again to FIG. 4, the communications path between the digital satellite interface 14 and an associated digital satellite unit 13 includes, at the central location, the buffer 29, span equipments 21 through 23, and the office repeaters 24 that connect the span equipments to the span 15. The buffer 29 enables communications between the processor 27 and the remote units of the system, using the "B" signalling bits, and is shown in FIG. 14. It includes two span transmit sections 2910 and 2911, two span receive sections 2912 and 2913, a receive output control circuit 2914, and a processor interface 2915 constituted by a conventional programmable interface adapter that is compatible with the processor 27 in FIG. 4.

Each of the transmit sections 2910 and 2911 has the same construction, and each receives data from the processor 27 by way of the processor interface 2915. Each contains a FIFO with serial/parallel, input/output capabilities. The processor interface 2915 provides data signals in parallel and control signals for shifting in data and indicating the loading of data. Moreover, each of the transmit sections 2910 and 2911 receives an enabling input that controls whether the data is routed to span 0 transmit section 2910 or span 1 transmit section 2911. Each SHIFT IN STROBE signal causes data to be loaded in parallel into a FIFO input register and then to ripple through the FIFO to the output register. When the data has been loaded, the processor 27 asserts a DATA LOADED signal that sets a latch on both transmit sections to provide an input to a span output enable latch.

Timing signals from the transmitter in the corresponding span equipment include a synchronizing signal that will set the output enable latch on the first synchronizing signal following the assertion of the DATA LOADED signal. This enables the corresponding FIFO outputs in the sections 2910 and 2911 so that the data is shifted serially on a strobe provided by the transmitter section in the span equipment at a time corresponding to the "B" signalling bit times. Whenever the DATA LOADED signal is not asserted between two successive synchronizing signals from the span equipment, neither of the FIFO outputs will be enabled in the transmit sections 2910 and 2911 so that a sequence of "1"'s, representing an "IDLE" message (FIG. 16), will be transmitted onto the spans as the "B" signalling bits.

The span 0 receive section 2912 and span 1 receive section 2913 contain identical circuits, including FIFO's that receive incoming span data from the span equipment receivers in response to a STROBE signal provided by the receivers. Other timing signals include a SYNC pulse, that clears the FIFO and associated receive counters, and a messge received indication prior to the reception of a SPAN message. More specifically, incoming data, in serial form, is shifted into the FIFO's by the strobe signal. Then the receive counter is incremented until it indicates that all the "B" signalling bits (24 bits in the specific example shown in FIG. 3) have been received. When this occurs, a SPAN MESSAGE RECEIVED signal is asserted.

After each SYNC pulse is received by the corresponding receive sections 2912 and 2913, the receive output control 2914 alternately enables the outputs of the receive sections 2912 and 2913, searching for a message other than an IDLE message. When this occurs, a SPAN RECEIVE MESSAGE READY signal is asserted to set a flag in the processor interface 2915. Each SYNC pulse from either span clears the SPAN RECEIVE MESSAGE READY signal. When the processor 27 reads the processor interface 15, it also clears the corresponding flag.

The processor interface 2915 provides the processor 27 with an indication of which span has the incoming message. This is accomplished by means of a FIFO ENABLE signal that indicates the span 1 receive section 2913 when it is asserted and the 0 receive section 2912 when it is not asserted. The processor 27 obtains the data by parallel extraction of the enabled FIFO's output register. Each reading operation is followed by a shifting of the information in the corresponding FIFO, under the control fo SHIFT OUT pulses, so the successive groups of bits are received. Each SHIFT OUT pulse also sets an OUTPUT REGISTER EMPTY signal, causing an empty indication counter to be incremented. The empty indication disappears following the next SHIFT OUT pulse unless the entire message has been extracted from the receive section 2912 or 2913.

The office repeaters 24 in FIG. 4 are transparent to all BUS signals. They eliminate noise and ground potential differences caused by noncontiguous placement of interfaces. They comprise differential receivers and differential drivers for producing transfers over the span equipment 15. Therefore, there is no need for a further description of the repeaters 24.

Figure 15:
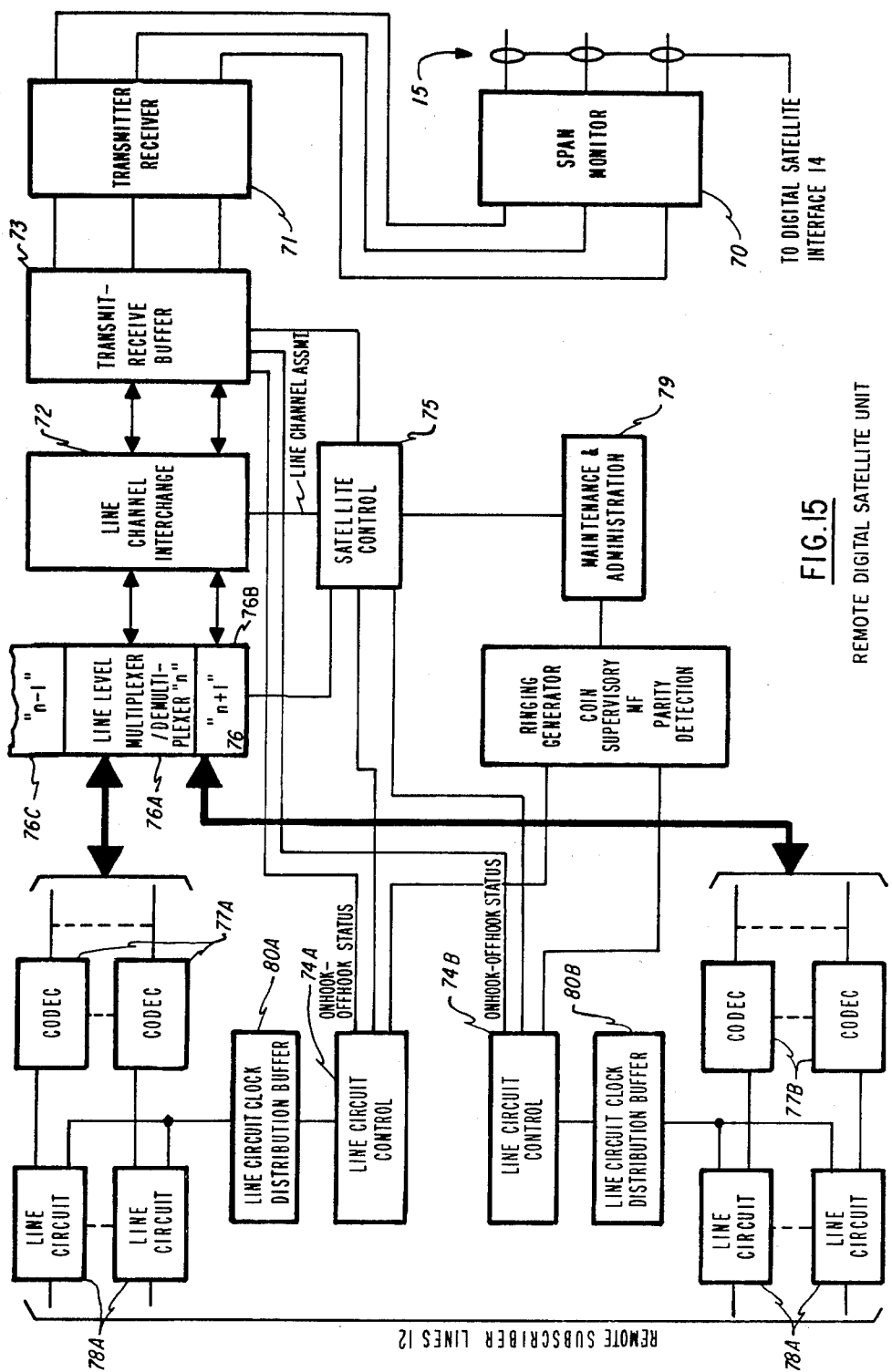
FIG. 15 is a block diagram of a remote digital satellite unit shown in FIGS. 1 and 2.

FIG. 15 is a basic block diagram of a typical, remote digital satellite unit. The individual paths in the span 15 connect to a span monitor 70. The span monitor 70 reports alarm conditions upon detection of a faulty waveform (specifically, bipolar violations), pulse voids, or sustained synchronization fault (so-called "carrier group alarm condition") during the pulse code modulation transmission. If one of the spans is operating as a backup span, the span monitor 70 provides circuitry for performing the necessary switching of the backup span in place of a faulty span under the control of messages from the digital satellite interface. It also responds to the incoming signals for generating the basic clock waveforms that are required for the operation of the unit.

The span monitor 70 also connects to a transmitter/receiver circuit 71. The transmitter portion receives digital voice data signals in pulse code modulated form from a line channel interchange 72 together with an identification of the span channel that is to carry that information and inserts the data signals into the bit stream being transmitted onto the span at the apropriate channel time. The transmitter also injects the proper framing for synchronizing signals such as shown in FIG. 3. Moreover, the transmitter derives functions necessary for data buffers 73, so that circuitry can insert the "A"0 signalling bits during frame number 6 of each superframe.

The receiver portion of each circuit 71 receives information from the span 15, converts it into a form that is compatible with the remainder of the circuit, and derives a clocking signal. Necessary timing functions are provided so that the B signalling bits can be extracted. The receiver utilizes the identification of the channel from the line channel interchange 72 to route each eight-bit word into an appropriate storge location. The receiver can also generate a frame alarm any time it does not detect the correct synchronizing pattern.

The transmit/receive buffer 73 monitors the hook status information from line circuit controls 74A and 74B and extracts information from incoming messages to be utilized by a satellite control 75. In addition, the buffer 73 responds to polling operations by inserting bits into a data stream at the correct time to indicate a need to communicate with the call processor, as described later.

The line channel interchange 72 controls the transfer of voice data signals between multiplexing and demultiplexing circuits 76 and the transmit/receive buffer 73 and transmitter/receiver 71. The line channel interchange 72 also provides the necessary timing to ensure that the correspondence between a channel and a line is maintained.

The line level multiplexer/demultiplexer circuit 76 gathers data representing voice data received in digital form from several CODEC circuits 77 associated with a group of line circuits 78. In a particular embodiment, this circuit contains one or more circuits that connect to 48 line circuits 78. The circuits 76 arrange this data into an 8-bit wide format which may then be interrogated by the line channel interchange 72 through appropriate addressing techniques. Similarly, the demultiplexing circuitry in each line level multiplexer/demultiplexer circuit converts signals received from the line channel interchange 72 into a format appropriate for transfer into the corresponding CODEC circuit 77 where the information is converted into analog form for transmission to a remote subscriber through an appropriate line circuit 78. The CODEC circuits 77 and line circuits 78 operate as discussed in U.S. patent application Ser. No. 924,883.

Messages from the digital satellite interface 14 are routed from the buffer 73 to the satellite control 75. The satellite control 75 decodes these messages and sends appropriate signals, that pertain to remote channel assignment messages, to the line circuit controls 74A and 74B. It also sends remote line channel assignments and line disconnect messages to the line channel interchange 72 and decodes information to be sent to a maintenance and administration circuit 79. These messages are encoded in the "B" signalling bits.

The line circuit control circuits 74A and 74B perform a number of functions. They process all originating requests; that is, when a subscriber takes his telephone off-hook, a corresponding line circuit control circuit 74 responds. Each line circuit control circuit 74 assigns channels on the span and disconnects lines as directed by the digital satellite interface 14. The circuits 74 also control party identification processing and encode ORIGINATE messages with the proper party information. They process all terminating traffic, control ring trip, supply hook status information to the digital satellite interface 14 by properly encoding the "A" signalling bits, and perform a number of other functions. In one specific embodiment, each line circuit control circuit 74 can accommodate up to 120 line circuits.

Each line circuit control circuit 74 is coupled to the line circuits 78 through a line circuit clock distribution buffer circuit 80. This circuit sequences and buffers data between the line circuit control 74 and the line circuits 78.

As will now be apparent, each of the call processors 408, the digital satellite interfaces 14, and the remote digital satellite units 13 have the capability of performing a number of functions independently and then communicating various items of information. This information is communicated by messages that are conveyed between the digital satellite interface 14 and the remote digital satellite unit 13 over the spans 15. It will now be helpful to discuss the content of these messages and the general sequence of operations in each of the units.

The digital satellite interface 14 operates by polling all the remote digital satellite units 13 connected to it by sending polling information during each of the "B" signalling times. As is apparent from the prior discussion and inspection of FIGS. 3, 16, and 17, each message comprises 24 bits. Referring to FIG. 16, a POLL message comprises 24 bits arranged in 4-bit groups that are represented in hexadecimal notation. The POLLING message has a code byte "1" followed by ten 1's and ten 0's, hence the hexadecimal sequence "FFC00". The entire POLL message (i.e., "1FFC00") is sent serially through each remote digital satellite unit 13 and is returned as a POLL RESPONSE message shown in FIG. 17 during the same frame. There is a positional correspondence between each of the ten bits and each of the digital satellite units 13. If a particular digital satellite unit 13 wishes to communicate with the digital satellite interface 14, it reverses the bits in the corresponding positions in the POLL message. For example, if a third digital satellite unit 13 (e.g., at location C in FIG. 1) desires service, the poll response will be "1DFC80".

An analogous TEST POLL message and corresponding TEST POLL RESPONSE message are shown in FIGS. 16 and 17 and identified by a code "5". The sequence of bits following the code in the TEST POLL message is the same as in the POLL message; that is, the TEST POLL message is "5FFC00". During a test poll, however, each remote digital satellite unit 13 alters its corresponding bit, whether service is requested or not. If any remote unit is connected, then the TEST POLL RESPONSE message should be "5003FF". Other messages will be discussed as this invention is described.

Figures 18, 18A:
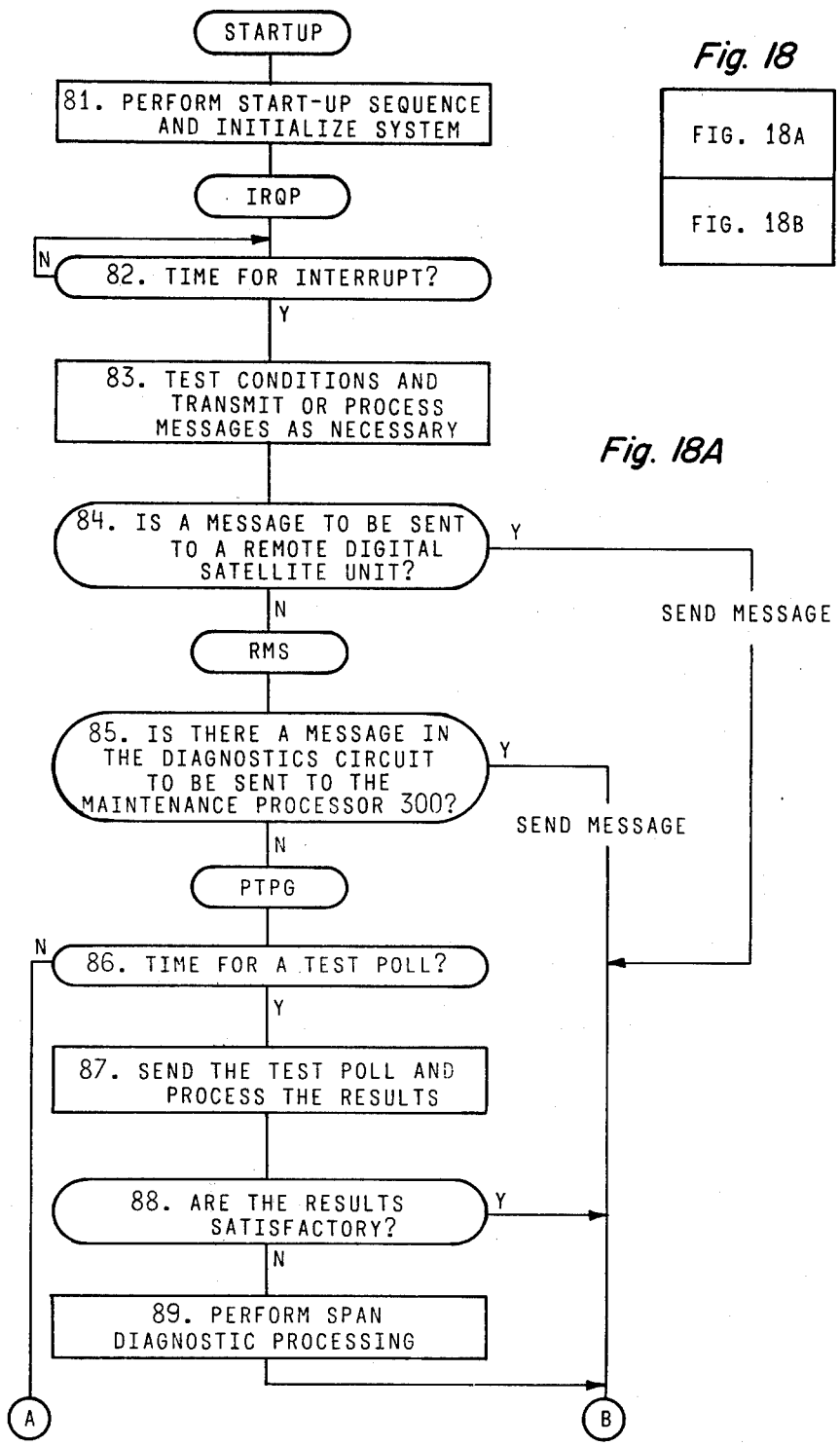
FIG. 18 together with FIGS. 18A and 18B constitute a flow chart that depicts a control program utilized in the digital satellite interface.

A further discussion of FIG. 18 will enable a better understanding of the operation of the digital satellite interface 14 during the transmission and reception of the POLL and POLL RESPONSE messages. When the system is energized, a start-up sequence is executed and the system is initialized (step 81). During a first step 82 in sequence "IRQP", the processor 27 awaits the completion of a predetermined interval that corresponds to an interruption rate. The use of "IRQP" and other mnemonics in ellipses throughout the figures constitute identification points and will help in coordinating the flow of operations that are described in this particular figure and other more detailed figures.

Figure 18B:
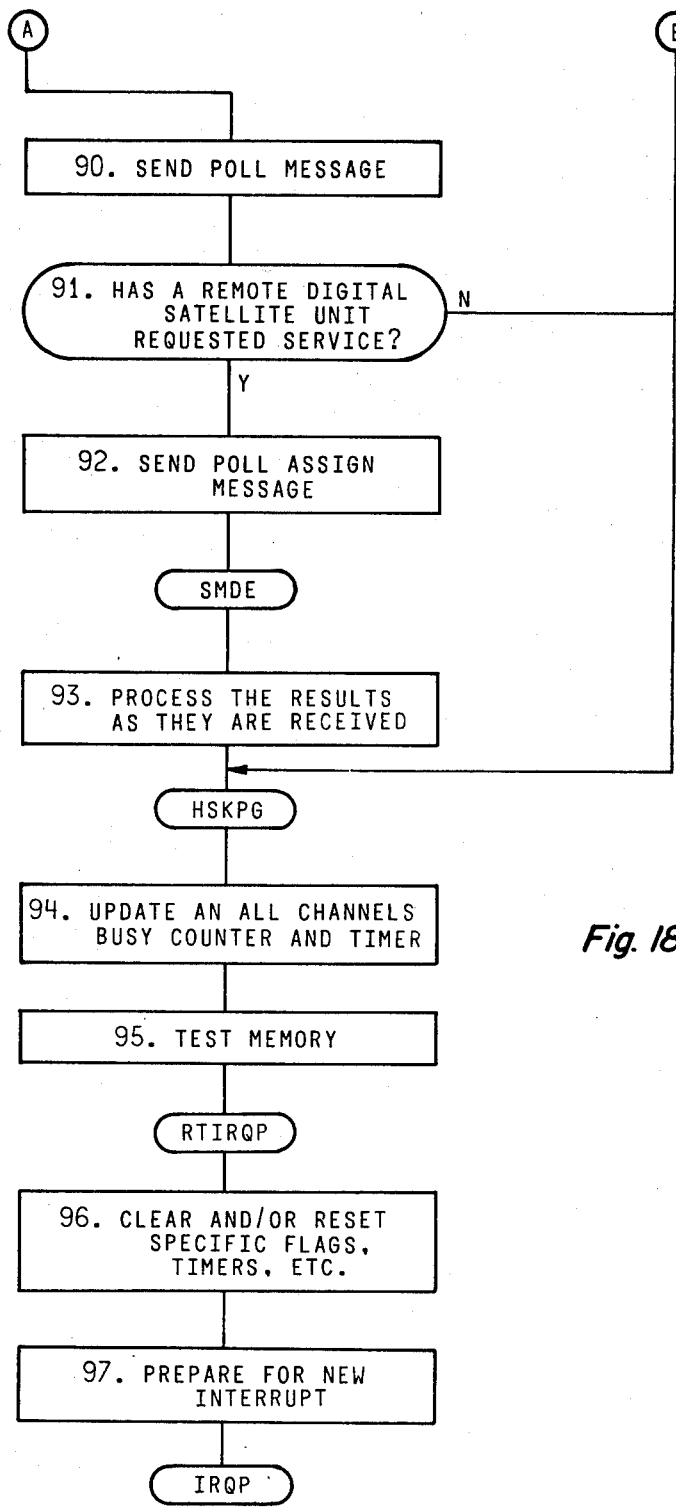

Each time an interruption occurs, step 82 branches to step 83, whereupon the processor 27 tests various conditions, described later, and, in response to those conditions, transmits or processes messages (step 84). If a message is to be sent, step 84 branches to an "HSKPG" sequence, shown in FIG. 18B. Otherwise, control transfers to step 85 in an "RMS" sequence, wherein the processor 27 determines whether a transfer is to occur to the maintenance processor 300. If such a transfer is to occur, step 54 branches to the "HSKPG" sequence in FIG. 18B.

When a test poll should occur, the polling sequence "PTPG" begins at step 86. The TEST POLL message "5FFC00" is sent in step 87 and the TEST POLL RESPONSE, which should be "5003FF", is tested in step 88. If satisfactory results are obtained, the polling sequence is complete and control passes to the "HSKPG" sequence. Otherwise, certain diagnostic processing is performed in step 89 before control passes to the "HSKPG" sequence.

If it is time for polling but not a test poll (step 86), control passes from step 86 in FIG. 18A to step 90, whereupon the digital satellite interface 14 transfers the POLL message ("1FFC00") shown in FIG. 16. The POLL RESPONSE message shown in FIG. 17 is then tested in step 91 and, if no digital satellite unit 13 has requested service, operations transfer to the "HSKPG" sequence.

It is possible that multiple requests for service may exist in a POLL RESPONSE message. The control programs in the digital satellite unit 13 arbitrate any such multiple, simultaneous contention and determine which of multiple remote digital satellite units 13 requesting service will be accepted. Each remote digital satellite unit 13 has a number assigned to it and this number is called a remote group number. Thus, when any contention has been resolved, the digital satellite interface 14 sends a POLL ASSIGNED message (FIG. 16) with a first byte of "7" in step 92. The next byte is the remote group number that identifies one of the possible remote digital satellite units 13; the remaining bytes are all zeroes. Only the designated remote digital satellite unit will respond to the POLL ASSIGNED message.

The digital satellite unit 13 processes a returned message and transfers the message to the digital satellite interface 14 during the next twelfth frame time of the next superframe. More specifically, if the POLL ASSIGN message in FIG. 16 is successfully processed, the remote digital satellite unit 13 transmits an OK message Ex0000, where "x" is "1" if the transmission will be over span 0 and "2" if the transmission will be over span 1, represented by the setting of S0 and S1 bits in a second byte in the OK message shown in FIG. 17. Then that message is processed in step 93.

After step 93, or in response to other branches depicted in FIG. 18A, the "HSKPG" sequence begins, whereupon an ALL CHANNELS BUSY counter and timer are updated in step 94 and the memory 28 is tested in step 95. Various flags and timers are cleared or set to specific values in step 96 and then the system prepares for a new interrupt in step 97. When this has been completed, control passes back to step 82 and the "IRQP" sequence shown in FIG. 18A.

E. Basic Call Processing

It now will be helpful to indicate a typical operation of a telephone switching system in response to telephone calls that originate on one of the remote subscriber lines 12 and also that terminate at one of the remote subscriber lines 12. First, assume that one subscriber, a calling subscriber, in the telephone network is calling another subscriber, a called subscriber. The calling subscriber's line 11 is the "CALLING" or "'ING" line, while the called subscriber's line is the "CALLED" or "'ED" line.

The digital central switch includes in its memory information that identifies every telephone number and whether that number corresponds to a local line 11 or one of the remote lines 12. For a remote line 12, the memory contains a satellite line number (SLN) that uniquely identifies each remote line 12.

When a remote line 12 is the "'ED" line, the call processor sends a 5-byte TERMINATE message, shown in FIG. 9. This message identifies the satellite line number for the "'ED" line, and the port number of the CALLING line. It also contains other information that is useful in completing the call. If the message is properly received, the digital satellite interface tests a GST signal in the TERMINATE message that indicates a ground start. If the bit is set, the digital satellite interface 14 sends a ground start message, specifically a unique DSI STATUS message "90" to the call processor 408.

Otherwise the interface 14 processes the TERMINATE message and sends a CONNECT message that is shown in FIG. 10. This message has a command value "2" and includes six bytes. The second byte contains the 'ED SLN and the third byte contains an assigned channel number which identifies the time slot on the span 0 or span 1 equipment that will be used. This assignment is made by the digital satellite interface 14. The fourth and fifth bytes contain the DCO's 'ING port number that was sent to the DSI in the TERMINATE message. If the digital central office 10 in FIGS. 1 and 2 establishes a path, a RING LINE message, shown in FIG. 9, is sent. The RING LINE message identifies the 'ED SLN and includes ringing control and ringing type bytes. The ringing control byte identifies the calling and called frequencies and the ringing type bytes identify whether normal, emergency, rering, revertive, or cease ring operations are to occur.

When this sequence is complete, the digital satellite interface 14 sends a TERMINATE message to the remote digital satellite unit 13. This message is shown in FIG. 16, with a code of "8". It includes the ring code received from the RING LINE message in FIG. 9, the satellite line number (SLN), the assigned channel number, and the span number. When this message has been sent, a MESSAGE COMPLETE message "71" in FIG. 10 is transmitted by the digital satellite interface 14 back to the call processor 408.

At this point, the 'ED line, or called line 12, rings. When the subscriber answers the phone, the remote digital satellite unit 13 senses the OFF-HOOK signal and stops the ringing. Moreover, at this time the "A"

signalling bits shift to an off-hook value, so the digital central office can connect the calling line to the assigned channel on the span through a corresponding time slot in the port group highway, whereupon the call proceeds.

When a calling subscriber takes a line off-hook, the corresponding remote digital satellite unit 14 requests service. When a POLL ASSIGNED message for that digital satellite unit is received, the response is not the OK message shown in FIG. 17. Rather, an ORIGINATE message, having a code "2", is sent that also identifies the satellite line number. It also includes a disconnect (DS) bit, a send try fail (SF), a party update (PU), and party identification (PI) bits. In response, the digital satellite interface 14 determines whether the line load controls are properly operating. If not, the digital satellite interface 14 sends a LINE CONTROL message shown in FIG. 16 with a disconnect (DS) bit set. If the line load control is operating properly, the digital satellite interface 14 then determines whether all available channels on the span are busy. If they are, the satellite line number (SLN) is loaded into an all channels busy queue and will be eventually transferred out of the queue as the channels become free.

Once a channel is available and selected by the digital satellite interface 14, it sends an ORIGINATE RESPONSE message with a code "8" shown in FIG. 16 back to the remote digital satellite unit 13. This message includes the satellite line number, the span number, and the channel number. The digital satellite unit interface 14 also sends an ORIGINATE message (FIG. 10) having a first byte "05" to the call processor 408. This message includes the 'ING SLN, the assigned channel number, an all channels busy delay count, and the PARTY ID. If an automatic test is being performed, then operations divert to an autotest sequence. Otherwise, the digital central office will attempt to establish a path for a dial tone.

When the remote subscriber receives the dial tone, the subscriber will begin to dial and transmit dial digits. These digits are encoded in the "A" signalling bits that are transferred over the port group highway in the "A" bit of the corresponding channel. Then the digital central office will complete the call processing by transferring the call to the 'ED line. If the satellite line number requires some answer supervision, the digital central office will send a LINE CONTROL message shown in FIG. 9, having a first byte value "23" with the satellite line number and other information. Otherwise, the process completes and the call proceeds.

When a remote subscriber line 12 is either the originating or the terminating line, the completion of a telephone call requires that the remote subscriber line be disconnected from the call processor. Under normal call processing, the call processor ascertains whether a given telephone line has become idle. When that decision is made and the line involved is a remote subscriber line 12, the digital central office sends a DISCONNECT message, shown in FIG. 9, with a first byte "12" and the satellite line number to the digital satellite interface 14. Although the DISCONNECT message shown in FIG. 9 is sent in this particular instance, lines can also be disconnected by the CHANNEL DISCONNECT and LINE CONTROL messages. However, with a normal DISCONNECT message the digital satellite interface receives that message and determines whether the channel assignment has been sent to the remote digital satellite unit 13. If it has not been sent, the digital satellite interface 14 transmits a LINE CONTROL message (code equal to "9") with the disconnect (DS) bit set. If the channel assignment has been sent, then the digital satellite interface 14 sends a LINE CONTROL message with a remote line control disconnect (RD) set and a single party line (SP) bit set or cleared. If the channel assignment has been sent to the remote digital satellite unit 13, the LINE CONTROL message is sent with the disconnect (DS) bit set and the single party line bit either set or cleared.

Assuming that the remote digital satellite unit receives the DISCONNECT message, as indicated by the receipt of an OK message, the digital satellite interface 14 then sends a CHANNEL DISCONNECT signal to the call processor. This message, shown in FIG. 10, identifies the satellite line number and the assigned channel number. In addition, the digital satellite interface makes the channel available for subsequent calls. If the satellite line number is on-hook, subsequent processing by the digital satellite interface 14 terminates. However, if the remote subscriber is still off-hook the remote digital satellite unit 13 sends a special ORIGINATE message with the disconnect (DS) bit set to operate as a DISCONNECT message. Then the digital satellite interface 14 sends a RELEASE message, shown in FIG. 10, to the call processor and the call processor updates its control information by indicating that that satellite line number is now idle. This completes the disconnection procedure.

F. Maintenance Processor—Digital Satellite Interface Path

The communications path between the digital central office 10 and digital satellite interface 14 shown in FIG. 4 for maintenance purposes includes the MBI buffer 18 that connects to the maintenance processor (MP) 300, the diagnostic circuit 30 that interconnects the MBI buffer 18 and the busing structure 26. The MBI buffer 18 is shown in block diagram in FIG. 18. Like the call processor bus interface (CPI) 17, the MBI buffer 18 provides a buffered interface between the maintenance processor 300 and the digital satellite interface 14. This path transfers diagnostic information between the digital satellite interface 14 and the maintenance processor 300 and also loads programs into the memory 28 in FIG. 4 from the maintenance processor 300. Each MBI buffer 18 can connect to 30 digital satellite interfaces 14. However, like the call processor bus interface buffer 17, the circuitry is essentially transparent in operation.

Figure 19:
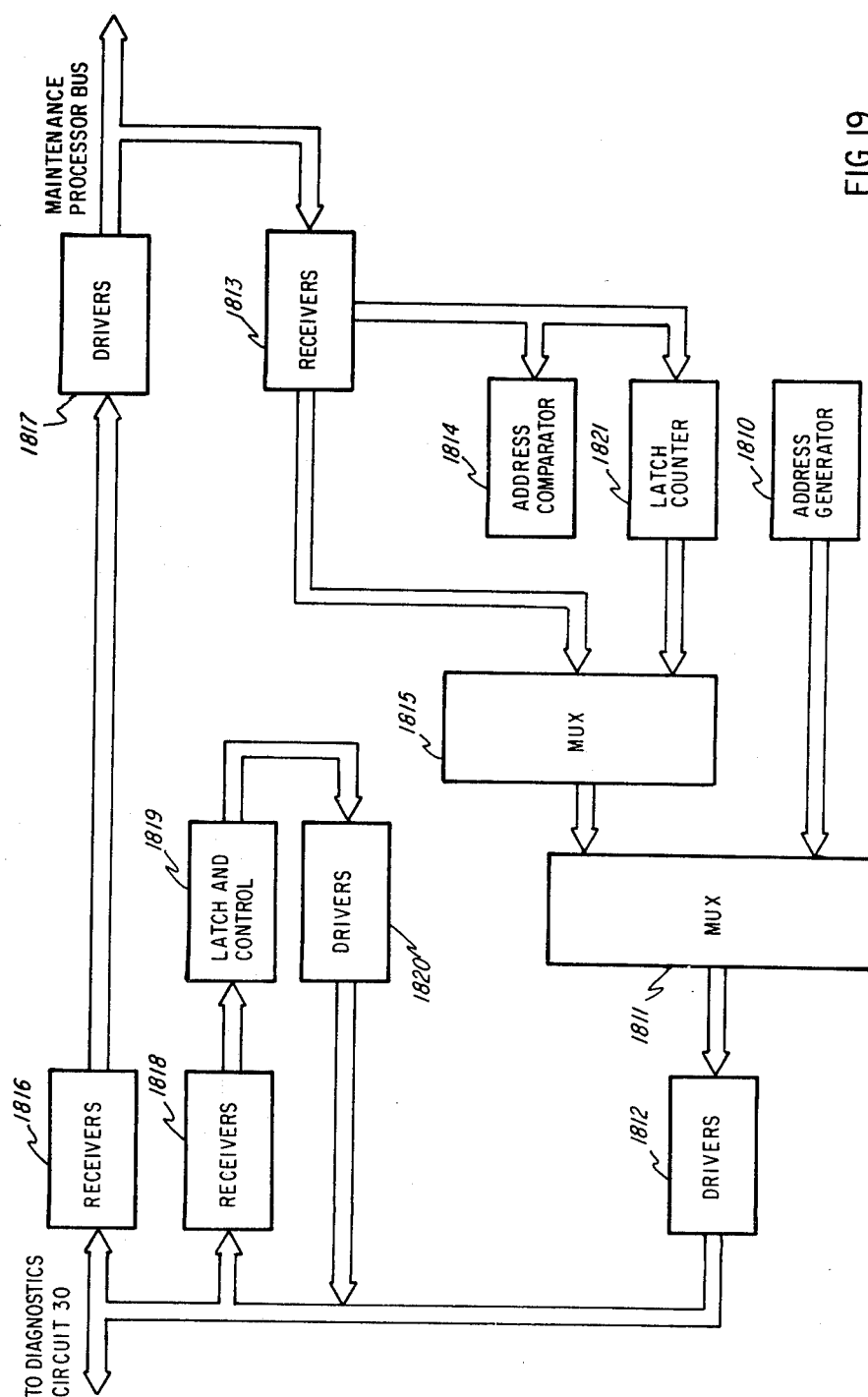
FIG. 19 is a block diagram of a maintenance interface buffer shown in FIG. 4.

The MBI buffer 18 has two modes of operation. When the MBI buffer 18 is not in use, polling occurs. In FIG. 19, an address generator 1810 produces addresses that identify a diagnostic circuit 30 in each digital satellite interface in succession. A multiplexer 1811 is enabled in this polling mode to couple the signals from the address generator 18 through drivers 1812 to the diagnostics circuit 30. If the corresponding digital satellite interface desires to transmit a message to the maintenance processor 300, it will respond with a flag signal that is detected to disable the address generator 1810 until the interruption has been serviced.

When the maintenance processor 300 wishes to send information to the diagnostics circuit 30, it transmits signals that first are passed through receivers 1813, multiplexer 1814, multiplexer 1811, and drivers 1812 to the diagnostics circuit 30.

If the digital satellite interface 14 wishes to transmit a message to the maintenance processor, it energizes receivers 1816 and drivers 1817, so the message normally passes directly through to the maintenance processor 300. However, if the MBI buffer 18 is conducting a polling operation when the digital satellite interface 14 attempts to access the maintenance processor 300, receivers 1818 couple the information into a latch and control circuit 1819 that retains the information until the poll has been completed, whereupon polling will be terminated and drivers 1820 will transfer the information back through the receivers 1816 and the drivers 1817.

Figure 20:
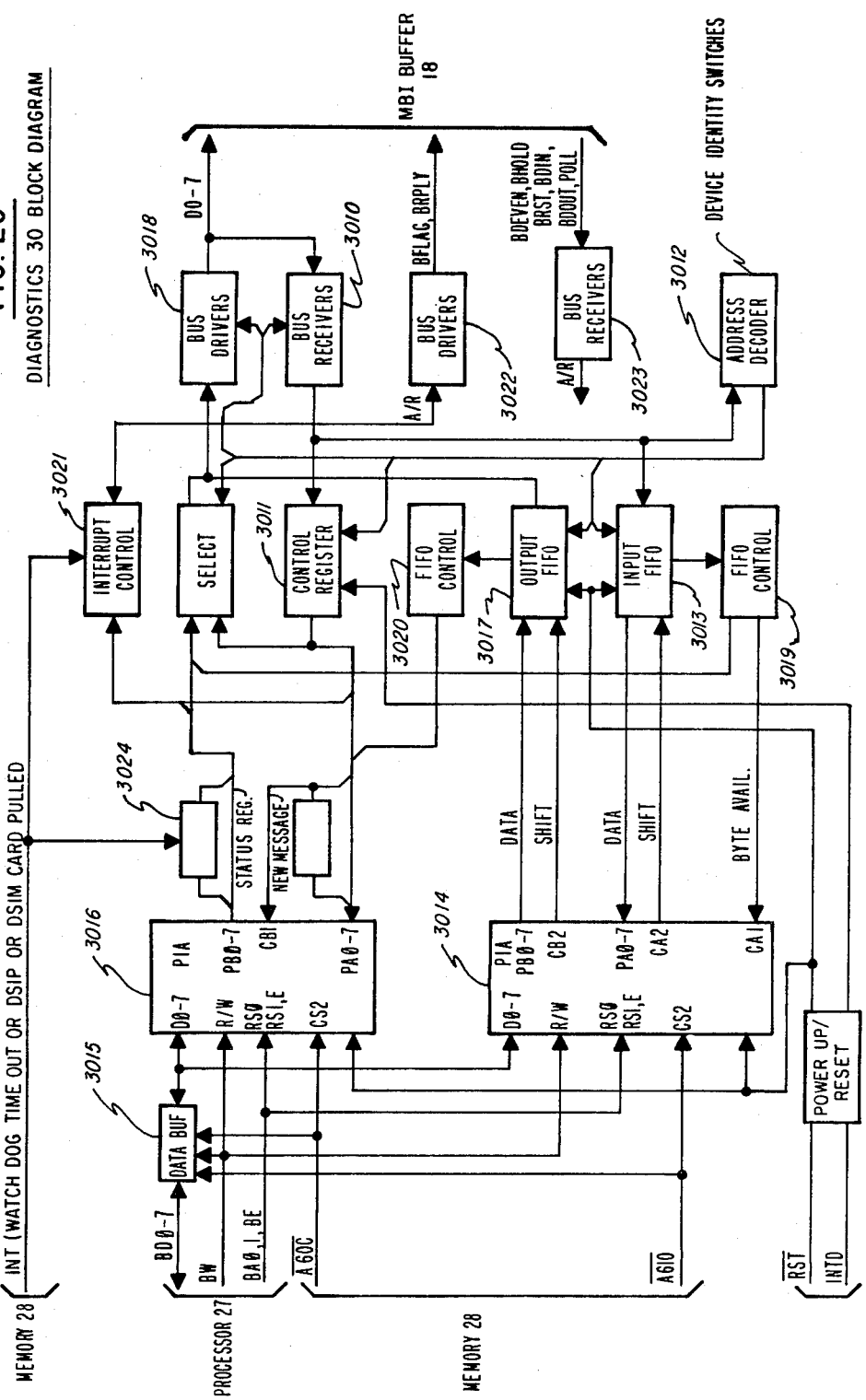
FIG. 20 is a block diagram of a diagnostics circuit shown in FIG. 4.

Now referring to FIG. 20, messages to the digital satellite interface 14 from the maintenance processor 300 pass through receivers 3010 in the diagnostics circuit 30 to a control register 3011, an address decoder 3012, and an input FIFO 3013. The address decoder 3012 decodes the address; if it corresponds to its digital satellite interface (DSI) address, subsequent messages transfer into the input FIFO 3013 for transfer through a programmable interface adapter 3014 to the memory 28 in FIG. 4. When the processor 27 wishes to transmit a message to the maintenance processor 300, it passes the data through a data buffer 3015 and the programmable interface adapter 3014 into an output FIFO 3017. The output message can then be transferred through bus drivers 3018 to the maintenance buffer interface 18.

The input and output FIFO's 3013 and 3017 operate in response to signals from FIFO control units 3019 and 3020, respectively. Diagnostics circuit 30 initiates the operation through an interrupt control circuit 3021 that produces control signals through bus drivers 3022. Various control signals from the maintenance bus interface buffer 18 are received by receivers 2023. A programmable interface adapter 3016 interfaces the control portion of the diagnostics circuit 30 and the processor 27.

The diagnostics circuit 30 performs several functions and operates under several modes. It can transfer messages from the processor 27 through the maintenance processor 30 and transfer messages from the maintenance processor 30 back to the processor 27. It indicates to the processor 27 or the processor 300 when an incoming message is available for the respective processor or when an output message can be sent from the respective processor. Moreover, the diagnostics circuit 30 signals the maintenance processor 300 if any emergency or nonemergency alarm conditions exist, if there is a request to transfer programs to the memory 28, specifically the program RAM 2811 and working RAM 2812 in FIG. 8, or when either the processor 27 or the memory 28 has been unplugged. When the maintenance processor begins to transfer information to the memory 28, the diagnostics circuit 30 signals the processor 27. It also signals the processor 27 to perform loopback testing and some error testing. Finally, the diagnostics circuit 30 interrupts the maintenance processor 300 and provides an interrupt mask.

Figure 21A:
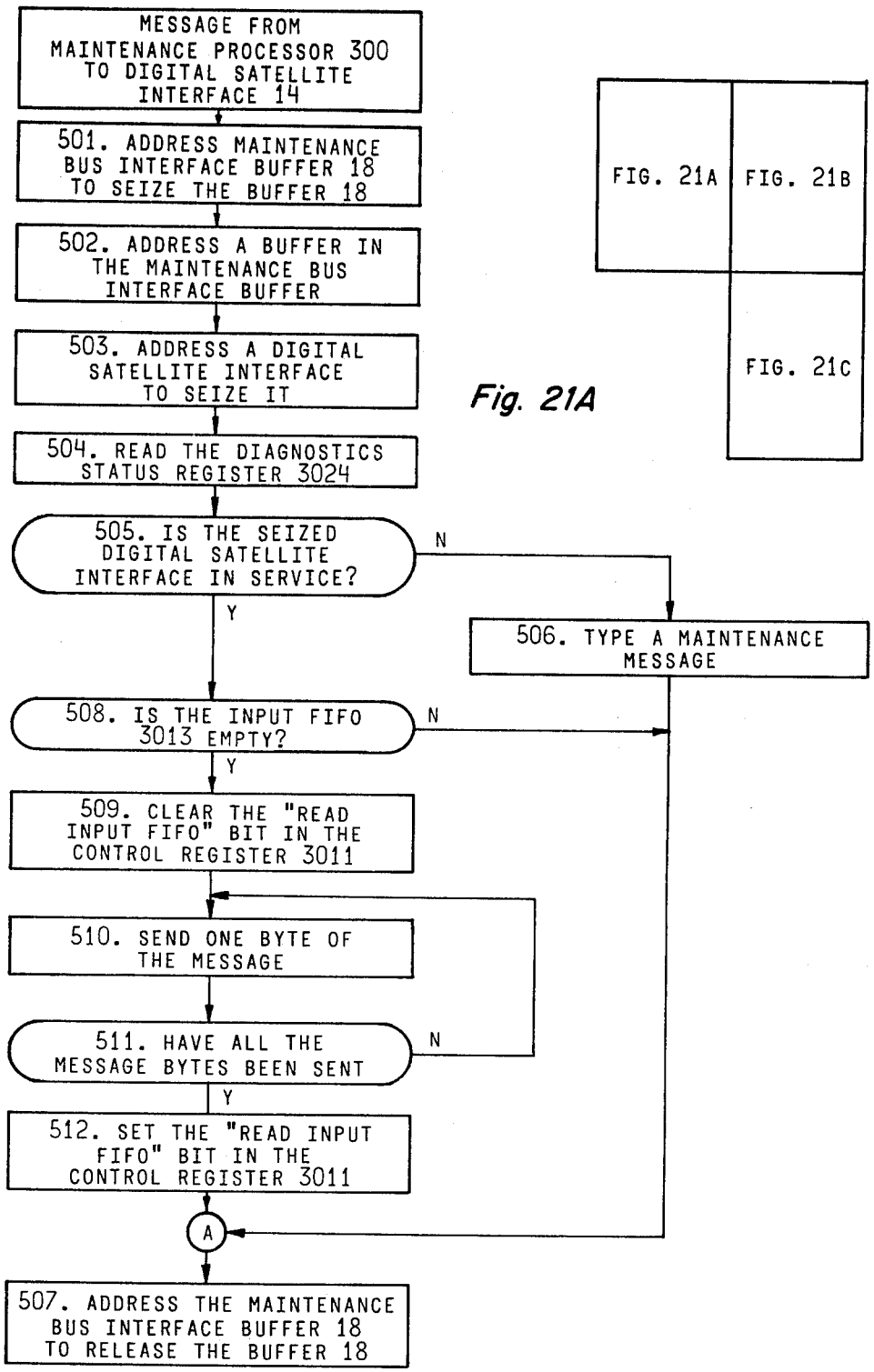
FIG. 21, together with FIGS. 21A, 21B, and 21C, constitute a flow diagram that depicts the operations in a maintenance processor and digital satellite interface during an interchange of messages therebetween.

The message transfer function is important to this invention and can best be understood by referring to FIG. 21 taken in conjunction with FIGS. 19 and 20. Referring first to FIG. 21A, a message is sent from the maintenance processor 300 to the digital satellite interface 14 by seizing the MBI buffer 18 and then seizing an appropriate diagnostics circuit 30 in one of the digital satellite interface units connected to the MBI buffer 18. This is accomplished in FIG. 21A by addressing the MBI buffer 18 in step 501, thereby to seize the MBI buffer 18. This is accomplished when the address comparator 1814 in FIG. 19 decodes an address in the receivers 1813 corresponding to the MBI buffer 18. Buffer 18 then enables the receivers to couple subsequent signals through the multiplexer 1815, the multiplexer 1811, and the drivers 1812 to the diagnostics circuit 30. Next, in step 502, the maintenance processor 300 addresses a fictitious location in the MBI buffer 18 that corresponds to the receivers 1813. This allows subsequent data to be transferred to the diagnostics circuit 30. Next, the maintenance processor 300 addresses one digital satellite interface in order to seize it (step 503).

Once a particular digital satellite interface 14 is seized, the maintenance processor 300 reads the diagnostics status register 3024 that is shown in FIGS. 20 and 12A. If a DSI OUT OF SERVICE bit is set, step 505 diverts to step 506 and the maintenance processor types a maintenance message. As the message cannot be sent at this time, the flow diverts to step 507, whereupon the maintenance processor 300 again addresses the MBI buffer 18 to release it. Now the polling operation can continue.

Assuming that the seized digital satellite interface 14 is in service, step 505 diverts to step 508 in which maintenance processor 300 tests bit 0 of the status register 3024, i.e., an INPUT FIFO NOT BUSY bit. If the input FIFO 3013 is not busy, step 508 branches to step 509, whereupon the maintenance processor clears a READ INPUT FIFO bit in the diagnostics control register 3011 and then sends a multiple byte message to the digital satellite interface 14 in steps 510 and 511. When all the bytes have been sent, step 511 branches to step 512 so the maintenance processor 300 can set the READ INPUT FIFO bit in the control register 3011 and then release the MBI buffer 18 in step 507.

Figure 21B:
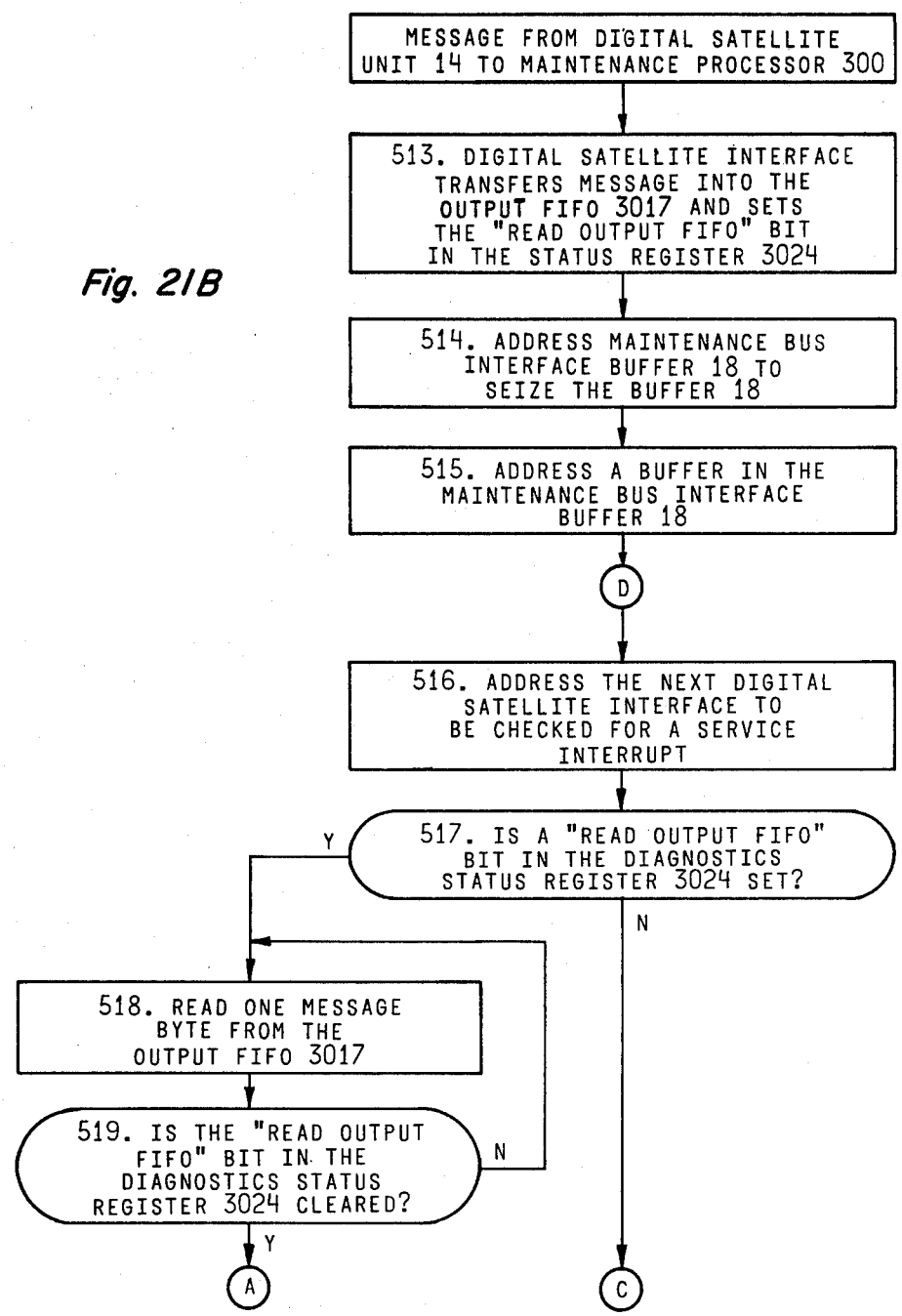

The process for transferring a message from a digital satellite interface 14 to the maintenance processor 300 begins in step 513 in FIG. 21B when a digital satellite interface transfers a message into its output FIFO 3017 in FIG. 20 and sets the READ OUTPUT FIFO bit in the status register 3024, shown in FIGS. 12A and 20. This change in state will cause an interruption of the maintenance processor 300.

In order to service this interruption, the maintenance processor addresses the MBI buffer 18 to seize it in step 514 and then addresses the fictitious location in the step 515 to enable communications with diagnostics circuit 30. These steps correspond to steps 502 and 503. Next, the processor addresses the next digital satellite interface to be checked for a service interrupt in step 516. If a READ OUTPUT FIFO bit in the corresponding diagnostics status register 3024 is set (step 517), one message byte is retrieved from the output FIFO 3017 in step 518. Additional bytes will continue to be retrieved until the maintenance processor 300, in step 509, "sees" that the READ OUTPUT FIFO bit in the diagnostics status register 3024 has been cleared. When this occurs, step 509 branches back to step 507 to release the MBI buffer 18.

Figure 21C:
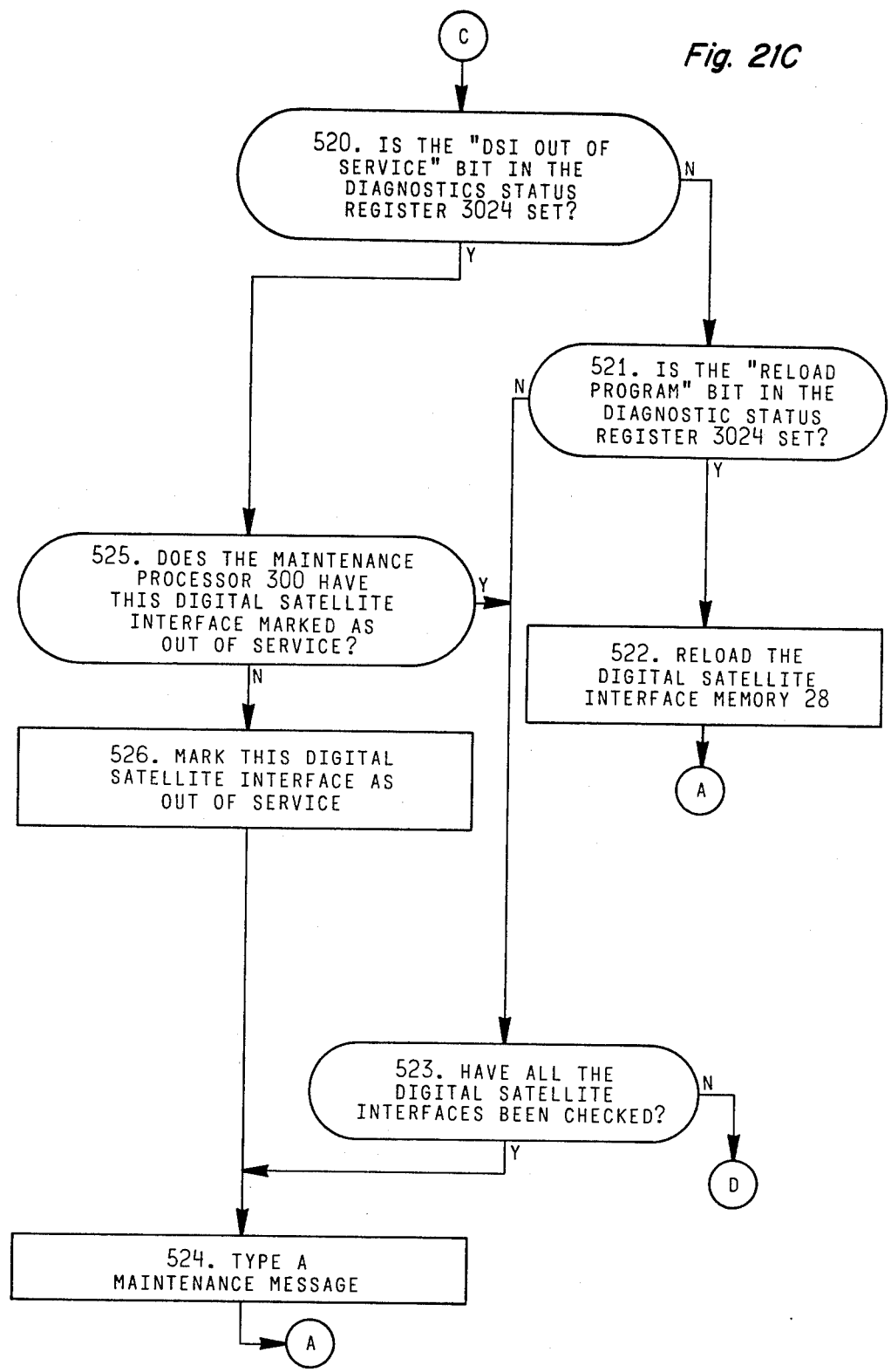

If the READ OUTPUT FIFO bit is not set in step 517, control passes to step 520 in FIG. 21C. The maintenance processor 300 tests a DSI OUT OF SERVICE bit in the diagnostics status register 3024 shown in FIGS. 12A and 20. Assuming that the digital satellite interface is plugged in and in service, step 520 branches to step 521 to reload the program memory 2811 in step 52 if a RELOAD PROGRAMS bit is set and return to step 507 in FIG. 21A. If the RELOAD PROGRAMS bit is not set, the maintenance processor 300 determines whether all the digital satellite interfaces 14 have been checked (step 523). If they have, a maintenance message is typed (step 524) on the teletypewriter 305 in FIG. 2. If they have not, control passes back to step 516 in FIG. 21B.

If the identified digital satellite interface is out of service (step 520, FIG. 21C), then control passes from step 520 to step 525 to enable the maintenance processor 300 to mark the interface 14 out of service in step 526 and type a message in step 524. It marking has already occurred, control passes to step 523.

G. Detailed Construction and Operation

With the foregoing understanding of the overall operation, it will now be possible to describe in detail those circuits that are involved in the transfer of messages between the call processing system and the digital satellite interface, between the digital satellite interface and the communications link, and between the communications link and the port group highways.

1. Call Processor Interface 17

Figure 22:
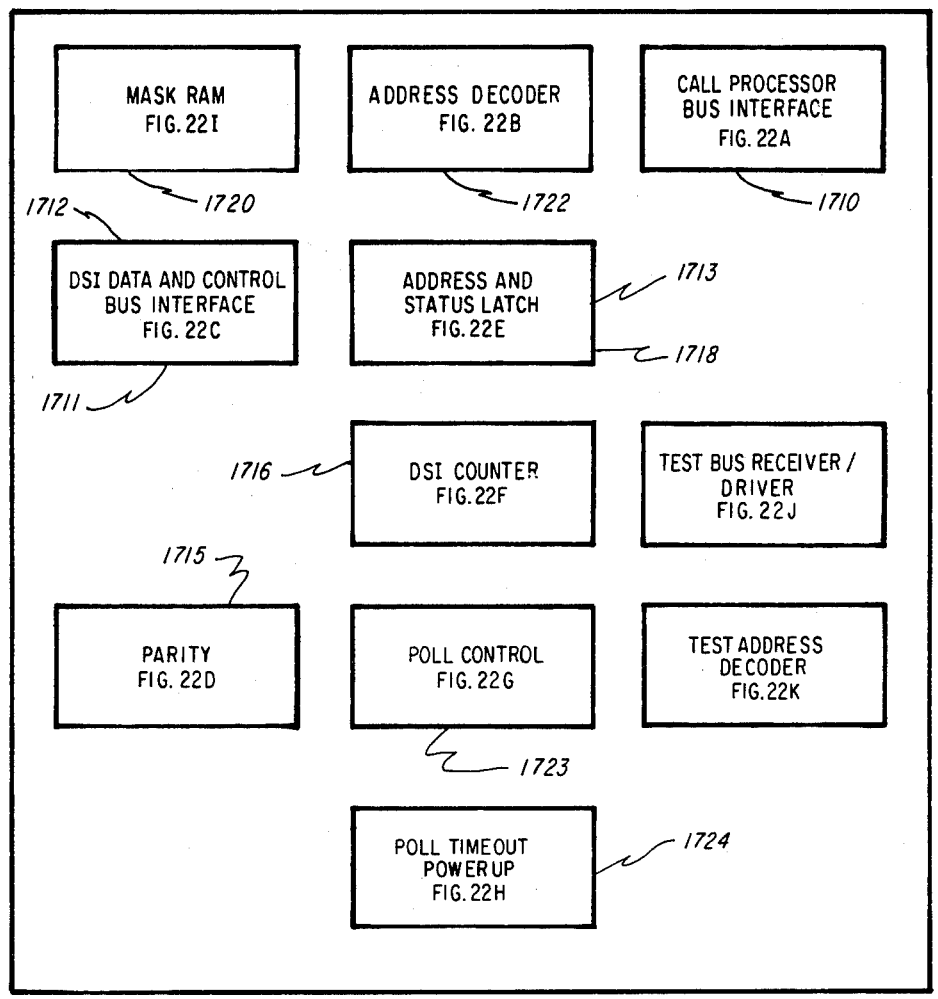
FIG. 22, together with FIGS. 22A through 22K, constitute a detailed logic diagram of the call processor bus interface shown in FIG. 5.

As previously indicated, the call processor interface 17 that is shown in FIGS. 4 and 5 has two modes of operation: a polling mode and a message transfer mode in which messages are transferred between the call processor and the digital satellite interface. FIG. 22 depicts the detailed logic organization of both the data and control paths for one call processor bus interface 17. When power is applied to the telephony network, a power detector 2201 in FIG. 22H and an OR gate 2202 generate a power up reset (PUR) signal. This PUR signal resets a number of elements in the CBI interface 17, including a DEVICE SELECTED flip-flop 2203 in FIG. 22B and a POLL MODE flip-flop 2204 in FIG. 22G.

Figure 22B:
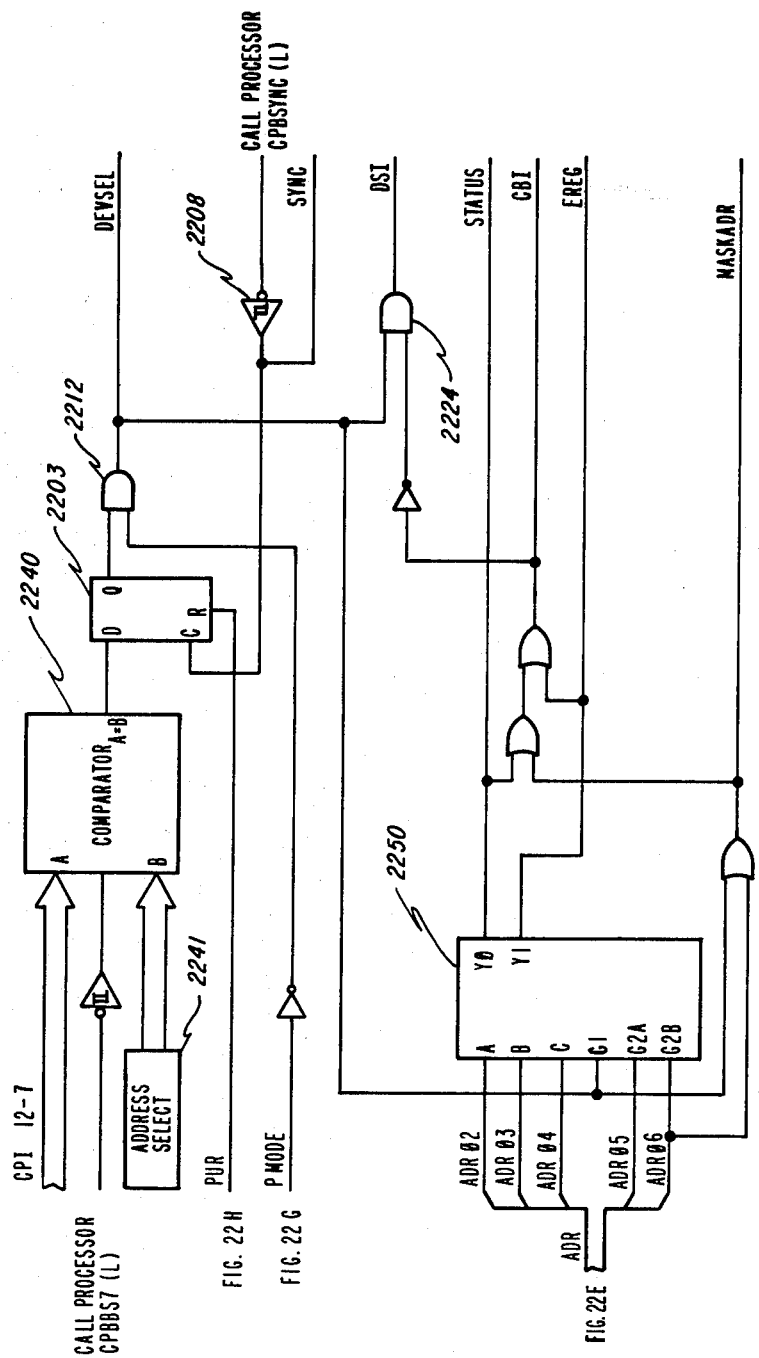
Figure 22D:
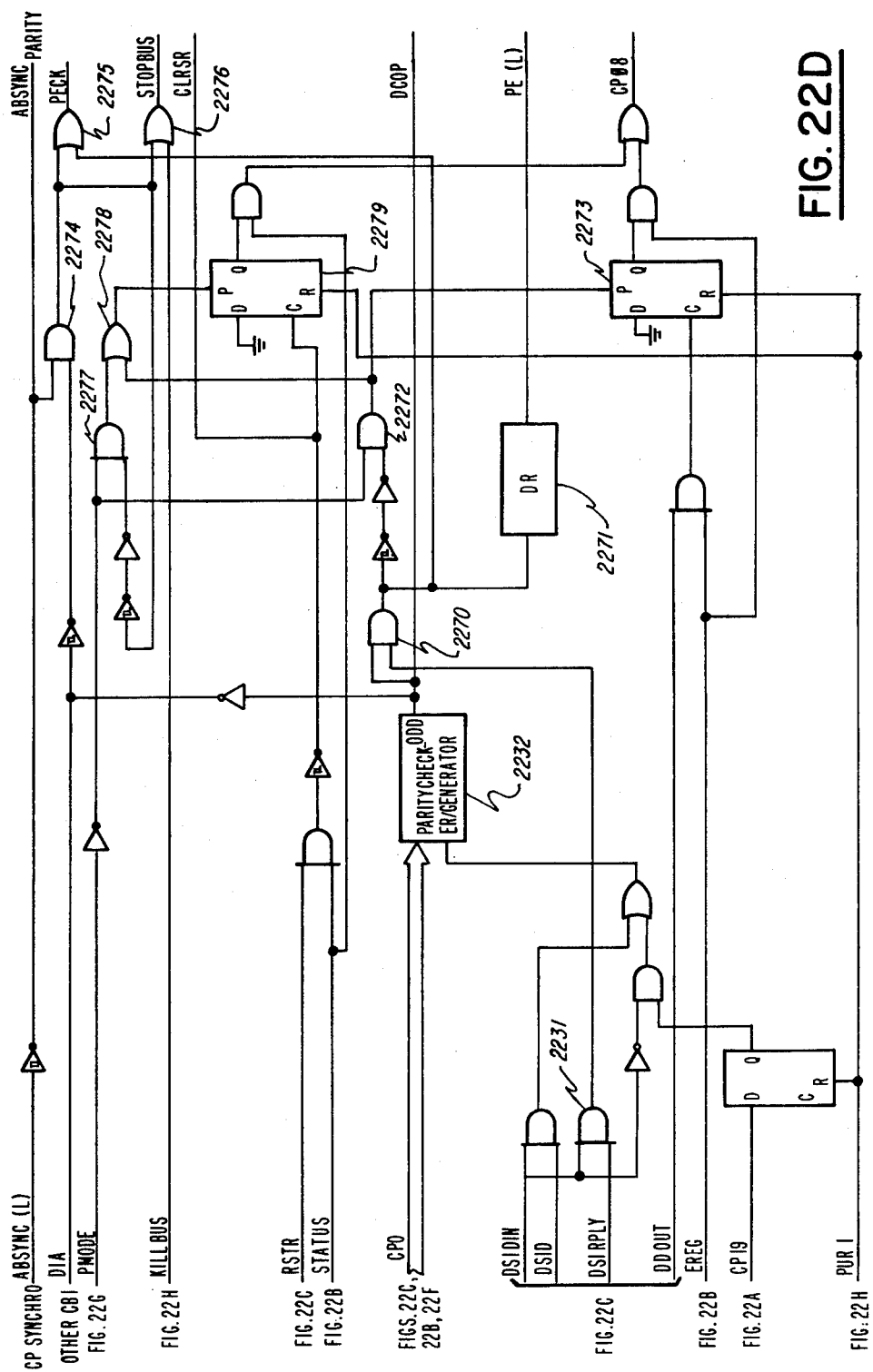
Figure 22E:
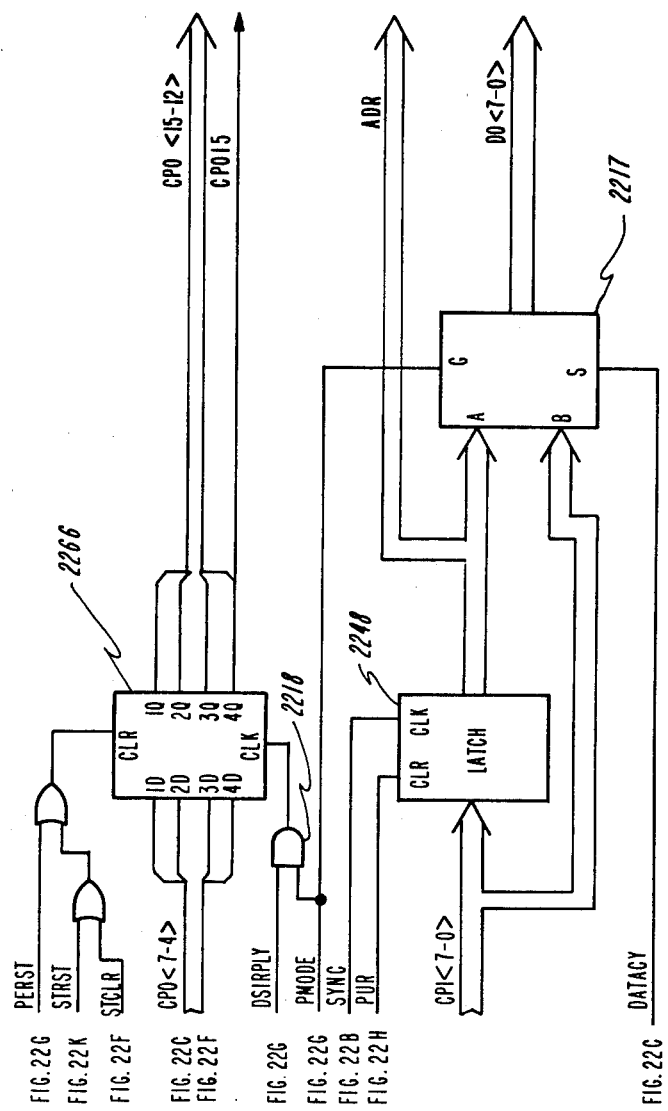
Figure 22F:
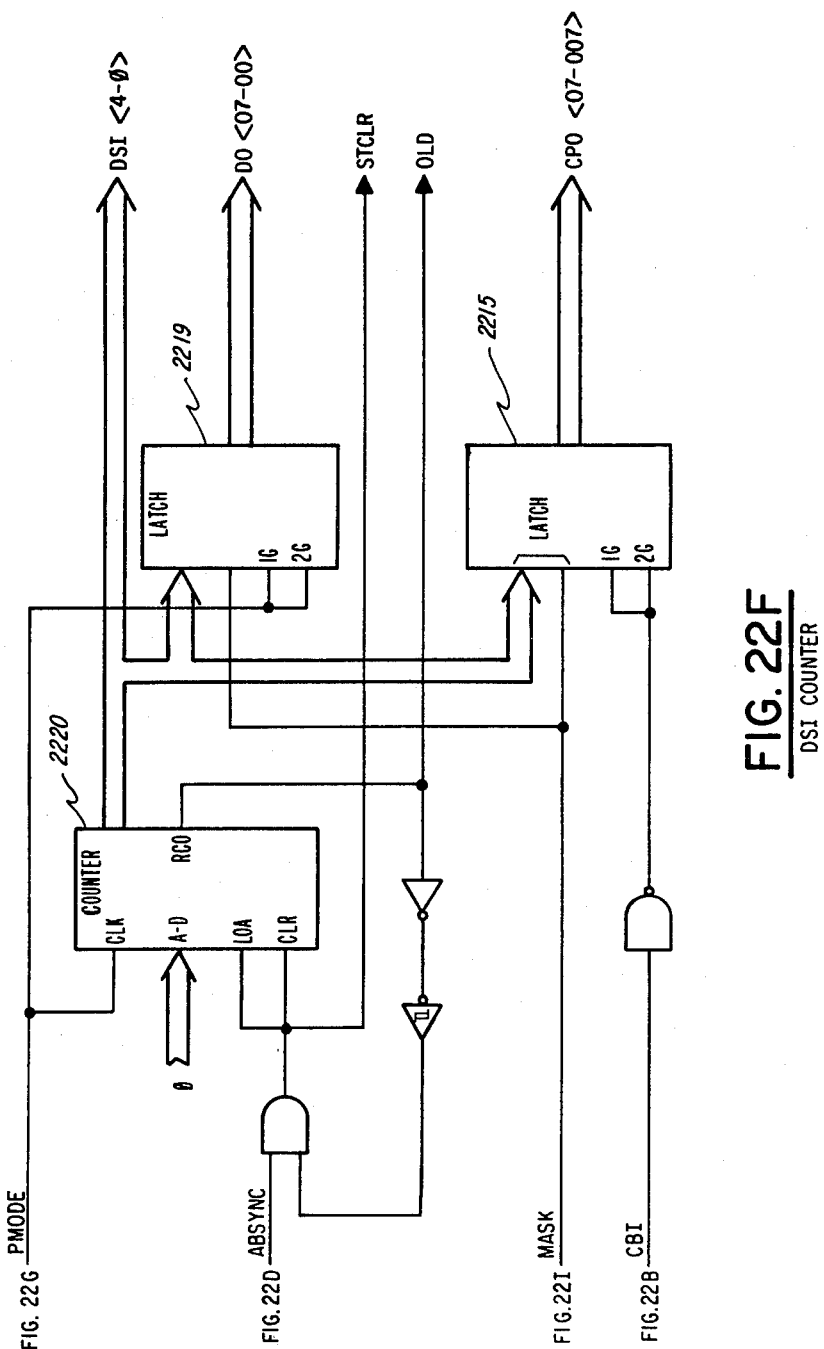
Figure 22G:
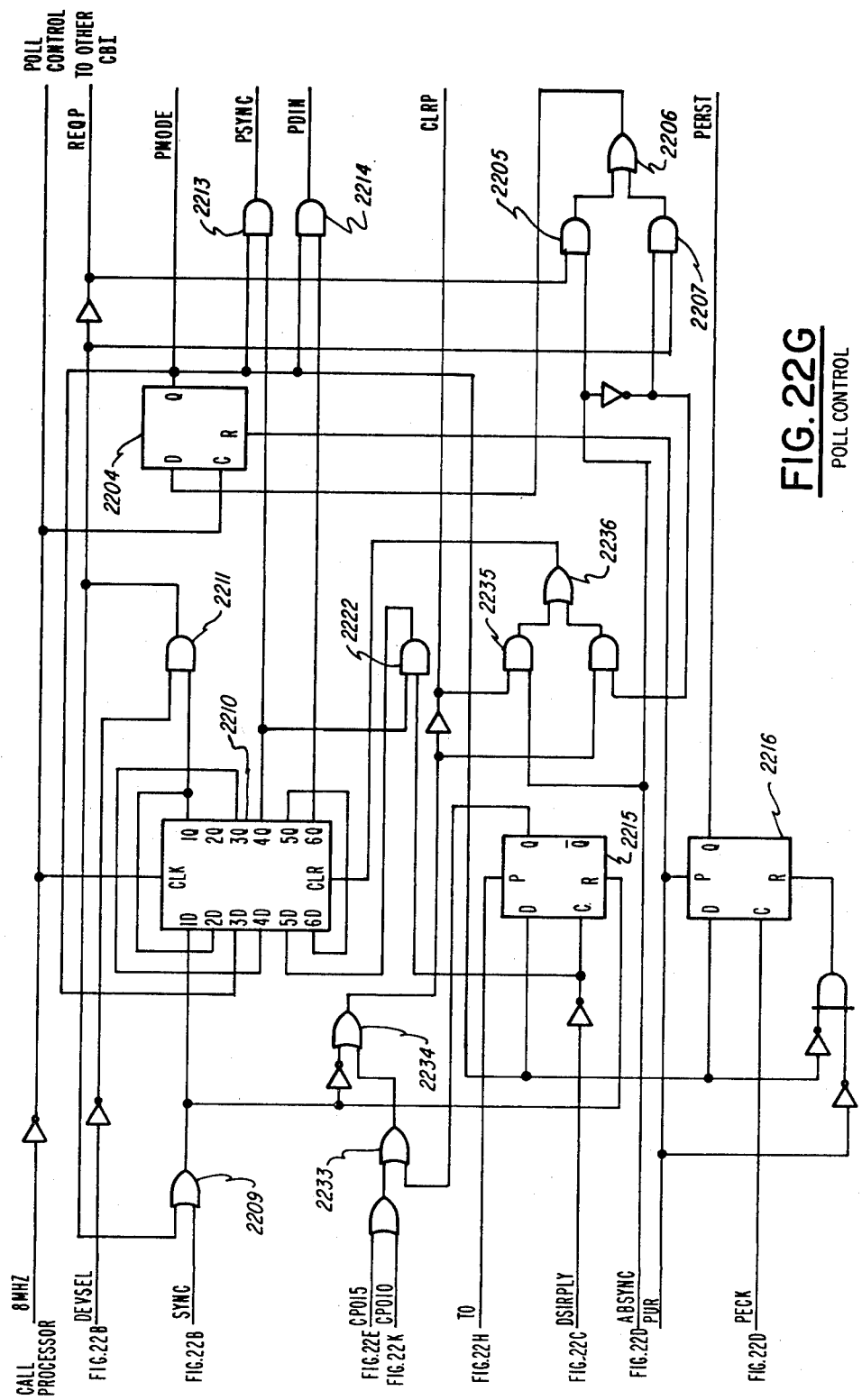

A gating network, comprising an AND gate 2205, an OR gate 2206, and an AND gate 2207 in FIG. 22G, controls transfers between the poll and message modes. When both the call processor systems shown in FIG. 2 are operating in synchronism, an ABSYNC signal, in FIG. 22D, is asserted enabling the AND gate 2205 in FIG. 22G and disabling the AND gate 2207. So long as neither CBI connected to the two call processor systems asserts a request for service (REQP) signal, the AND gate 2205 is energized and conditions the POLL MODE flip-flop 2204 to be set by a 8 MHz clocking signal from the call processor. When this occurs, the POLL MODE flip-flop 2204 sets and asserts the PMODE signal.

If the ABSYNC signal is not asserted, then the shift to the poll mode is produced by a signal from the OR gate 2209. Specifically, a synchronizing (SYNC) signal from the call processor is generated each time the call processor produces a data transfer. This SYNC signal energizes the OR gate 2209 and conditions one stage of a multistage flip-flop 2210 to set in response to the 8 MHz clocking signal. This energizes an AND gate 2211 that is enabled so long as a device select (DEV SEL) signal is not asserted. The signal from the AND gate 2211 latches the first stage of flip-flops 2210 through the OR gate 2209 and energizes the AND gate 2207, thereby enabling the shift to the poll mode.

When the CBI 17 operates in the poll mode, it generates various control signals that emulate or correspond to the signals generated by the call processing system. In this regard, the successive 8 MHz clocking signals to the multiple latch 2210 produce a sequence of timing signals. First, the PMODE signal from the flip-flop 2204 conditions a 3D input so that, after a delay, the 4Q output energizes an AND gate 2213, enabled by the PMODE signal, thereby to produce a PSYNC signal. A successive 8 MHz clocking signal causes the signal from the 6Q output to energize an AND gate 2214, thereby producing a PDIN signal at a time corresponding to the appearance of data signals on the call processor bus. The PMODE signal also conditions a POLL MODE ENDING flip-flop 2215 and a parity ERROR flip-flop 2216 to be set in FIG. 22G. In addition, the PMODE signal conditions a gated multiplexer 2217 in FIG. 22E to produce output signals from one of two servos. In FIG. 22F, the PMODE signal allows a latch 2219 to couple signals and advances a counter 2220 to identify the next digital satellite interface (DSI) to be polled. In FIG. 22H, the PMODE signal clears a TIME-OUT latch 2221.

Referring again to FIG. 22G, when the PSYNC signal is asserted, an AND gate 2222 enables the SD input to the latch 2210. A DSI RPLY signal corresponds to the BUS REPLY signal that signals the completion of a bus cycle on the call processor bus. When the DSI RPLY signal is not asserted, the AND gate 2222 is enabled and its energization enables additional timing to occur within the multiple latch 2210. After another interval, the AND gate 2214 generates the PDIN signal.

The PSYNC and PDIN signals are coupled to a multiplexer 2223 in FIG. 22C, controlled by a DSI signal. An AND gate 2224, in FIG. 22B, asserts the DSI signal only when the CBI 17 has been selected or latched. During the polling mode the DSI signal is not asserted, so the multiplexer 2223, in FIG. 22C, couples the PSYNC and PDIN signals to the corresponding formatter 25 during the polling mode. A DSI OUT signal, that indicates a writing operation, is held at a nonasserted level during polling. The DSI SYNC, DSI IN, and DSI OUT signals are transferred through differential bus drivers 2224, in FIG. 22C, along with the address and data signals that pass through differential bus drivers 2225 and that are received from the latch 2219 in FIG. 22F.

The combination of these signals causes the reading operation from the selected DSI formatter, and the incoming data signals appear at differential bus receivers 2226, in FIG. 22C. In addition, the REPLY control signal passes through differential bus receivers 2227 as a REPLY signal to energize an OR gate 2228 and condition a multiple latch 2229, which acts as a time delay circuit. After one clock interval, a signal from the 2Q output sets a flip-flop 2230, latching the 1D input to the flip-flops 2229. In addition, the 2Q output signal acts as a DSI RPLY signal that passes back to an AND gate 2231 in a parity circuit shown in FIG. 22D along with the data which is applied to a parity checker generator 2232. When the DSI RPLY signal is asserted, the AND gate 2222 (FIG. 22G) is deenergized and the flip-flop 2215 sets. A gating circuit, comprising OR gates 2233 and 2234, energizes an AND gate 2235 and an OR gate 2236, clearing the latches 2210. Both the AND gate 2211 and the AND gate 2205 are deenergized, and the POLL MODE flip-flop 2204 clears. However, the next SYNC signal appearing on the call processor bus energizes the latches 2210 and shifts the unit into poll mode again, whereupon the next DSI in sequence will be polled.

Whenever the call processor wishes to transfer a message to or from the DSI, it first addresses the call processor bus interface (CBI) to shift it into a message mode. The addresses are applied to a comparator 2240 in FIG. 22B during the address phase of a bus transfer. If they match a selected address provided by address selection circuit 2241, the DEVICE SELECTED flip-flop 2203 sets on the leading edge of the delayed SYNC pulse associated with address phase. When the PMODE signal subsequently shifts to a nonasserted state, the AND gate 2212 asserts the DEV SEL signal and disables the AND gate 2211 in FIG. 22G. If neither of the CBI's 17A or 17B in FIG. 4 has been selected, the AND gate 2205 (FIG. 22G) shifts to a deenergized state, so the POLL MODE flip-flop 2204 cannot set. Now the DSI signal is produced by the AND gate 2224 (FIG. 22B), so the DSI SYNC, DSI DIN, and DSI OUT signals from the multiplexer 2223 (FIG. 22C) are responsive to signals from the bus, specifically the DIN signal from receivers 2245 in FIG. 22A, and the SYNC signal from the receiver 2208 in FIG. 22B. The coincidence of both the SYNC and DEV SEL signals enables another delaying latch 2246 in FIG. 22C to produce a sequence of timing signals. The first timing signal, after a delay, acts as the DSI SYNC signal. The second, after another time delay, becomes a data cycle (DATACY) signal that enables operation of another latch 2247. The DATACY signal also selects, the input of the multiplexer 2217 in FIG. 22E, which is the input from the CPI bus, thereby to establish a data path. A latch 2248 receives the address signals during the address phase in response to the assertion of the SYNC signal. However, the multiplexer 2217 does not couple any input signals to the output during the message mode because the PMODE signal is not asserted. Thus, during the message mode the address signals appear only on ADR conductors.

These address signals are applied to an address decoder 2250 in FIG. 22B that then identifies which of the several possible locations is involved; namely, a status register, an error register, or a mask register. Whenever any of these three registers is identified, the CBI signal is also asserted to turn off the differential bus receivers 2226 in FIG. 22C. A latch 2215 in FIG. 22F also is disabled.

When the REPLY signal is received in differential bus receivers 2227 in FIG. 22C, a similar sequence as previously discussed occurs. In this case, however, the assertion of the DIN signal enables the delaying latch 2247 to energize an AND gate 2252 after a certain time delay, thereby to generate the DDIN signal, which is coupled through multiplexer 2223 as DSI DIN signal. When the CBI signal is asserted, the OR gate 2263 and an AND gate 2254 also produce a restart (RSTR) signal and an OR gate 2255 produces a CPORPLY signal.

If a writing operation occurs, an AND gate 2256 is energized to produce a DDOUT signal and, while the flip-flop 2230 is reset, to energize an AND gate 2257 to assert the DSI OUT signal. The DSI signal, that is again generated when the device is selected by circuitry in FIG. 22B, also enables an AND gate 2258 in FIG. 22C. After a delay established by the latches 2229, the AND gate 2258 produces the CPORPLY signal. This signal is applied to a transceiver 2260, in FIG. 22A, and is transferred back to the call processor bus as the CPB RPLY signal that indicates the end of the transfer. When this occurs, the incoming DIN STROBE signal will shift to a nonasserted level in FIG. 22A and cause the termination of the DSI DIN signal from the multiplexer 2223, which will then cause the termination of the CPORPLY signal and the subsequent shift of the PSYNC signal to a nonasserted level. This terminates the data transfer.

The call processor bus interface, shown in FIG. 22, normally operates in a polling mode. However, the polling mode is interrupted whenever the call processor desires to communicate through the call processor bus interface with a particular DSI. During transfers to and from the call processor, all the control signals from the call processor, in this case a Digital Equipment Corporation LSI11 digital data processor, are transferred through the call processor bus interface after a short delay, thereby to produce the various transfers. If one of the three internal registers; namely, the mask register shown in FIG. 22I, the status latch 2266 shown in FIG. 22E, or stages in a status register or error register represented by flip-flops 2267 (FIG. 22H) and 2279 (FIG. 22D), respectively, is identified during a reading operation, the corresponding information is transferred onto the call processor bus.

If the poll mode is not terminated within a predetermined time, the counter 2221 in FIG. 22H produces a carry-out which acts as a time out (TO) signal. The TO signal directly sets the END-OF-POLL MODE flip-flop (FIG. 22G), in FIG. 22G, thereby to enable the completion of the cycle so that the call processing system will not be prevented from continuing its operation. Such a time-out, then, either indicates the failure of the DSI or the lack of DSI equipment corresponding to the number transmitted from the address.

Referring to FIG. 22D, the parity checker generator 2232 receives information from the CPO bus and produces an odd parity. If, at the completion of a data transfer, when the AND gate 2231 is energized, an odd parity is detected, an AND gate 2270 produces a parity error (PE) signal through drivers 2271 and, through an AND gate 2272, presets a flip-flop 2273 which is a parity error state in the error register. The AND gate 2272 is disabled during the poll mode. If the other call processing bus interface produces a parity error, an AND gate 2274 in FIG. 22D generates a parity error check (PECK) signal through an OR gate 2275 and a stop bus (STOPBUS) signal through an OR gate 2276. In addition, AND gate 2277 and OR gate 2278 preset another PARITY ERROR flip-flop 2279 to provide an output on one of the data conductors.

Other circuitry shown in FIG. 22D clears the various stages and enables the parity to be tested when both sides of the call processing system are in synchronization or out of synchronization and when they are in the poll or nonpoll modes. The parity error appears as bit 8 in both the status and error register of the call processor bus. The status register is reset each time the status is read, but the error register is reset only when the error register is written.

Now referring to FIG. 22F, the counter 2220, is duplicated in each of the call processor bus interfaces. The counters operate in synchronism with each other, and provide DSI numbers during polling. Each time one reaches a maximum number, it produces a carry output (OLD) signal that is cross-coupled to the other counter. Thus, when either counter overflows, both are set to zero.

Figure 22I:
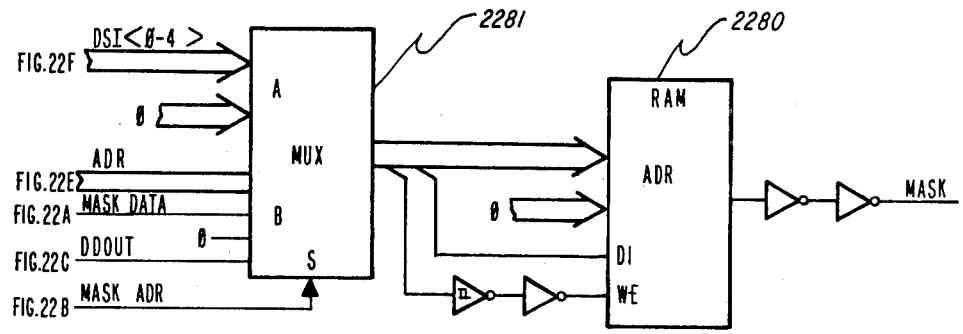

The mask RAM 1720 of FIGS. 5 and 22 is shown in FIG. 22I. It includes a one-bit random access memory (RAM) 2280. A multiplexer 2281 selects one of two address sources. The first source is a DSI number that is generated by the counter 2220 during the poll mode. The other source is the address signals from the latch 2248 during a transfer to or from the mask register. When a transfer is to the mask register, the DDOUT signal from the AND gate 2256 in FIG. 22C enables a writing operation into the RAM 2280. A MASK ADR signal from the address decoding network in FIG. 22B, performs the source selection.

Thus, for each DSI the random access memory 2280 produces a MASK signal to indicate whether the DSI is or is not masked. The state of the MASK signal is read through the latch 2251 in FIG. 22E on the CPO7 conductor. It also is coupled through the address and status latch 2266 in FIG. 22E as a CPO15 signal. In FIG. 22G, the CPO15 signal is coupled to the OR gate 2233 to clear the latch 2210 and terminate the poll mode.

Figure 22J:
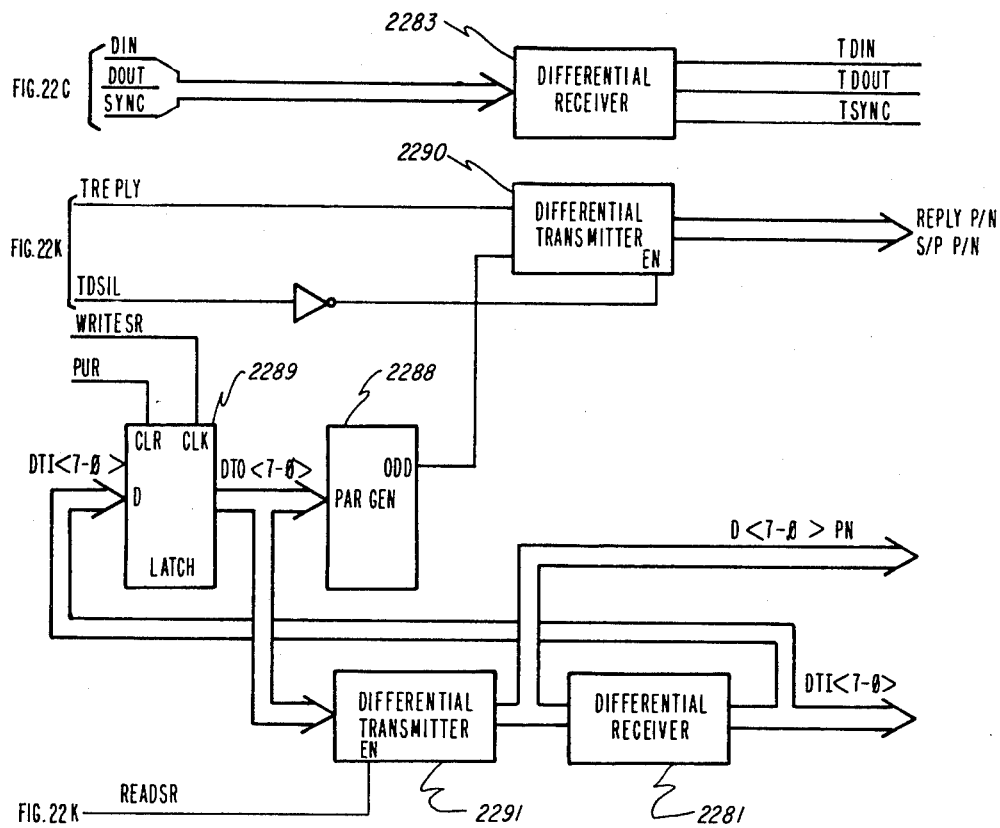
Figure 22K:
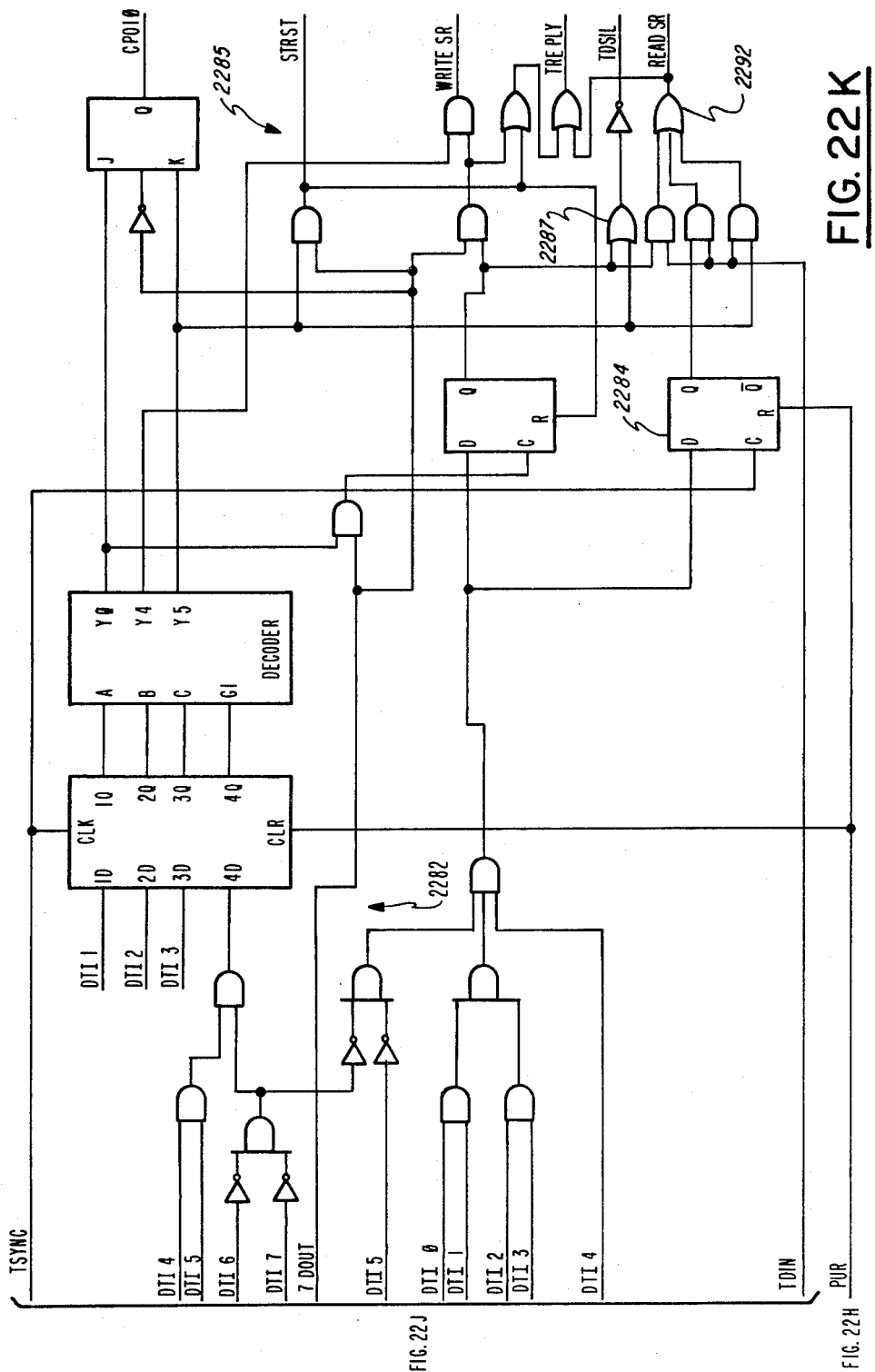

The call processor bus interface also contains a test circuit for testing the differential data and control bus leads, the poll mode circuit, the mask register, and the call processor to digital satellite interface communications paths. This is identified by a particular DSI number and, when that address appears on the conductors, it passes through differential bus receivers 2281 in FIG. 22J to a test address decoder 2282 in FIG. 22K. A network 2285 of flip-flops and gates produces various signals during a timing sequence, in a manner similar to the network shown primarily in FIG. 22C. Differential receivers 2283, in FIG. 22J, receive the incoming bus timing and control signals from the other portions of the interface and couple them to flip-flops such as the flip-flop 2284 in FIG. 22K that indicates one specific operation, in this case a reading operation of the status register. The remaining gating network 2285 decodes the other signals to identify other operations. OR gates 2286 and 2287 produce TREPLY and TDSIL signals that act as reply and interrupt signals, respectively. A parity generator 2288 in FIG. 22J receives data signals from a latch 2289 and can generate a PE signal through the differential transmitter 2290. Data can also be read through differential transmitter 2291 during a reading operation indicated by an READSR signal that is produced by the flip-flop 2284 and an OR gate 2292 in FIG. 22K, for example.

2. Formatter 25

As shown in FIG. 4, each DSI 14 has two formatters 25A and 25B. Each formatter connects to a corresponding call processor bus interface. FIG. 6 is a block diagram of the data paths in one such formatter 25, and FIGS. 23A through 23F depict details of both the data and control paths for the formatter.

A formatter connects to its corresponding call processor bus interface, to the data processing system and memory, to the span equipment, and to the other formatter. More specifically, the interface to the corresponding call processor bus interface includes differential receivers 2310 in FIG. 23A that connect the ABSYNC signal to the formatter. This signal indicates whether both sides of the call processing system are in synchronization. An ADREN(L) ground assertion signal indicates whether there is a physical connection to the corresponding call processor bus interface. The ADREN(L) signal is applied to inverter 2311 to enable a decoder 2312 when the ADREN(L) signal is asserted. Control signals from the corresponding call processor bus interface are passed through differential bus receivers 2313 in FIG. 23F and other control signals are transferred to the corresponding call processor bus interface through differential drivers 2314. Differential bus receivers 2315 receive data from and differential transmitters 2316 transmit data to the corresponding call processor bus interface.

One connection to the processor 27 is a fused parity error (FPE) signal that is applied to an exclusive-OR circuit 2317 in FIG. 23B. Bidirectional gating circuitry 2320 in FIG. 23C couples data from the processor to a programmable interface adapter 2321 to appear as PIA OUT signals. During a transfer to the processor, the PIA IN signals are coupled through the programmable interface adapter 2321 and the gating circuitry 2320 to the processor data conductors. Receivers 2322, in FIG. 23C, receive various other control signals from the processor that are used by the programmable interface adapter 2321. The A600 signal from the memory 28 enables an AND gate 2324 and the programmable interface adapter 2321. This signal indicates that an input/output device is being addressed. The use of such signals is known.

Receivers 2322 also receive a span 0 control (SPC0) signal from the interface portion of the span equipment. Inverters 2325 and 2326 receive signals indicating which of the spans is selected in order to produce a SET SIDE signal through circuitry 2328.

As there are two formatters operating in synchronism, there are some interconnections between those two formatters. A driver circuit 2327 in FIG. 23B transfers a parity error (PE) signal to and receives a similar parity error signal from the other formatter. Driver 2330 provides a connection for an address parity error (APE) signal to the other formatter. In FIG. 23E, an OR gate 2331 receives a message ready (MRDY) signal from the other formatter. A flip-flop 2332 produces the similar MRDY signal that is transferred to the other formatter.

Figure 23A:
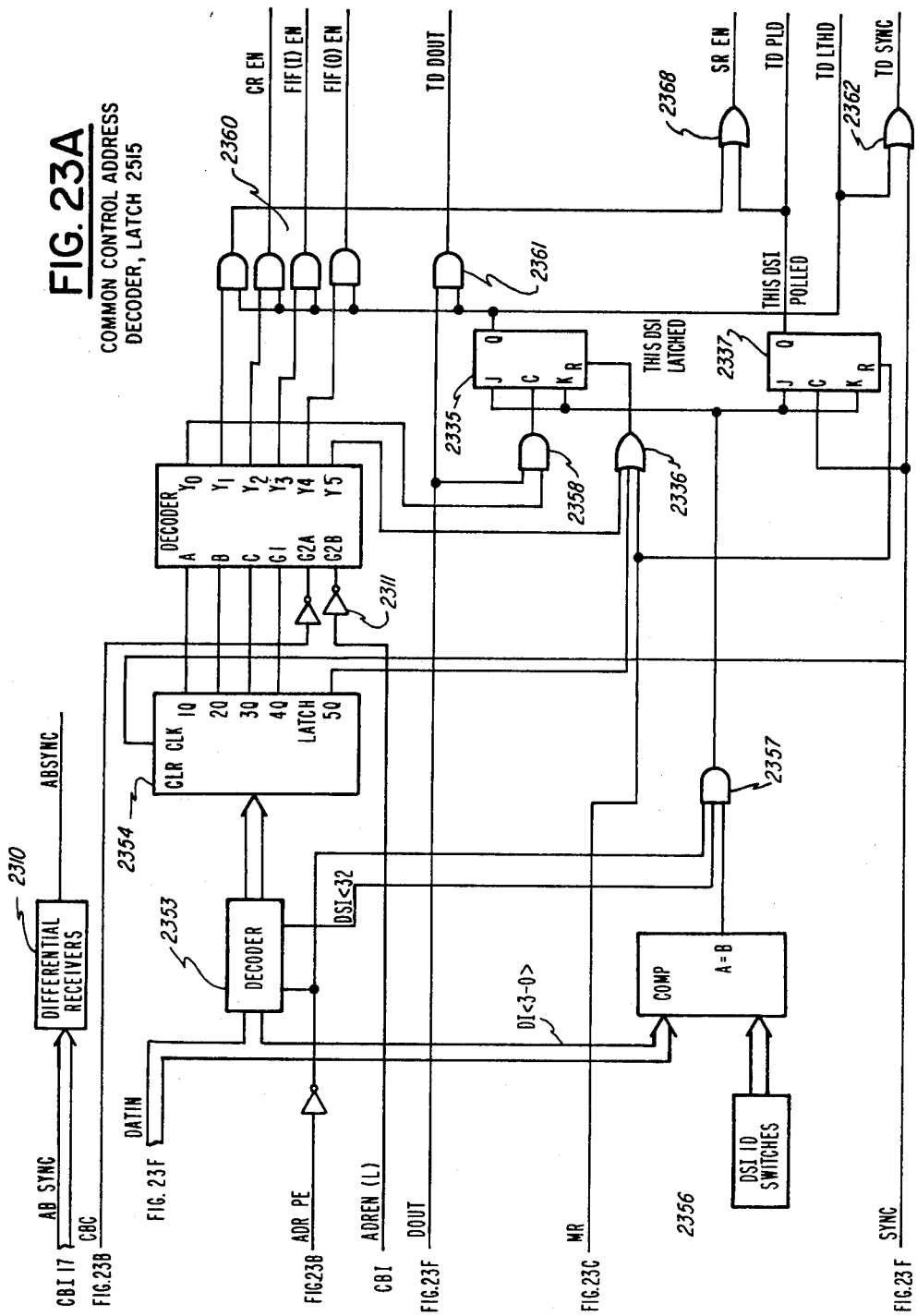

When power is applied to the formatter, one input of the receivers 2322 in FIG. 23C senses the input voltage and produces a master reset (MR) signal. This MR signal initializes various circuits in the formatter. Specifically, in FIG. 23A the MR signal clears a "THIS DSI LATCHED" flip-flop 2335 through an OR gate 2336 and a "THIS DSI POLLED" flip-flop 2337. In FIG. 23E, the MR signal clears a "DSI-to-DCO" flip-flop 2340, a "DCO-to-DSI" flip-flop 2341, and a "RESULTS" flip-flop 2342. In addition, the MR signal energizes OR gates 2343 and 2344 thereby to assert an input fifo reset (FIF(I)R) signal and a clear parity error (CLR PE) signal, respectively. Another OR gate 2345 produces a reset output fifo (RFIFO) signal. In addition, the RFIFO signal presets a flip-flop 2346 and the OUTPUT MESSAGE READY flip-flop 2332 and clears the output FIFO 2347 shown in FIG. 23D. The FIF(I)R signal from the OR gate 2343 in FIG. 23E clears the input FIFO 2351 shown in FIG. 23D. The CLR PE signal from the OR gate 2344, in FIG. 23E, clears a "THIS DSI ADDRESS PARITY ERROR" flip-flop 2351 and a "DATA PARITY ERROR" flip-flop 2352, in FIG. 23B.

As previously indicated, a particular formatter operates in response to a first and subsequent transfers through the call processor bus interface from the call processor that identifies the particular formatter. These are generally call processor writing operations. During a first writing operation, the DSI address decoder address appears at the output of the receivers 2315 in FIG. 23F. The delayed SYNC signal will cause that address to be coupled into a latch 2354 in FIG. 23A, thereby to enable the decoder 2312. During the data cycle, an address comparator 2355 compares the DSI number on the DATIN conductors with the DSI ID switch signals from switch circuit 2356. If there is a comparison, if no address parity error is indicated, and if the data on the DATIN conductors is within range, an AND gate 2357 is energized to condition both the flip-flop 2335 and the flip-flop 2337 to set.

These two flip-flops 2235 and 2237 distinguish communications with the call processor but interface during its polling operations and during message transfers. During a message transfer, the DSI number will be transmitted and a data out (DOUT) signal from the receivers 2313 will be asserted. As a result, an AND gate 2358 (FIG. 23A) will be energized. One output from the decoder (a Y0 output) indicates the receipt of the DSI address for the DSI and enables the AND gate 2358 to clock the "THIS DSI LATCHED" flip-flop 2335 to a set condition. The flip-flop 2337 does not latch because because the SYNC signal is asserted during the entire interval of the address and data transfers.

When the flip-flop 2335 sets, its TD LTHD output signal enables a set of gates generally indicated as 2360 and another AND gate 2361 that produces a TD DOUT signal. In addition, the TD LTHD signal energizes an OR gate 2362 to enable the SYNC signal to produce a corresponding TD SYNC signal.

During a polling operation, however, the AND gate 2357 is energized during the addressing intervals, so the SYNC signal can set the "THIS DSI POLLED" flip-flop 2337, thereby producing a TD PLD signal. During polling, the TD PLD signal from FIG. 23A is coupled to an OR gate 2363 in FIG. 23F and enables the AND gate 2364 to be energized when data is on the conductors. This allows the differential transmitters 2316 to transmit the data onto the bus and also energizes an OR gate 2365 to enable differential drivers 2314 to produce an RPLY reply signal that is transmitted back to the call processor bus interface.

Figure 23D:
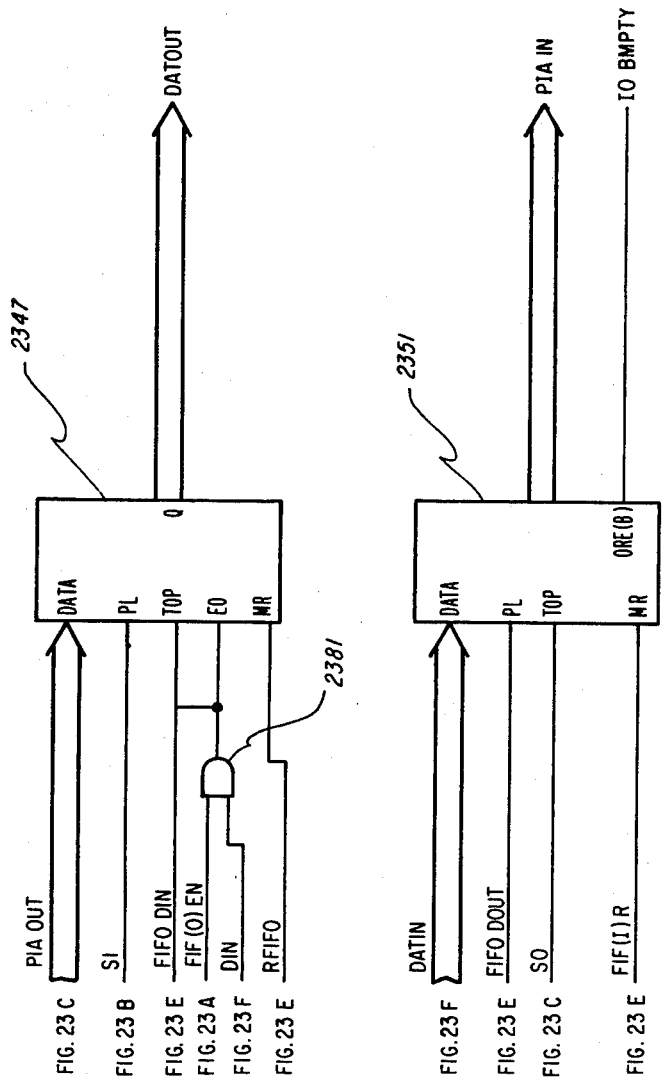
Figure 23E:
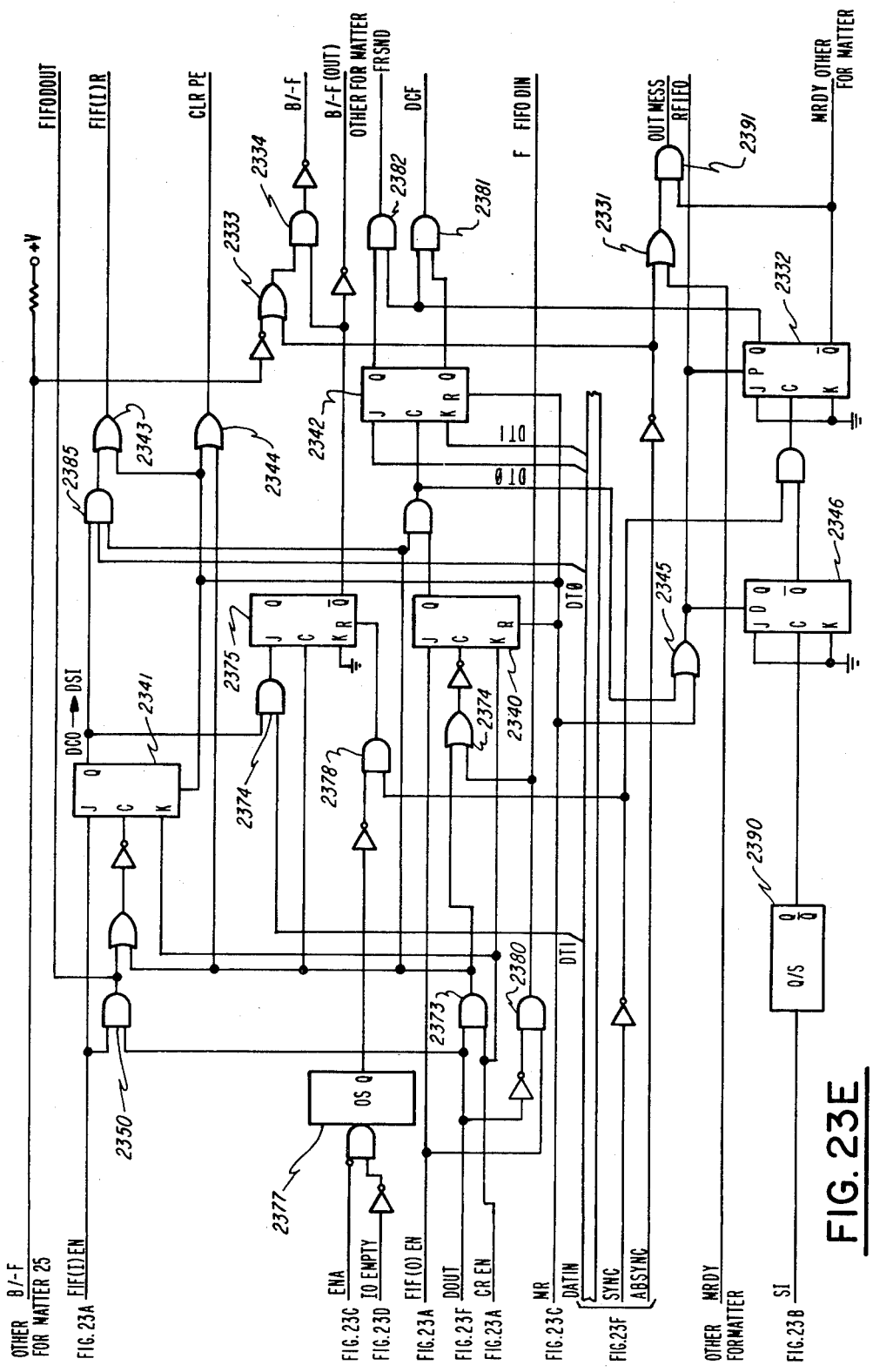
Figure 23F:
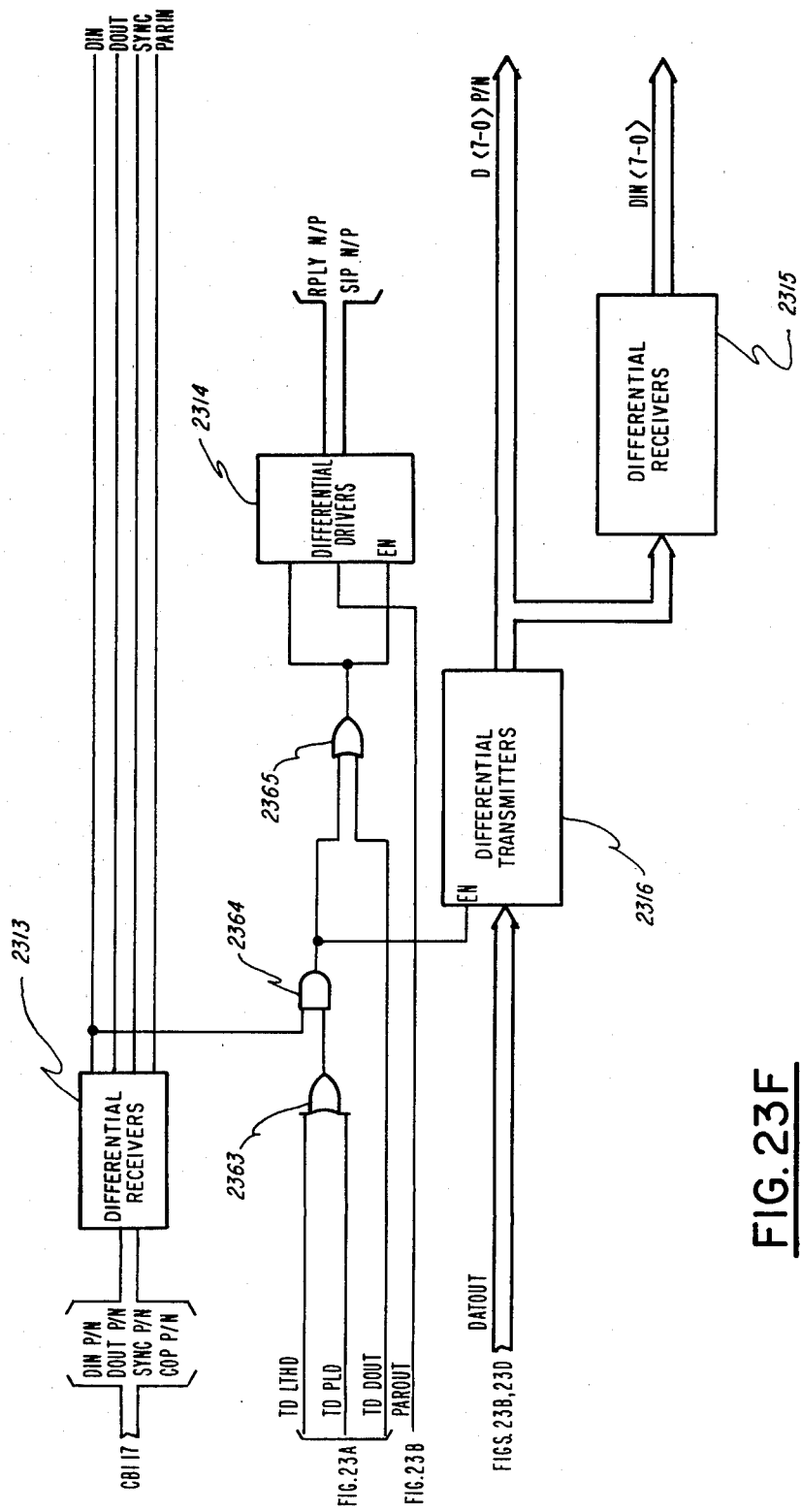

When the TD LTHD signal is asserted, the AND gate 2364 in FIG. 23F is also enabled. Likewise, during the data phase of a transfer, the TD DOUT signal also enables the differential drivers 2314 to produce the RPLY reply signal. Thus, the drivers 2314 produce the required reply signal during each transfer to the formatter.

Each time a successive transfer occurs, the TD SYNC signal from the AND gate 2362 in FIG. 23A clocks the flip-flop 2351 in FIG. 23B. This flip-flop sets if a parity circuit 2364 indicates a parity error during the address phase in response to signals on the DATIN bus and, during the address phase, a PAR IN signal. The processor bus interface produces an address parity signal that is coupled through an AND gate 2365.

Each time the SYNC signal is asserted, the parity circuit 2364 also indicates whether a parity error exists during the address cycle, notwithstanding the final destination of the transfer. Specifically, the SYNC signal clocks a flip-flop 2366 in FIG. 23B thereby to produce an address parity error signal for any address parity error so long as the two formatters are operating in synchronism.

Either the flip-flop 2351 or the flip-flop 2352, when set, energizes an OR gate 2367, thereby to energize the drivers 2327 to generate the PE signal if either an address or data parity is detected during a transfer to or from the formatter.

It is also possible to "unlatch" the formatter through the OR gate 2336 shown in FIG. 23A. As previously indicated, this unlatching operation occurs in response to the MR signal. It also occurs in response to an attempt to latch another DSI, as indicated by an output from the latch 2354 or in response to an UNLATCH command. The decoder 2312 responds to the UNLATCH command by energizing the OR gate 2336.

As soon as the formatter is addressed, either during a polling operation or during a message transfer, the flip-flop 2337 or the gates 2360, respectively, energizes an OR gate 2368 thereby to produce a status register enabling (SR EN) signal. During a reading operation, an AND gate 2369 in FIG. 23B enables drivers 2370 to couple various signals onto the DATOUT conductors, and the differential transmitters 2316 in FIG. 23F transfer these signals to the call processor bus interface. However, if a parity error exists, the exclusive OR gate 2317, in FIG. 23B, will enable the differential drivers 2314 in FIG. 23F to transmit an SIP signal back to the unit. This signal is a parity interrupt signal.

Once a writing operation to a DSI has occurred and the DSI has been latched, a succeeding writing operation will enable the address to be transferred into the latch 2354 in FIG. 23A and decoded to indicate the status register, the control register, the input FIFO, or the output FIFO as the addressed location. If the status register is selected, then a reading operation occurs as just described. The status register specifically includes a B/−F signal that indicates to the other formatter that this formatter is busy. Another input indicates a parity error. Still another input indicates that an output message exists, thereby reflecting the cleared state of the flip-flop 2332 and the assertion of the MRDY signal or a lack of synchronization through the OR gate 2331 in FIG. 23E. The parity error signal is generated by the assertion of either the PE signal by the driver 27 or the APE signal by the driver 2330. These bit positions are shown in FIG. 12, indicated as the DSI BUSY signal, PARITY ERROR signal, and SERVICE REQUEST signal, respectively.

If a message is being transmitted from the call processor to the digital satellite interface, one of gates 2360 in FIG. 23A asserts the FIF(I)EN signal and the AND gate 2361 asserts the TD OUT signal. The FIF(I)EN signal conditions the flip-flop 2341 in FIG. 23E and enables an AND gate 2350 to be energized by the assertion of the DOUT signal during the data cycle, thereby to produce an FIFO DOUT signal. At the end of the cycle, the DOUT signal shifts to a nonasserted level and sets the flip-flop 2341.

The FIFO DOUT signal from the AND gate 2350 in FIG. 23E enables the input FIFO 2351 shown on FIG. 23D to start receiving the DATIN data signals. As known, information is placed in the "bottom" of the FIFO and then is automatically conveyed to the "top". So long as no data is present in the "top" location, the FIFO 2351 asserts an IOEMPTY signal. When that signal shifts to a nonasserted level, data is then present at the PIA IN conductors from the input FIFO 2351.

If a parity error occurs during the data transfer, the flip-flop 2352 in FIG. 23B sets, thereby energizing the OR gate 2367 and the drivers 2327 to produce the parity error signal.

Successive bytes will be transferred in a similar manner until the complete message has been transferred. When this occurs, the call processor makes a transfer to the control register and asserts the DT1 bit position, indicating that the transfer is complete. When this occurs, the CREN signal from the one of gates 2360 and DOUT signal energize an AND gate 2373 and an AND gate 2374 conditions the flip-flop 2375 to be set. As will be apparent, this sequence will occur because the transfer of bytes into the FIFO will be at a rate which exceeds the transfer rate from the FIFO. When the flip-flop 2375 sets, the B/−F signal produced by the circuit 2333 and driver 2334 shifts state, thereby indicating to the other formatter that it is busy and, in addition, enabling an AND gate 2376 (FIG. 23C) to condition the programmable interface adapter 2321 to transfer information. The processor 27, in FIG. 4, then effects the transfer from the FIFO through the programmable interface adapter 2321, as described later. When the IOEMPTY signal is again asserted, the AND gate 2376 turns off the programmable interface adapter 2321 and, in addition, a one-shot multivibrator 2377 in FIG. 23E produces a pulse that is coupled through an AND gate 2378 to clear the BUSY flip-flop 2375.

Now assuming that a message is to be transferred from the digital satellite interface to the call processor, the call processor institutes a reading operation from that location and the one of gates 2360, in FIG. 23A, asserts the FIF(O) EN signal. This signal and the inverted DOUT signal enable an AND gate 2380 in FIG. 23E to energize the OR gate 2374 so that, at the completion of the first transfer, the flip-flop 2340 sets. In addition, the AND gate 2380 generates a fifo data in (FIFO DIN) signal that is coupled to the output FIFO 2347. An AND gate 2381 (FIG. 23D), that also receives the FIFO EN and DIN signals, is also energized, so that the appearance of both these signals enables the output fifo 2347 to produce data on the DATOUT conductors, which data are then coupled through the differential transmitters 2316 in FIG. 23F.

As previously indicated, the transfer of any message is followed by a subsequent transfer from the call processor. In the case of a message from the call processor to the DSI, this will indicate that the message has been completed and will consist of a message sent to the formatter control register 2256 shown in FIG. 12B. The DONE signal will be asserted and, as a result, the flip-flop 2375 (FIG. 23E) will be set. In addition, if a message has been received by the call processor and verified, the DONE signal will condition the flip-flop 2342 (FIG. 23E) to be cleared, thereby indicating that the message has been received. This is by means of a DCF signal from an AND gate 2381 shown in FIG. 23E.

If the message to the call processor is not accurately transmitted, then the DT0 signal will be asserted and the Results-flip-flop 2342 sets, thereby energizing an AND gate 2382 to produce a formatter resend (FRSND) signal that is also reported to the processor 27.

Other functions will also occur in response to such a transfer to the control register. If the DONE bit is not set and the RESEND bit is set, an AND gate 2385 will be energized to clear the input FIFO by energizing the OR gate 2343 in FIG. 23E.

A writing operation to the control register also causes the AND gate 2373 in FIG. 23E to energize the OR gate 2344, thereby to assert the CLRPE signal which then clears the PARITY ERROR flip-flops 2351 and 2352 in FIG. 23B. As a result, the PE signal and the BUSY signal, both from status register 2518 (FIG. 12B), are all cleared. Any writing to the control register conditions the flip-flop 2341 to be cleared, thereby indicating the completion of the message.

During a message transfer from the DSI to the call processor, the processor 27 in the DSI sends the message and transmits signals that produce a periodic EDG signal shown in FIG. 23C. This signal is coupled through drivers 2372 (FIG. 23B) as an SI signal and this signal is applied to a one-shot multivibrator 2390, in FIG. 23E. When the message has been completely loaded in the buffer, the one-shot multivibrator 2390 times out and the trailing edge of the output signal triggers the flip-flop 2346. On the trailing edge of the next SYNC pulse the MESSAGE READY flip-flop 2332 will be cleared, thereby enabling the AND gate 2391 to produce an OUT MES signal when the message has been transferred to both formatters. The OUT MES signal is then applied to the status register to indicate a service request as shown in FIG. 12B.

In summary, the call processor bus interface can, during its polling operations, identify a particular DSI by transmitting the DSI number during a data cycle and then by reading the status register can identify when a service request is necessary. During the transmission of messages from the call processor to the processor 27 in the DSI, the messages are first transferred to and accumulated in the input FIFO 2351 shown in FIG. 23D. After the message bytes are sent, another message is sent to the control register 2256 (FIG. 12B) in the formatter to indicate the completion of that message. Either after the message has been sent or during the message transmission, the FIFO control indicates to the processor 27 that a message is available and the processor can thereafter retrieve the message from the FIFO through the programmable interface adapter 2321 shown in FIG. 23C.

Similarly, when the processor 27 sends a message to the call processor, it transmits the message to the output FIFO 2347 in FIG. 23D. When the entire message has been received in the FIFO, the OUT MES signal from the AND gate 2391 is generated so that, during a next polling operation, a service request will be received. Then the call processor generates the address for the call processor bus interface and the formatter to latch the formatter and then, during successive operations, addresses the output FIFO, thereby to read the information from that FIFO. When the message has been completely received and verified, the control register is written with a DONE signal. If a verification has not occurred, a RESEND signal is sent. The RESEND signal is then conveyed back to the processor 27 to enable the message to be sent again.

3. Memory Maps

Figure 24:
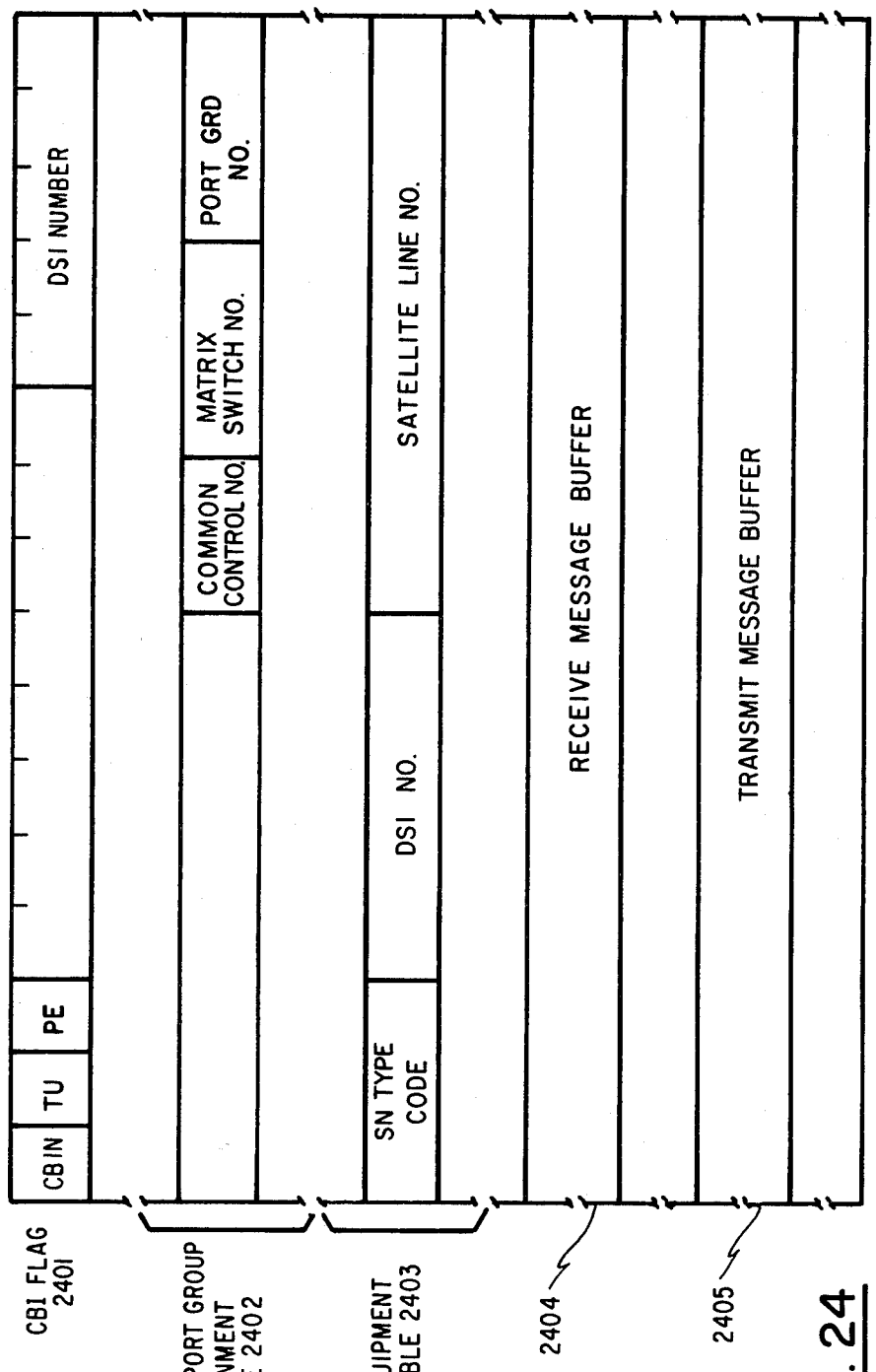
FIG. 24 is a memory map that depicts portions of the call processor memory shown in FIG. 2.

FIG. 24 depicts portions of the call processor memory that are useful to an understanding of this invention. A single location 2401 is a CBIFLAG register that contains bit positions that indicate the direction of a transfer (CBIN), the lack of success of a message transfer (TU), the existence of a parity error (PB), and the DSI number.

Location 2402 is a representative entry in a DSI port group assignment. There is one such entry, or location, for each span in the network. Each entry establishes a correspondence between a specific span and its connection to the central switch as defined by a common control number, a matrix switch number, and a port group number.

An equipment table 2403 contains one entry for each subscriber in the system. For a subscriber connected to a remote digital satellite unit, the entry contains an SN type code, the DSI number, and the satellite line number.

FIG. 24 also illustrates a receive message buffer 2404 and a transmit message buffer 2405. These buffers store messages received from and sent to the digital satellite interface.

Figure 25C:
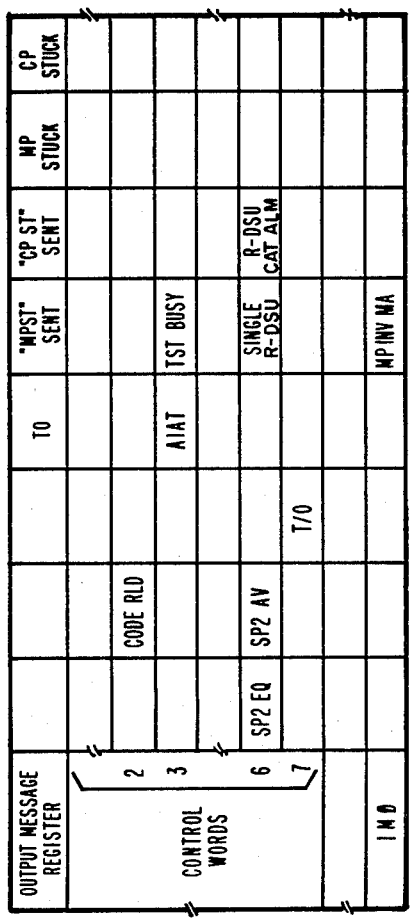
FIG. 25, along with FIGS. 25A through 25D, are memory maps that depict the organization of the random access memory shown in FIG. 8.
Figure 25A:
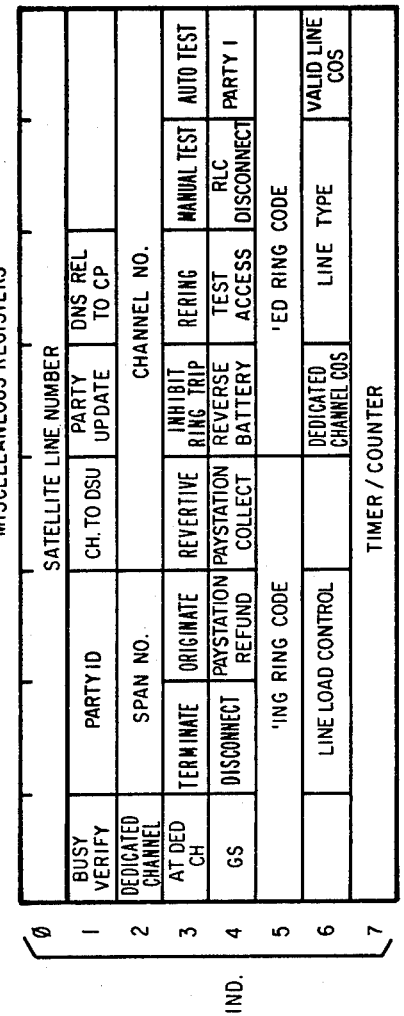
Figure 25:
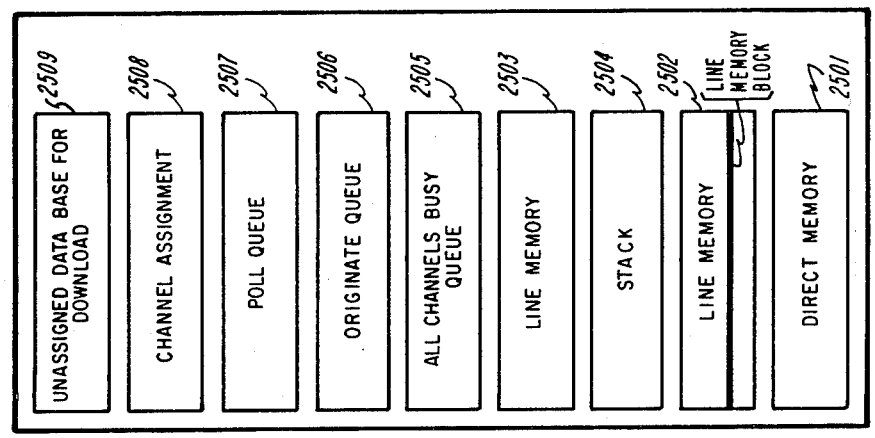

FIG. 25 depicts the organization of the DSI's memory 28 in FIG. 8. The memory comprises a direct working memory 2501 that contains various control registers and working registers and two line memories, 2502 and 2503. A stack area 2504 is positioned between the two line memories in this particular embodiment. An all channels busy queue 2505 carries the list of calls that are trying to originate when all the channels on the span are occupied. An originate queue 2506 stores ORIGINATE messages and a poll queue 2507 assembles the identities of remote digital satellite units that have altered their corresponding bit positions during a polling message. A CHANNEL ASSIGNMENT block 2508 contains information concerning each satellite line number and another block 2509 is designated for unassigned data base information for downloading purposes.

FIG. 25A shows a typical line memory block for a given satellite line number. It includes the satellite line number in relative location 0. Of particular importance to this invention is location 2, which contains a bit indicating whether this particular satellite line number has a dedicated channel and the corresponding span and channel numbers. Locations 3 and 4 contain information concerning the status of the particular line. Location 5 contains the ringing codes for both the calling and called phones. Location 6 contains other information. Location 7 is a timer/counter that is useful in processing calls to determine when timeouts have occurred.

Figure 25B:
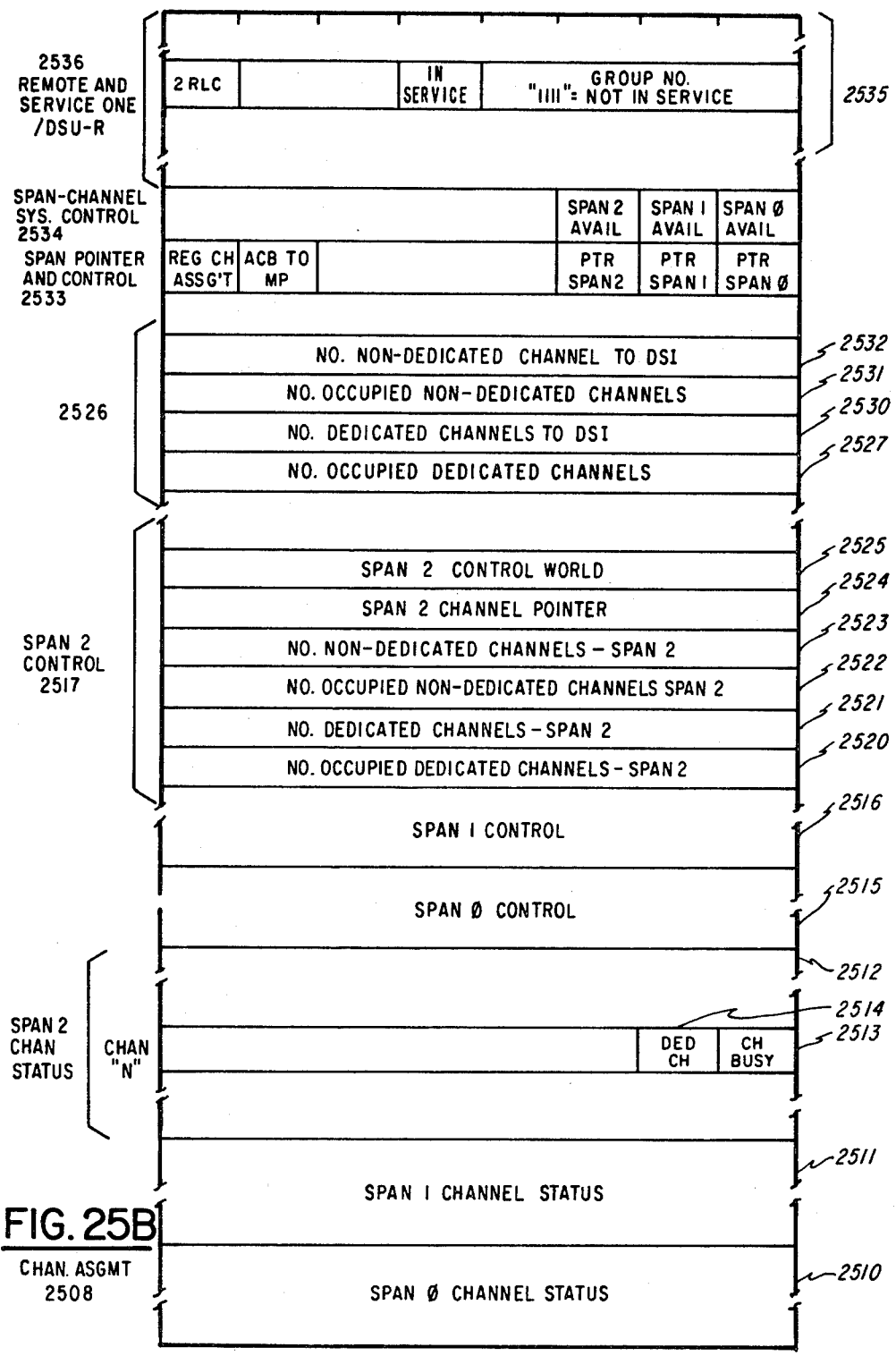

FIG. 25B depicts the organization of the channel assignment block 2508. There are three portions of the channel assignment block 2508 that contain span channel status. They are span 0 channel status area 2510, span 1 channel status area 2511, and span 2 channel status area 2512. A location in span 2 channel status area 2512 for channel "N" is shown as comprising a channel busy (CH BUSY) bit 2513 and a dedicated channel (DED CH) bit 2514. One such location is associated with each channel and each span.

The channel assignment block 2508 also contains span control areas 2515, 2516, and 2517 for spans 0, 1, and 2, respectively. Each of these areas is identical and span 2 control area 2517 is shown in detail. The number of occupied, dedicated channels is stored in location 2520 and the number of dedicated channels is stored in location 2521. The number of occupied, nondedicated channels is stored in location 2522 with a total number of nondedicated channels being stored in location 2523. A channel pointer is stored in location 2524 and a span control word is stored in location 2525. Other locations define a system control area 2526. This area contains the total number of occupied, dedicated channels and the number of dedicated channels to a digital satellite interface in locations 2527 and 2530, respectively. Locations 2531 and 2532 contain the number of occupied, nondedicated channels and the number of nondedicated channels, respectively. A span pointer and control location 2533 contains a bit for indicating that a regular channel assignment has occurred or, in the case of an "all channels busy" condition, that a message has been sent to the maintenance processor. Pointers are then provided for each of the spans. A span channel system control location 2534 indicates whether each of the spans is available. Another area, 2535, contains remote and service information for each remote digital satellite unit. One location corresponds to each remote digital satellite unit and location 2536 shows the most significant bit position, which indicates whether the remote unit is equipped with one or two remote line controls. An IN SERVICE bit indicates whether the remote digital satellite unit is in service.

FIG. 25C depicts the format of certain registers, or locations, in the direct memory area 2501. The use of this area will become apparent later. FIG. 25D defines the meaning of various signals sent to and from the various programmable interface adapters used in the digital satellite interface. As such units are known, the meanings are not further discussed here. The use and manipulation of certain bits will become more evident later.

4. Operation of the Call Processor

U.S. patent application Ser. No. 924,883 describes the operation of one embodiment of a call processor, such as call processor 408A and 408B in FIG. 2, in connection with call processing to local lines 11 shown in FIG. 2. Certain modifications to those programs are necessary in order to make the call processor compatible with the digital satellite interface and the various messages routed to and from the interface.

Figure 26:
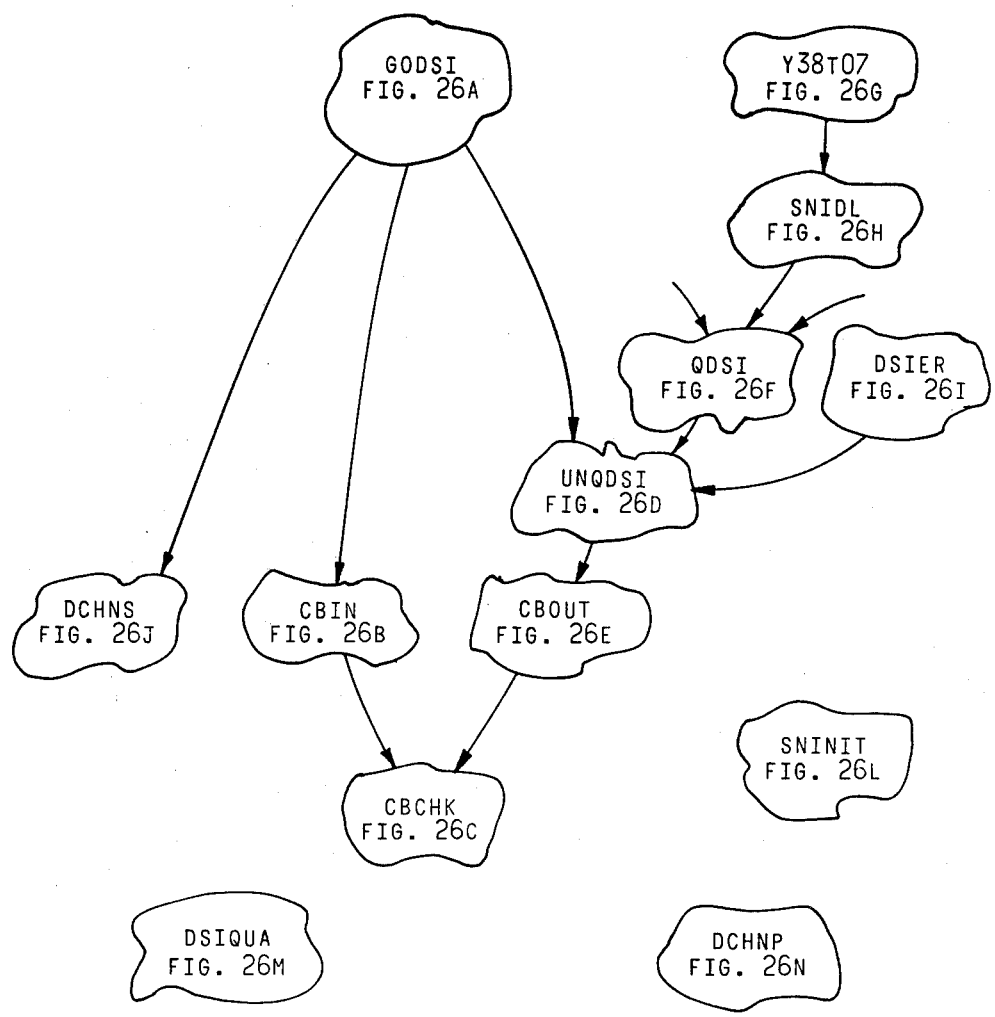
FIG. 26, together with FIGS. 26A 26B, 26C-1 through 26C-3, 26D, 26E, 26F-1, 26F-2 and 26G through 26N, comprise detailed flow diagrams of the control programs executed by the call processor shown in FIG. 2 that are related to this invention.

These programs are organized into modules and FIG. 26 depicts the interrelationship of those modules. Specifically, the arrows show the interrelationship in terms of the ability to call a module as a subroutine. For example, a GODSI module can call the CBIN module. The CBIN module, in turn, calls the CBCHK module. However, it will be apparent that the GODSI module will be processed to the point of calling the CBIN module. Then the CBIN module will be processed to the point of calling the CBCHK module. When the CBCHK module has been completed, control will return to the CBIN module. When the CBIN module has completed its operations, which may include further calling of the CBCHK module or other modules, control will return back to the GODSi module.

Figure 26A:
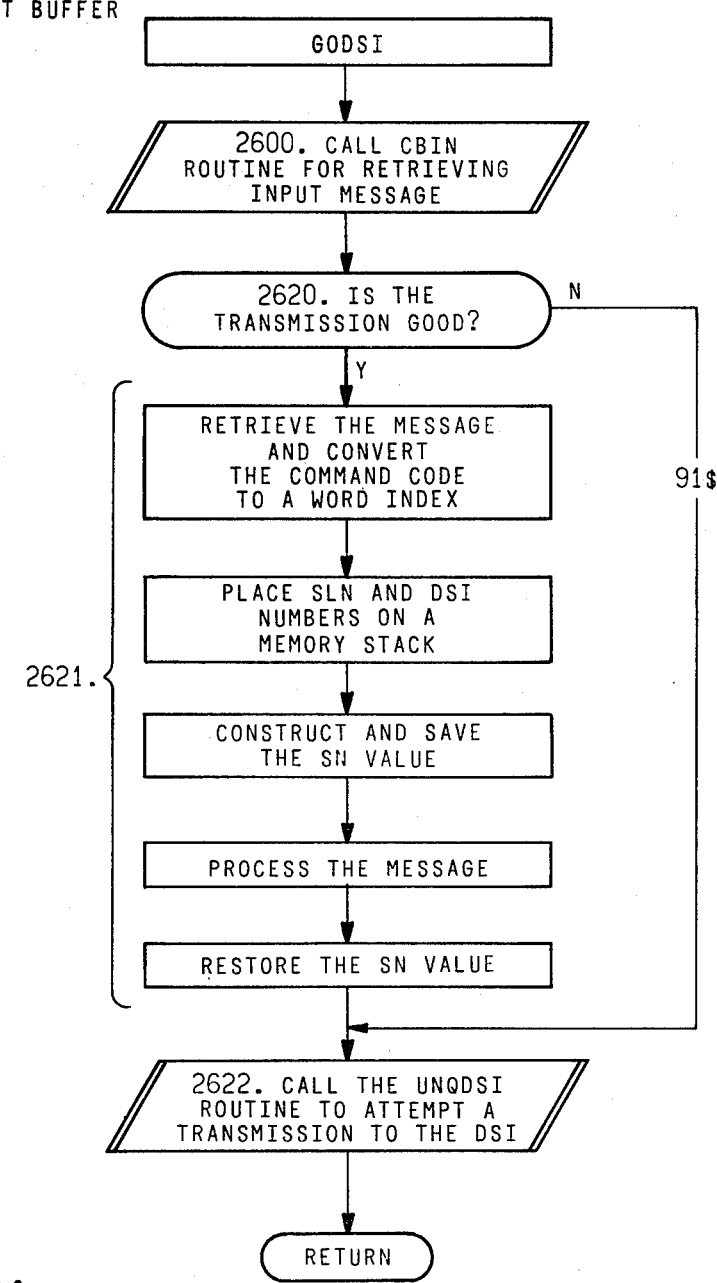

Now referring to the GODSI module in FIG. 26A, this module performs various functions that are common to the receipt of all messages and then, based on the first byte of the message, calls an appropriate message handler. More specifically, it computes a message pointer from the input header, computes an SN equipment number utilizing the DSI number and SLN numbers in the register in equipment table 2403 (FIG. 24), and then calls the appropriate task handler to process the message.

Figure 26B:
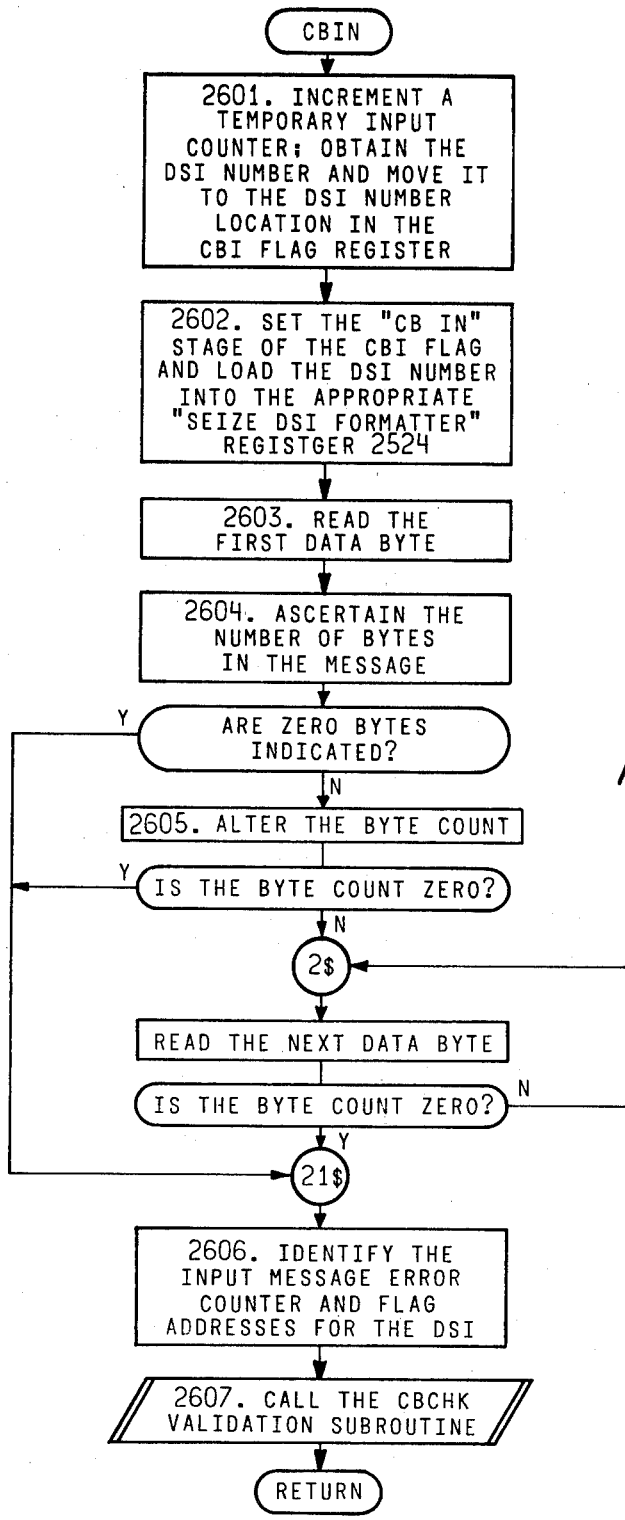

As a first step 2600, the GODSI module calls the CBIN module, in FIG. 26B, in order to retrieve the input message. Referring now to FIG. 26B, the CBIN module transmits data, which will be in the format depicted in FIG. 10, from the call processor bus interface and buffers it for subsequent use by the call processor. Specifically, it selects a particular call processor bus interface by requesting service and then reads the first data byte in the message. It then extracts the message byte count and uses this information to control the extraction of more bytes from the call processor bus interface. When the message has been received, the DBIN module calls the CBCHK module, in FIG. 26C-1 through 26C-3, to validate and terminate the transmission. From other modules, the device status and device number will be retrieved, in step 2601 of the CBIN module, and the DSI number will be transferred into the least significant bit positions of the CBI FLAG register 2401, in FIG. 24. In step 2602, the CBIN stage in the CBI FLAG 2401 is set and then the DSI number is sent to the appropriate formatter to seize the formatter and enable the first data byte of the message to be read in step 2603. The low order bits of that first byte are read to determine the number of bytes in the message. A sequence of steps 2605 are then used to determine when the entire message has been received. Then various error counters and flag addresses of the DSI are identified, in step 2606, in order that, in step 2607, the CBCHK validation subroutine can be performed.

Figures 1, 26C:
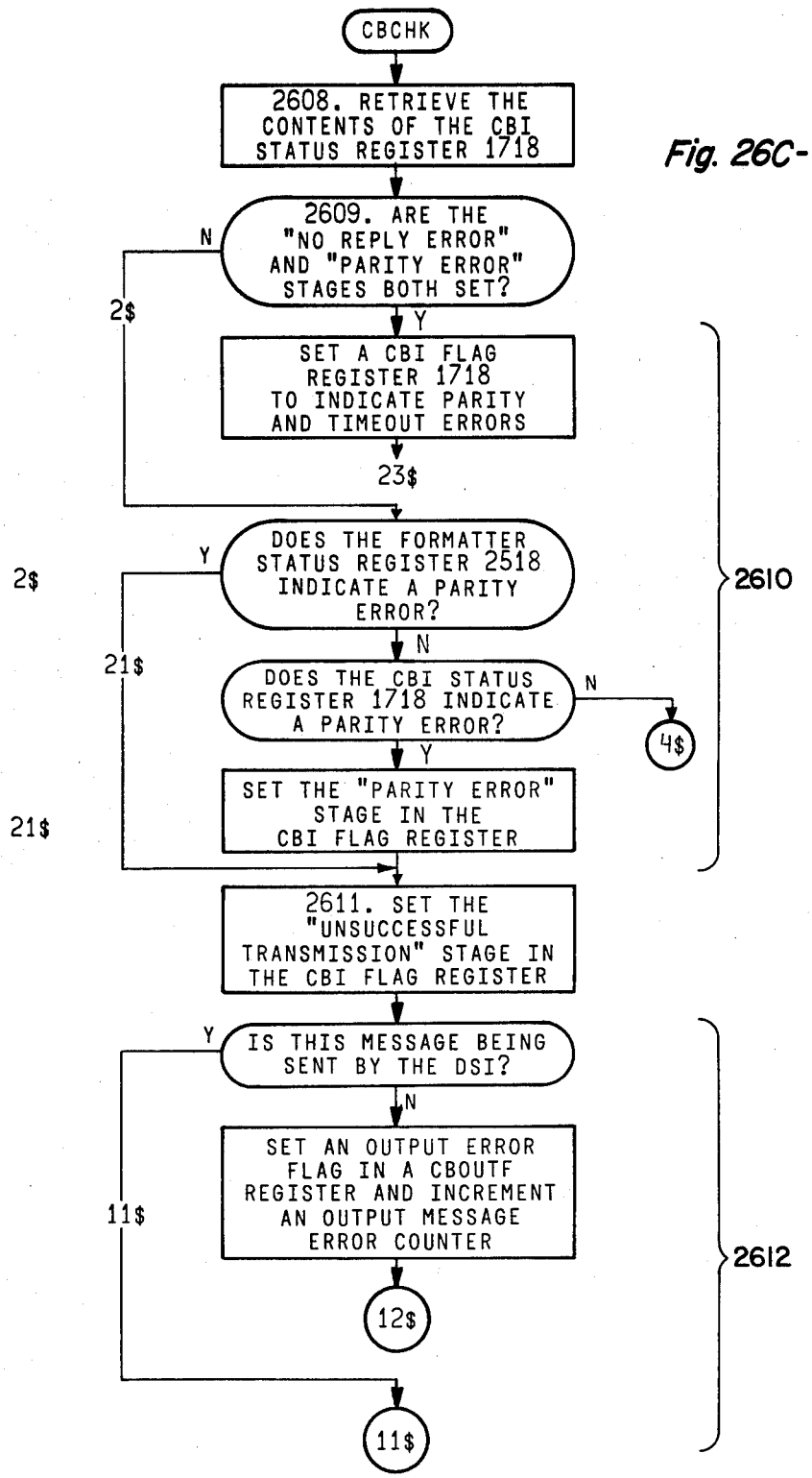
Figures 2, 26C:
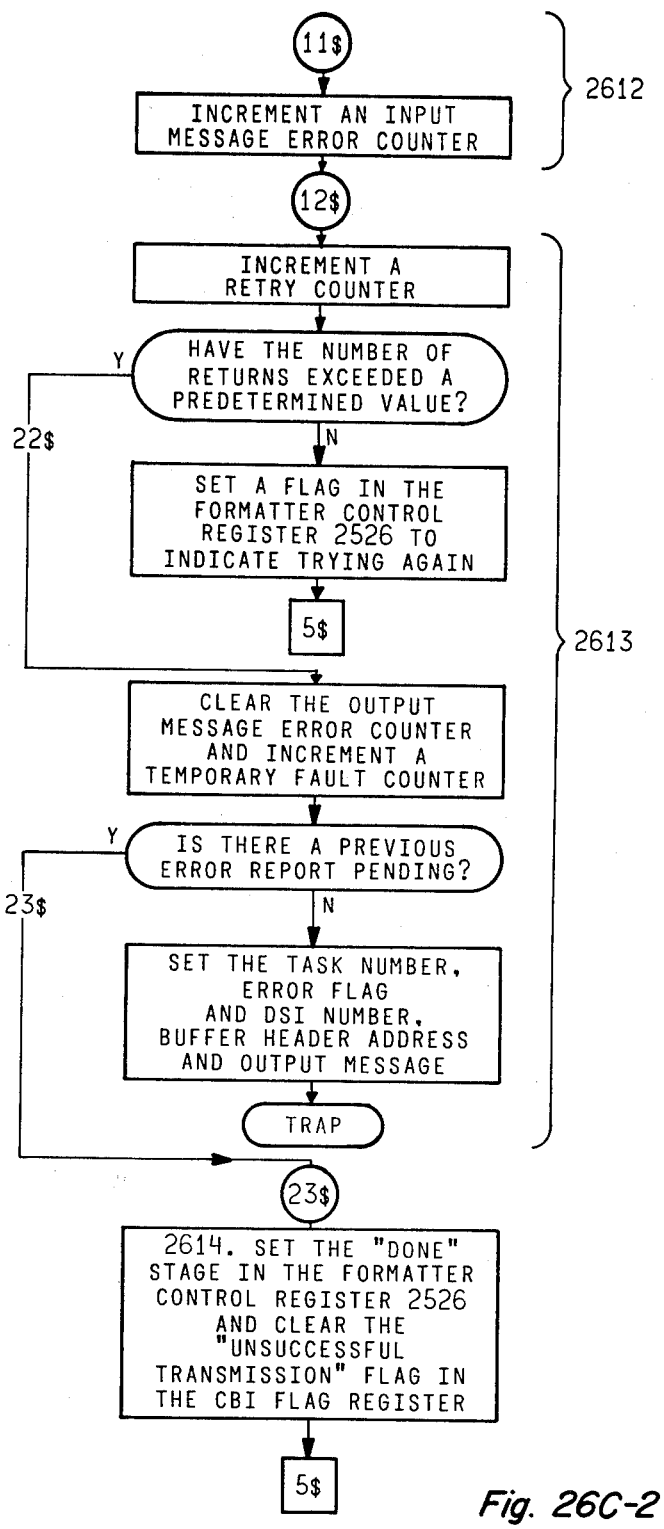
Figures 3, 26C:
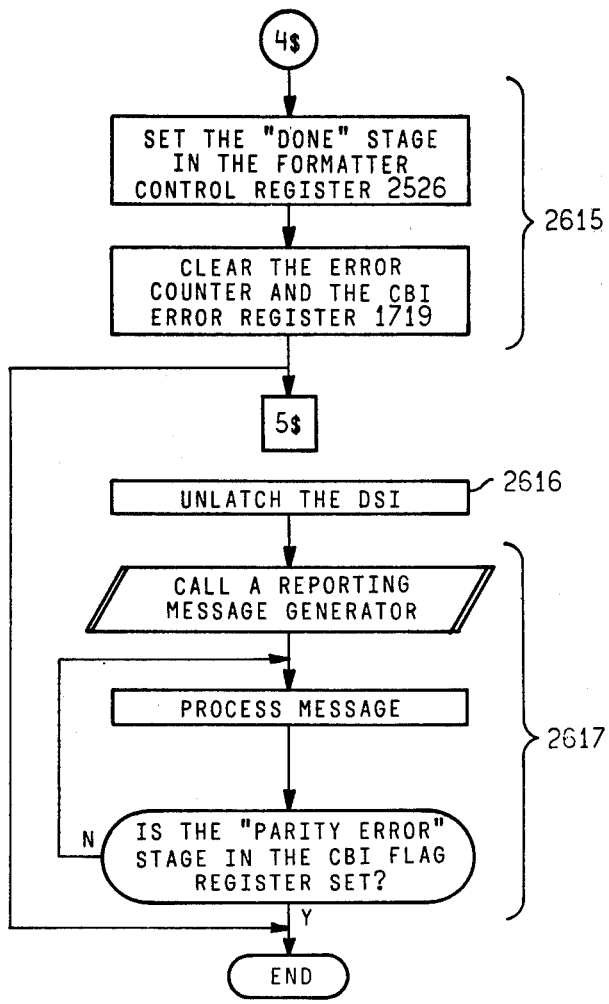

The CBCHK routine is shown in FIG. 26C-1 through 26C-3. It validates transmissions to and from the call processor bus interface by checking the status of both the call processor bus interface and the formatter. This module also handles error processing and terminates transmissions. Specifically, the CBCHK module checks the status of the call processor bus interface and the DSI currently latched to it. If no error is indicated, an error count flag and the error register in the call processor bus interface are cleared and the DONE message is sent to the latched formatter. If an error is indicated, the CBCHK system determines whether the retry limit, shown in step 41 (FIG. 11), has been reached. If it has not, the error counter is incremented and a retry is sent back to the latch device by setting the RESEND bit in the formatter control register. If the retry limit has been exceeded, then the call processor sends a message to the maintenance processor and terminates processing. Neither a RETRY nor a DONE signal is sent back to the formatter control register. Whether or not an error is indicated, the CBCHK routine then unlatches the DSI from the call processor bus interface.

Still referring to FIGS. 26C-1 through 26C-3, the CBCHK module, in step 2608, retrieves the contents of the CBI status register 1718 in FIG. 12 and tests it in step 2609. If the "NO REPLY ERROR" and "PARITY ERROR" stages are both set, steps 2610 in FIG. 26C also test parity error flags in both the call processor bus interface and the formatter to control the setting of the PE stage in the CBI FLAG register 2401. The unsuccessful transmission (TU) stage is set in step 2611. If the message is being sent to the DSI, steps 2612 cause an OUTPUT ERROR flag and OUTPUT ERROR counter to be set and incremented; otherwise, an INPUT MESSAGE counter is incremented. Steps 2613 then monitor the retry counters and perform necessary functions. If both a NO REPLY ERROR stage and a PARITY ERROR stage in the CBI status register 1718 (FIG. 12A) are set, or, if they are not but there is a previous error report pending, the call processor transmits a message to the formatter control register 2526 (FIG. 12B) with the DONE stage set and clears the unsucessful transmission flag. If the message is successful, then steps 2615 send the message to the control register 2526 in the formatter and clear the error counter and the error register 1719 (FIG. 12A). Then the message to unlatch the DSI is sent in step 2616 and a reporting message is sent in step 2617. When the validation has thus been completed, control returns to the CBIN module in FIG. 26B and, as the calling instruction in step 2607 is the last operation, control then returns back to the GODSI signal, in step 2600.

After the CBIN module has been processed, step 2620, in FIG. 26A, determines whether a valid transmission occurred. If it did, steps 2621 retrieve the message and process it. When the message has been completed or if the message was not properly received, step 2622 calls an UNQDSI routine in an attempt to transmit a message to the digital satellite interface.

Figure 26D:
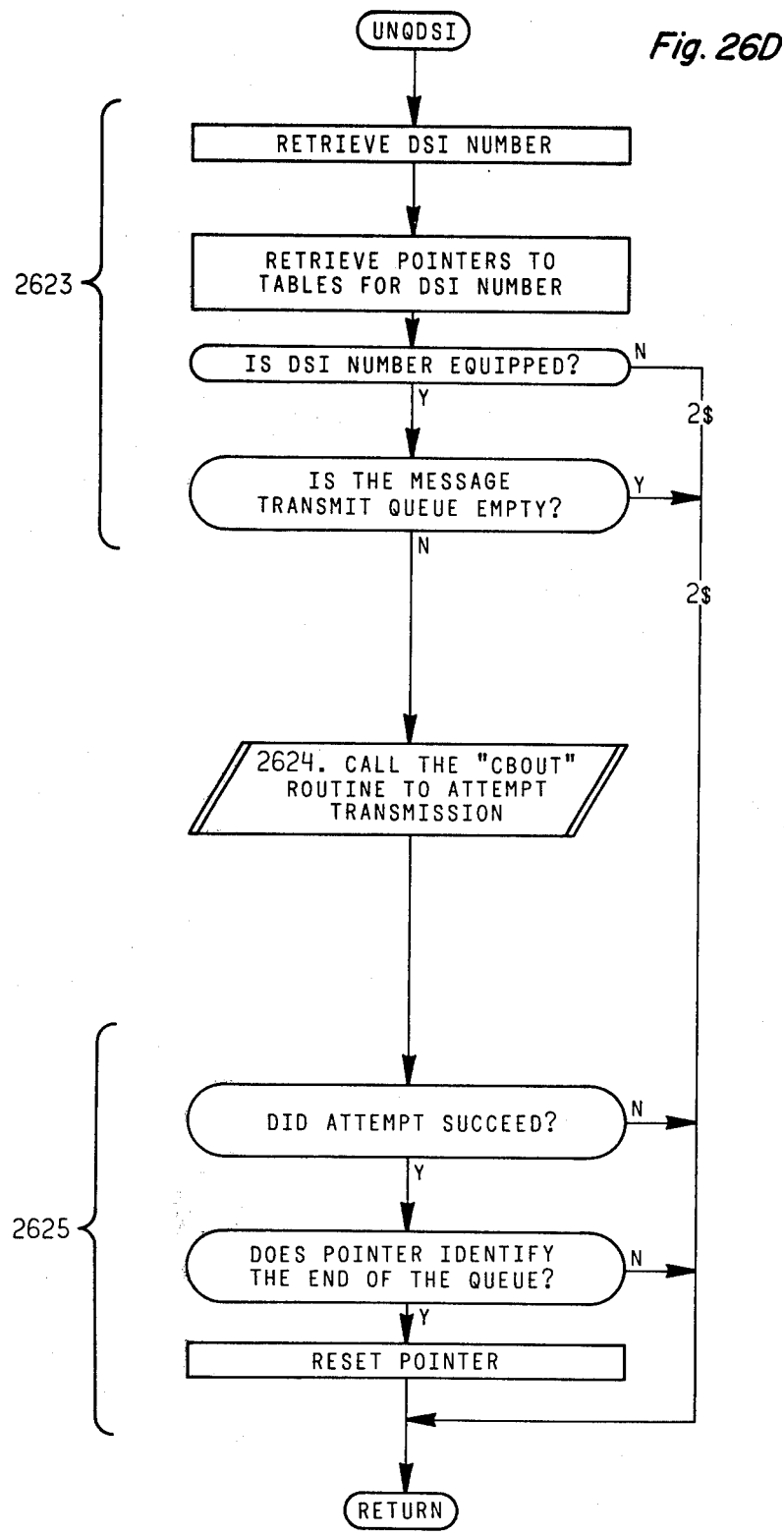

Now referring to FIG. 26D, the UNQDSI module computes the various parameters for the digital satellite interface, utilizing the DSI number and the SLN number in the appropriate register in equipment table 2403 (FIG. 24). After various tests in steps 2623, the system uses step 2624 to call a CBOUT routine to attempt a transmission to the DSI. When that transmission has been completed, steps 2625 analyze the results to determine if it was successful.

Figure 26E:
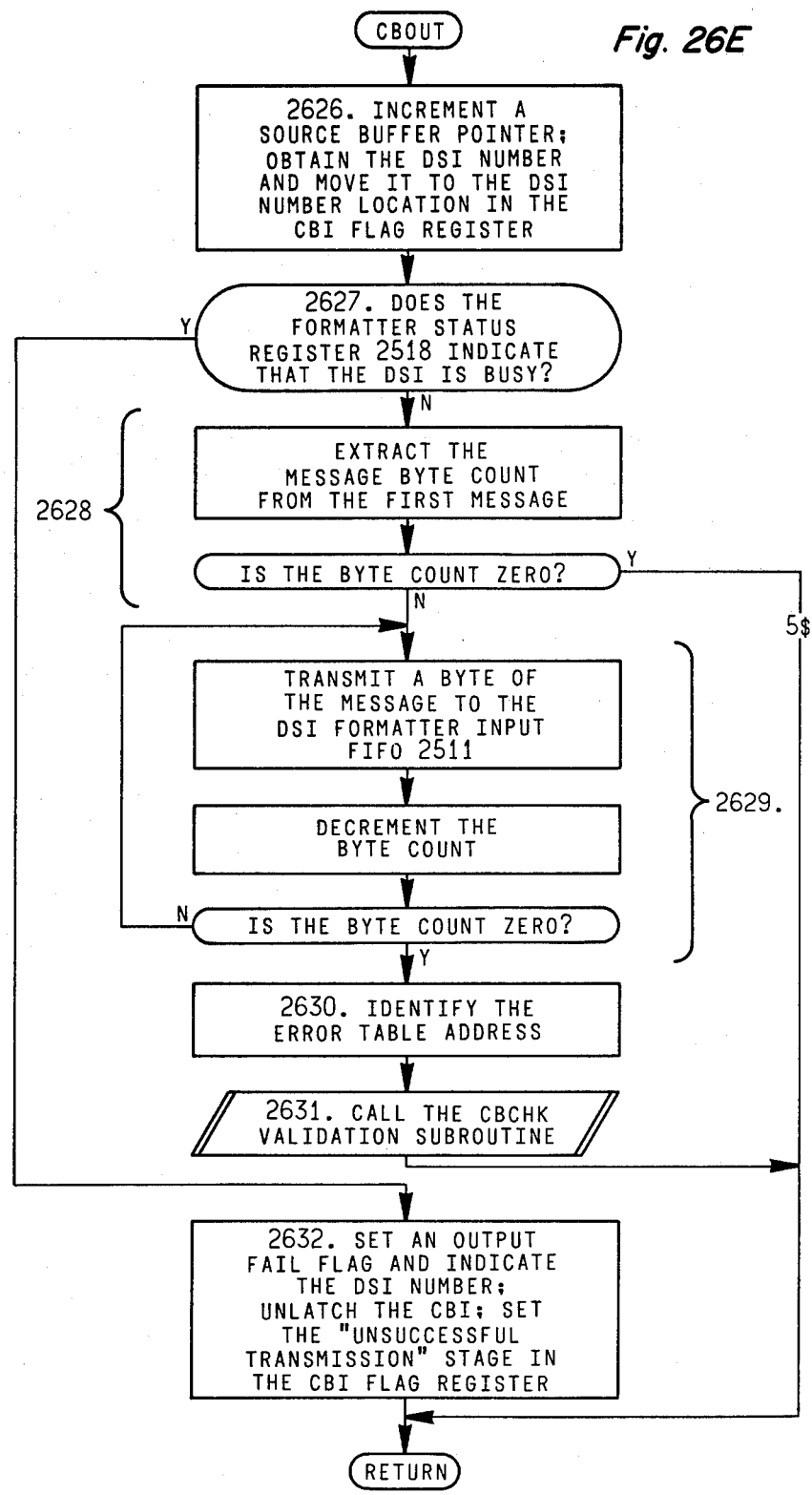

FIG. 26E depicts the CBOUT module that is called in step 2624 (FIG. 26D). This module transmits a message from the call processor to the attached DSI, provided the DSI is not busy. Particularly, it selects the DSI through the call processor but interface and reads its status register, as previously described. If the digital satellite interface is busy, the module terminates processing, indicating no transmission occurred. If it is not busy, then the message is loaded and then the CHCHK module is called to verify the transmission. The transmission is accomplished, as shown in FIG. 26E, by first obtaining the DSI number and moving it to the CBI FLAG register 2401 in step 2626. Then the formatter status register 2518 in FIG. 12B is read in step 2627, to determine if the DSI is busy. If it is not, the first message byte is examined to determine the number of bytes being transferred, in step 2628. Then the message is transmitted in steps 2629. When all the bytes have been transmitted, the error table addresses are identified in step 2630 so the CBCHK validation subroutine can be called, in step 2631. If that validation routine indicates that the transmission was not successful, then the TU flag in the CBI FLAG register 2401 is set in step 2632. If the formatter status register 2518 indicates that the designated digital satellite interface is busy in step 2627, control passes to step 2633 whereupon an OUTPUT FAIL flag is set, the call processor bus interface is unlatched, and the TU bit in the CBI register 2401 is set.

Figures 1, 26F:
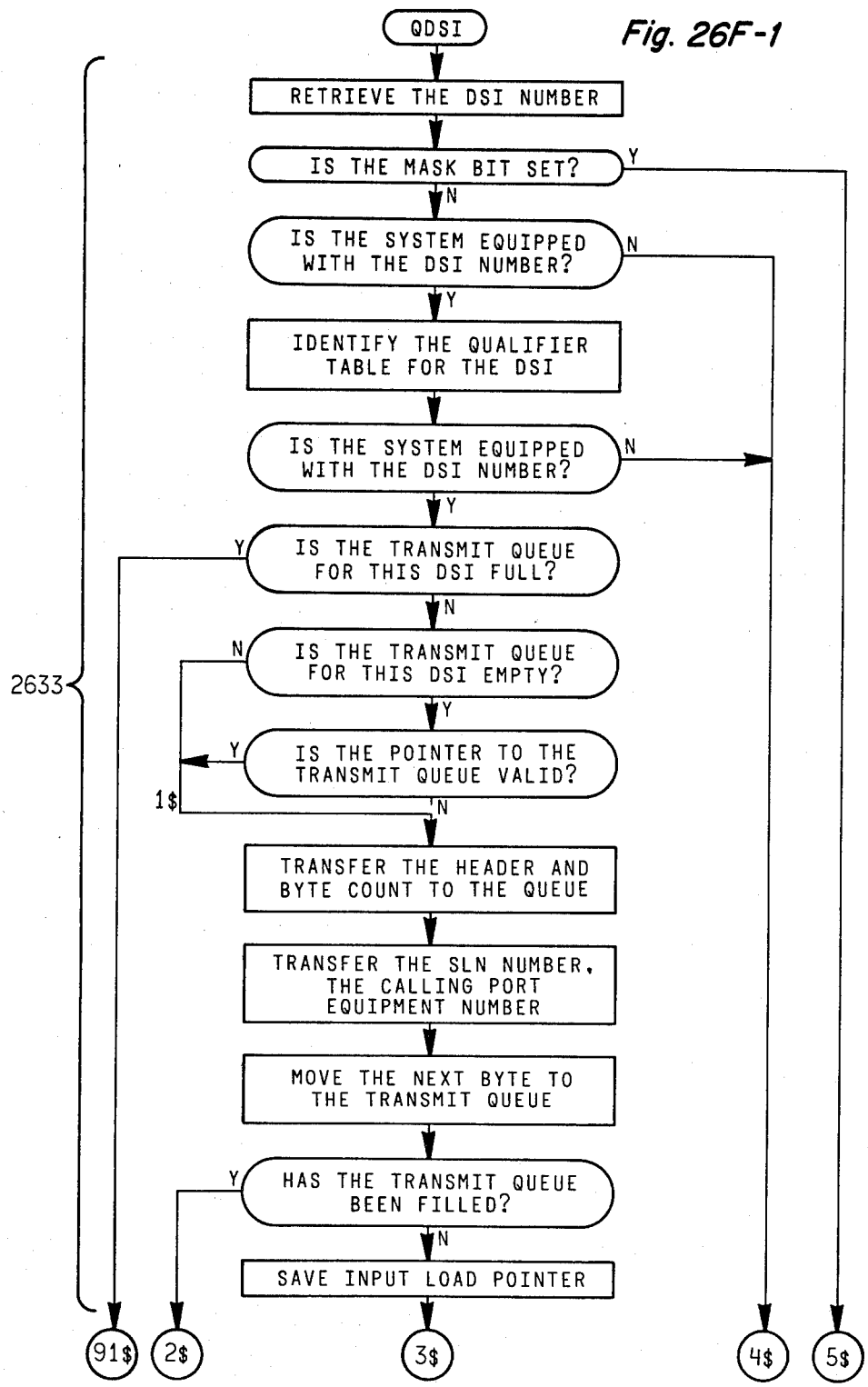
Figures 2, 26F:
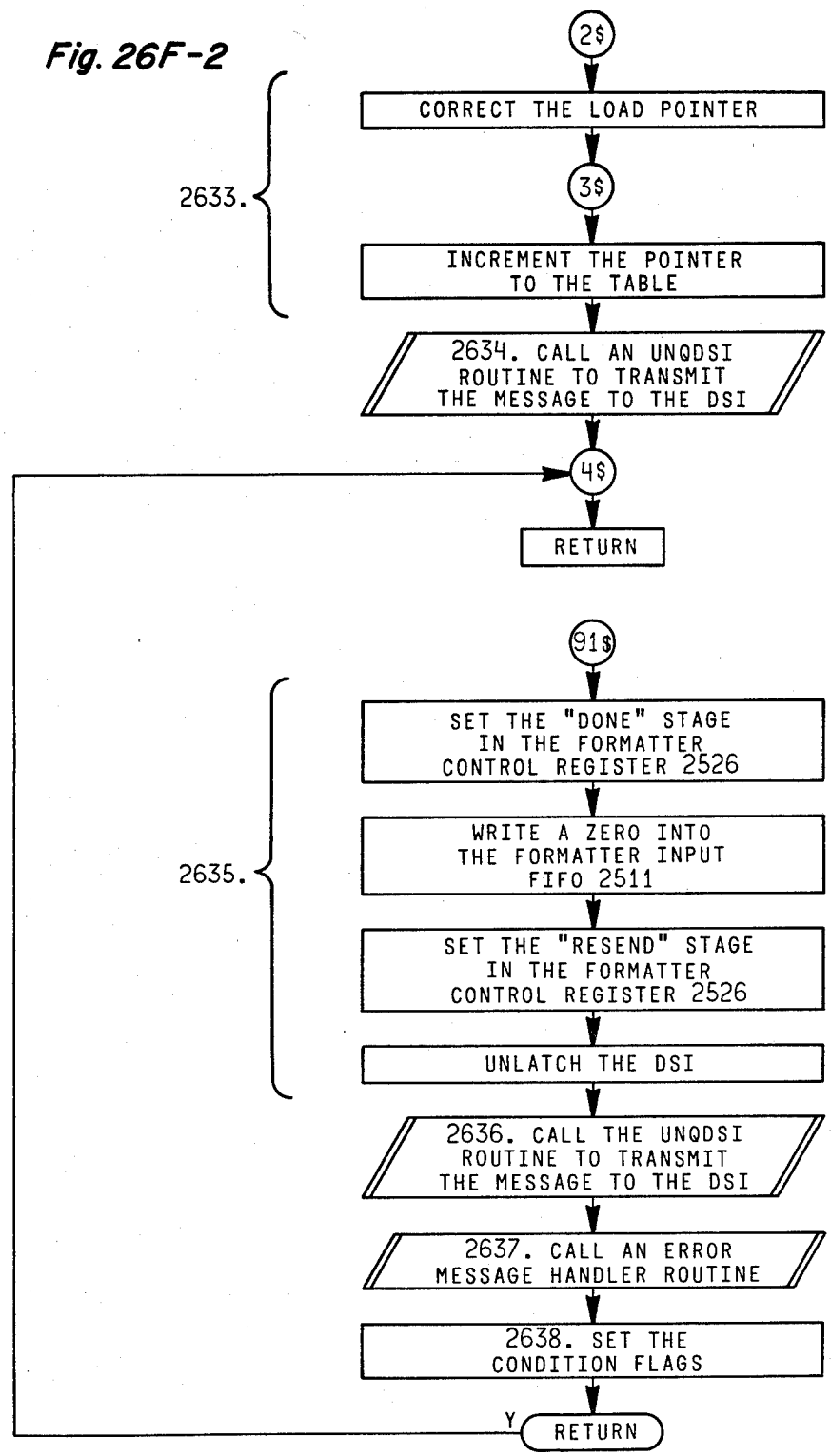

A QDSI module, as shown in FIG. 26, and in further detail in FIGS. 26F-1 and 26F-2 also can call the UNQDSI module in FIG. 26D. This module assembles a message and queues it for future transmission to the appropriate digital satellite interface. Specifically, it computes the transmit queue address page for the DSI in the call processor memory. Such queues are stored in transmit message buffer 2405 depicted in FIG. 24. If that queue is not full, then the message is assembled and stored with a load pointer and then the UNQDSI module, in FIG. 26E, is called to attempt a transmission. All the steps shown in FIGS. 26F-1 and 26F-2 and designated generally with reference numeral 2633 are used to identify the transmit queue, obtain the necessary pointers, and determine if the queue is empty or full. In step 2634, the UNQDSI routine, detailed in FIG. 26D, is called to attempt a transmission and, upon completion, the QDSI module terminates. If, during steps 2633, it is found that the transmit queue for the DSI is full, then steps 2635 send a message to the formatter control register 2526 (FIG. 12B) to set the DONE stage and write "0" into the formatter input FIFO 2511 and set the RESEND stage in the formatter control register 2526 before unlatching the DSI. The system again calls the UNQDSI routine in step 2636 in an attempt to transmit a message and then calls an error message handler in step 2637, and sets various condition flags in step 2638, before returning to the calling routine.

Figure 26G:
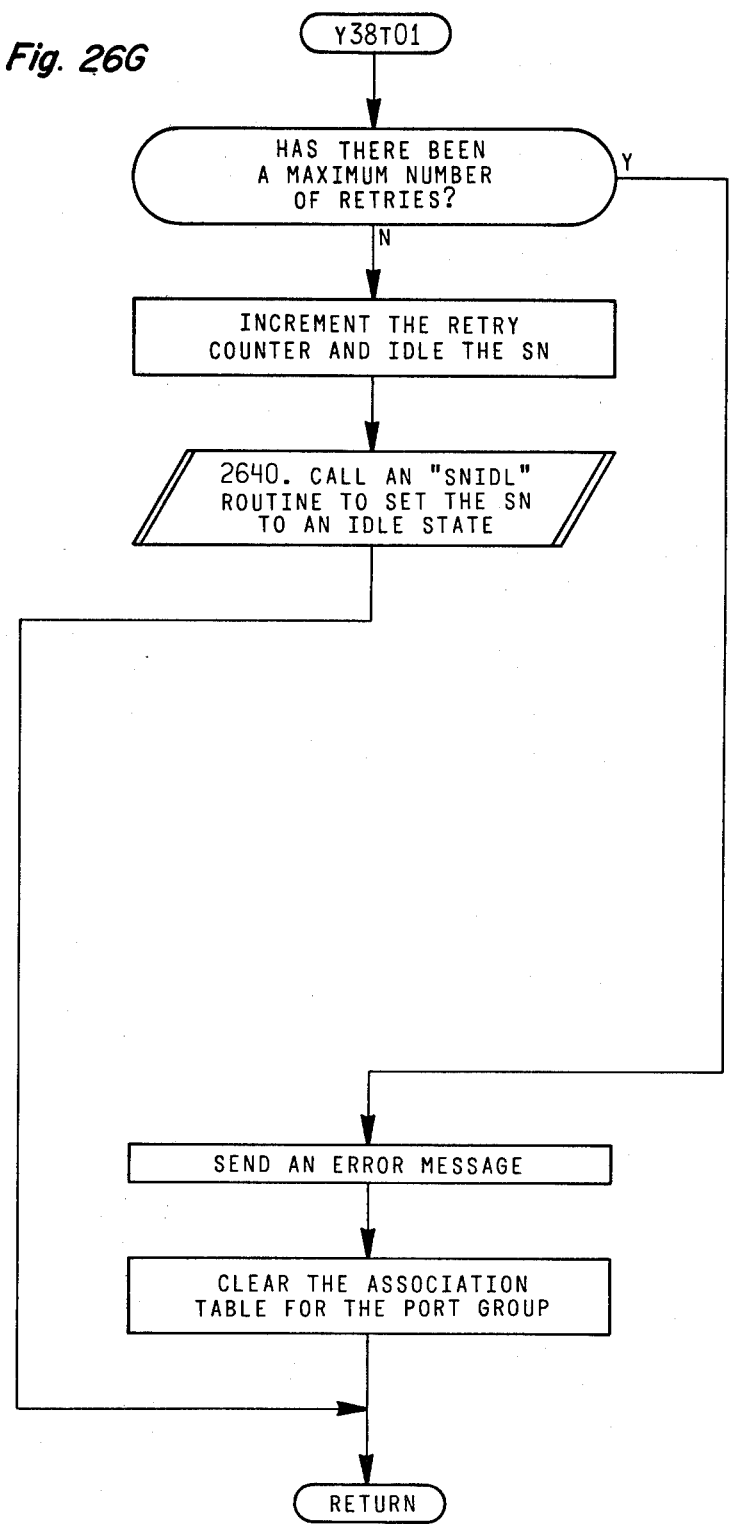
Figure 26H:
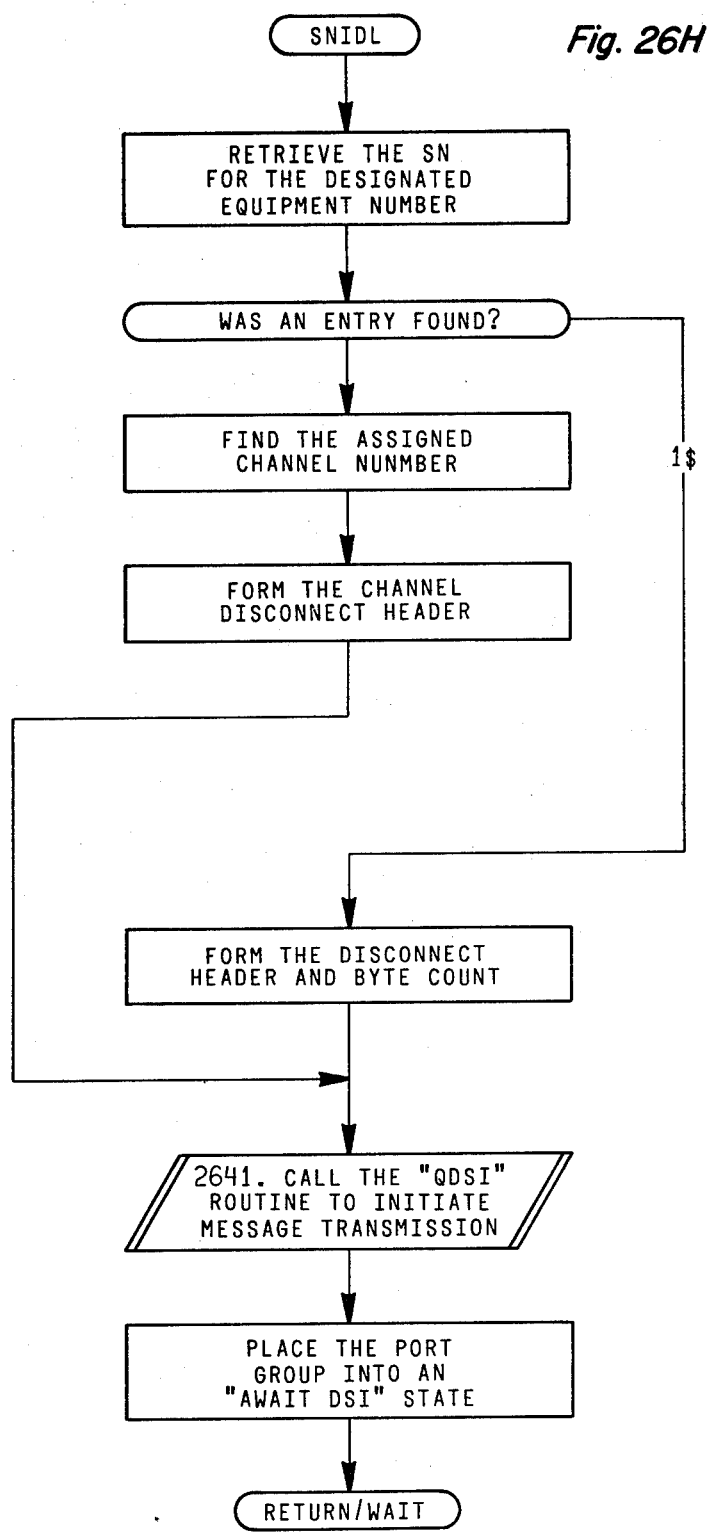

One routine that can call the QDSI module, in FIGS. 26F-1 and 26F-2, is a Y38T07 routine, shown in FIG. 26G. This module handles time-out transitions from an initial AWAIT DSI CALL state and attempts to release the SEND MESSAGE TO DSI flag. If it cannot, an error message is sent to the maintenance processor and the port group number is idled. Various steps are shown in FIG. 26G. Step 2640 calls an SNIDL routine to set the SEND MESSAGE register to an idle state. The SNIDL module is shown in FIG. 26H. Using this routine, either the DISCONNECT or CHANNEL DISCONNECT messages shown in FIG. 9 can be sent and, in step 2641, the QDSI routine is called to initiate the transmission of this message. The SNIDL module then places the port group into an AWAIT DSI state.

Figure 26I:
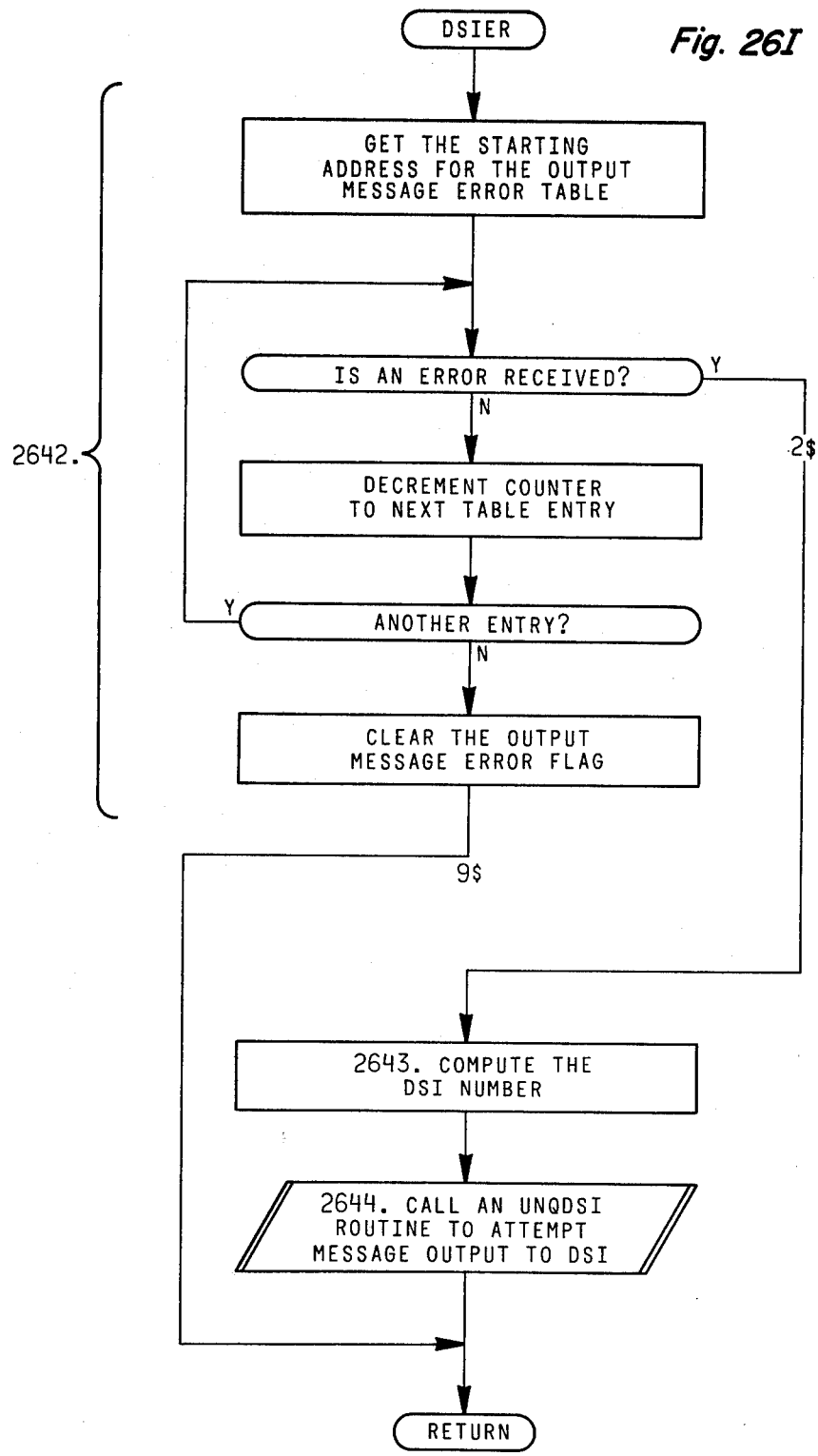

A DSIER module shown in FIG. 26I also can call the UNQDSI module. The DSIER module checks the error counter pointer for each DSI. If the DSI has an active error, the DSIER module calls the UNQDSI module to attempt to resend the last message. Specifically, steps 2642 determine whether a particular digital satellite interface has an error message. When an error is detected, step 2643 computes the DSI number and, in step 2644, the UNQDSI module is called to attempt to transmit a message to the DSI.

Figure 26J:
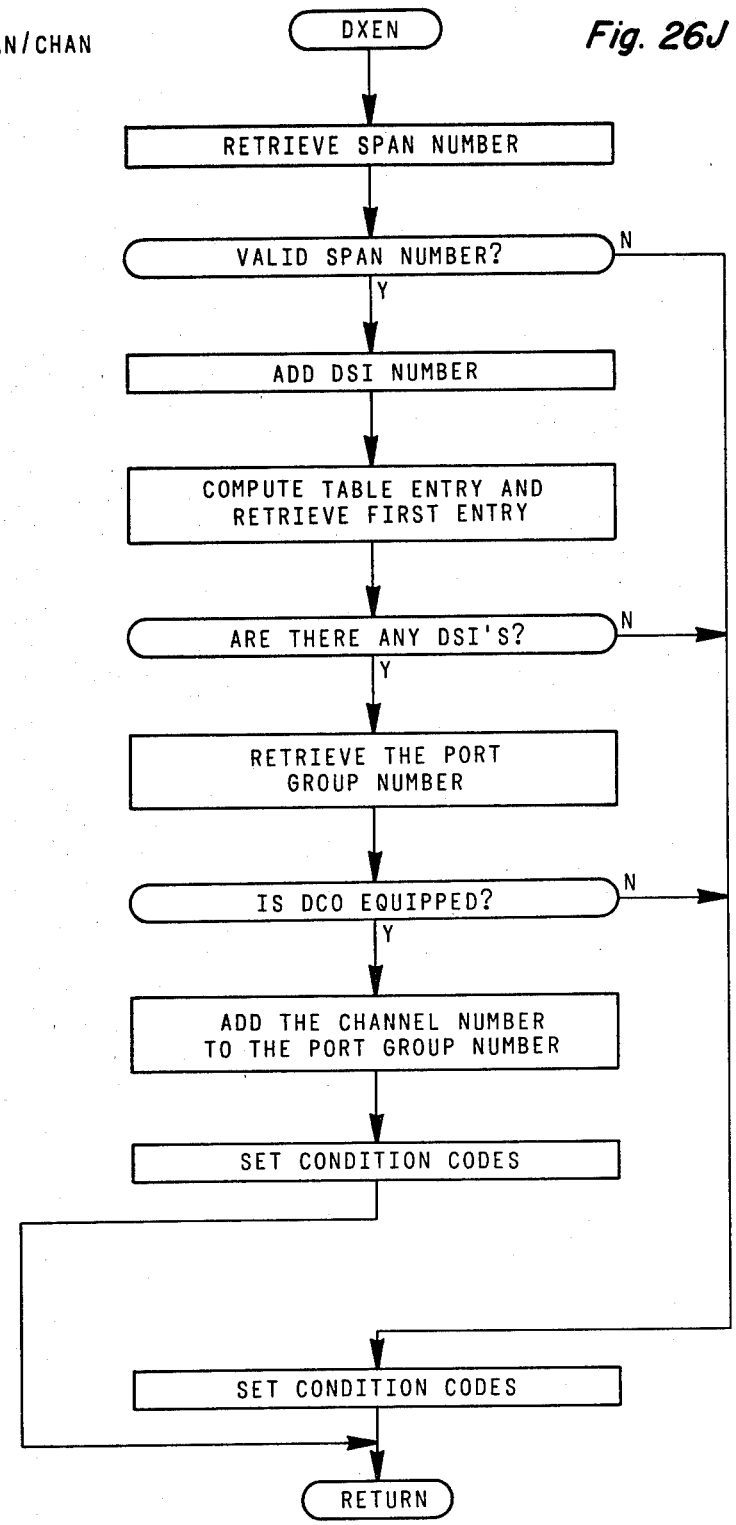

FIG. 26J illustrates a DXEN module which the GODSI module can call during the processing of a particular message. This module converts the span and channel numbers and the DSI number from the ORIGINATE message into an equipment number utilizing the DSI port group assignment table 2402 (FIG. 34). Equipment numbers, their organization and use are described in U.S. patent application Ser. No. 924,883.

Figure 26K:
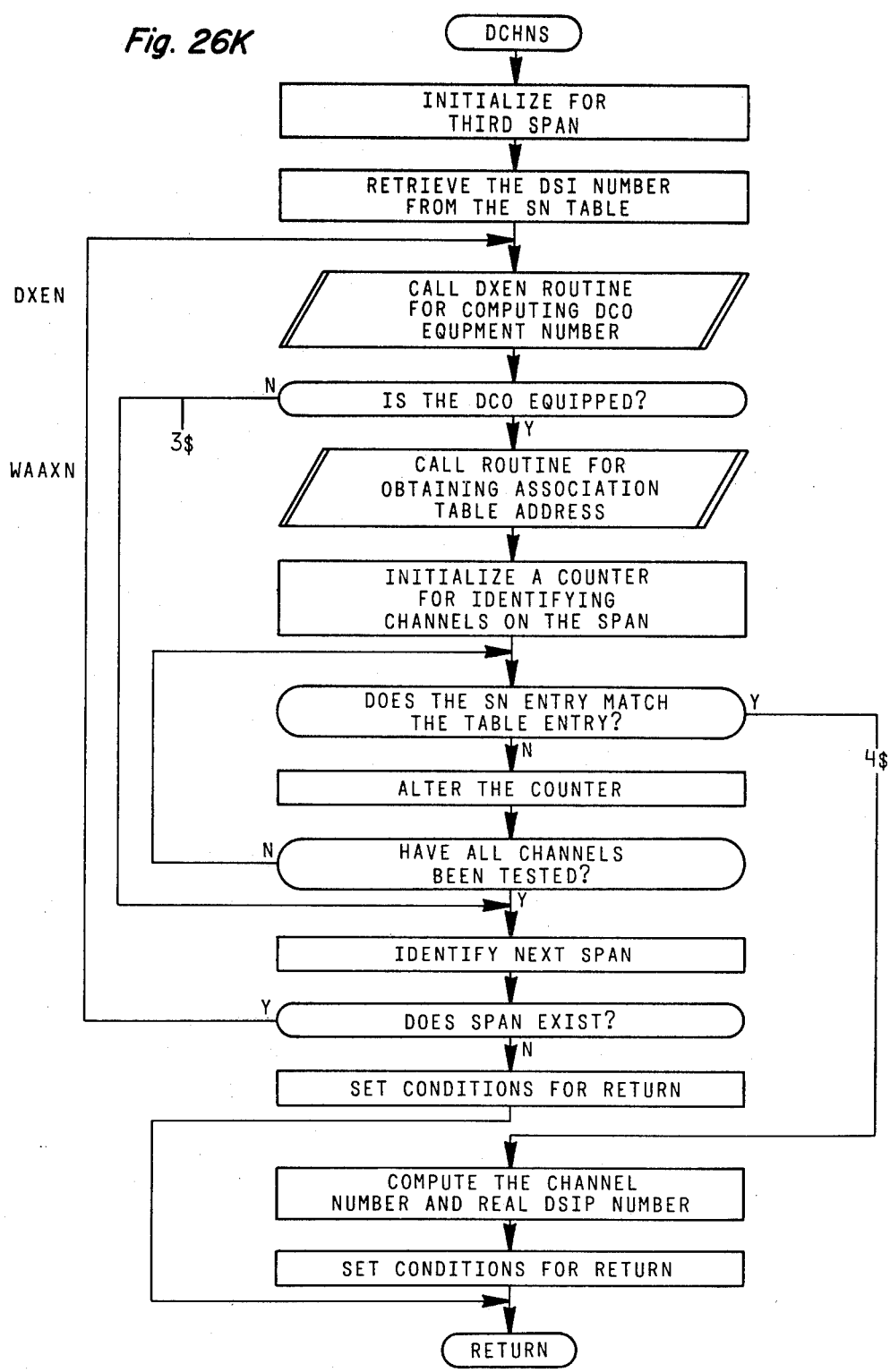

A DCHNS module in FIG. 26K utilizes a given SN entry in the equipment table 2403 in FIG. 24 to find an associated entry on the DSI port group assignment table 2402. Specifically, this module retrieves the entry from the port group assignment table and uses the location to ascertain the correspondence to a span and channel number and DSI number. It then retrieves the associated SN number from the equipment table. When a match is found, then the associated address can be converted into the appropriate equipment number. Channels in each span are compared independently.

Figure 26L:
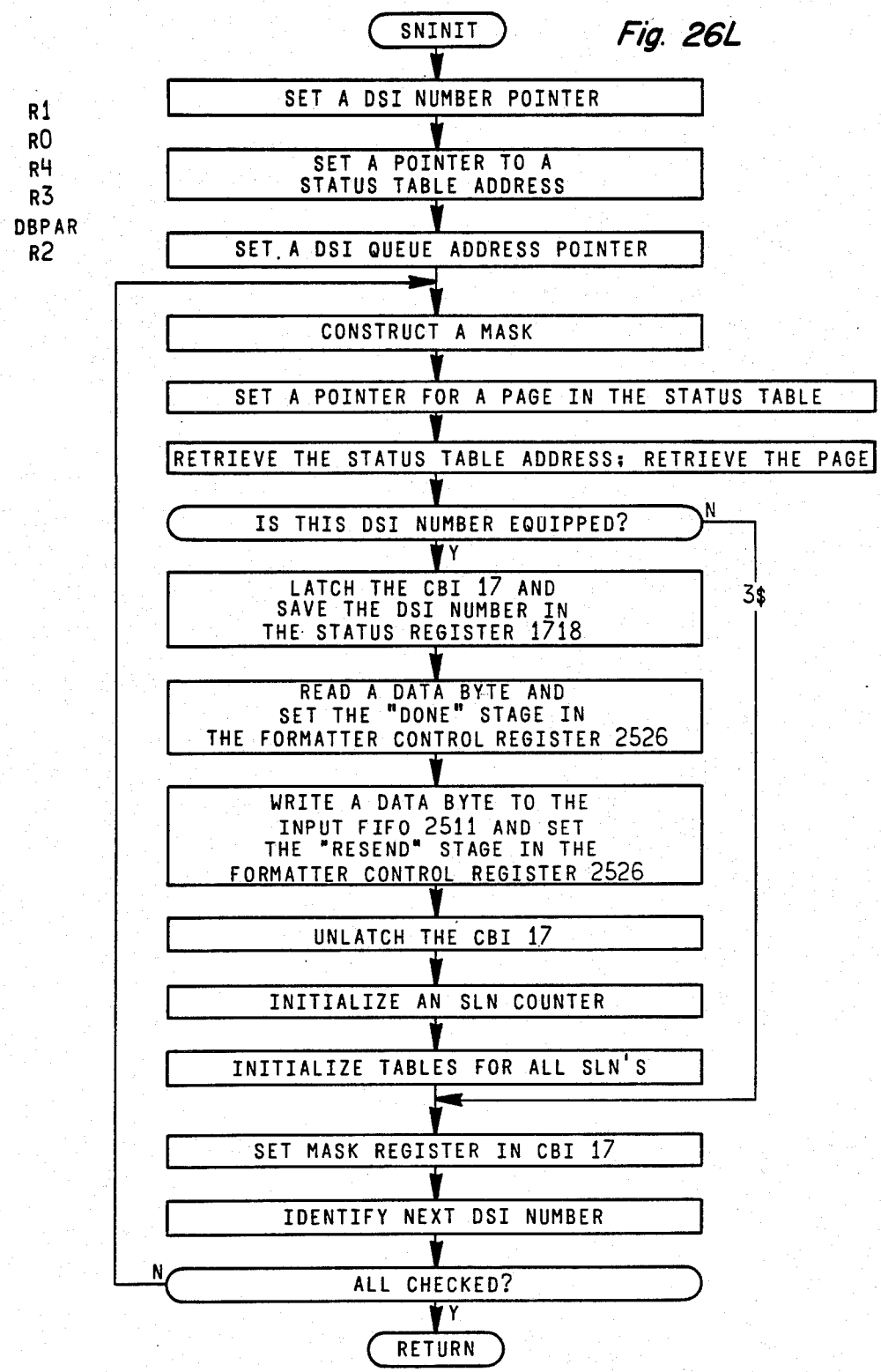
Figure 26M:
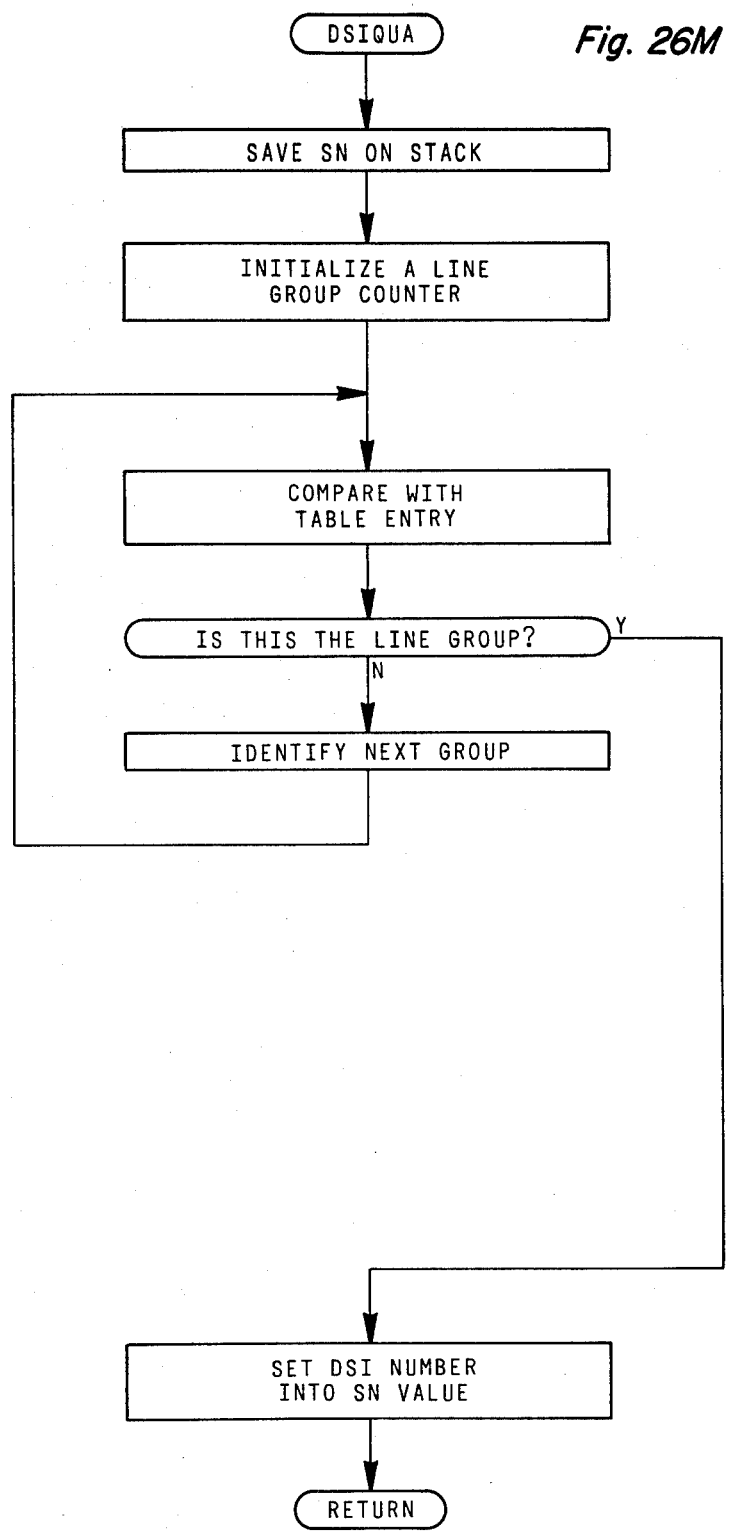

FIG. 26L discloses an initialization program module SNINIT. This program initializes a digital satellite interface and all the satellite line numbers during startup. Specifically if, in initializing a DSI number, it is found that no corresponding digital satellite interface exists, then the mask in the call processor bus interface is set. If equipment does correspond to the DSI number, the mask is set to allow service. Then each of the digital satellite interfaces is initialized by a latching operation, reading a byte from it, sending a message to the formatter control register indicating that it is done, and then unlatching the call processor but interface when all the digital satellite interfaces have been completed. Then the status for all satellite line numbers associated with that call processor but interface are set to an idle state. The DSIQUA module, shown in FIG. 26M, computes a remote line group in the digital satellite unit as a qualifier for a given satellite line number by finding the line group number and then combining the DSI number with the line group number.

The DCHNP module in FIG. 26N computes a DSI channel number given its equipment number. Specifically, the common control, matrix switch, and port group numbers are extracted from the equipment number. This value is used as an index to DSI port group assignment table 2402 in FIG. 24. The complete channel identification is obtained by concatenating the port number for the equipment number to be retrieved based upon the address in table 2402 that contains the matching data.

Thus, the foregoing description of FIGS. 26 through 26N indicates the types of operations tht occur in a call processor in order to effect communications between the call processor and a digital satellite interface. It will be apparent that other arrangements and other sequences may also be used to produce such transfers.

5. Buffer 29

The buffer 29 (shown in FIG. 4 and in more detail in the Block Diagram in FIG. 14) provides an interface between the DSI processor 27 and the respective span 1 equipment 22 and span 0 equipment 21. With reference to FIG. 14, the buffer receives data and control signals from the processor 27 in a processor interface 2915, and transfers them, in response to control signals from receive output control 2914, to one of a span 0 transmit 2910 or span 1 transmit 2911 for transfer to span 0 equipment 21 or span 1 equipment 22. Similarly, buffer 29 receives signals from the span 0 equipment or span 1 equipment in a span 0 receive 2912 or span 1 receive 2913 in response to enabling signals from the receive output control 2914 and strobe signals from the processing interface. The data signals from the receive 2912 or 2913 are transferred to the processor interface 2915, which transfers them to processor 27.

Since span 0 transmit 2910 and span 1 transmit 2911 are identical, only span 0 transmit 2910 will be described. Similarly, span 0 receive 2912 and span 1 receive 2913 are identical, and only span 0 receive 2912 will be described.

Figure 27A:
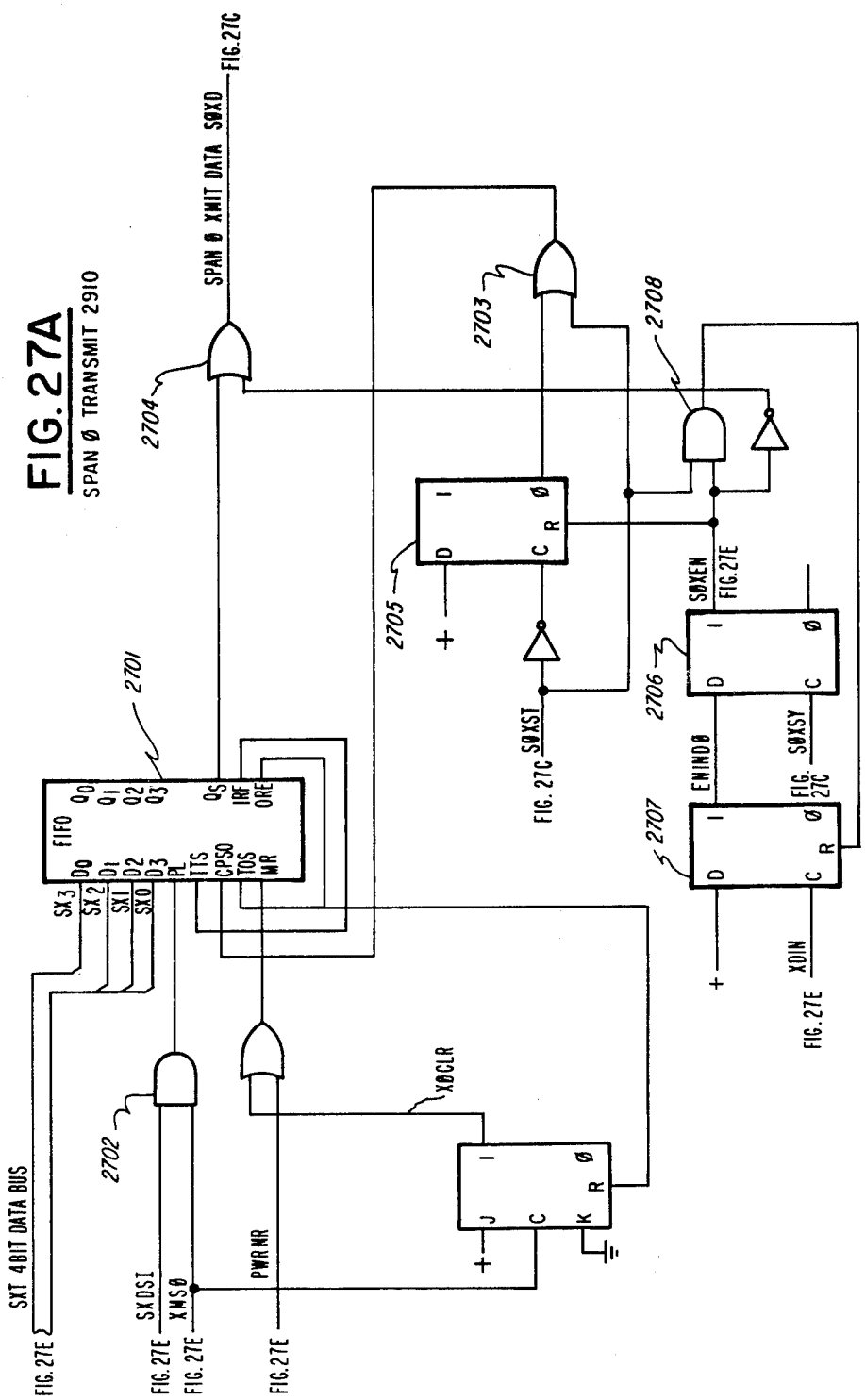

With reference to FIG. 27A, span 0 transmit 2910 receives the four SXT (span transmit) signals SX3-SX0 in prallel in a FIFO 2701. The SXT bus signals SX3-SX0, which are derived from signals received from processor 27, are clocked into the FIFO 2701 when an AND gte 2702 is energized. AND gate 2702 is energized when an SXDSI (shift in strobe) signal is asserted and an XMSO (transmit span 0) enabling signal is asserted. The SXDSI shift in strobe and XMSO signals are controlled by the processor 27 and are received from processor interface 2915 (FIG. 27E). The SX3-SX0 signals in stored FIFO 2701 are shifted out in response to the energization of an OR gate 2703, which is energized in response to an S0XST (transmit strobe) signal from the receive output control 2914 (FIG. 27C).

Figure 29A:
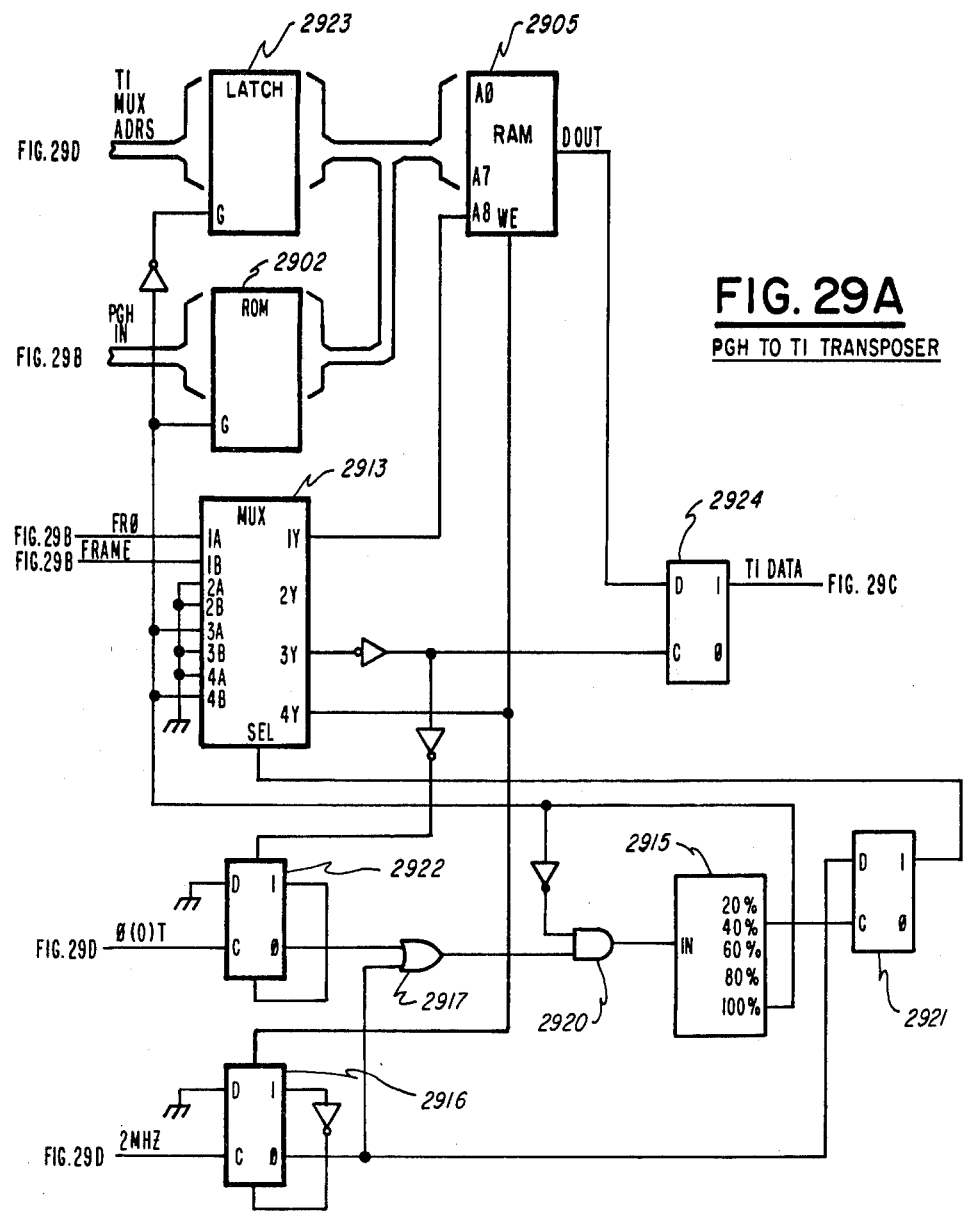
FIG. 29, together with FIGS. 29A through 29D, constitute a detailed logic diagram of the transmitter portion of the span equipment shown in FIG. 28 and FIGS. 29E and 29F are truth tables useful in understanding the operation thereof.

The signals stored in FIFO 2701 are shifted out serially through a QS output and an OR gate 2704 as an S0XD (span 0 transmit data) signal. A flip-flop 2707 is set in response to an XDIN transmit data in signal which is asserted in synchronism with the input of data on the SXT bus from the processor interface 2915 (FIG. 14 and FIG. 27E). This asserts an ENIND0 (enable input data 0) signal which sets a flip-flop 2706 in response to an S0XSY (span 0 transmit synchronization) signal from receive output control 2914 (FIG. 27C). The S0XSY signal is generated in response to a BTSY0 signal from driver 2710 (FIG. 27C), the BTSY0 signal being a synchronizing signal from the span equipment (FIG. 29D). The resulting signal, an S0XEN (span 0 transmit enable) signal, provides an overriding reset signal to a flip-flop 2705 which in turn energizes an OR gate 2703. The energization of OR gate 2703 causes the FIFO 2701 to transmit a bit of data through the QS serial output line. When an S0XST signal (span 0 transmit strobe) signal is next asserted, in response to a BTST0 signal from the span 0 equipment not being asserted, an AND gate 2708 will reset flip-flop 2707. The BTST0 signal is a strobing signal from the span equipment transmitter, which is discussed below (FIG. 29D). The S0XD (span 0 transmit data) signal is transferred to the span 0 equipment or BTDT0 signals (FIG. 29D) for insertion into the T1 signal.

Figure 27C:
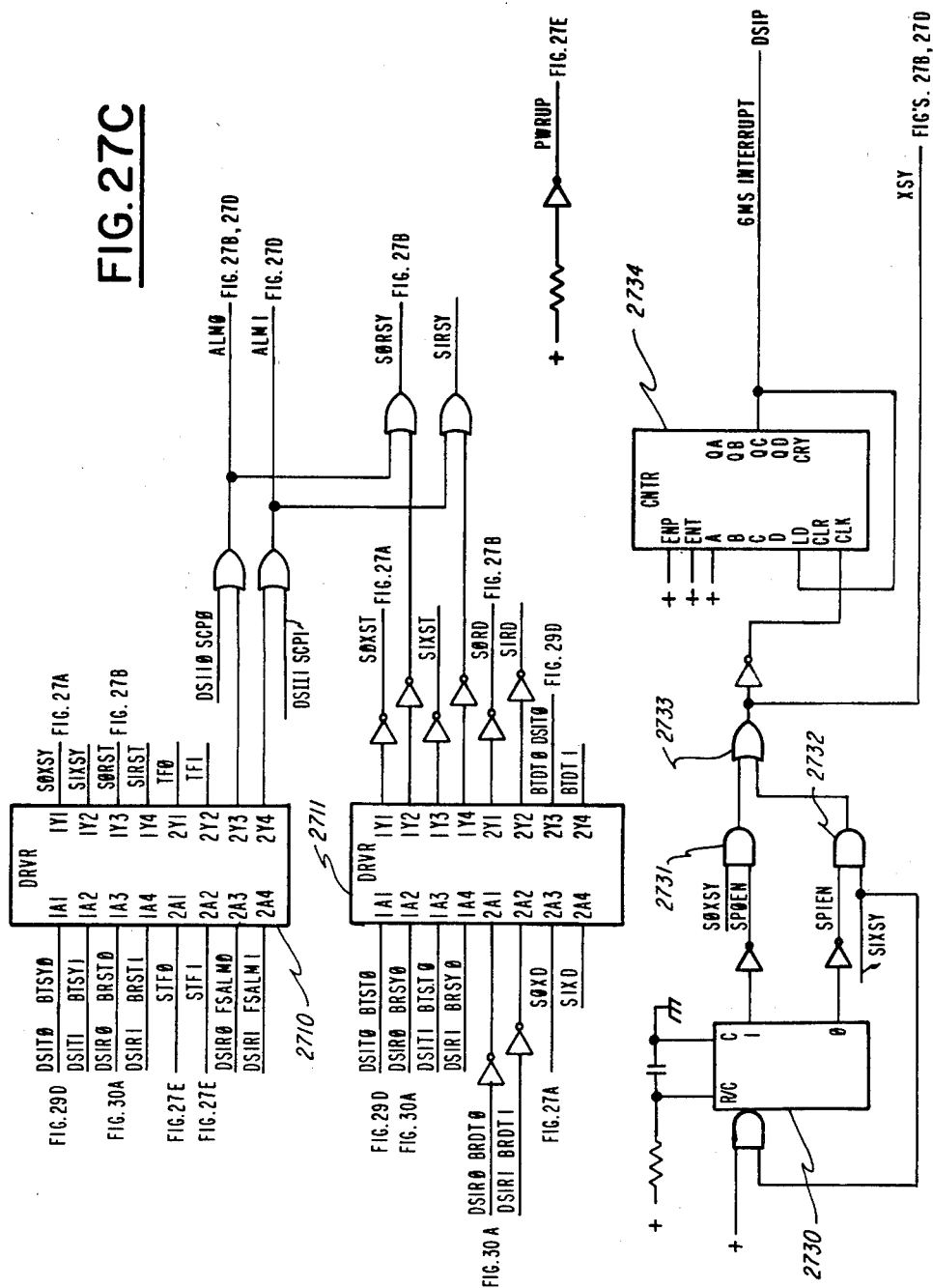

With reference to FIG. 27B, the span 0 receive 2912 includes a FIFO 2720 which receives a S0RD (span 0 read data) signal serially from driver 2711 (FIG. 27C). The S0RD signal is received in response to BRDT0 data signals received from the span 0 equipment (FIG. 30A). The data signals are received and clocked into FIFO 2720 in response to S0RST (span 0 receive strobe) signals from driver 2710, which also are generated in synchronism with the BRST0 strobe signals from the span receiver (FIG. 27C). The received data signals are shifted out of FIFO 2720 through parallel outputs Q0-Q3 as SR3-SR0 signals respectively, and placed on the respective lines of the SRD (span receive data) bus 2721. The SR3-SR0 signals are shifted out, enabled by an AND gate 2722 energized by an S0SEL (span 0 select) signal from receive output control 2914 (FIG. 27D) if an ALMO alarm signal (FIG. 27C) is not asserted. The SR3-SR0 signals are transferred out of FIFO 2720 by a clocking signal constituted by the trailing edge of an SRSO shift out signal if the S1 SEL signal is not asserted.

The S0RST receive strobe signal also clocks a counter 2723. The carry output of counter 2723 sets a flip-flop 2724, which in turn sets a flip-flop 2725 when the counter reaches the next QD output. The set flip-flop 2725 asserts an S0RMR (span 0 received message ready) signal. The setting of the flip-flop 2725 stops the counter 2723, which is cleared in response to an S0RSY (span 0 receive sync signal) from FIG. 27C.

Figure 27D:
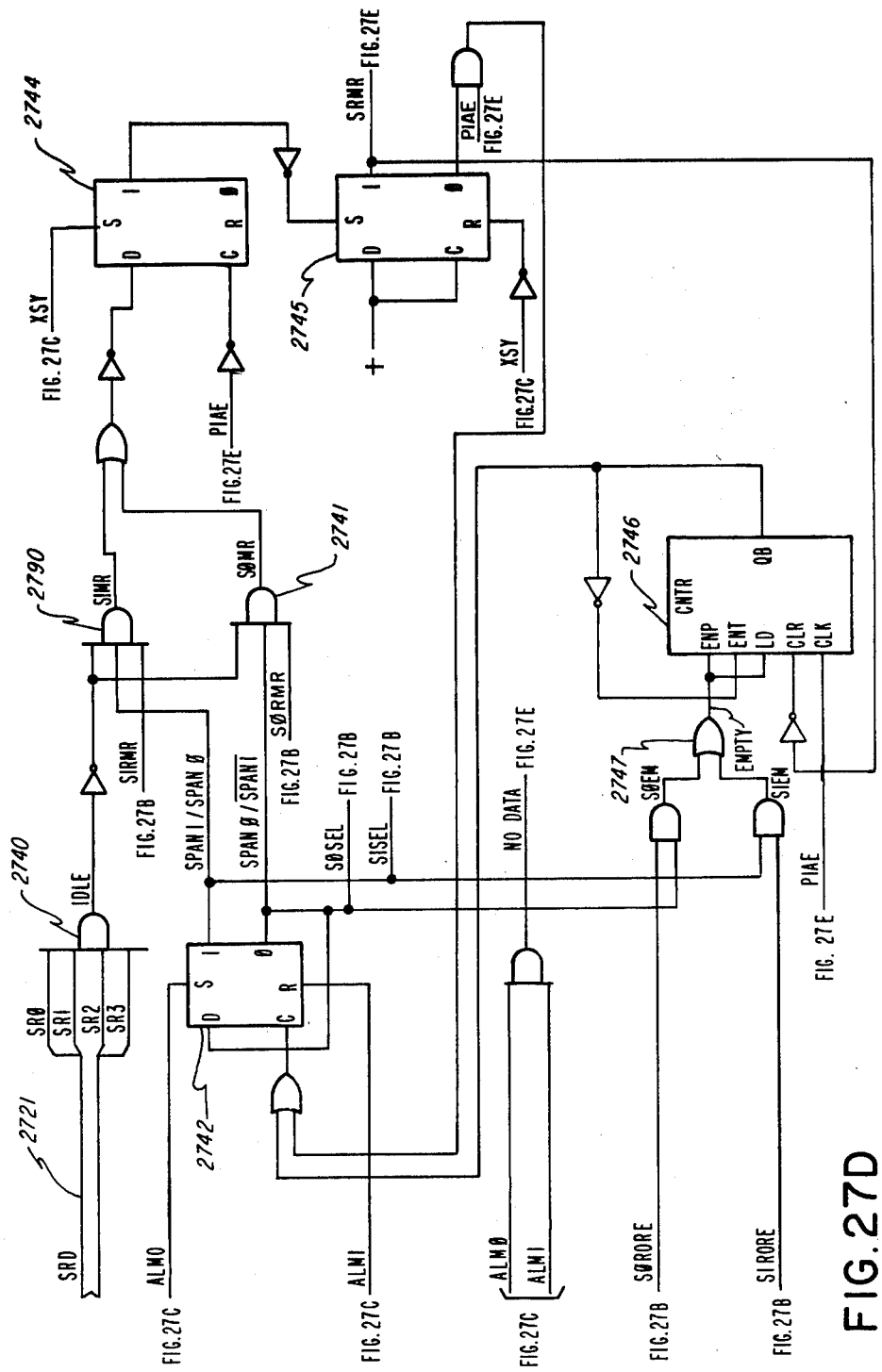
Figure 27E:
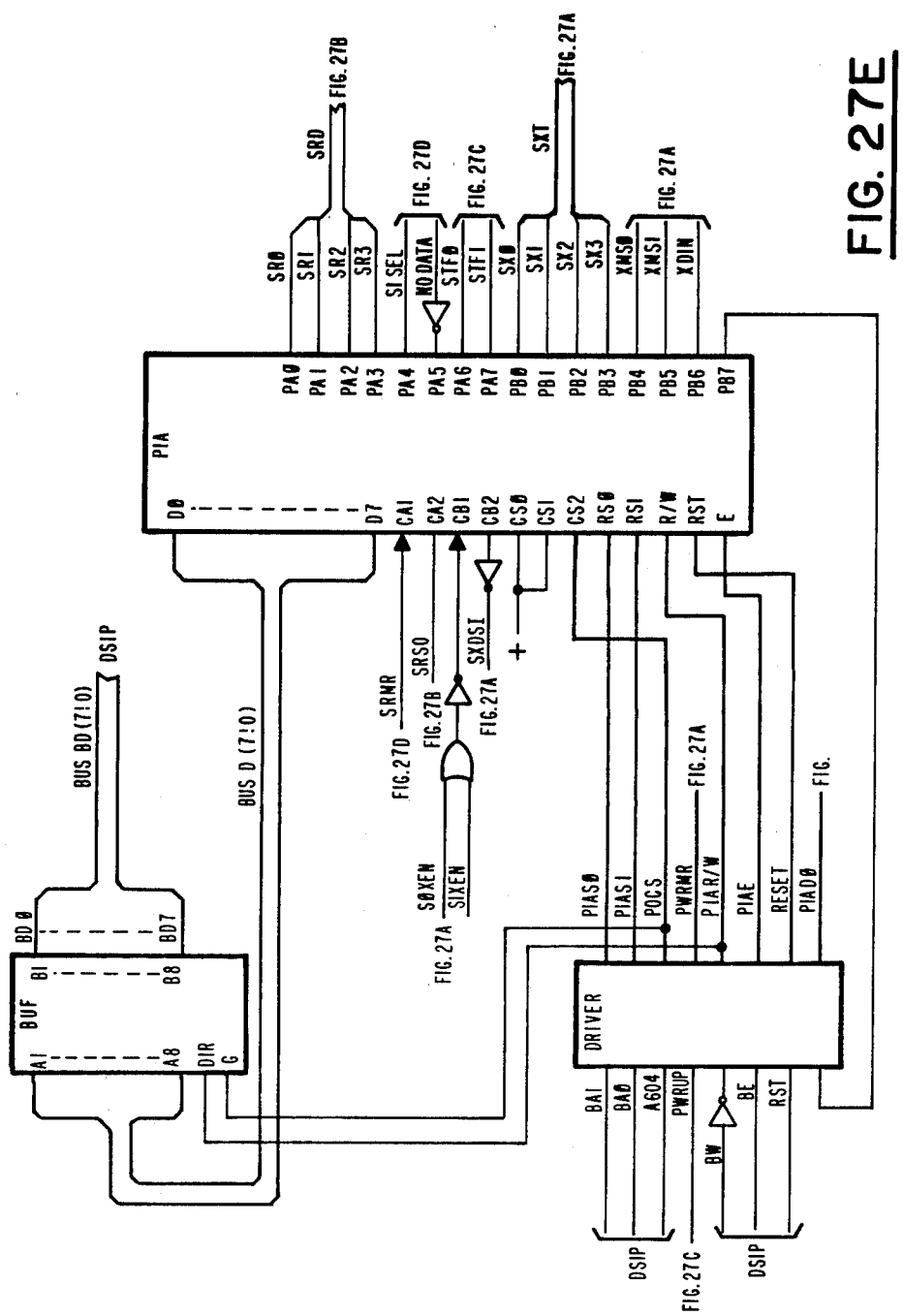

FIGS. 27C and 27D contain circuitry in the receive output control 2914. Drivers 2710 and 2711 (FIG. 27C) receive various timing and control signals from the respective span 0 equipment for distribution to the buffer 29 span 0 transmit and receive described previously with respect to FIGS. 27A and 27B. Additionally, the receive output control generates a 6MS interrupt signal that is transmitted to the DSI processor 27. A flip-flop 2730 asserts one of the SP0EN or SP1EN enabling signals to pass the corresponding S0XSY or S1XSY (transmit synchronizing) signal through AND gates 2731 or 2732. This energizes an OR gate 2733 to assert the XSY transmit synchronizing signal which resets flip-flops 2724 and 2725 on FIG. 27B, and clocks a counter 2734 (FIG. 27C). When the counter reaches its QC output, the 6MS INT (six millisecond interrupt) signal is asserted, which also reloads the counter 2734.

The circuitry shown on FIG. 27D serves to toggle between span 0 receive and span 1 receive until one of them has received a message, as indicated by the S0RMR signal (FIG. 27B).

With reference to FIG. 27D, if all of the SR0-SR3 lines forming SRD receive data bus 2721 are energized (in the embodiment depicted in FIG. 27D, the signals carried by SRD 2721 are ground assertion signals), an AND gate 2740 asserts an IDLE signal, the complement of which energizes one input of AND gates 2740 and 2741. Flip-flop 2742 toggles between selecting the span 0 from which to receive or the span 1 from which to receive by alternatingly asserting the S0SEL and S1SEL signals. AND gates 2790 and 2741 are enabled by the complement of the IDLE signal, when the SRD bus 2721 does not contain all zeros, the respective S1SEL and S0SEL signals, and the S1RMR and S0RMR (receive message ready) signals from FIG. 27B. Thus, if the S0SEL signal is asserted by flip-flop 2742, and if a received message is ready as indicated by the S0RMR signal being asserted, and if the SRD bus 2721 is not idle, AND gate 2741 will assert the S0MR (span 0 message ready) signal. This energizes an OR gate 2743 which resets a flip-flop 2744 when a PIAE (programmable interface adapter enable) signal is not asserted. The PIAE signal is a timing signal received from the processor 27 in synchronism with the transfer of data between the buffer 29 and processor 72. When flip-flop 2744 is re-set, that sets a flip-flop 2745 is set, which asserts an SRMR (span received message ready) signal.

Flip-flop 2742 (FIG. 27D) which asserts the S0SEL and S1SEL (span 0 select and span 1 select) signals is toggled by a counter 2746 that is enabled by an OR gate 2747. OR gate 2747 is energized when the FIFO 2720 (FIG. 27B) of the span 0 receive 2912 has an empty output register if the S0SEL (span 0 select) signal is asserted. Similarly, OR gate 2747 is energized if the output register of the corresponding FIFO of the span 1 receive 2913 is empty if the S1SEL span 1 select signal is energized. The resultant signal from OR gate 2747 indicates that the output register of the FIFO of the selected span 0 receive or span 1 receive is empty, thereby enabling counter 2746 to advance at the receipt of the next PIAE timing signal. The counter 2746 generates a signal which causes the flip-flop 2742 to toggle thereby selecting the other of the span 1 or span 0 receive 2912 or 2913.

FIG. 27E depicts circuitry contained in the processor interface 2915 (FIG. 14). Data from the processor 27 is received in a bi-directional buffer 2750 in response to directional signals and gating signals received from processor 27 in driver 2751. The signals from buffer 2750 are directed to D0-D7 inputs of programmable interface adapter 2752 in response to the control signals from driver 2751. The signals from buffer 2750 are transferred through the D0-D7 terminals and the PB0-PB3 outputs onto the SX0-SX3 lines of the SXD (span transmit data) bus to the span transmitter shown on FIG. 27A. The XMS0 and XMS1 (span 0 and span 1 transmit select) signals are also transmitted to the span transmitters, as is the XDIN (transmit data in strobe) signal.

The received data from the selected span 0 and span 1 receiver 2912 and 2913 are received in the PA0-PA3 inputs of programmable interface adapter 2752 in response to the SRSO shift out signals from the programmable interface adapter 2752. These signals are transmitted through the D0-D7 outputs to bi-directional buffer 2750 and thence to the processor 27.

6. Span Equipment

The span 0 equipment 21, span 1 equipment 22, and span 2 equipment 23 shown in DSI 14 are all identical. Therefore, only one span equipment will be discussed.

Figure 28:
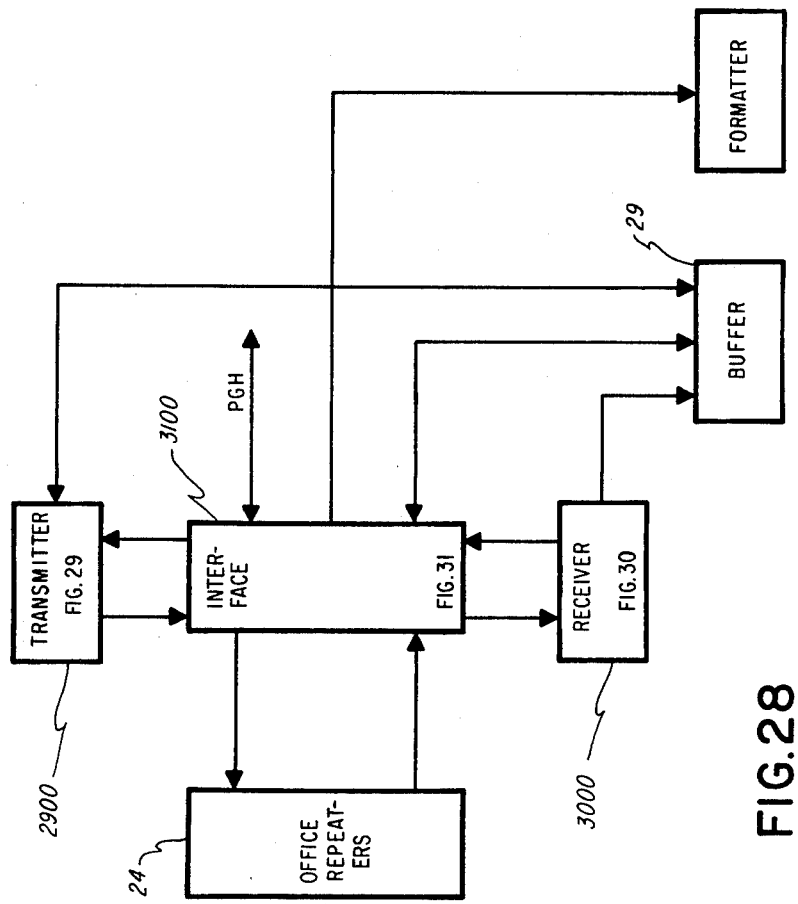
FIG. 28 is a block diagram of one of the span equipments shown in FIG. 4.

With reference to FIG. 28, the span equipment includes an interface 3100 which receives PGH signals from the port group highway and transmits PGH signals to the port group highway. The interface 3100 transmits the PGH signals to a transmitter 2900, which formats the PGH signals into a T1 format data stream for transmission to office repeaters 24 (FIG. 4). The transmitter 2900 then converts the digital signals to an NRZ non-return to zero form and transfers them back to interface 300. The interface 3100 receives the reformatted signals from transmitter 2900 and converts them to bi-polar form for transmission to the office repeaters 24.

The interface 3100 also receives data signals in T1 format from office repeaters 24, converts the bi-polar signals into NRZ (non-return to zero) form and transfers them to receiver 3000. Receiver 3000 then converts the T1 formatted signals into the PGH (port group highway) format and transfers the reformatted signals to the interface for transmission over the port group highway.

Transmitter 2900 also inserts the "A" control bits received from the buffer 29 into the correct location in the T1 signal shown in FIG. 3, and provides spaces for the "B" sense bits. Similarly, receiver 3000 extracts the "B" sense bits from the T1 format shown in FIG. 3 and transfers them to buffer 29. The receiver 3000 also inserts the "B" sense bits into the PGH data stream in their appropriate locations.

Figure 31:
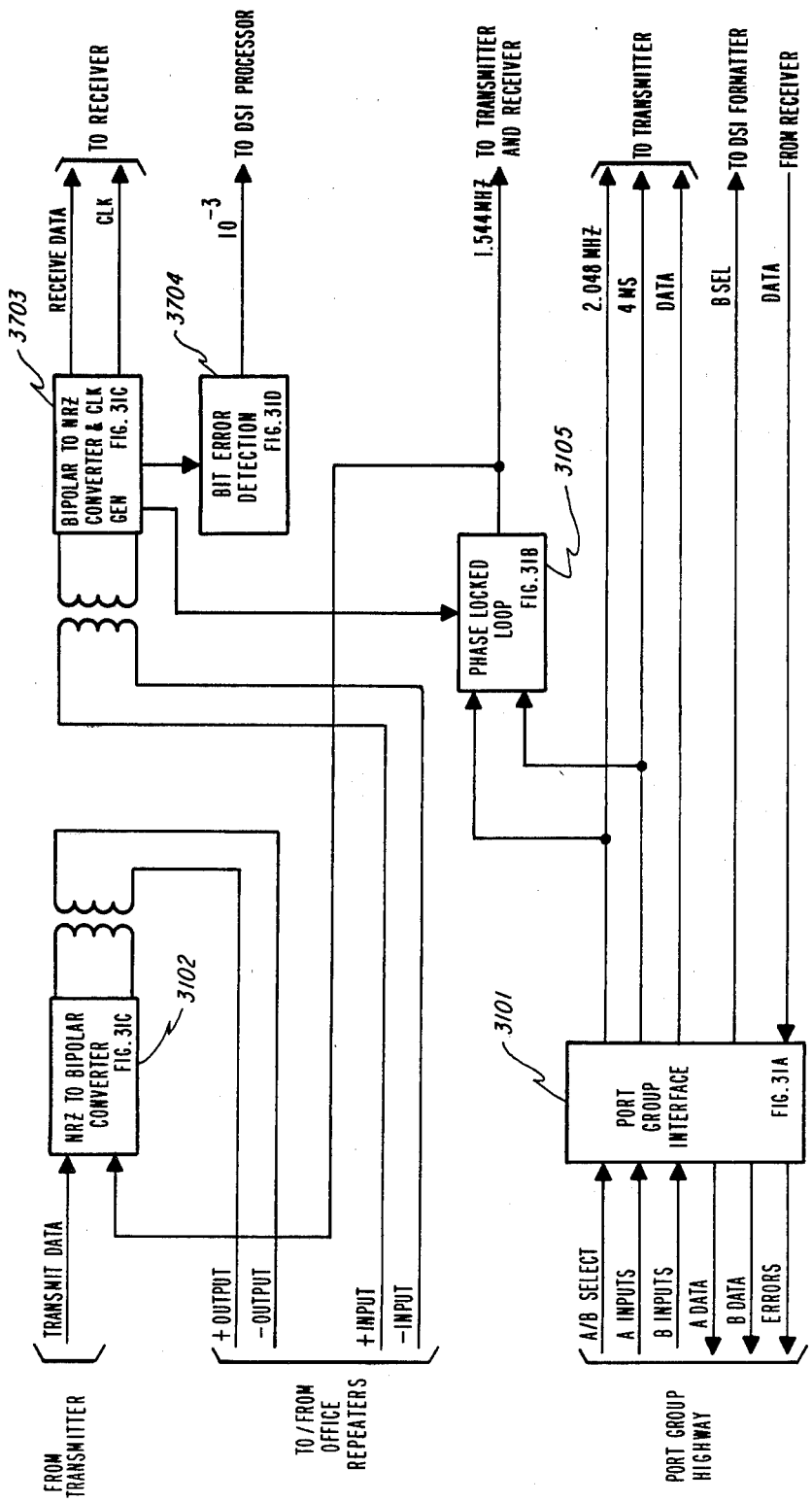
FIG. 31, together with FIGS. 31A through 31D, constitute detailed logic diagrams of span interface circuitry shown in the span equipment in FIG. 28.

With reference to FIG. 31, the span interface 3100 receives signals from the port group highway in the port group interface 3101. These signals include data signals from matrix switch A 200 and matrix switch B 100 (FIG. 4), and an A/B select signal. Port group interface 3101 also transmits data signals and an error signal to matrix switch A 200 and matrix switch B 100.

The data signals from the selected matrix switch A or matrix switch B are transferred to the transmitter 2900. The reformatted signal from transmitter 2900 is received in an NRZ (non-return to zero) to bi-polar converter 3102, which converts the NRZ signals from transmitter 2900 to bi-polar signals for transmission to the office repeaters 24. Similarly, the signal from the office repeaters is received in a bi-polar to NRZ converter 3703, which converts the received signal to NRZ form, and transfer them to receiver 3000. The receiver 3000 transforms the received signal from the T1 format to the PGH format and transfers the transformed signal to port group interface 3101 for transmission to the matrix switch A and B. A bit counter 3704 provides a BEP (bit error pulse) signal for the processor 27. Also a phase lock loop timing circuit 3105 is provided to extract timing signals from the input data from the matrix switch A or B to provide timing signals for the transmission and receiver.

With reference to FIG. 31A, signals from the port group highway are received in a multiplexer 3110. The signals from each of matrix switch A and B are received in respective inputs of the multiplexer. The selection of signals to be coupled through multiplexer 3110 is made by an A/B selection signal from the PGH port group highway. The PGH signals include a DATA signal, and 2 MHZ and 4MS clocking signals for each of matrix switch A and B, in addition to the A/B selection signal. The pulse constituting the 4MS signal is lengthened in flip-flops 3111 and 3112 and the lengthened pulse is directed to the transmitter 2900 and receiver 3000 by driver 3113. The A DATA and B DATA signals from the PGH port group highway are also received in an exclusive OR gate 3114 which produces an asserted output signal if the two signals are not identical. A flip-flop 3115 is set in the event the A DATA and B DATA signals are not identical, to assert an error signal which is transmitted through drivers 3716 that in turn is transmitted to the matrix switch diagnostics 430 (FIG. 2).

Data signals in PGH format are coupled from the receiver 3000 as PGHDR (data receive) signals and transmitted through drivers 3116 onto the PGH port group highway as A PGH Data and B PGH Data signals to the matrix switch A 200 and matrix switch B 100 respectively.

The data from the selected A DATA or B DATA lines in the port group highway are coupled through driver 3113 as PGHDT (transmit data) signals to the transmitter (FIG. 29D).

Figure 31B:
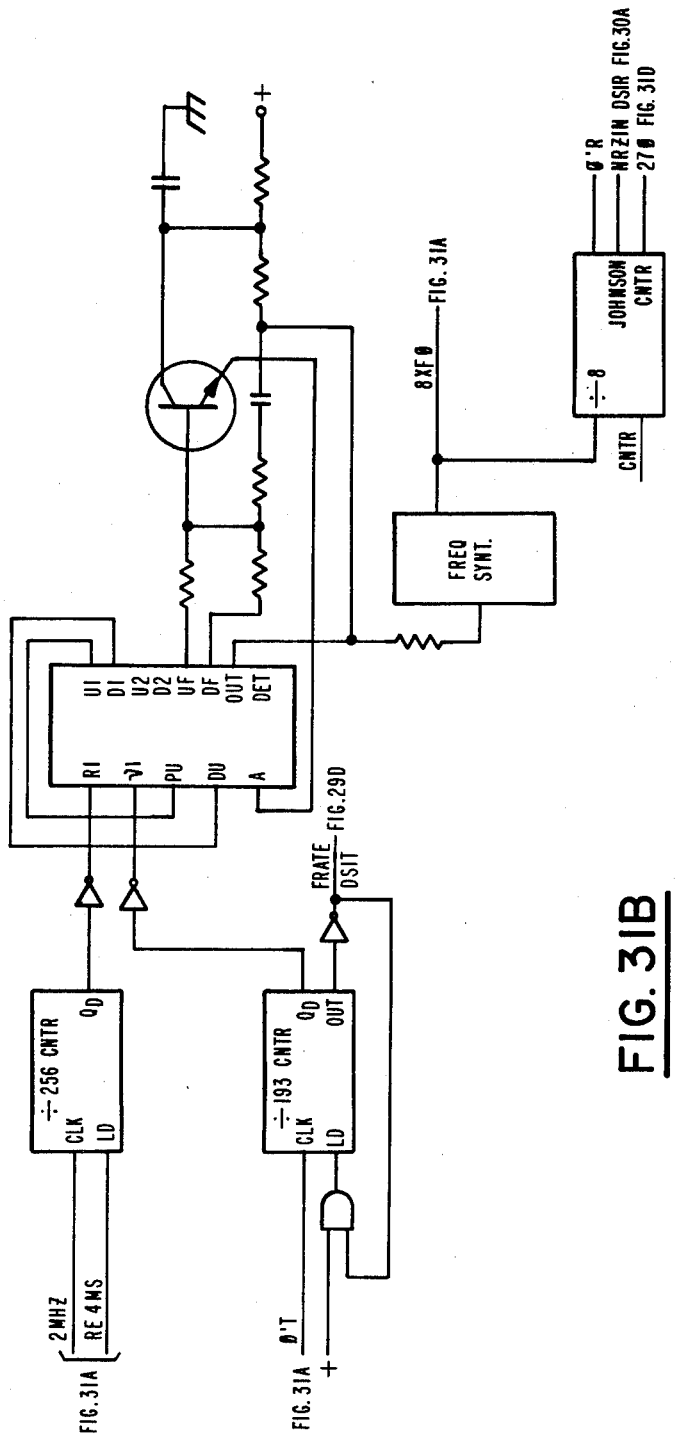

FIG. 31B depicts circuitry in the phase lock loop 3105 for producing precise timing signals for the interface 3100, transmitter 2900 and receiver 3000. Since phase lock loop circuits are known in the art, this circuitry will not be discussed further.

FIG. 31A also discloses circuitry for providing certain timing signals including a 2XF0 signal and certain phasing signals. In one embodiment of this invention, F0 is 1.544 MHZ.

With reference to FIG. 31C, NRZ to bi-polar converter 3102 (FIG. 31) includes a flip-flop 3120 whose output signal is a pulse of a one-half the bit width if a TDATA transmit data input signal is a logical one, or a zero if the TDATA input signal is a logical zero. The TDATA signal is the reformatted signal from transmitter 2900 (FIG. 31A). This is divided by two in flip-flop 3121, and the results are coupled to a transformer driver 3123, which provides a push-pull drive to transformer 3124.

With further reference to FIG. 31C, the bi-polar to NRZ converter 3103 receives the input signals from office repeater 24 and couples them through a transformer 3130. The input signal is received in differential receivers 3131 to produce the POSRZ and NEGRZ (positive and negative return to zero) signals. The remainder of the circuitry of FIG. 31C and the circuitry of FIG. 31D detects errors in bit reception. The NEGRZ and POSRZ negative and positive return to zero pulses are pulses that represent the sense of the detected bit and an RZ signal is asserted if one, but not both, of the POSRZ or NEGRZ signals is asserted. An invalid correlation results in the assertion of the BEP bit error pulse.

With reference to FIG. 31D, the BEP (bit error pulse) signal enables a counter 3150. The bit error rate measurement is performed by counting errors occurring during successive four million received bit periods. Counter 3151 counts the four million bit periods, clocked by a 0'R clocking signal from the phase lock loop timing circuitry (FIG. 31B). Each time the counter 3151 counts out, it loads the counter 3150 asserted. Counter 3150 counts up by one each time a +270 clocking signal is received from phase lock loop timing circuitry if the BEP bit error pulse signal is asserted. When the counter 3150 finally counts out, a flip-flop 3151 is cleared, thereby generating a BERB signal, clocked by the +270 timing signal. The BERB signal is then transferred to the processor through driver 3113 (FIG. 31A).

FIGS. 29 and 29A-29F contain a block diagram and detailed circuit diagrams respectively of the transmitter 2900. Transmitter 2900 receives the PGH data from the port group highway and supervisory signals from the DSI buffer 29 (FIG. 4). The transmitter 29 transposes the PGH data bits received from the interface 3100 into the T1 format, and inserts the "A" supervisory bits into the proper location and transfers the resulting signal back to the interface for transmission to the office repeaters 24.

With reference to FIG. 29, the transmitter 2900 includes a PGH counter 2901 which receives the 2 MHZ and 4MS timing signals from the interface (FIG. 31A). The 4MS signal identifies the beginning of a frame of data on the PGH, while the 2 MHZ signal identifies the individual bits. The PGH counter 2901 identifies the particular PGH time slot in the PGH frame, to which the PGH data from the interface corresponds. The output signals from the PGH counter 2901 are coupled to the inputs of a transposer ROM 2902, which generates a signal identifying the corresponding bit position in the T1 format. Similarly, a bits/frame counter 2903 and frame counter and transmitter synchronizer 2904 identify, in response to timing signals from FIG. 31A, the particular time slot being transferred in the T1 format shown in FIG. 3. The information from bits/frame counter 2903 and transposer ROM 2902 is coupled to transposer RAM 2905 which receives the serial PGH data from the interface (FIG. 31A), stores it in a location in the transposer RAM 2905 depending on the output of transposer ROM 2902, and read it out from a location in response to signals from bits/frame counter 2903. The data read from transposer RAM 2905 is coupled to an output multiplexer 2906, which passes the data from transposer RAM 2905 except during the time during which the A signals are transmitted, in which case a DSI SUPY supervisory bit from the buffer 29 is inserted. A time slot allocated for the B sense bit. Output multiplexer 2906, under control of an output decoder 2907, selects PGH signals from transposer RAM 2905, DSI SUPY bits or synchronization bits from synchronization pattern generator 2908, and couples them to its output in the appropriate time slots. The signals from the output multiplexer 2906 are then coupled to a zero suppressor 2909 to generate the NRZ non-return to zero signals which are then returned to the interface at FIG. 31C.

With this overview, the detailed circuitry will be described with respect to FIGS. 29A–29D.

Figure 29B:
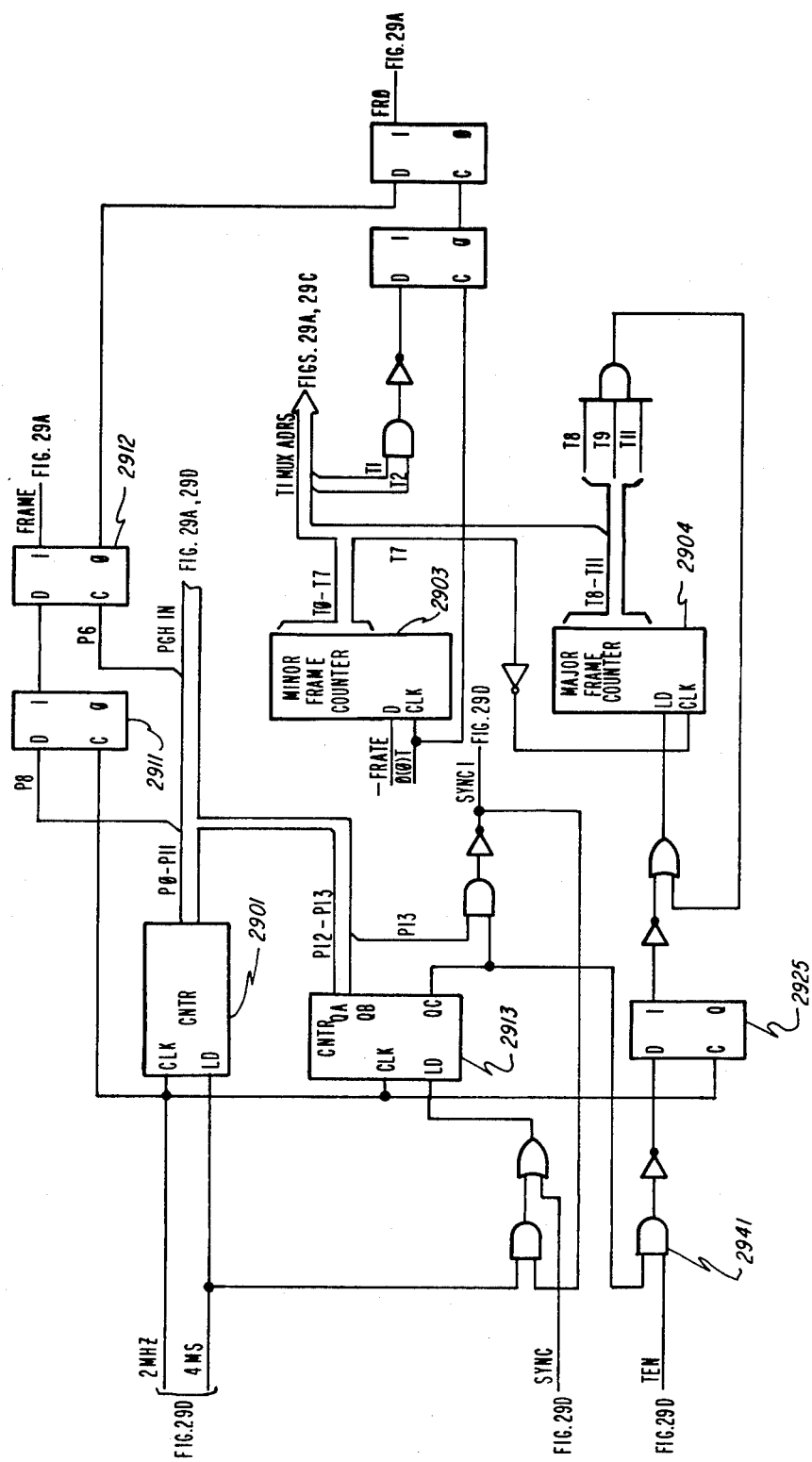
Figure 29C:
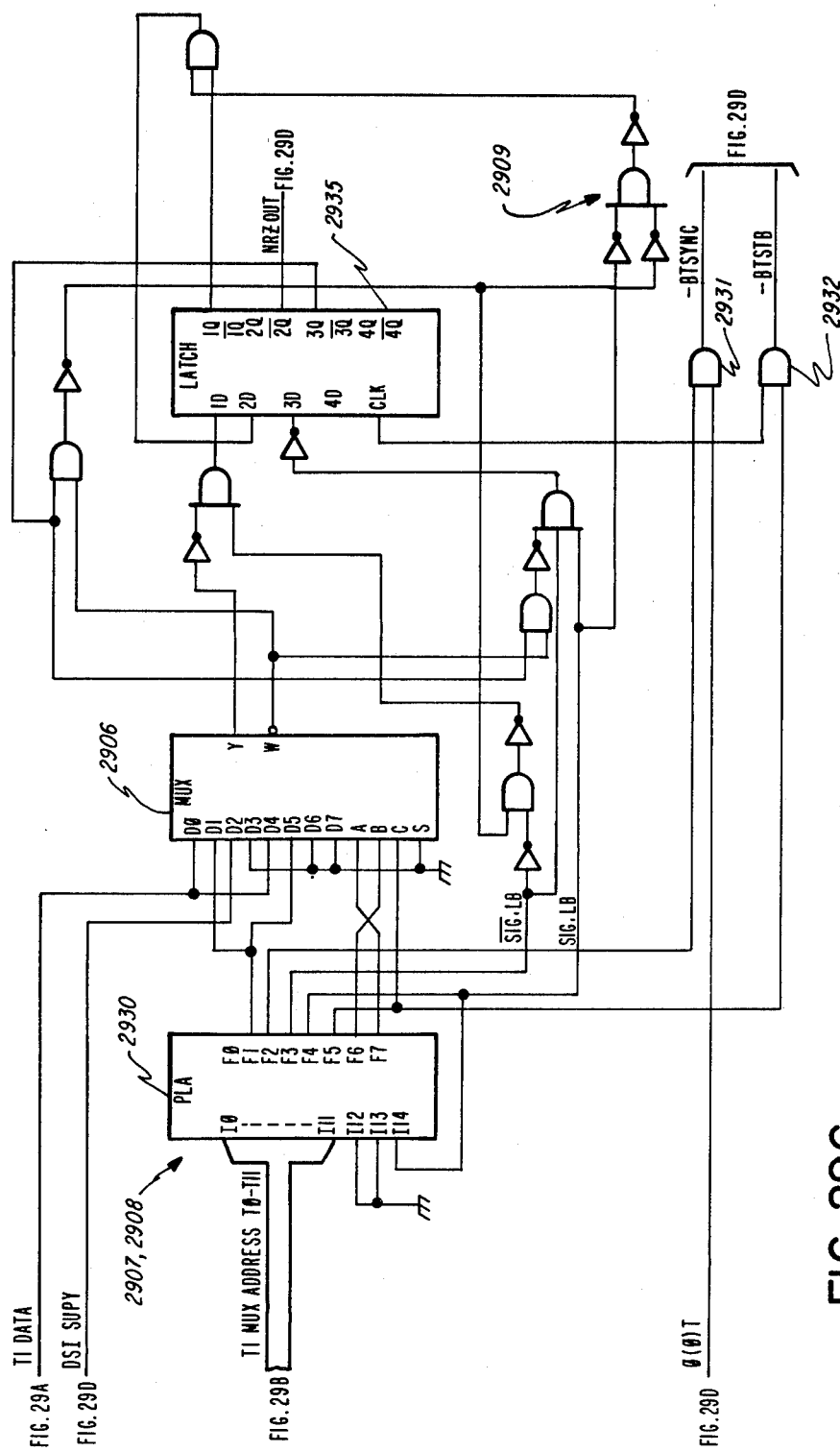
Figure 29D:
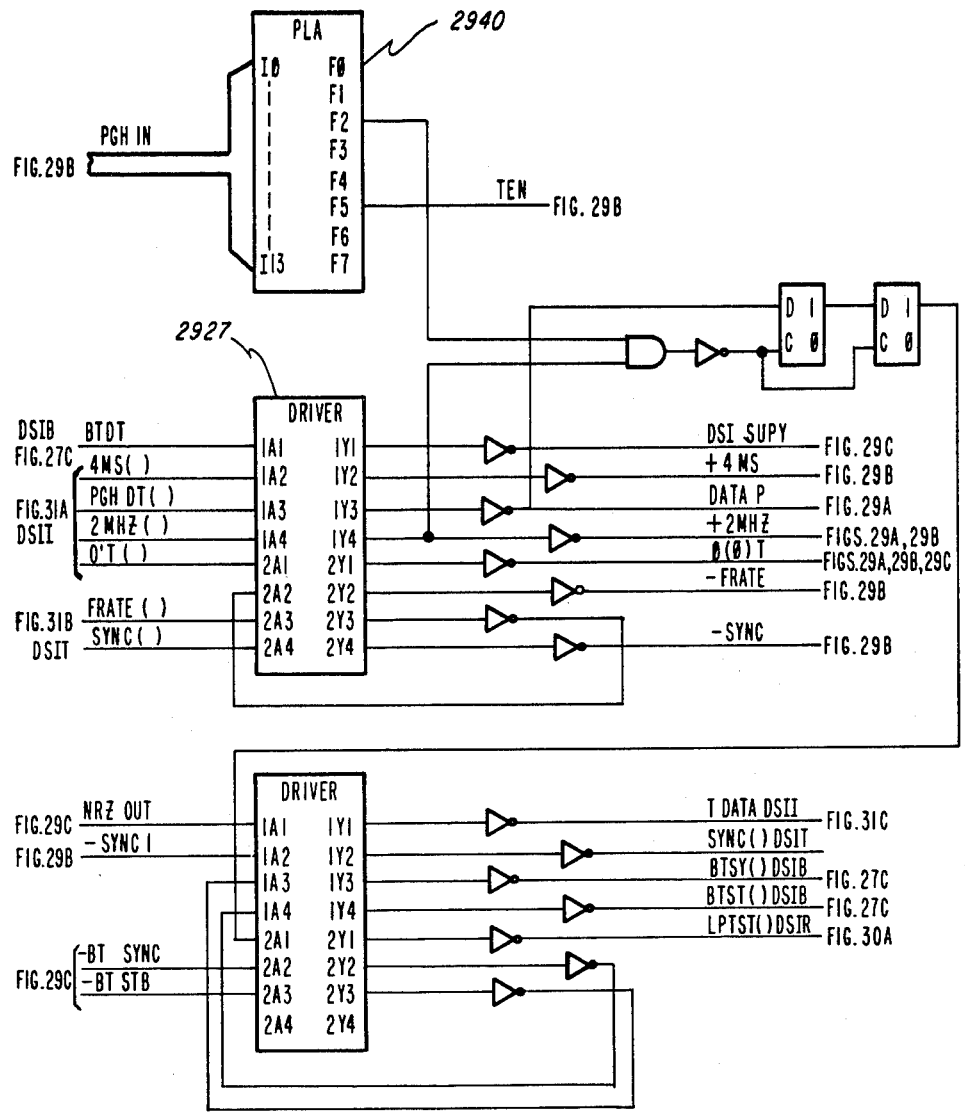

With reference to FIG. 29B, a PGH counter 2901 is clocked by the 2 MHZ timing signal and loaded by the 4MS timing signal from FIG. 29D. The counter 2901 identifies the incoming PGH time slot. In one embodiment the incoming PGH time slots are skewed with respect to the output of counter 2901, and flip-flops 2911 and 2912 are provided to account for the skew. Flip-flop 2912, when set, asserts a FRAME signal which provides one input to a multiplexer 2913 (FIG. 29A). The signal is an address signal as will be discussed hereinbelow. A second counter 2913, also clocked in response to the 2 MHZ signal and loaded in response to a −SYNC signal from a corresponding transmitter in another span equipment. Counter 2913 is also loaded in response to the 4MS signal if the counter's QB and QC outputs are not energized.

The P0–P7 signals from counter 2901 and the frame signal from flip-flop 2912 constitute address signals which are received in ROM 2902 and multiplexer 2913 respectively (FIG. 29A). ROM 2902 receives the PGH IN signal from counter 2901, which identifies the location of the bit of the incoming DATA P signal from the PGH in the PGH bit stream. The ROM 2902 receives the PGH IN signals and identifies the particular location in the T1 bit sequence that the bit corresponds to, and transfers that information to RAM 2905 as address signals A0–A7 when ROM 2902 is gated by a gating signal from delay 2915.

Delay 2915 and its associated circuitry provide read and write control signals that determine when information is to be written into RAM 2905 and when the T1 data is to be read from RAM 2905. The read and write control signals are generated in response to the 0 (0) T and 2 MHZ timing signals (FIG. 29D). During a writing cycle, the 2 MHZ signal resets a flip-flop 2916 which provides a conditioning input to flip-flop 2921, conditioning it to be set when its clocking input is clocked. The flip-flop is clocked as follows. The same output of flip-flop 2916 energizes an OR gate 2917 and an AND gate 2920 if the 100 nanosecond output of delay 2915 is not asserted. The energization of AND gate 2920 loads the delay 2915, which sets the flip-flop 2921 40 nanoseconds later. The setting of the flip-flop 2921 couples the 1B, 2B, 3B, and 4B inputs through multiplexer 2913, which enables the write enable input of RAM 2905, and gates the transposed address signals from ROM 2902, causing the DATA P signal (the incoming PGH data) to be written into the RAM 2905 at the address identified by ROM 2902. The assertion of the write enable signal also serves to set flip-flop 2916, conditioning flip-flop 2921 to be reset at the next clocking signal. When data is to be read from RAM 2905, the 0 (0) T timing signal resets flip-flop 2922, which initiates the sequence in delay line 2915. However, flip-flop 2916 being set prevents flip-flop 2921 from being set, so the 1A, 2A, 3A, and 4A inputs of multiplexer 2913 are selected, and a latch 2923 couples T1 MUX ADRS address signals from the bits/frame counter 2903 and frame counter 2904 (FIG. 29B). The data is transferred out of RAM 2905, as a D OUT (data out) signal (FIG. 29A) which is coupled to the D input of a flip-flop 2924. At the end of the 60 nanosecond delay caused by delay 2915, the flip-flop 2904 is clocked by the falling edge of the delay 2915 signal to produce a T1 DATA signal.

The T1 MUX ADRS signal from latch 2923 is produced by a minor frame counter 2903 (FIG. 29B). The minor frame counter operates in a manner similar to the PGH counter 2901 for the T1 data signals, identifying each of the 193 bits (twenty-four eight-bit words plus one synchronization bit) forming a frame (FIG. 3). The minor frame counter 2903 is synchronized to the T1 data stream by the FRATE frame rate signal from the interface (FIG. 31B) and is clocked at the T1 bit rate by the 0 (0) T signal from FIG. 31A.

The major frame counter 2904 identifies the particular frame in each superframe (FIG. 3) than being transferred. The major frame counter is reloaded at the end of each frame or in response to a synchronization signal from flip-flop 2925 (FIG. 29B).

With reference to FIG. 29C, the output multiplexer 2906 receives the T1 data from flip-flop 2924 (FIG. 29A), and DSI SUPY ("A" bit supervisory data) signals from driver 2927 (FIG. 29D). The DSI SUPY signal is derived from the "A" supervisory data bits received from the buffer 29 (FIG. 27C). The multiplexer 2906 receives selection signals from a programmable logic array 2930 which constitutes the output decoder 2907 and byte pattern generator 2908. The programmable logic array 2930 has output signals that identify several conditions, including when the T1 data signals should be coupled to multiplexer 2906, and when the DSI supervisory bits DSI SUPY signals should be coupled through multiplexer 2906. The programmable logic array 2930 also identifies the frame in which the "B"

sense data would be transferred, and transfers a logical "zero" for the least significant bit of each word in the frame.

The programmable logic array 2930 also generates signals that energize two AND gates 2931 and 2932 when the 0 (0) T1 clocking signal is asserted. These AND gates provide the BT SYNC (buffer transmit sync) and BT STB (buffer transmit strobe) signals that are transferred to the buffer as BTSY and BTST signals (FIG. 27C). These signals enable the transfer of the "A" supervisory data bits (the DSI SUPY signals) to the transmitter (FIG. 29C).

The remainder of the circuitry shown on FIG. 29C constitutes the zero suppression circuitry 2909. This circuitry tests to determine if an outgoing eight-bit word is all zeros. If the outgoing word is all zeros, the zero suppress circuitry 2909 changes the least significant bit to a logical one, except during the frames in which the "A" bits are to be transferred or logical zeroes to be transferred for the "B" sense bits, in which case the second least significant bit is changed to a logical one. The zero suppression circuitry 2909 converts the serial output from multiplexer 2906 to parallel form and ANDs the eight bits forming each word. If all eight bits are zero, then the bit conversion takes place in latch 2935 (FIG. 29C).

With reference to FIG. 29D, a programmable logic array 2940 provides a TEN transmit enable synchronizing signal at the beginning and end of each PGH data frame. The TEN transmit enable synchronizing signal energizes an input of AND gate 2941 (FIG. 29B) to clear flip-flop 2925 at the next 2MHZ clocking signal. This loads major frame counter 2904 to synchronize the T1 superframe (FIG. 3) to the PGH frame.

Figure 30:
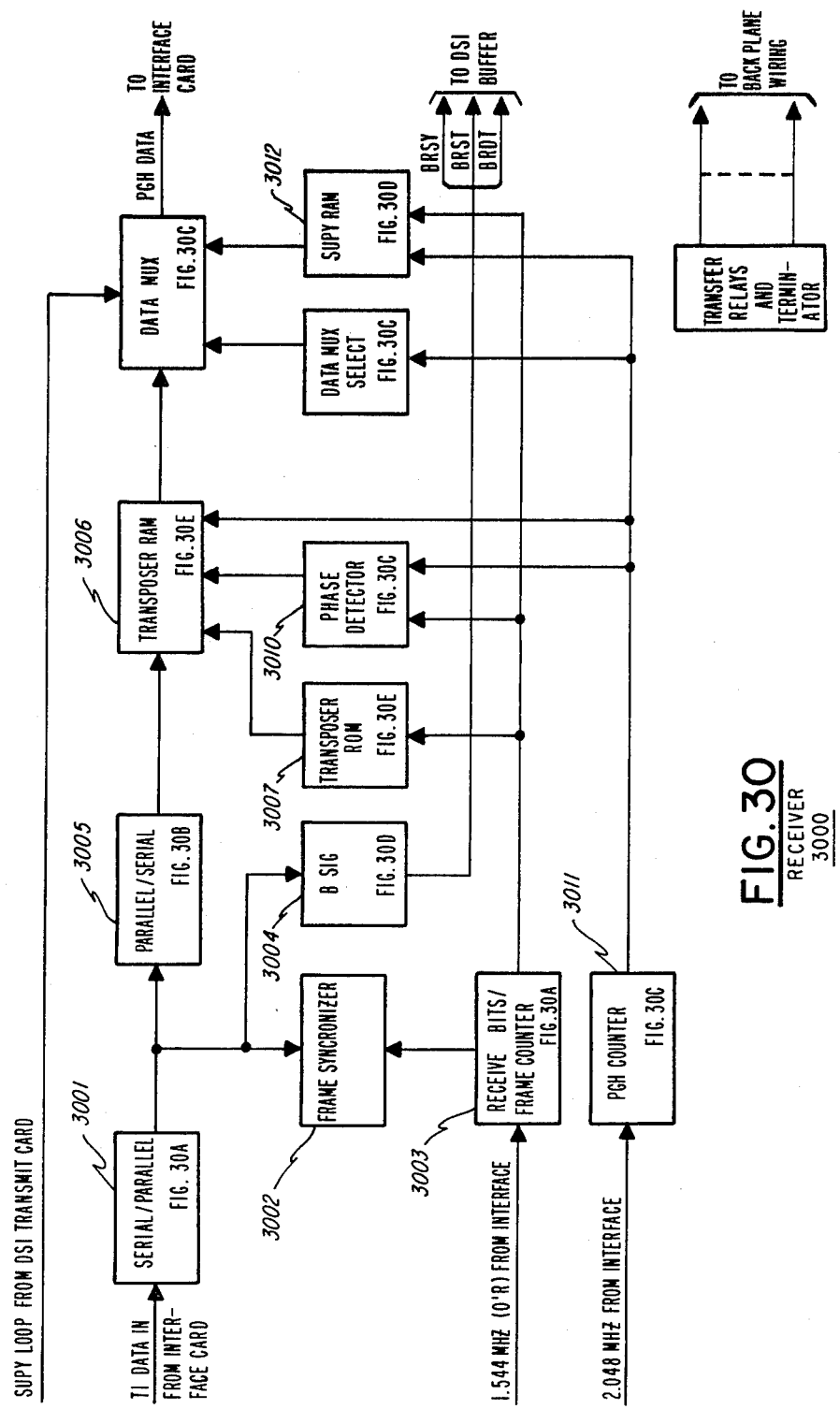
FIG. 30, together with FIGS. 30A through 30E, constitute a detailed logic diagram of the receiver portion of the span equipment shown in FIG. 28 and FIGS. 30F and 30G are truth tables useful in understanding the operation thereof.
Figure 30A:
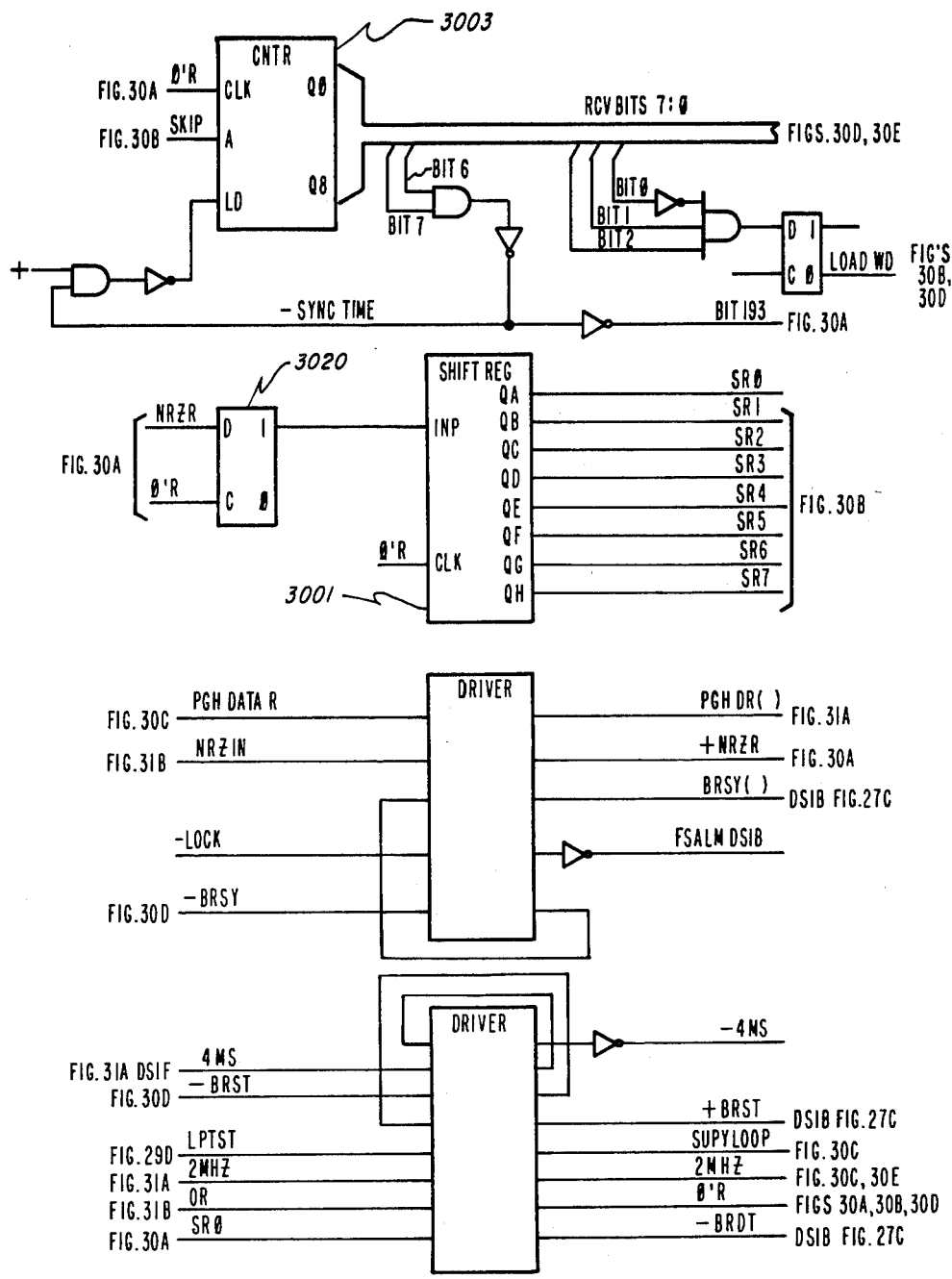

The circuitry for receiver 3000 is shown in FIG. 30 in block diagram form and in detail in FIGS. 30A–30G. Generally speaking, the receiver 3000 operates in reverse from transmitter 2900. The receiver, operating in response to timing signals from interface 3100, receives the T1 signals, synchronizes on the incoming T1 data signals, removes the B signalling bits (FIG. 3), transfers the data, except for the "B" bits, into a transposer RAM, and transfers the B bits into a second ("SUPY") RAM, and transmits the data and B signalling bits in the proper order to the interface to be transferred over the PGH port group highway. In addition, the receiver transmits the synchronizing, strobe and B signalling bits to the DSI buffer 29 (FIG. 4).

With reference to FIG. 30, the T1 data from the interface is first received in a serial to parallel converter 3001 and coupled to a synchronizer 3002 which tests certain bits in each block of 193 bits to determine if they correspond to a pre-established synchronizing pattern. If they do not, frame synchronizer 3002 tests other bits to attempt to locate the pattern, and signals a bits/frame counter 3003 both when it has received the pattern, and at the beginning of each frame as long as a synchronization is maintained. The B signalling bits are stripped off in a driver 3004 and transferred as BRDT (data) signals to the buffer 29 (FIG. 4) with a BRSY (synchronizing) signal and a BRST (strobe) signal. The signals from serial to parallel converter 3001 are reserialized in parallel to serial converter 3005, and transferred to a transposer RAM 3006. The data signals from parallel to serial converter 3005 are written into transposer RAM 3006 in response to address signals from a transposer ROM 3007 and phase detector 3010. The transposer ROM receives address signals from counter 3003 which identify the particular bit in each T1 frame to which the incoming data bit corresponds. The transposer ROM identifies the corresponding position in the PGH data format, and addresses that location in transposer RAM 3006 when the data bit is to be stored therein. The phase detector 3010 receives signals from the T1 bits/frame counter 3003 and a PGH counter 3011 to correlate the particular incoming frames in the PGH format and T1 format, to adjust for any skews.

The signals from transposer RAM 3006 are read out in response to address signals from PGH counter 3011 which identify the particular bit location in the transposer RAM corresponding to the time slot being transferred over the port group highway.

The B signalling bits are stored in a supervisory RAM 3012 and read therefrom in a manner similar to the operation of transposer RAM 3006. The signals stored in both transposer RAM 3006 and supervisory RAM 3012 are read out through a multiplexer 3040 (FIG. 30C) in response to a selection signal from the port group highway counter 3011.

Figure 30B:
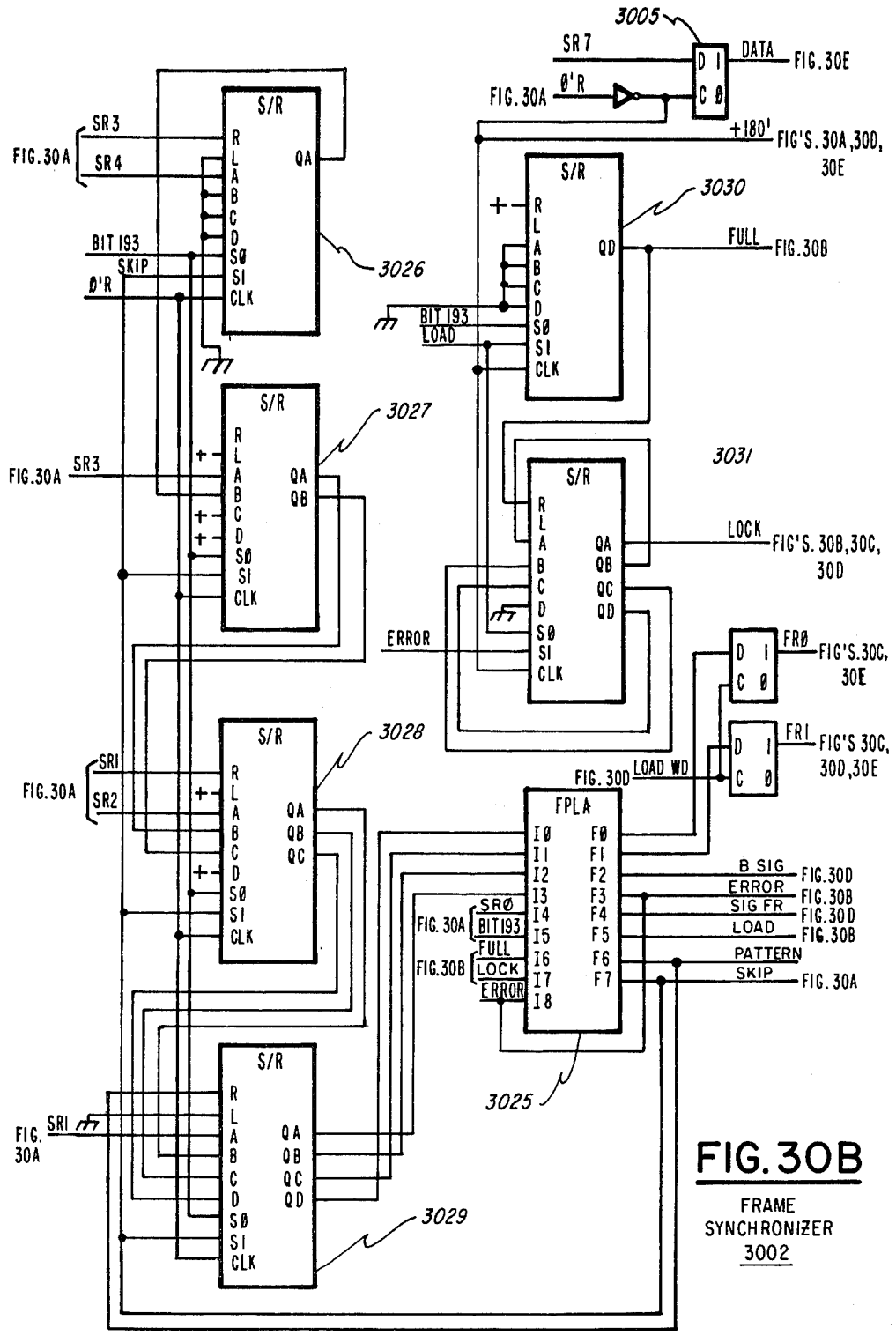

With reference to FIG. 30A, the NRZR non-return to zero received data signals received from the span interface (FIG. 31A) are coupled through a flip-flop 3020 clocked by the 0'R timing signal (FIG. 31A). The 0'R timing signal is synchronized to the incoming T1 data bit stream. The output bit stream from flip-flop 3020 is shifted into shift register 3001, which is also clocked at the 0'R timing signal. Four output signals SR1–SR4 from shift register 3001 are coupled to the frame synchronizer 3002 (FIG. 30B).

The frame synchronizer 3002 receives four bits to test to determine if they correspond to the synchronizing pattern. A comparison is performed in a programmable logic array 3025, which produces an ERROR signal if the wrong pattern is detected. Frame synchronizer 3002 includes four shift registers 3026–3029 that also store the four preceding test bits to determine if they constitute the synchronizing pattern. If the test pattern is not a synchronization pattern, the programmable logic array 3025 asserts a SKIP signal.

With reference again to FIG. 30A, the receive bits/frame counter 3003 is clocked at the 0'R (receive bit timing) signal from the interface (FIG. 31B), and is loaded each time it counts to 193 (which corresponds to a frame of twenty-four eight-bit words plus one synchronizing bit). When the frame synchronizer 3002 (FIG. 30B) produces a SKIP signal, counter 3003 skips one bit to permit the frame synchronizer 3002 to test a different set of bits to attempt to locate the synchronization pattern.

The receive bits/frame counter 3003 generates the RCVBIT 7:0 signals which identify the time slot of the incoming T1 data signal within the T1 frame (FIG. 3). The receive bits/frame counter 3001 asserts a LOAD WD load word signal every six (hex) time slot.

With reference again to FIG. 30B, frame synchronizer 3002 also includes two shift registers 3030 and 3031. When a frame is received in which the synchronization bit (bit 193) follows the proper pattern, the shift register 3030 shifts upward (to the right) by one stage. When four proper synchronizing bits are received, a FULL signal is received, which causes shift register 3031 to increment by one. When an error is received, shift register 3031 decrements by one. However, as long as the lowest stage of shift register 3031 is set, a LOCK (synchronization lock) signal, indicating that the receiver is synchronized, will be asserted. This permits synchronization to be maintained in the event of lost bits.

The incoming T1 data is reserialized by flip-flop 3005 (FIG. 30B). The SR7 signal from shift register 3001 (FIG. 30A) is clocked through flip-flop 3005 by the 0'R clocking signal to produce a DATA signal.

Figure 30C:
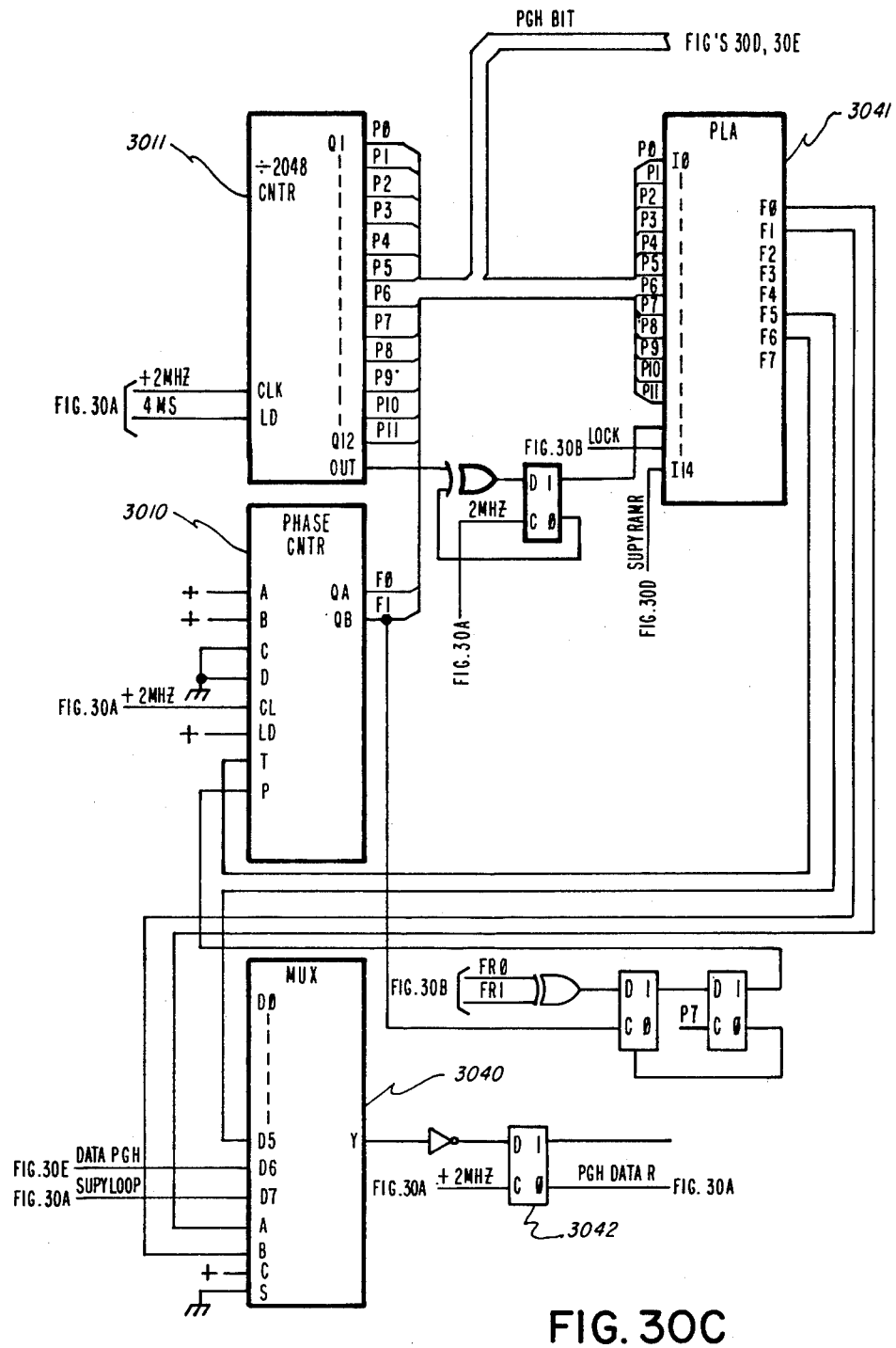
Figure 30D:
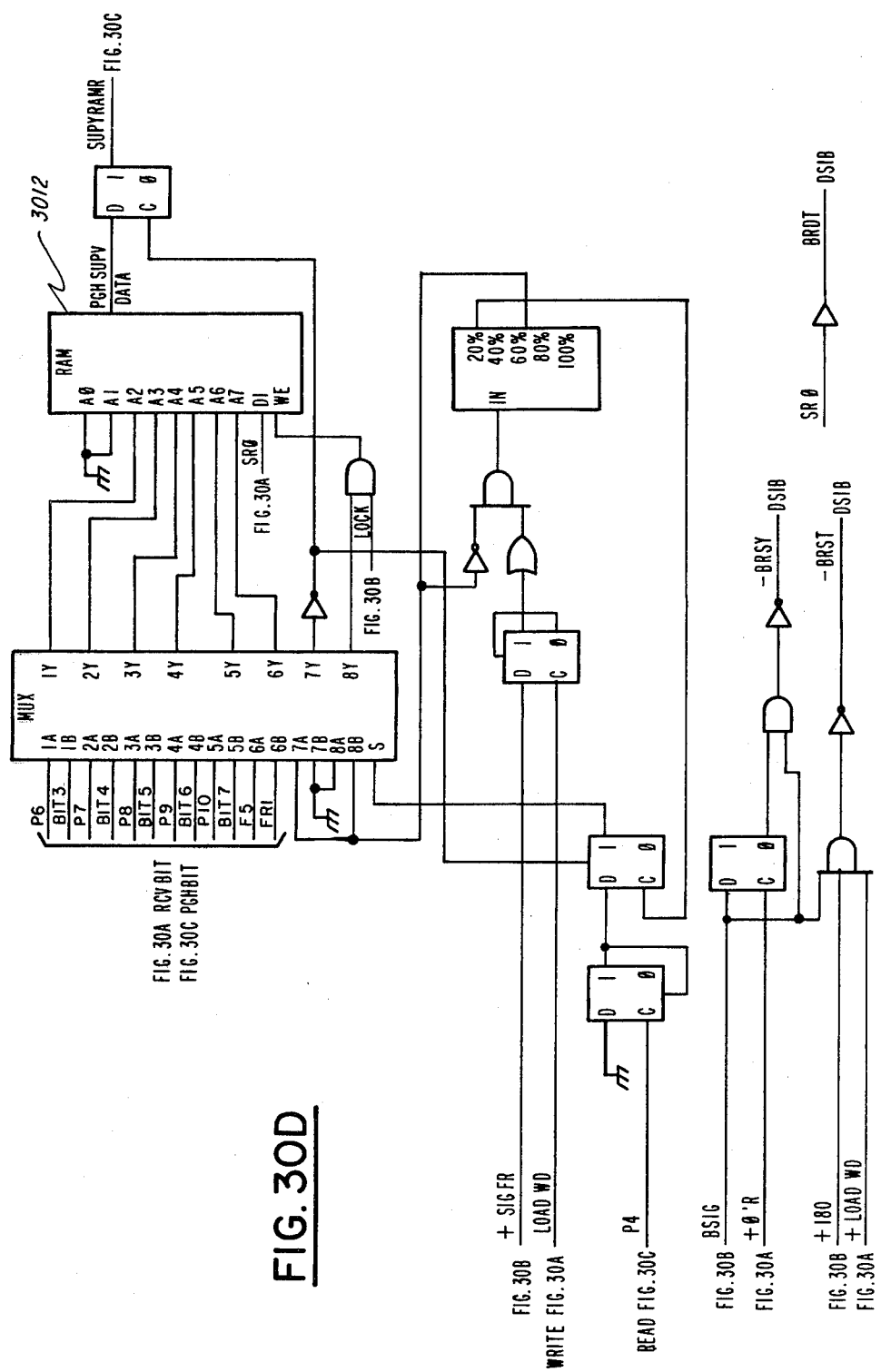

With reference to FIG. 30C, a counter 3011 produces the port group highway time slot identifying signals clocked by the 2MHZ clocking signal and loaded by the 4MS signal at the beginning of each port group highway frame. The result, a PGHBIT signal, is coupled to transposer RAM 3006 (FIG. 30E) to identify the PGH frame bit to be transferred from RAM 3006.

Figure 30E:
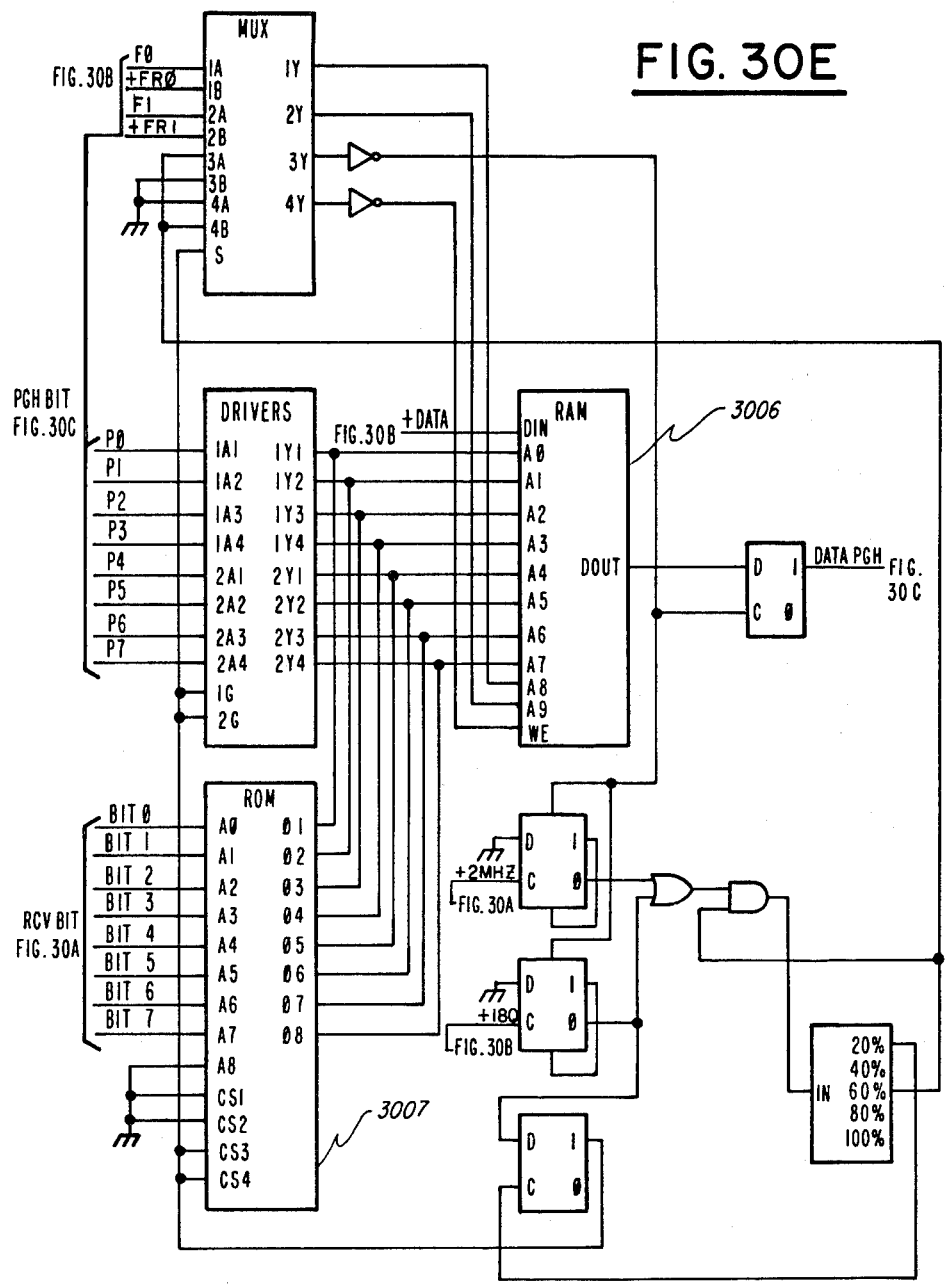

The RCVBIT signals from counter 3003 are coupled to transposer ROM 3007 (FIG. 30E). The transposer ROM 3007 output signals and the PGHBIT signals provide addressing signals to the transposer RAM 3006 in the same manner as discussed above with respect to the transmitter transposer RAM 2905 (FIG. 29A). The read and write control for transposer RAM 3006 is also handled similarly.

When a B signalling frame is received, the programmable logic array 3025 (FIG. 30B) asserts a SIGFR signal frame signal. This SIGFR signal, with the LOAD WD (load word) signal from receive bits/frame counter 3003, causes the control circuitry for SUPY RAM (supervisory RAM) 3012 (FIG. 30D) to write the corresponding B signalling bit into a corresponding location in SUPY RAM 3012 (FIG. 30D), if the receiver 3000 is synchronized to the incoming T1 signal, as indicated by the assertion of lock signal from shift register 3031 (FIG. 30B). The control circuitry for supervisory RAM 3012 (FIG. 30D) causes the B signal bit to be written into the SUPY RAM 3012 in the same manner as for transposer RAM 3006. However, only the SR0 bits, the least significant bits from serial to parallel converter 3001, are transferred into SUPY RAM 3012. This corresponds to the B signalling bits in the T1 frame. The reading and writing into and out of RAM 3012 occurs in a manner similar to that for RAM 3006 (FIG. 30E). The output signals from SUPY RAM 3012 constitutes a SUPY RAM R signal.

The signal ultimately transferred over the port group highway, whether the data PGH signal (FIG. 30E) or the SUPY RAM R signal (FIG. 30D) is selected by a multiplexer 3040 (FIG. 30C) in response to selection signals from a programable logic array 3041. The selection is made in response to the PGHBIT signals from PGH counter 3011, and a phase counter 3010 which identifies the frame in the PGH bit stream as currently being transmitted. The particular signal coupled through multiplexer 3040 is transmitted through a flip-flop 3042 clocked by the 2MHZ clocking signal at the port group highway data transmission rate.

FIGS. 32-1 through 32H-3 depict the various operations of the processor 27 in the digital satellite interface shown in FIG. 4. More specifically, the various sheets of FIGS. 32-1 through 32-5 define the control previously described with respect to FIG. 18 in more detail. FIGS. 32A through 32H-3, in turn, define modules that are used by the control in FIG. 32.

7. Control Modules

Figures 1, 32:
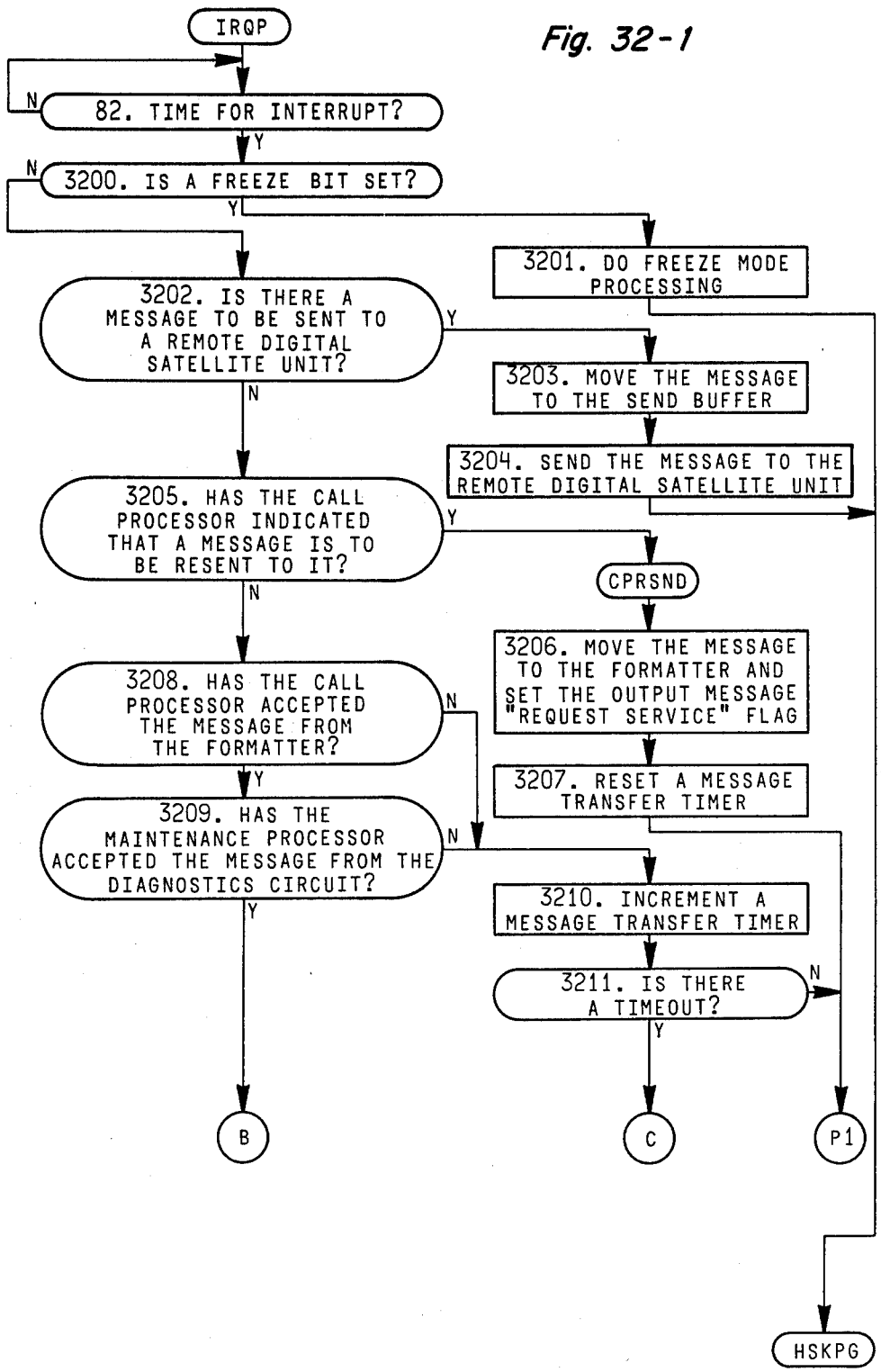
Figures 2, 32:
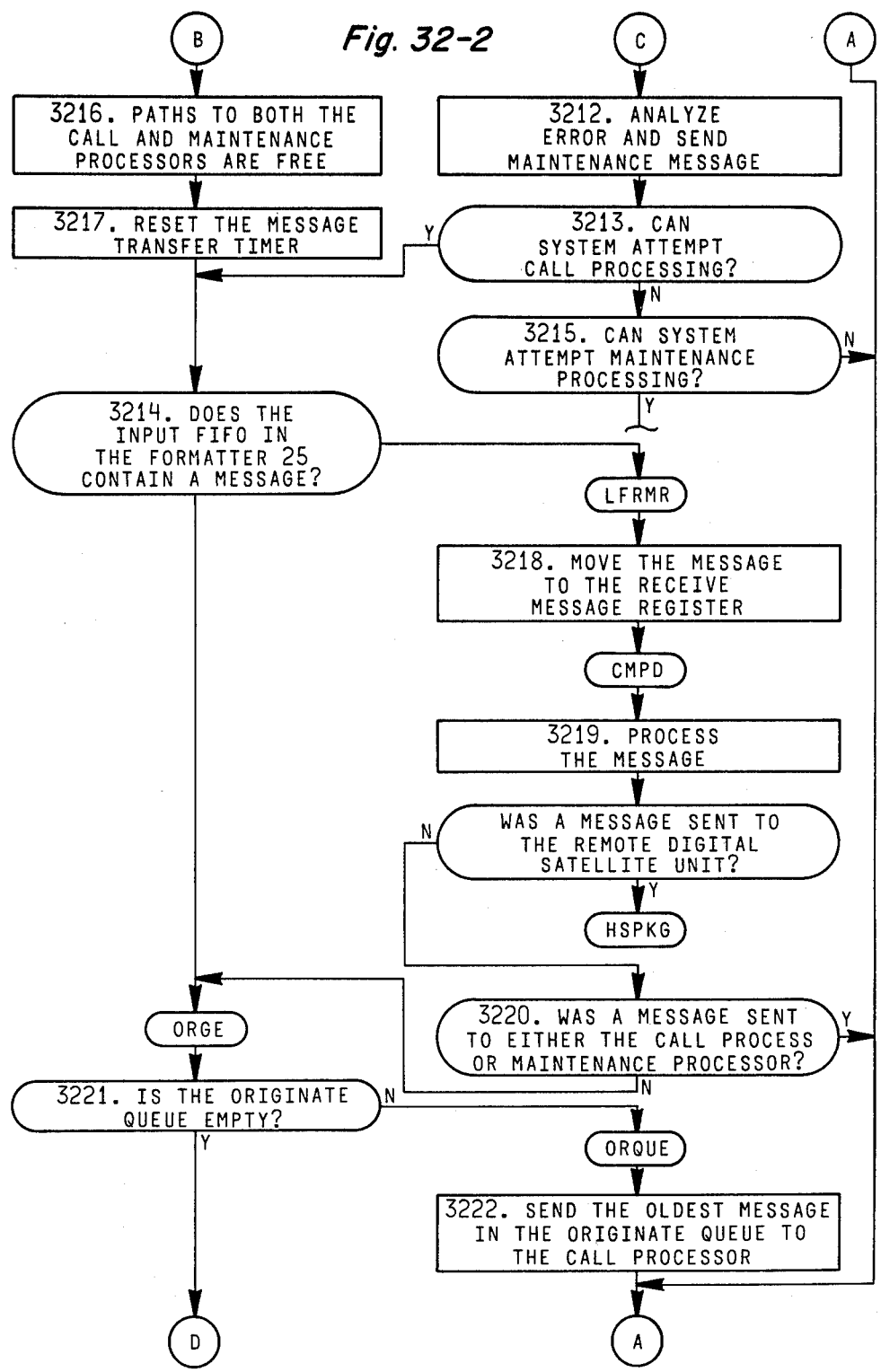
Figures 3, 32:
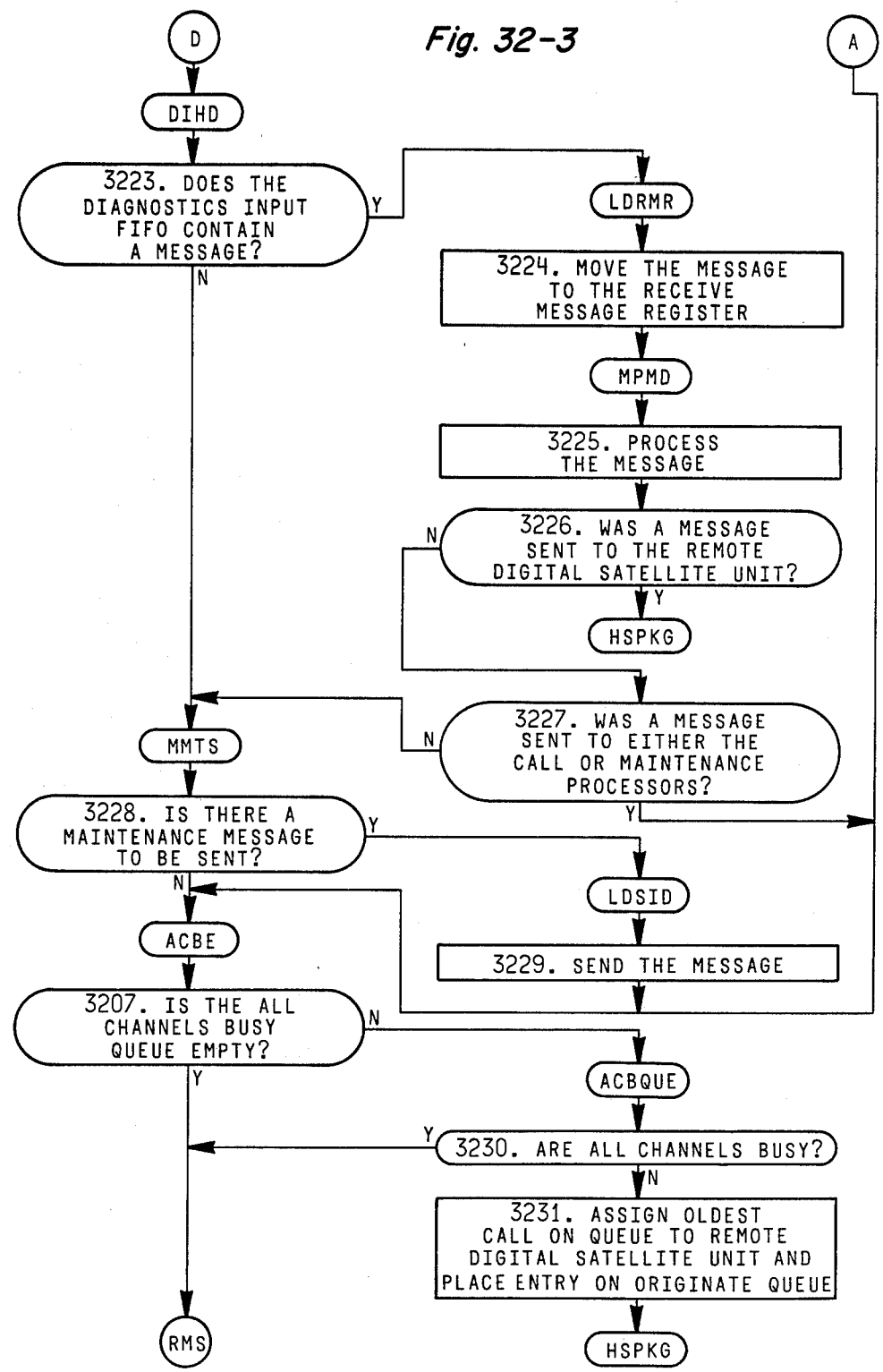
Figures 4, 32:
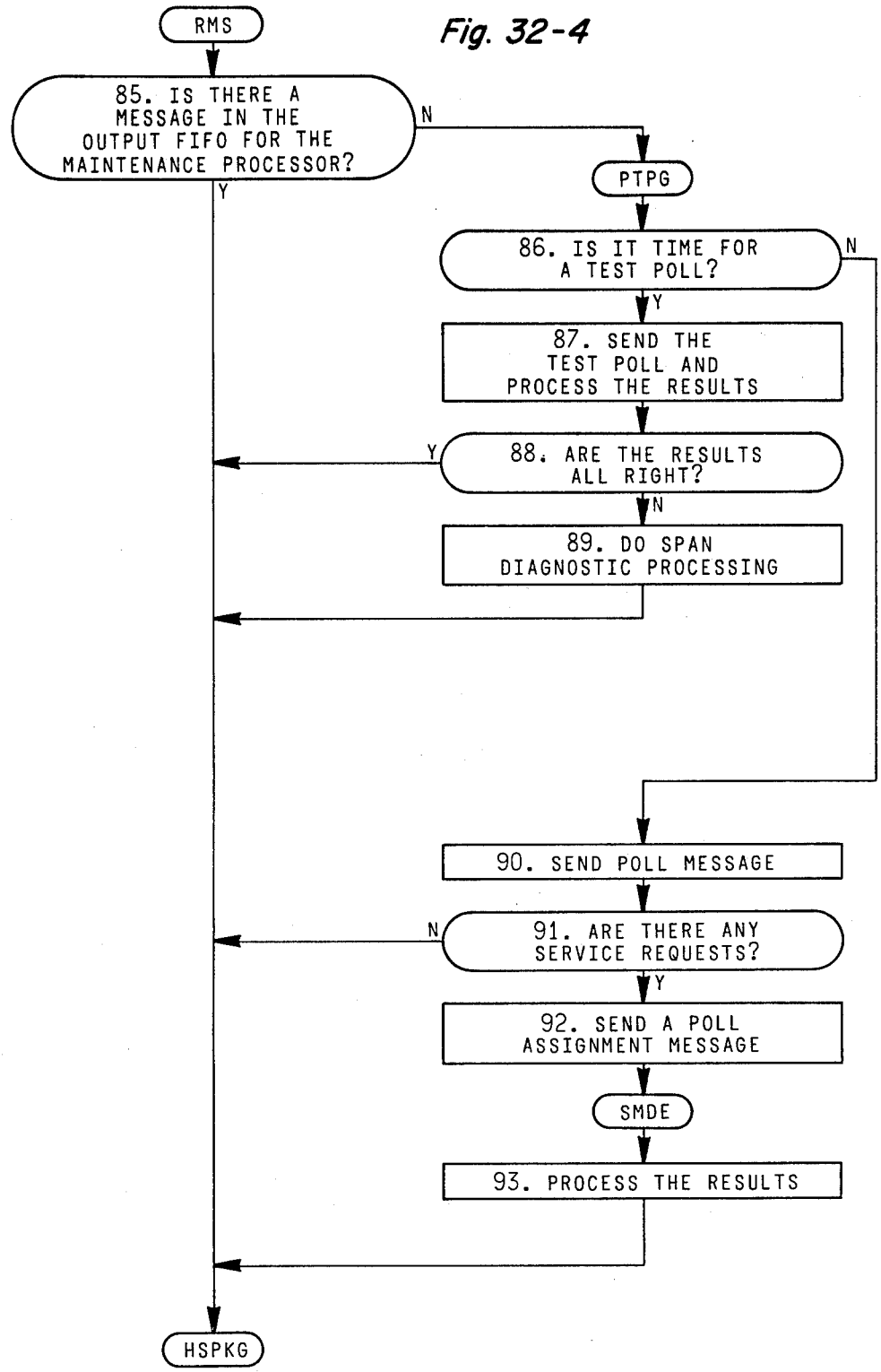
Figures 5, 32:
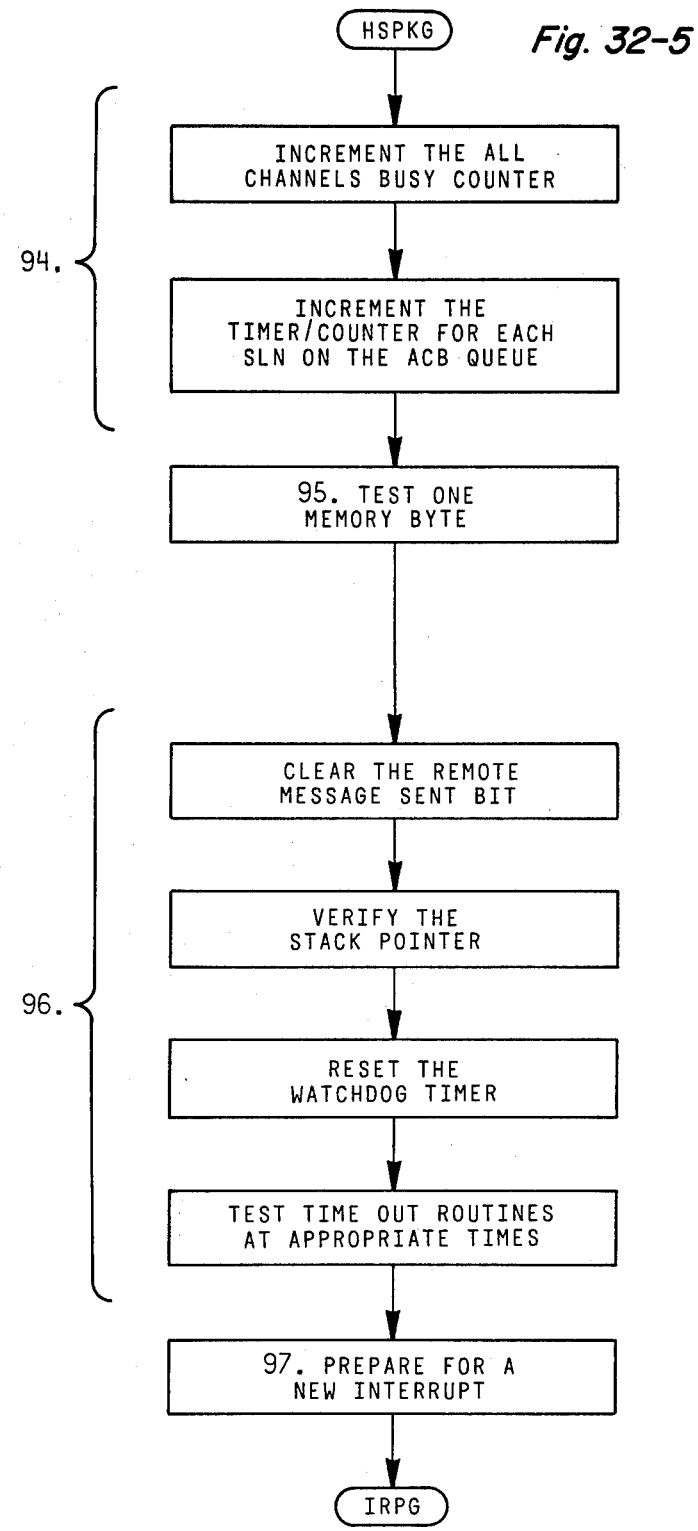

Referring now to FIG. 18A and FIG. 32-1, step 82 defines the interruption time for digital satellite interface processor 27. Thus, the program is a time-driven program and, during each iteration, certain tasks are performed and the priority of those tasks is established by the flow of the basic module shown in FIGS. 18A and 18B. If a FREEZE bit is set in step 3200, freeze mode processing occurs in step 3201, whereupon the system transfers back to the HSPKPG processing beginning with step 94 in FIG. 18B. Normally, however, processing diverts to step 3202. If there is a message to be sent to a remote digital satellite unit 15, the message is transferred to a SEND buffer in the DSI memory 28 (step 3203) and then to the remote digital satellite unit in step 3204. If no message is to be sent to the remote digital satellite unit, then the processor 27 determines if a message is to be sent to the call processor (step 3205). A CPRSND module (FIG. 32D) moves the message to the formatter output FIFO and sets the output message "REQUEST SERVICE" flag in step 3206 and then resets a message transfer timer 3207 that determines timeouts. When these steps have been completed, processing shifts to the next function (step 3207) in the overall priority loop in which an ALL CHANNELS BUSY queue is checked to determine if it is empty.

If no message is to be sent, control passes to step 3208 in FIG. 32-1. If the call processor has accepted a message from the formatter, control passes to step 3209 to determine if the maintenance processor has accepted the message from the diagnostics circuit. If a message has been sent and not accepted, both these steps transfer control to step 3210, whereupon the message transfer timer is incremented and then tested to see if a predetermined interval has expired in step 3211. If a timeout has not occurred, control passes back to step 3207 in FIG. 32-3. If an error has occurred, then control passes to step 3212 in FIG. 32-2, to send an error message to the maintenance processor. If the system can continue to attempt call processing, step 3213 diverts control to step 3214. Otherwise the system determines if maintenance processing can be attempted. If it can, step 3215 diverts control to such maintenance processing. Otherwise control passes back to step 3207 in FIG. 32-3.

If both the call processor and maintenance processor have accepted prior messages, the paths to both the call and maintenance processors are free (step 3216 in FIG. 32-2) and the message transfer timer is reset in step 3217.

If the formatter input FIFO contains a message, step 3214 diverts to an LFRMR module to retrieve that message in step 3218, process the message in 3219, and determine if a message is to be sent to the remote digital satellite unit. If it is, control passes back to the HSPKG module. Otherwise, control passes to step 3220. In this step, it is determined whether a message was sent to either the call or maintenance processor. If no such message was sent, control passes back to an ORGE module, in which an ORIGINATE queue is tested in step 3221. If a message was sent, control shifts to step 3207 in FIG. 32-3.

If control passes to step 3221 and the ORIGINATE queue is not empty, step 3222 sends the oldest message in the ORIGINATE queue to the call processor to initiate call processing. Otherwise, control passes to step 3223 in FIG. 32-3 to determine if the diagnostics input FIFO contains a message from the maintenance processor. If it does, an LDRMR module moves the message to a RECEIVE MESSAGE register in the memory 28 (FIG. 4) in step 3224 and processes the message in step 3225. If a message was sent to the remote digital satellite unit, control passes to the HSPKG module. Otherwise, control passes from step 3226 to step 3227 to determine whether a message was sent either to the call or maintenance processor. If such a message was sent, control passes to step 3207. Otherwise, control passes to an MMTS module.

In the MMTS module, step 3228 determines whether a maintenance message is to be sent. Control then passes either directly to step 3207, if no such message is to be sent, or to an LDSID module which sends the message in step 3229 before returning control to step 3207.

If the ALL CHANNELS BUSY queue is not empty, the system determines whether all the channels are busy in step 3230 and assigns the oldest call on the queue to the remote digital satellite unit and places the entry on the ORIGINATE queue in step 3231 before transferring control to the HSPKG module. If the ALL CHANNELS BUSY queue is empty or if it is not empty and all the channels are busy, control passes to step 85 in FIG. 32-4 (see also FIG. 18A) to determine if there is a message in the diagnostics output FIFO for transmission to the maintenance processor. At this point further control corresponds to the control shown in FIGS. 18A and 18B and like reference numerals depict like steps in both FIGS. 32-4 and 32-5.

Referring again to FIG. 32-2, the LFRMR module, as generally stated by step 3218, moves a message from the call processor to a RECEIVE MESSAGE register in the memory 28. This module is shown in detail in FIG. 32A. A FAIL flag is cleared in step 3240 and a register X, that is an index register, receives a pointer to the FORMATTER RECEIVE MESSAGE register, which constitutes a multiple location buffer. A MESSAGE READ BYTE counter is cleared in step 3242 and steps 3243 through 3246 retrieve the successive bytes from the formatter input FIFO by transferring them through the formatter programmable interface adapter and loading them into the RECEIVE MESSAGE register at a location identified by the pointer (step 3243). The pointer and byte counter are incremented in step 3244 and the programmable interface adapter is tested to determine if another input byte is available. If it is, the byte counter is tested to determine if the message being received is too long. If it is too long, steps 3247 prepare a proper message and then return control to step 3245.

If the message is valid, however, step 3245 will branch to step 3250. In step 3250, an index register is loaded with the address of the first location in the FORMATTER RECEIVE MESSAGE register. A code for a message to be sent from the call processor to the digital satellite interface is retrieved in step 3251 and stored in a message directory. Then a message is sent to the send buffer by calling an MSGBUF subroutine in step 3252. That MSGBUF module is shown in FIG. 32B.

The MSGBUF module pushes the message onto the stack in step 3253. If the message is for the call processor, step 3254 causes control to adjust a buffer pointer and to store that buffer pointer in a CPMS register in step 3255, thereby to provide a pointer to the CALL PROCESSOR MESSAGE SEND register. Otherwise, in step 3256, the pointer is adjusted and stored in a MAINTENANCE PROCESSOR MESSAGE POINTER register. In either case, the pointer is advanced to point to the last byte in the message in step 3257 and filler bytes are stored in the buffer in step 3258. Then the message is stored in the buffer in step 3259 and the message directory code is then stored in the first byte of the buffer in step 3260.

Figure 32A:
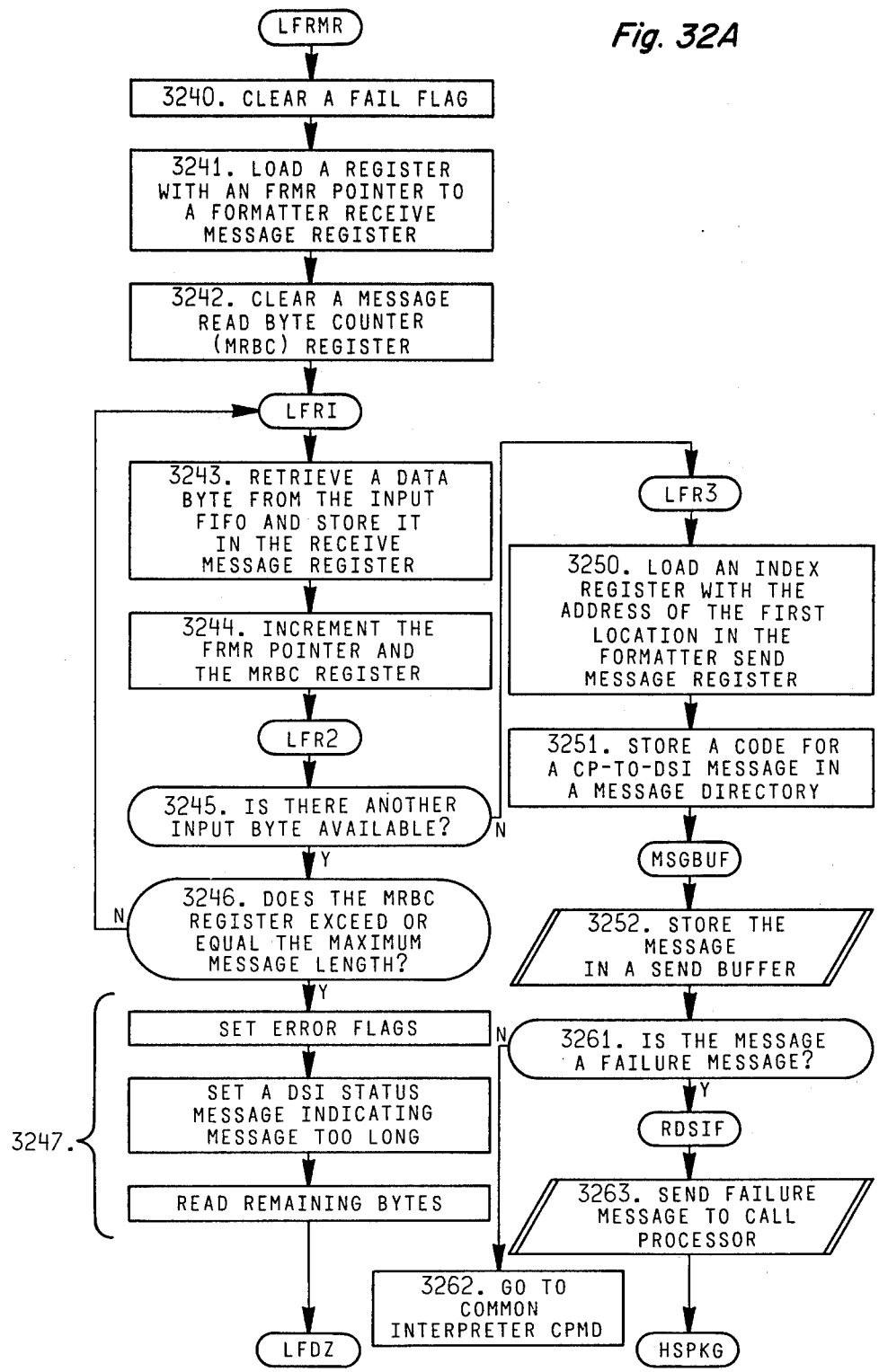
Figure 32B:
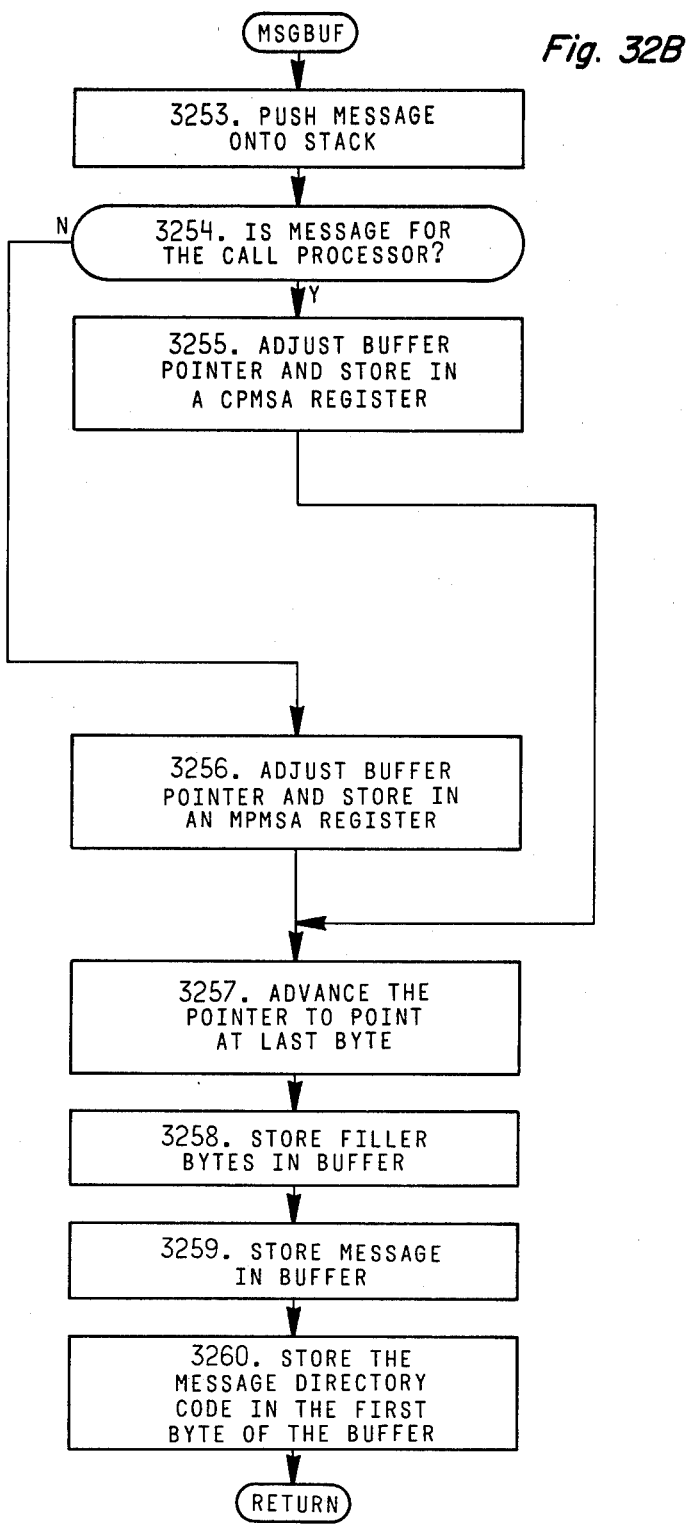

Control then returns to step 3261 in FIG. 32A. There, the message is interpreted to determine if it is a failure, or error, message. If it is not, then a command interpreter is called in step 3262. Otherwise, a failure message is then sent back to the call processor in step 3263.

Figures 1, 32C:
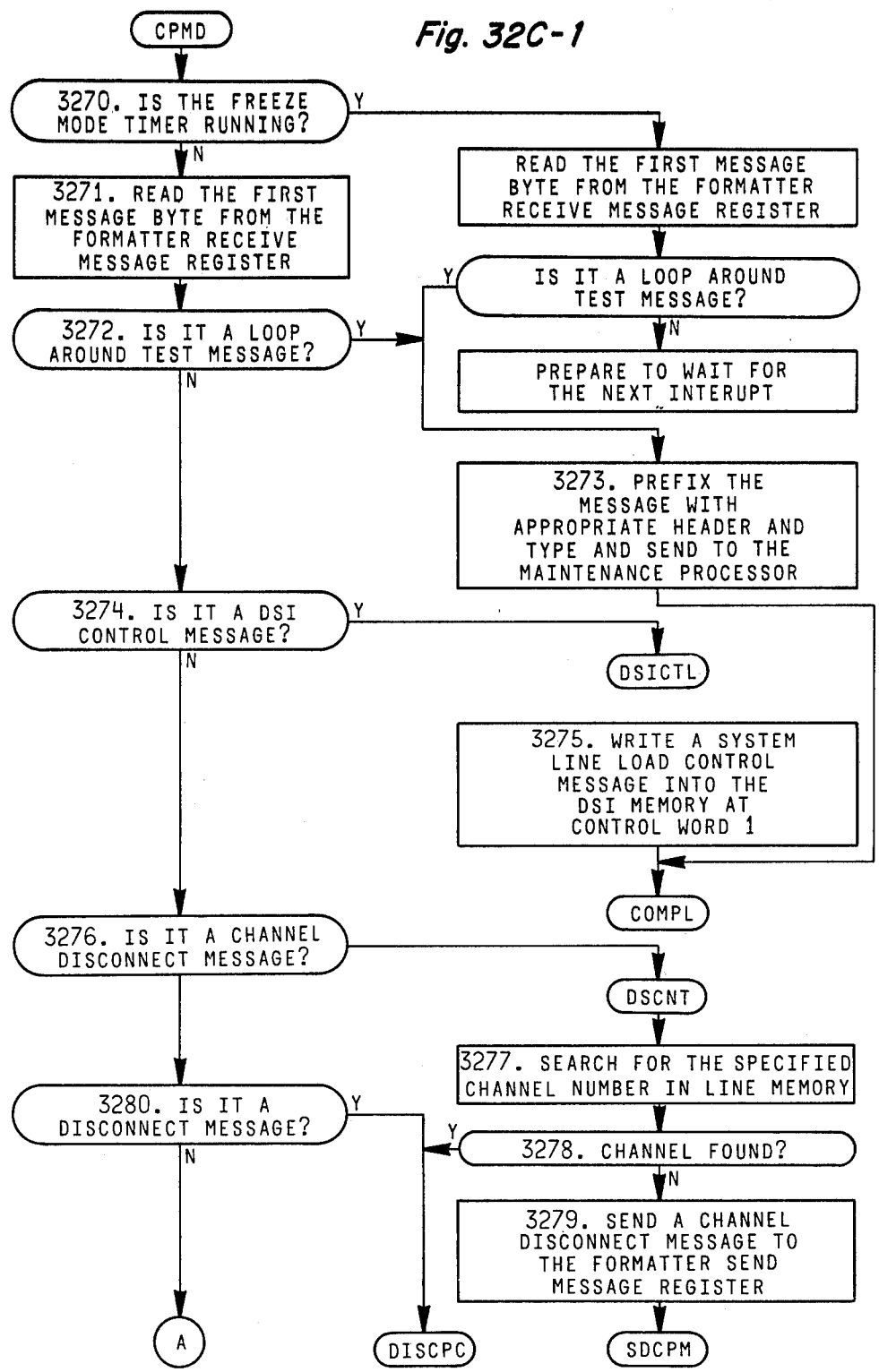
Figures 2, 32C:
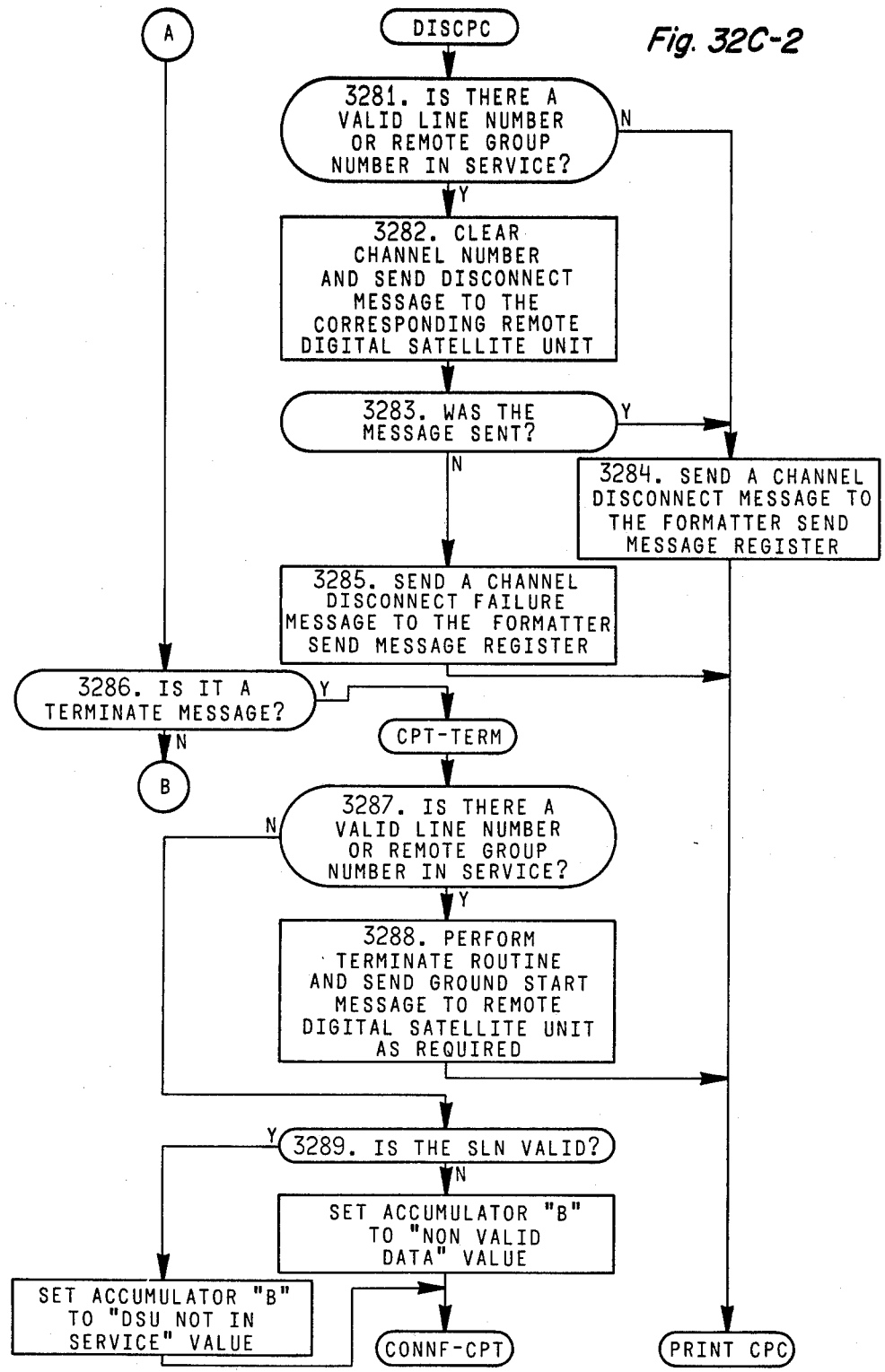
Figures 3, 32C:
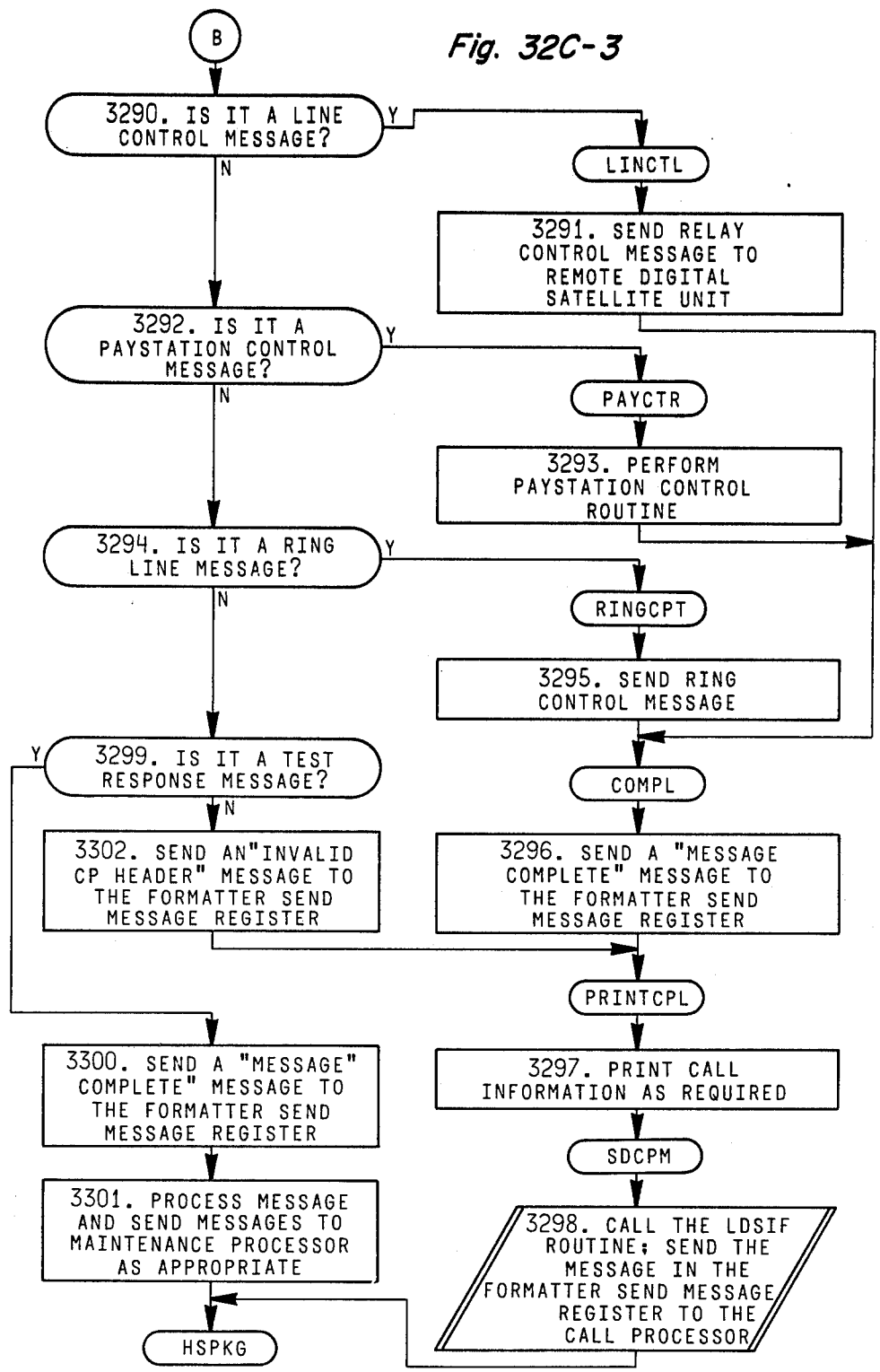

A portion of the command interpreter, designated in step 3262 of FIG. 32A, is shown in FIGS. 32C-1 through 32C-3. Assuming that a freeze mode timer is not running, step 3270 branches to step 3271. In this step, the first message byte from the FORMATTER RECEIVE MESSAGE register is read. This first byte contains the header, which, as shown in FIG. 10, identifies the nature of the message, and the number of bytes in the message. The header is tested in step 3272 to determine if it is a loop-around test message.

If it is, then step 3273 prefixes that message with an appropriate header and type and sends a message to the maintenance processor.

If the header defines a DSI control message, step 3274 branches to step 3275 to write a system line load control message into the DSI memory, specifically into a control word shown in FIG. 25C. Processing of either step 3273 or step 3275 passes control to a COMPL module shown in FIG. 32C-3, in which a "message complete" message is sent to the formatter's SEND MESSAGE register.

If a channel disconnect message (see FIG 10) has been received as defined by the message header, step 3276 branches to step 3277 to search for the specified channel number in the line memory 2503 shown in FIG. 25. If a channel is found, step 3278 transfers control to a DISCPC module in FIG. 32C-2. Otherwise, a channel disconnect message is sent to the FORMATTER SEND MESSAGE register in step 3279 and control passes to an SDCPM module in FIG. 32C-3. If a disconnect message is received, step 3280 branches directly to the DISCPC module in FIG. 32C-2. In this module, the information is tested to determine if there is a valid line number or remote group number in service (step 3281). If there is, the channel number is cleared, and the disconnect message is sent to the corresponding remote digital satellite unit in step 3282. If the message was actually sent, control passes from tep 3283 to step 3284 to send a channel disconnect message to the FORMATTER SEND MESSAGE register before transferring control to a PRINT CPC module in FIG. 32C-3. If no message was sent, a channel disconnect failure message is sent fo the FORMATTER SEND MESSAGE register in step 3285.

If a terminate message (see FIG. 10) is received from the call processor, step 3286 transfers control to step 3287 to again determine if a valid line number or remote group number is in service. If this test is satisfied, a terminate routine is performed and a send ground start message is sent to the remote digital satellite unit as required (step 3288). Then control passes to the PRINT CPC module. If a valid line or a remote group number is not found, then the satellite line number is tested in step 3289. An accumulator "B" in the processor is set with a message indicating either that the remote digital satellite unit is not in service or that there is a nonvalid data value. Control then passes to another module.

If a line control message (see FIG. 10) is received, step 3290 in FIG. 32C-3 transfers control to an LINCTN module that sends a relay control message (see FIG. 16) to the remote digital satellite unit in step 3291. If a paystation control message (see FIG. 10) is received in step 3292, control passes to perform a paystation control routine in step 3293. If a ring line message is decoded in step 3294, a ring control message is sent in step 3295. After the relay control, paystation control, or ring control messages are sent in steps 3291, 3293, and 3295 respectively, control passes to step 3296, which represents the COMPL module, to send a "message complete" message to the FORMATTER SEND MESSAGE register. Then control passes to the PRINT CPL module, where call information is printed as required in step 3297 before control is transferred to the SDCPM module which, in step 3298, calls an LDSIF MODULE to send the message in the FORMATTER SEND MESSAGE register to the call processor. This module is depicted in FIG. 32D and will be described later.

If a test response message is decoded in step 3299, then a "message complete" message is sent to the FORMATTER SEND MESSAGE register in step 3300 and that message is sent to the maintenance processor in step 3301. If a test response message is not decoded, control passes from step 3299 to step 3302. An "invalid CP header" message is then sent, as this would be the last of the possible headers. Control then passes to step 3297 to print the call information as required.

Figure 32D:
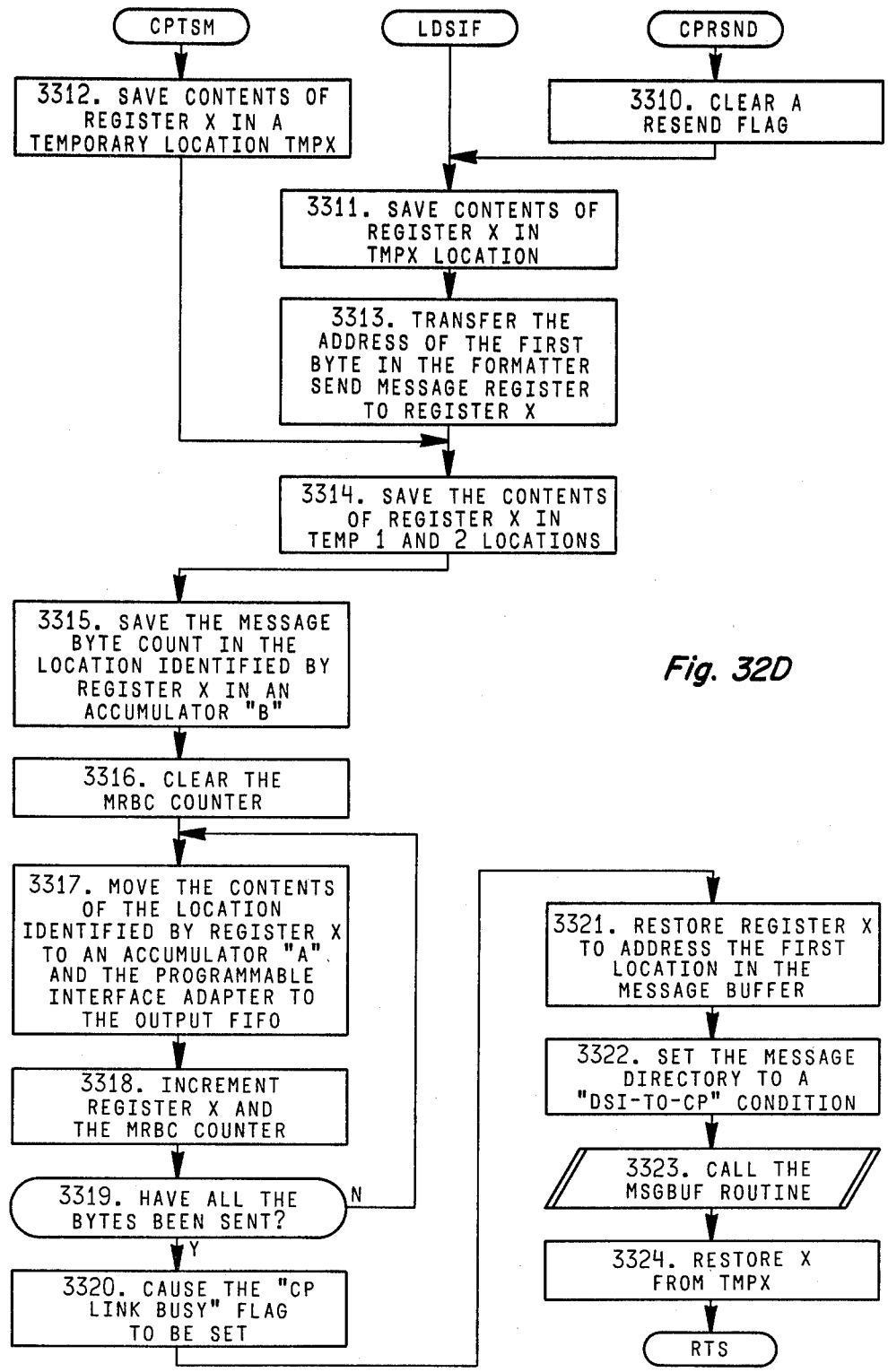

FIG. 32D shows the LDSIF module for transferring a message back to the call processor. This module can also be called step 3206 in FIG. 32-1. If called as the CPRSND module, step 3310 clears a RESEND flag. Then control transfers to step 3311, which is the first step in the LDSIF module. In addition, it will also be possible to send a message in response to a CPTSM module, not shown. This module saves the contents of an index register (register X) in a temporary location in step 3312 before entering the program.

More specifically, in step 3311 the contents of register X are also saved in a temporary location and then the address of the first byte position in the FORMATTER SEND MESSAGE register is transferred to register X in step 3313. The contents of register X are stored in two temporary locations in step 3314 and the message byte count in the low order bits of the first location identified by register X are stored in accumulator B (step 3315). A message register byte count (MRBC) counter is cleared in step 3316 so that the message can then be sent.

Specifically, the contents of the location idenfified by register X are sent through an accumulator "A" and the programmable interface adapter to the formatter output FIFO in step 3317. In step 3318, the contents of register X and the MRBC counter are incremented. The MRBC counter is tested in step 3319 and control passes back to step 3317 until all the bytes have been sent. When this occurs, control passes to step 3320, which causes the "CP link busy" flag to be set. Then register X is restored to address the first location in the message buffer (step 3321). The message directory is set to indicate a "DSI-TO-CP" condition in step 3322. In step 3323, the MSGBUF module of FIG. 32B is processed. The module finishes by restoring register X from the temporary location in step 3324.

Figure 32E:
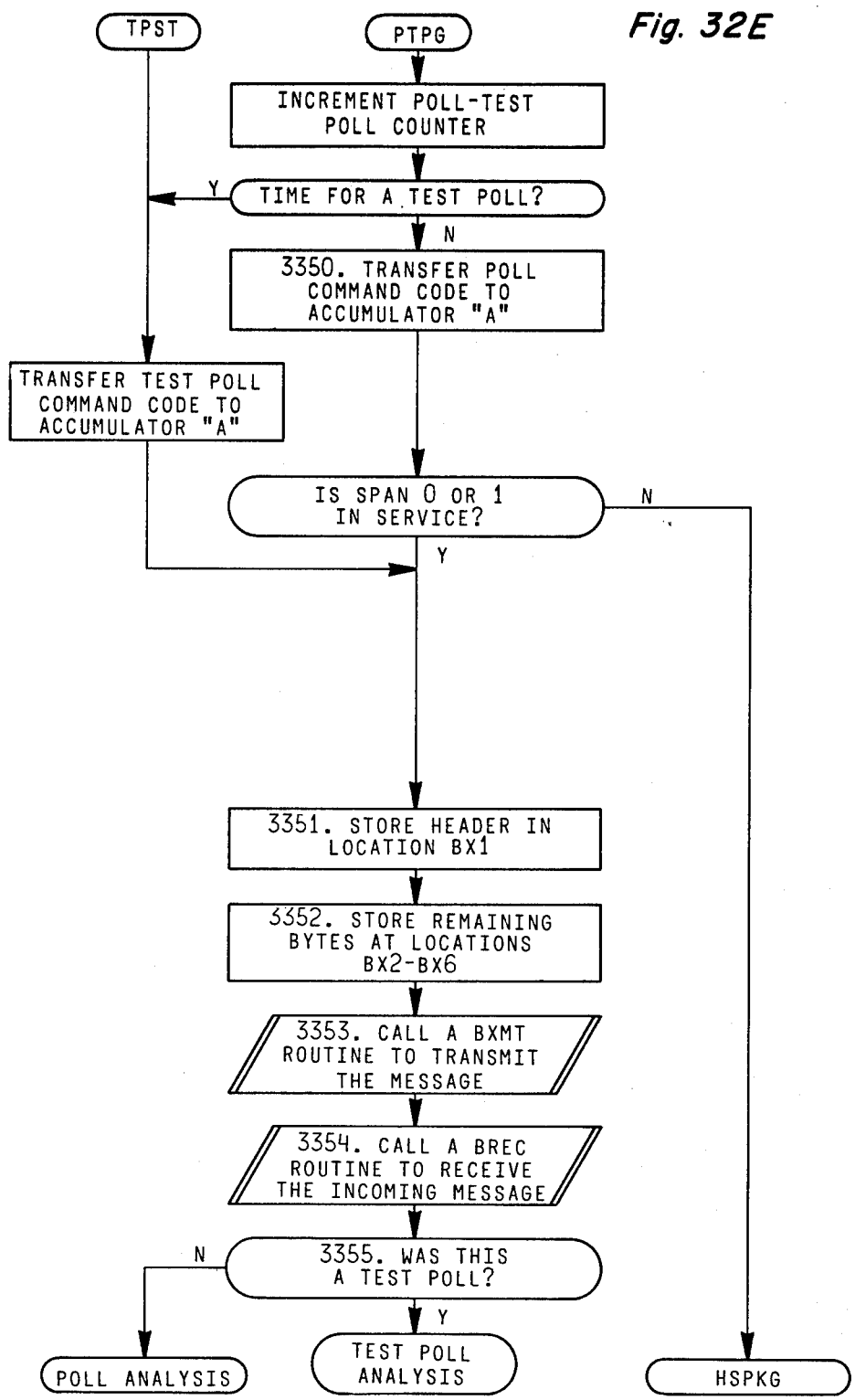

The foregoing modules are used by the digital satellite interface processor 27 to control transfers from and to the call processor. As indicated in FIG. 32C, however, there are also times when messages are transferred between the digital satellite interface and the remote digital satellite unit through the buffer 29 (FIG. 4) and the span equipment previously described. One specific example of the operations which require such a transfer is shown in FIG. 32E.

Specifically, this set of operations shows the transfer of a poll or test poll message (see FIG. 16). Steps 3350 generally control the timing of that operation. In step 3351, the appropriate message header is stored in a location BX1, which is an initial location in a DSU transmission buffer. The remaining bytes are stored at locations BX2 through BX6 in step 3352. A BXMT module transmits this message through the buffer for subsequent encoding during the "B" signalling time slots onto the span. This BXMT module is called in step 3353 and is described later with respect to FIG. 32F. Then the digital satellite interface awaits the echo message and uses a BREC routine in step 3354, shown in detail in FIG. 32H, to receive the echo message. Step 3355 controls subsequent response to the received message.

Figure 32F:
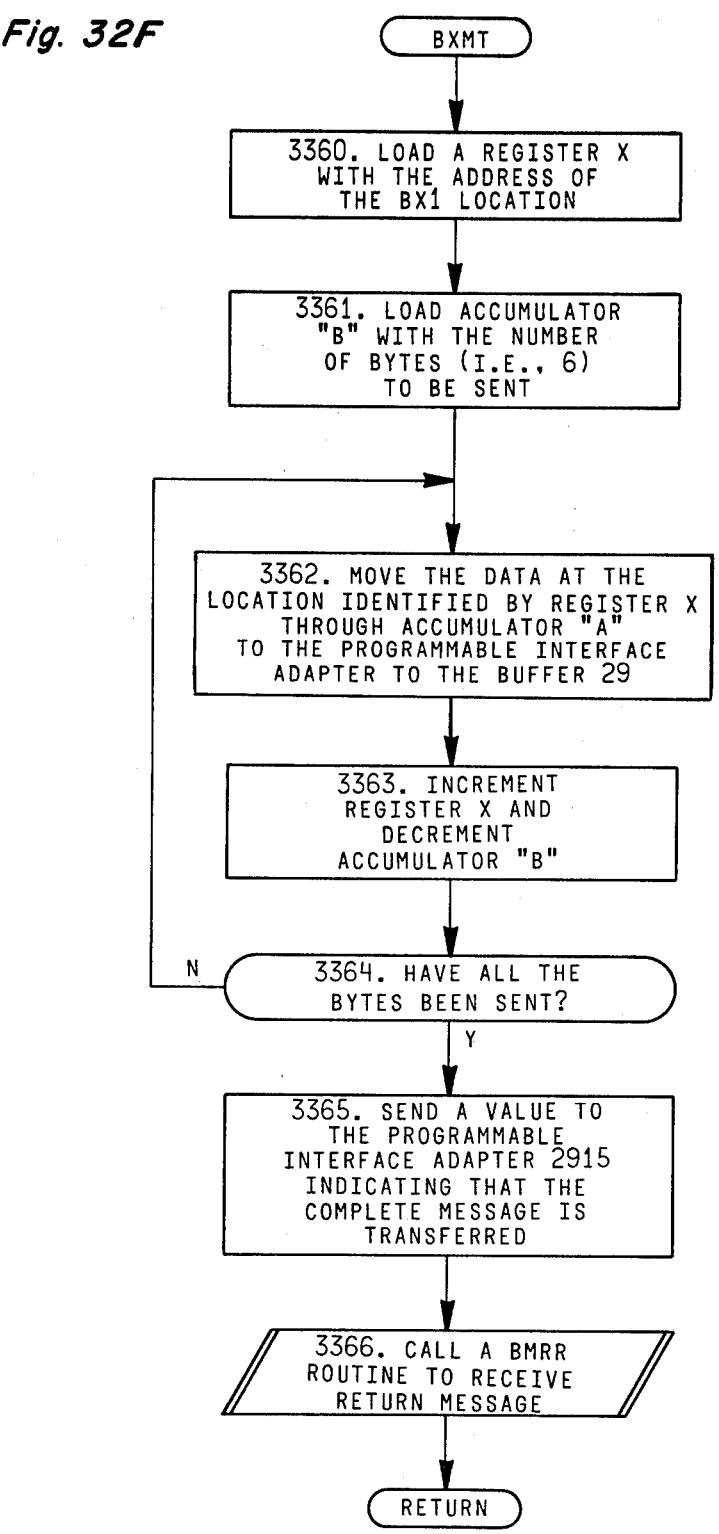
Figure 32G:
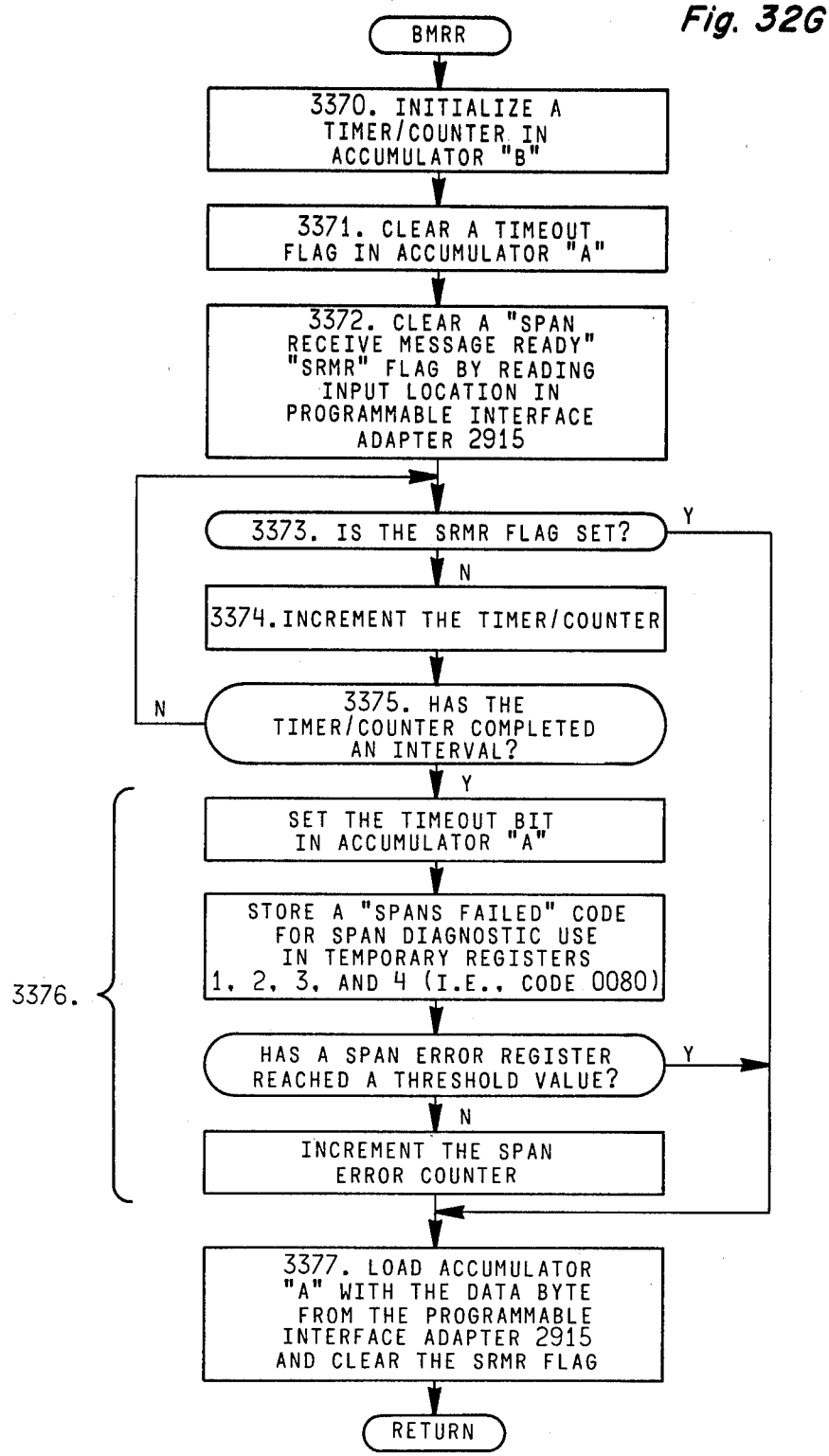

Referring now to FIG. 32F, the transmission of a message begins by loading register X with the address of the BX1 location in step 3360. Accumulator "B" of the processor 27 is then loaded with the number of bytes to be sent, in step 3361. In step 3362, the data at the location identified by the contents of register X is moved through accumulator "A" to the programmable interface adapter for the buffer 29. In step 3363, register X is incremented and accumulator B is decremented so that step 3364 can determine when all the bytes have been sent. When they have, control passes to step 3365. A value is then sent to the programmable interface adapter 2915 associated with the buffer, indicating that the complete message has been transferred. In step 3366, a BMRR module is called. This module is shown in FIG. 32G. It senses the return of the echo message and delays return of control to step 3354 in FIG. 32E until such time as the digital satellite interface begins to receive the echo message.

The BMRR module begins with the initialization of a timer/counter in accumulator "B" (step 3370).

A time-out flag is set in accumulator "A" and cleared in step 3371. A span receive message ready (SRMR) flag is cleared in the programmable interface adapter 2915 (step 3372). Control then passes through step 3373, to test the SRMR flag to step 3374, to increment the timer/counter, and step 3375 to test the counter. If the timer completes its interval before the SRMR flag is set, steps 3376 process the resulting error and load the accumulator "A" with an appropriate data byte in step 3377. However, if the incoming message is received within the allocated time, step 3373 branches directly to step 3377 and control then passes to the return following step 3366 in FIG. 32F, and the return following step 3353 in FIG. 32E.

Figures 1, 32H:
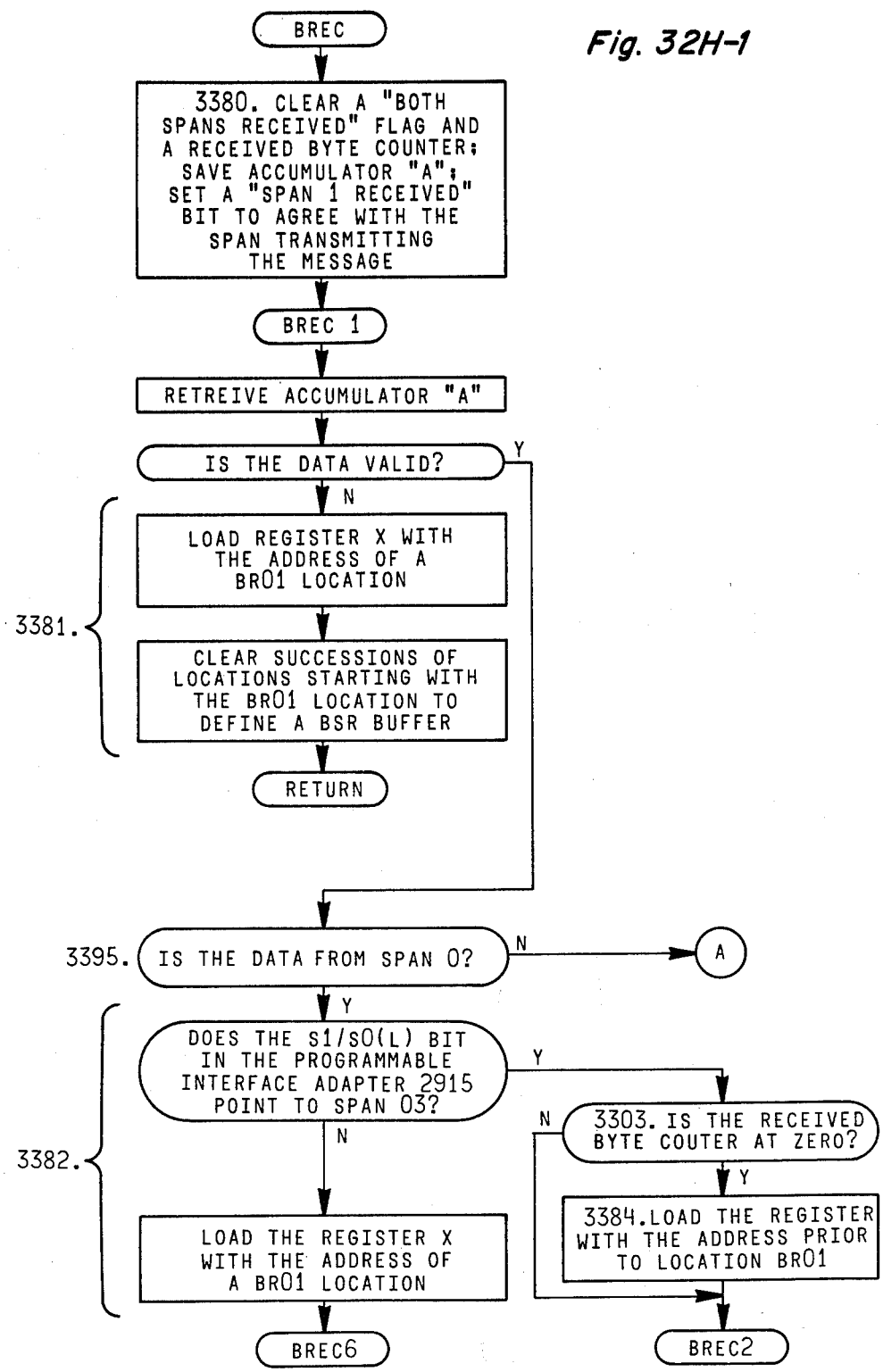
Figures 2, 32H:
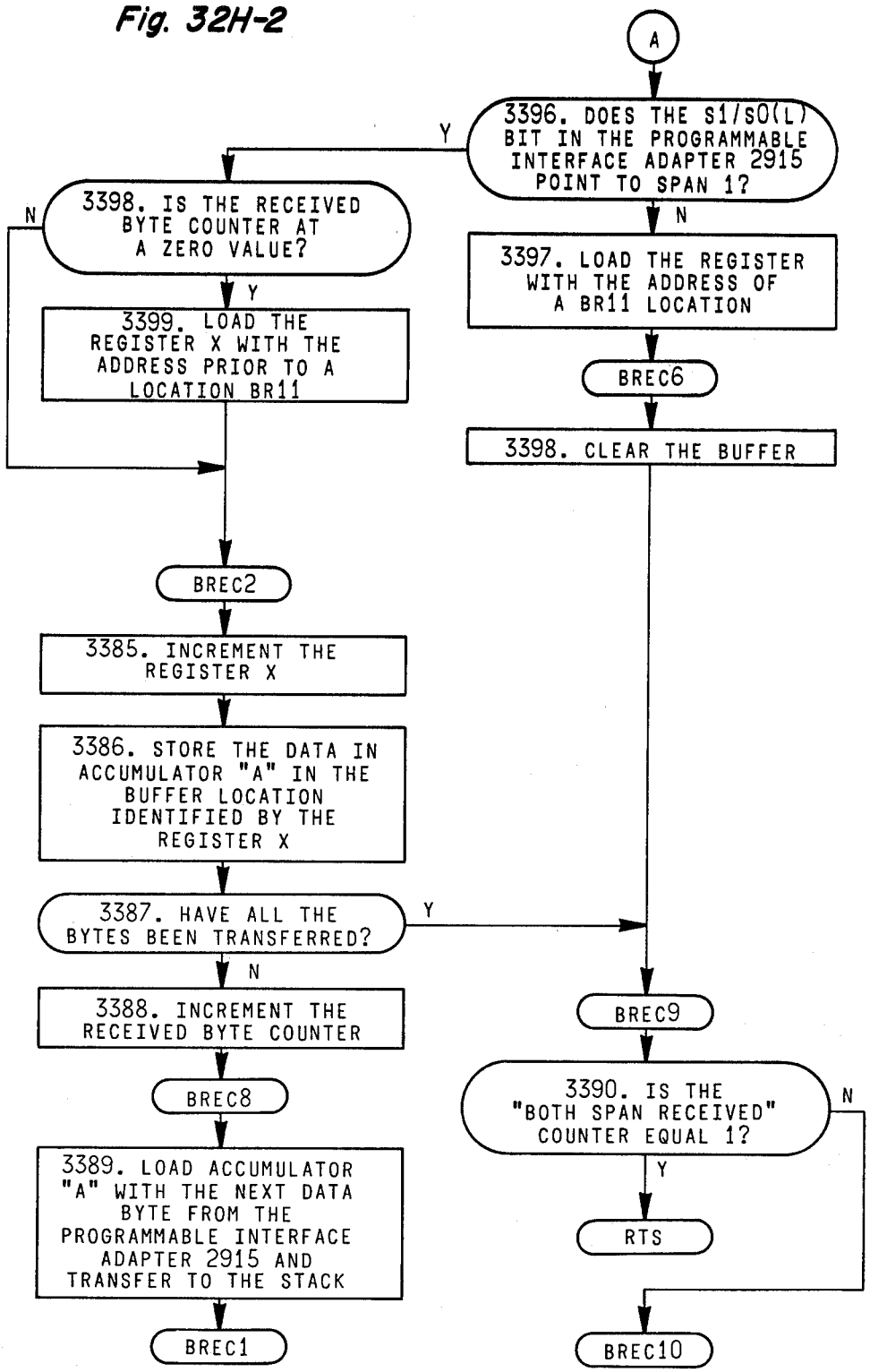
Figures 3, 32H:
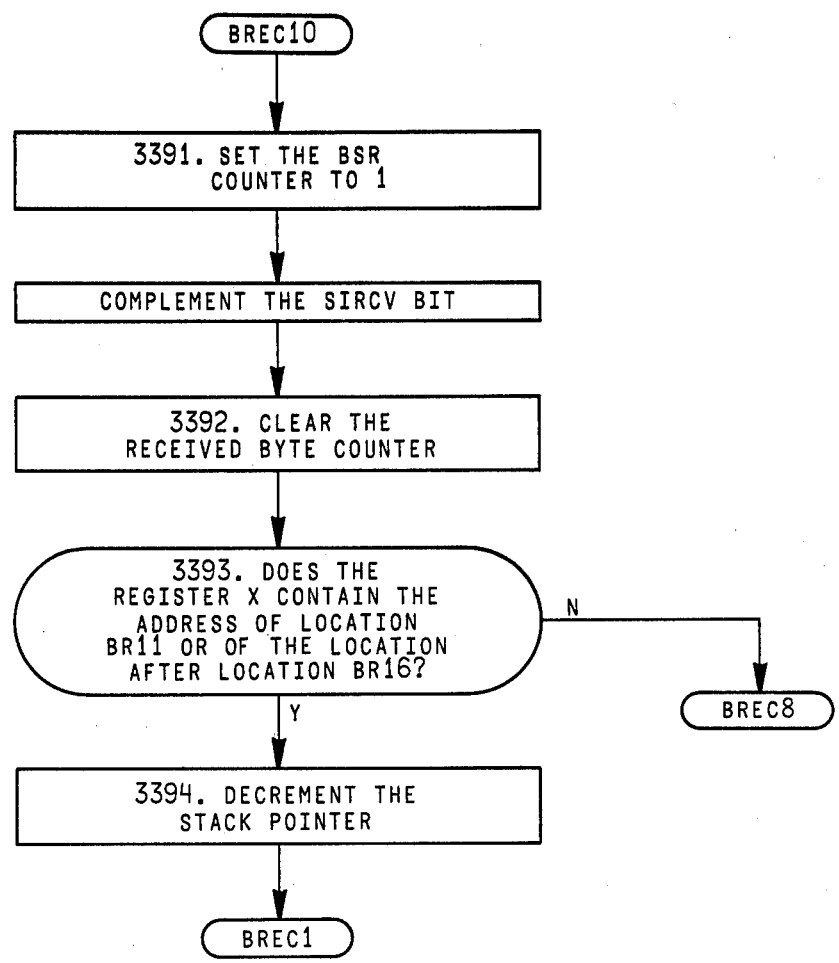

Control then passes directly to step 3354 in FIG. 32E and the BREC module shown in FIGS. 32H-1 through 32H-3. In step 3380 of FIG. 32H-1, a "BOTH SPANS RECEIVE" flag and RECEIVED BYTE COUNTER register are cleared. The contents of accumulator "A" are saved. A SPAN 1 RECEIVE bit is set to agree with the span transmitting the message. If data in the accumulator "A" is not valid, a buffer is defined in step 3381. If the data is valid from the span, an S1/S0 (L) bit, which indicates whether span 1 or span 0 is sending information, is tested to define the appropriate starting location in the BSR buffer, as there are two starting locations depending upon which span is transmitting the information. If the information is coming from span 0, the RECEIVE BYTE COUNTER is tested. If the byte counter is at 0, indicating a first transfer through the system, step 3308 branches to step 3384 to load register X with the address prior to location BR01 which is the initial location for the span 0 buffer. In FIG. 32H-2, step 3385 then increments register X and the data stored in accumulator "A" is transferred to the appropriate buffer location in step 3386. If all the bytes have not been transferred, step 3387 branches to step 3388 to increment the RECEIVE BYTE COUNTER and to allow the accumulator to be loaded with the next data byte from the programmable interface adapter 2915 which is then transferred to the stack in step 3389. Control then passes back to the BREC1 module, immediately following step 3380 in FIG. 32H-1. When all the bytes for span 0 have been transferred, control passes to step 3390 in FIG. 32H-2 to determine if messages from both spans have been received. If not, control passes to module BREC10 in FIG. 32H-3. In this case, the BSR counter is set to 1 and the SPAN RECEIVE bit is complemented in step 3391. The RECEIVE BYTE COUNTER is cleared in step 3392. If register X contains the address of the initial location of the second buffer or the location after the second buffer, control passes from step 3393 so the stack pointer is decremented in step 3394 and control passes back to the BREC1 point in FIG. 32H-1. Otherwise, control passes from step 3393 to a BREC8 module represented by step 3389 in FIG. 32H-2.

If the data being received is from the other span, control passes from step 3395, in FIG. 32H-1, to step 3396 in FIG. 32H-2. If the S1/S0(L) bit does not point to span 1, register X is loaded with the address of the span 1 buffer in step 3397 and the buffer is cleared in step 3398 before control passes to step 3390.

If span 0 is indicated in step 3396, control passes to step 3398 to determine if the RECEIVE BYTE counter is at a 0 value. If it is, the X register is loaded with the address prior to the first location in the second buffer in step 3399, before control passes to step 3385 to begin loading the second buffer register.

FIG. 32, therefore, depicts those portions of the control programs associated with the processor 27 in FIG. 4 that enable the digital satellite interface to communicate with the call processor and with the remote digital satellite unit. Specific examples of the operation and response to particular commands have been set forth. Any particular listing of commands and the operations they peform can be developed for any particular application. It is important for the purposes of this invention, however, to understand the communications between the various elements that allow the remote concentration of lines which the digital satellite interface and remote digital satellite units provide. Moreover, the foregoing description will indicate how the call processor may be modified to provide the capability of communicating with the digital satellite interface.

This invention has been disclosed by means of block diagrams, flow diagrams, and logic diagrams. We believe that this disclosure is sufficient to enable logic designers to build the circuitry and programmers to write programs for operation with a specific processor without undue experimentation. Moreover, this disclosure has been in terms of a specific embodiment, and it will be apparent that many different circuits and logical organizations can be utilized with the attainment of all or some of the objects of this invention. Therefore, it is the object of the appended claims to cover all such variations and modifications as come within the true spirit and scope of this invention.

What is claimed as new and desired to be secured by Letters Patent of the United States is:

1. In a telephony system for selectively interconnecting telephone calls among a plurality of telephone lines that includes, at a first location, a plurality of port group highway means for receiving and transmitting signals that represent voice data and signals in a first format that represent supervisory data, and call processing means including a digital data processor and an input-/output bus means for selectively interconnecting the plurality of port group highway means in response to certain of a plurality of commands interpreted by the digital data processor, said telephony system including, at a second location that is physically remote from the first location, port means for transmitting onto and receiving from certain of the telephone lines first port signals representing voice data and for transmitting and receiving second port signals representing voice data signals and supervisory data signals, the telephony system further comprising communications linkage means connected to the port means for conveying the second port signals in a predetermined format, the improvement of interfacing means comprising:
   A. encoding means connected to the input/output bus means for encoding signals representing supervisory data signals in response to commands from the call processing means,
   B. transfer means connected to a selected port group highway means, the communications linkage means and said encoding means for converting signals between the format of the signals at the port group highway means and said encoding means and the format of the signals on the communications linkage means, and
   C. message generating means connected to said transfer means and to the input/output bus means for transmitting messages to the call processing means in response to certain signals representing supervisory data signals received in said transfer means from the communications linkage means.

2. The arrangement as defined in claim 1 in which said port group highway means further includes means for transmitting timing signals, said transfer means further including:
   A. timing signals generating means for generating timing signals in response to timing signals from said port group highway means, including timing signals representative of time slots;
   B. means for receiving voice data signals from said port group highway means in response to timing signals from said timing signals generating means;
   C. means for receiving supervisory data signals from said encoding means; and
   D. means responsive to the timing signals from said timing signals generating means for selectively transmitting the received voice data signals and supervisory data signals in the format of the communications linkage means.

3. The arrangement as defined in claim 2 in which said voice data signals receiving means includes random access memory means for receiving the voice data signals from said port group highway means in response to the timing signals from said timing signals generating means and transmitting said voice data signals in response to said timing signals representative of time slots, said selective transmitting means including output multiplexer means coupled to said random access memory means and said transfer means supervisory data signals receiving means for coupling signals from either said random access memory means or said transfer means supervisory data signals receiving means in response to the timing signals representative of said time slots.

4. The arrangement as defined in claim 1 in which said port group highway means further includes means for transmitting timing signals, said transfer means further including:
   A. timing signals generating means for generating timing signals in response to timing signals from said port group highway means, including timing signals representative of time slots;
   B. means responsive to the timing signals representative of time slots from said timing signals generating means for receiving voice data signals from said communications linkage means;
   C. means responsive to the timing signals representative of time slots from said timing signals generating means for receiving voice data and supervisory data signals from said communications linkage means; and
   D. means connected to said voice data signals receiving means and supervisory data signals receiving means for transmitting said supervisory data signals to said message generating means and said voice data signals to said port group highway means in response to said timing signals from said timing signals generating means.

5. The arrangement as defined in claim 4 in which:
   A. said voice data signals receiving means includes a first random access memory means responsive to the timing signals from said timing signals generating means representative of time slots for receiving voice data signals from said communications linkage means;
   B. said supervisory data signals receiving means includes a second random access memory means responsive to the timing signals from said timing signals generating means representative of time slots for receiving supervisory data signals from said communications linkage means; and
   C. said transfer means transmitting means includes a multiplexer means responsive to timing signals from said timing signals generating means representative of the format of signals on said port group highway means for selectively coupling signals from one of said first or second random access memory means to the port group highway means in the format of signals at the port group highway means.

6. The arrangement as defined in claim 1 in which said encoding means includes:
   A. processing means for receiving commands from the input/output bus means,
   B. means connected to said receiving means for processing the commands, said processing means including means for generating supervisory data signals in response to the processed commands, and
   C. means connected to said processing means for transmitting the supervisory data signals to said transfer means.

7. The arrangement as defined in claim 6 in which said input/output bus means transfers commands and control signals, and said receiving means includes:
   i. input/output bus means interfacing means connected to said input/output bus means for transferring commands and control signals therefrom in response to control signals from the input/output bus means, and
   ii. formatter means connected to said input/output bus means interfacing means for receiving the commands and control signals, and for transferring the commands to said processing means in response to control signals from said processing means.

8. The arrangement as defined in claim 7 in which said transfer means includes means for generating timing signals, and in which said transmitting means includes buffer means connected to said processing means for receiving supervisory data signals from said processing means in response to control signals therefrom, and for coupling the supervisory data signals to said transfer means in response to timing signals therefrom.

9. The arrangement as defined in claim 1 in which said message generating means includes:
   A. means for receiving supervisory data signals from said transfer means,
   B. means connected to said receiving means for processing the supervisory data signals and for generating message signals in response to the processed supervisory data signals, and
   C. means connected to said processing means for transmitting the message signals to said input/output busmeans.

10. The arrangement as defined in claim 9 in which said transfer means includes means for generating timing signals and in which said processing means includes means for generating control signals, said receiving means including buffer means connected to said transfer means and said processing means for receiving said sense supervisory data signals in response to timing signals from said transfer means and for coupling the supervisory data signals to said processing means in response to control signals from said processing means.

11. The arrangement as defined in claim 9 in which said input/output bus means and said processing means each transfers control signals, and said receiving means includes:
   i. formatter means connected to said processing means for transferring the message signals in response to control signals from said processing means, and
   ii. input/output bus means interfacing means connected to said formatter means and to the input/output bus means for transferring message signals in response to control signals from the input/output bus means.

12. A telephony system for selectively interconnecting telephone calls among a plurality of telephone lines comprising:
   A. a plurality of port group highway means at a first location for conveying voice data signals and control data signals as signals in a first predetermined format,
   B. call processing means including, at the first location, a digital data processor having an input/output bus for selectively interconnecting said plurality of port group highway means in response to certain of a plurality of commands interpreted by said digital data processor,
   C. port means, at a second location that is physically remote from the first location, for transmitting onto and receiving from certain of the telephone lines first port signals representing voice data and for transmitting and receiving second port signals representing voice data and supervisory data signals, D. communications linkage means connected to said port means for conveying the second port signals in a second predetermined format, and E. interfacing means at the first location connected to a selected one of said port group highway means, to said input/output bus in said call processing means and to said communications linkage means, said interfacing means comprising:
i. encoding means connected to said call processing means for encoding signals representing supervisory data signals in response to commands from said call processing means,
ii. transfer means connected to said selected port group highway means, said communications linkage means and said encoding means for converting signals between the format of the signals at said port group highway means and said communications linkage means, and
iii. message generating means connected to said transfer means and to said input/output bus for transmitting messages to said call processing means in response to certain signals representing supervisory data signals received in said transfer means from said communications linkage means.

13. A telephony system as defined in claim 12 in which said port group highway means further includes means for transmitting timing signals, said transfer means further including:
A. timing signals generating means for generating timing signals in response to timing signals from said port group highway means, including timing signals representative of time slots;
B. means for receiving voice data signals from said port group highway means in response to timing signals from said timing signals generating means
C. means for receiving supervisory data signals from said encoding means, and
D. means responsive to the timing signals from said timing signals generating means for selectively transmitting the received voice data signals and supervisory data signals in the format of the communications linkage means.

14. A telephony system as defined in claim 13 in which said voice data signals receiving means includes random access memory mens for receiving the voice data signals from said port group highway means in response to the timing signals from said timing signals generating means and transmitting said voice data signals in response to said timing signals representative of time slots, said selective transmitting means including output multiplexer means coupled to said random access memory means and said supervisory data receiving means for coupling signals from either said random access memory means or said supervisory data signal receiving means in response to the timing signals representative of said time slots.

15. A telephony system as defined in claim 12 in which said port group highway means further includes means for transmitting timing signals, said transfer means further including:
A. timing signals generating means for generating timing signals in response to timing signals from said port group highway means, including timing signals representative of time slots;
B. means responsive to the timing signals representative of time slots from said timing signals generating means for receiving voice data signals from said communications linkage means;
C. means responsive to the timing signals representative of time slots from said timing signals generating means for receiving voice data and supervisory data signals from said communications linkage means; and
D. means connected to said voice data signals receiving means and supervisory data signals receiving means for transmitting said supervisory data signals to said message generating means and said voice data signals to said port group highway means in response to said timing signals from said timing signals generating means.

16. A telephony system as defined in claim 15 in which:
A. said voice data signals receiving means includes a first random access memory means responsive to the timing signals from said timing signals generating means representative of time slots for receiving voice data signals from said communications linkage means;
B. said supervisory data signals receiving means includes a second random access memory means responsive to the timing signals from said timing signals generating means representative of time slots for receiving supervisory data signals from said communications linkage means; and
C. said transfer means transmitting means includes a multiplexer means responsive to timing signals from said timing signals generating means representative of the format of signals on said port group highway means for selectively coupling signals from one of said first or second random access memory means to the port group highway means in the format of signals at the port group highway means.

17. A telephony system as defined in claim 12 in which said encoding means includes:
A. means for receiving commands from the input/output bus,
B. processing means connected to said receiving means for processing the commands for generating supervisory data signals in response to the processed commands, and
C. means connected to said processing means for transmitting the supervisory data signals to said transfer means.

18. A telephony system as defined in claim 17 in which said input/output bus transfers commands and control signals, and said receiving means includes:
i. input/output bus interfacing means connected to said input/output bus for transferring commands and control signals therefrom in response to control signals from the input/output bus, and
ii. formatter means connected to said input/output bus interfacing means for receiving the commands and control signals, and for transferring the commands to said processing means in response to control signals from said processing means.

19. A telephony system as defined in claim 18 in which said transfer means includes means for generating timing signals, and in which said transmitting means incudes buffer means connected to said processing means for receiving supervisory data signals from said processing means in response to control signals therefrom, and for coupling the supervisory data signals to said transfer means in response to timing signals therefrom.

20. A telephony system as defined in claim 12 in which said message generating means includes:
  A. means for receiving supervisory data signals from said transfer means,
  B. means connected to said receiving means for processing the superviosry data signals and for generating message signals in response to the processed supervisory data signals, and
  C. means connected to said processing means for transmitting the message signals to said input/output bus.

21. A telephony system as defined in claim 20 in which said transfer means includes means for generating timing signals and in which said processing means includes means for generating control signals, said receiving means including buffer means connected to said transfer means and said processing means for receiving said supervisory data signals in response to timing signals from said transfer means and for coupling the supervisory data signals to said processing means in response to control signals from said processing means.

22. A telephony system as defined in claim 20 in which said input/output bus and said processing means each transfers control signals, and said receiving means includes:
  i. formatter means connected to said processing means for transferring the message signals in response to control signals from said processing means, and
  ii. input/output bus interfacing means connected to said formatter means and to the input/output bus for transferring message signals in response to control signals from the input/output bus.

23. A telephony system as defined in claim 12 in which the second port signals define a sequence of time slots, said second location port means including:
  A. means for sensing when a telephone connected to a telephone line connected thereto goes into an offhook condition,
  B. means for generating a message indicating that a telephone has gone into an offhook condition and for transmitting the message onto said communications linkage means; and
  C. means responsive to a messge from said first location interfacing means over said communications linkage means for assigning a time slot to a telephone line when the telephone connected thereto goes into an offhook condition.

24. A telephony system as defined in claim 23 in which said second location port means further includes:
  A. means for sensing selected conditions, and
  B. means responsive to a selected condition being sensed for generating sense data signals and for transmitting them to said interfacing means during a selected time slot associated with the telephone line.

25. A telephony system as defined in claim 23 in which said second location port means further includes:
  A. means for receiving supervisory data signals during a selected time slot associated with the telephone line, and
  B. function means responsive to said supervisory data signals for performing a selected function in response to the receipt of said supervisory data signals.

26. A telephony system for selectively interconnecting telephone calls among a plurality of telephone lines comprising:
  A. a plurality of port group highway means at a first location for conveying voice data and control data as signals in a first predetermined format,
  B. call processing means at the first location for selectively interconnecting said plurality of port group highway means, said call processing means including:
    i. a digital data processor for interpreting a plurality of commands, said digital data processor having an input/output bus, and
    ii. input/output bus interfacing means connected to said input/output bus,
  C. port means, at a second location that is physically remote from the first location, for transmitting onto and receiving from certain of the telephone lines first port signals representing voice data and for transmitting and receiving second port signals representing voice data and supervisory data,
  D. communications linkage means connected to said port means for conveying the second port signals in a second predetermined format, and
  E. interfacing means at the first location connected to a selected one of said port group highway means, to said input/output bus in said call processing means and to said communications linkage means, said interfacing means comprising:
    i. control means including a digital data processor for controlling the operation of said interfacing means,
    ii. formatting means connected to said input/output bus interfacing means and said control means for converting signals between the format on the input/output bus of the call processing means and a format that is compatible with said control means, thereby to establish a communications path between said control means and said call processing means for supervisory data,
    iii. buffer means connected to said formatting means and said control means for converting signals representing supervisory data between the format of said control means and the format on said communications linkage means,
    iv. transmitter means connected to said buffer means, said selected port group highway means, and said communications linkage means for converting signals representing voice data and supervisory data between the formats of the signals at said port group highway means and said buffer means and the format of the signals at said communications linkage means, and
    v. receiver means connected to said buffer means, said selected port group highway means, and said communications linkage means for converting signals representing voice data and supervisory data between the format of the signals at said communications linkage means and the formats of the signals at said port group highway means and said buffer means.

27. A telephony system as defined in claim 26 in which said second port signals define a series of time slots, the voice data signals and the supervisory data signals being transmitted during selected time slots, said transmitter means further comprising:
  A. means connected to said selected port group highway means for receiving said voice data signals therefrom;
  B. means connected to said buffer means for receiving said supervisory data signals therefrom; and C. means connected to said port group highway signals receiving means and said supervisory data signals receiving means for coupling said voice data signals and said supervisory data signals onto said communications linkage means in selected time slots.

28. A telephony system as defined in claim 27 in which said port group highway means further conveys timing signals to which its voice data signals and control data signals are synchronized, said transmitter means further comprising:
   A. means connected to said port group highway means for generating timing signals representative of the time slots in response to timing signals from said port group highway means;
   B. said port group highway signals receiving means including random access memory means for receiving the voice data signals from said port group highway means in response to the timing signals from said timing signals generating means, said random access memory means transmitting said voice data signals in response to said timing signals representative of the time slots; and
   C. said coupling means including output multiplexer means coupled to said random access memory means, said supervisory data signals receiving means, and to said timing signals generating means for coupling signals from either said random access memory means or said supervisory data signals receiving means to said communications linkage means in response to the timing signals representative of the time slots.

29. A telephony system as defined in claim 26 in which said second port signals define a series of time slots, the voice data signals and the supervisory data signals occupying selected time slots, said receiver means further comprising:
   A. means connected to said communications linkage means for receiving the voice data signals and supervisory data signals therefrom;
   B. means connected to said selected port group highway means for transmitting said voice data signals thereto;
   C. means connected to said buffer means for transmitting said supervisory data signals thereto; and
   D. means connected to said voice data signals and supervisory data signals receiving means, said port group highway signals receiving means and said supervisory data signals receiving means for coupling said voice data signals to said voice data signals transmitting means and said supervisory data signals to said supervisory data signals transmitting means.

30. A telephony system as defined in claim 29 in which said port group highway means further conveys timing signals, and said receiver means further includes:
   A. means connected to said port group highway means for generating timing signals representative of said time slots, in response to timing signals from said port group highway means;
   B. said coupling means including
      i. means responsive to said port group highway timing signals for receiving said supervisory data signals and for transmitting them to said buffer means, and
      ii. random access memory means connected to said timing signals generating means and said communications linkage means for receiving said voice data signals in response to the timing signals representative of said time slots, and for coupling the voice data signals to said port group highway means.

31. A telephony system as defined in claim 30 in which said random access memory means further receives said supervisory data signals and couples them to said port group highway means in response to the timing signals representative of said time slots.

32. A telephony system as defined in claim 26 in which said control means includes means for generating first timing signals, and said transmitter means includes means for generating second timing signals to which said second port signals are synchronized, said buffer means comprising means for receiving supervisory data signals from said control means in response to said first timing signals, and for transmitting said supervisory data signals to said transmitting means in response to said second timing signals.

33. A telephony system as defined in claim 32 in which said buffer means further includes means for receiving supervisory data signals from said receiver means in response to said second timing signals, and for transmitting them to said control means in response to timing signals from said control means.

34. A telephony system as defined in claim 26 in which said formatting means includes input buffer means responsive to control signals from said input/output bus interfacing means for receiving and storing data signals therefrom, said input buffer means being further responsive to control signals from said control means for coupling signals stored therein to said control means.

35. A telephony system as defined in claim 26 in which said formatting means includes output buffer means responsive to control signals from said control means for receiving and storing data signals therefrom, said output buffer means being further responsive to control signals from said input/output bus interfacing means for coupling signals stored therein to said input/output bus interfacing means.

36. A telephony system as defined in claim 26 in which said second port signals define a sequence of time slots, said second location port means including:
   A. means for sensing when a telephone connected to a telephone line connected thereto goes into an offhook condition,
   B. means for generating a message indicating that a telephone has gone into an offhook condition and for transmitting the message onto said communications linkage means; and
   C. means responsive to a message from said first location interfacing means over said communications linkage means for assigning a time slot to a telephone line when the telephone connected thereto goes into an offhook condition.

37. A telephony system as defined in claim 36 in which said second location port means further includes:
   A. means for sensing selected conditions, and
   B. means responsive to a selected condition being sensed for generating sense data signals and for transmitting them to said interfacing means during a selected time slot associated with the telephone line.

38. A telephony system as defined in claim 36 in which said second location port means further includes:
   A. means for receiving supervisory data signals during a selected time slot associated with the telephone line, and
   B. function means responsive to said supervisory data signals for performing a selected function in response to the receipt of said supervisory data signals.

* * * * *